(12) United States Patent
Dyer et al.

(10) Patent No.: US 10,037,352 B1
(45) Date of Patent: Jul. 31, 2018

(54) METHODS FOR EDITING HIERARCHICAL DATA

(71) Applicant: THE BOSTON CONSULTING GROUP, Boston, MA (US)

(72) Inventors: Andrew Mark Donald Dyer, Gleve (AU); Ronald Lee Nicol, Frisco, TX (US); Andrew Francis Toma, Sunny Isle Beach, FL (US); Perry Calnon Keenan, Chicago, IL (US); Bradley Nigel Bryan Noakes, Mosmon (AU); Lindsay Tien-Li Chim, Chicago, IL (US); Matthew Stephen Coleman, Malibu, CA (US); Jorge Victor Barron, Chicago, IL (US); Jordan Isaac McClure, Chicago, IL (US); Rex Xavier Chettiar, Des Plaines, IL (US); Elena Heddie Kim, Chicago, IL (US); Sarah Ann Baxter, Brighton, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 14/218,110

(22) Filed: Mar. 18, 2014

Related U.S. Application Data

(60) Provisional application No. 61/802,884, filed on Mar. 18, 2013.

(51) Int. Cl.
G06F 17/30 (2006.01)
(52) U.S. Cl.
CPC .............................. *G06F 17/30362* (2013.01)

(58) Field of Classification Search
CPC .... G06F 13/3625; G06F 21/602; G06F 21/62; G06F 2221/2141; G06F 3/067; G06F 3/0688; G06F 3/0604; G06F 17/2247; G06F 17/212; G06F 17/24
See application file for complete search history.

(56) References Cited

U.S. PATENT DOCUMENTS

| | | | |
|---|---|---|---|
| 5,285,392 A | | 2/1994 | Kyle et al. |
| 6,018,741 A | * | 1/2000 | Howland .......... G06F 17/30961 707/696 |
| 6,088,693 A | | 7/2000 | Van Huben et al. |
| 6,529,905 B1 | | 3/2003 | Bray et al. |
| 2002/0091558 A1 | | 7/2002 | Anderson et al. |

(Continued)

OTHER PUBLICATIONS

McKinsey & Company Brochure, "McKinsey Center for Government: Org Lab: Brining org design into the 21st Century", Apr. 2013 (4 pages).

(Continued)

*Primary Examiner* — Scott A. Waldron
*Assistant Examiner* — Fatima P Mina
(74) *Attorney, Agent, or Firm* — DLA Piper LLP (US)

(57) ABSTRACT

Methods for Editing Hierarchical Data are provided. Data subsets of hierarchical data are copied. Workstreams are generated and sent to users. An edit to a first workstream from a first user and an edit to a second workstream from a second user are received. The hierarchical data in the general database is edited according to the edits made by the first user and the second user. A full organization view of persons and positions in the organization that includes the edits made by the first user and the second user is displayed.

15 Claims, 116 Drawing Sheets

(56) References Cited

U.S. PATENT DOCUMENTS

| | | | |
|---|---|---|---|
| 2002/0128893 A1* | 9/2002 | Farenden | G06Q 10/063112 705/7.14 |
| 2004/0088647 A1 | 5/2004 | Miller et al. | |
| 2005/0080757 A1 | 4/2005 | Sharma et al. | |
| 2005/0144308 A1* | 6/2005 | Harashima | H04L 67/06 709/232 |
| 2005/0193009 A1 | 9/2005 | Reinhardt et al. | |
| 2006/0206866 A1* | 9/2006 | Eldrige | G05B 15/02 717/122 |
| 2006/0259518 A1 | 11/2006 | Lomet et al. | |
| 2007/0186157 A1 | 8/2007 | Walker et al. | |
| 2007/0198952 A1 | 8/2007 | Pittenger | |
| 2008/0077530 A1 | 3/2008 | Banas et al. | |
| 2008/0091441 A1 | 4/2008 | Flammer | |
| 2009/0019048 A1* | 1/2009 | Pendergast | G06F 17/30011 |
| 2009/0132313 A1* | 5/2009 | Chandler | G06Q 10/063112 705/7.14 |
| 2009/0171726 A1* | 7/2009 | Johnson | G06Q 10/06 705/7.13 |
| 2009/0210408 A1* | 8/2009 | Boyer | G06F 17/30997 |
| 2009/0299829 A1* | 12/2009 | Fraser | G06Q 10/063112 705/7.14 |
| 2010/0077290 A1* | 3/2010 | Pueyo | G06F 17/3082 715/230 |
| 2010/0083374 A1* | 4/2010 | Schmitlin | G06Q 10/10 726/21 |
| 2011/0202381 A1* | 8/2011 | Bernasconi | G06Q 10/06 705/7.14 |
| 2013/0024229 A1* | 1/2013 | Agrawal | G06Q 10/06 705/7.14 |
| 2013/0097093 A1* | 4/2013 | Kolber | G06Q 10/1053 705/321 |
| 2013/0173649 A1 | 7/2013 | Chmiel et al. | |

OTHER PUBLICATIONS

McKinsey & Company Brochure, "Talent System Assessment Tool (TSAT)", Jan. 2011 (4 pages).

www.McKinsey.com, downloaded from web.archive.org, archived on Mar. 6, 2013 (8 pages).

U.S. Appl. No. 13/830,915 electronically captured from PAIR on Nov. 30, 2016.

U.S. Appl. No. 13/830,915 electronically on Jul. 31, 2017 for May 22, 2017 to Jul. 31, 2017.

U.S. Appl. No. 13/830,915 electronically on May 22, 2017 for Nov. 30, 2016 to May 22, 2017.

* cited by examiner

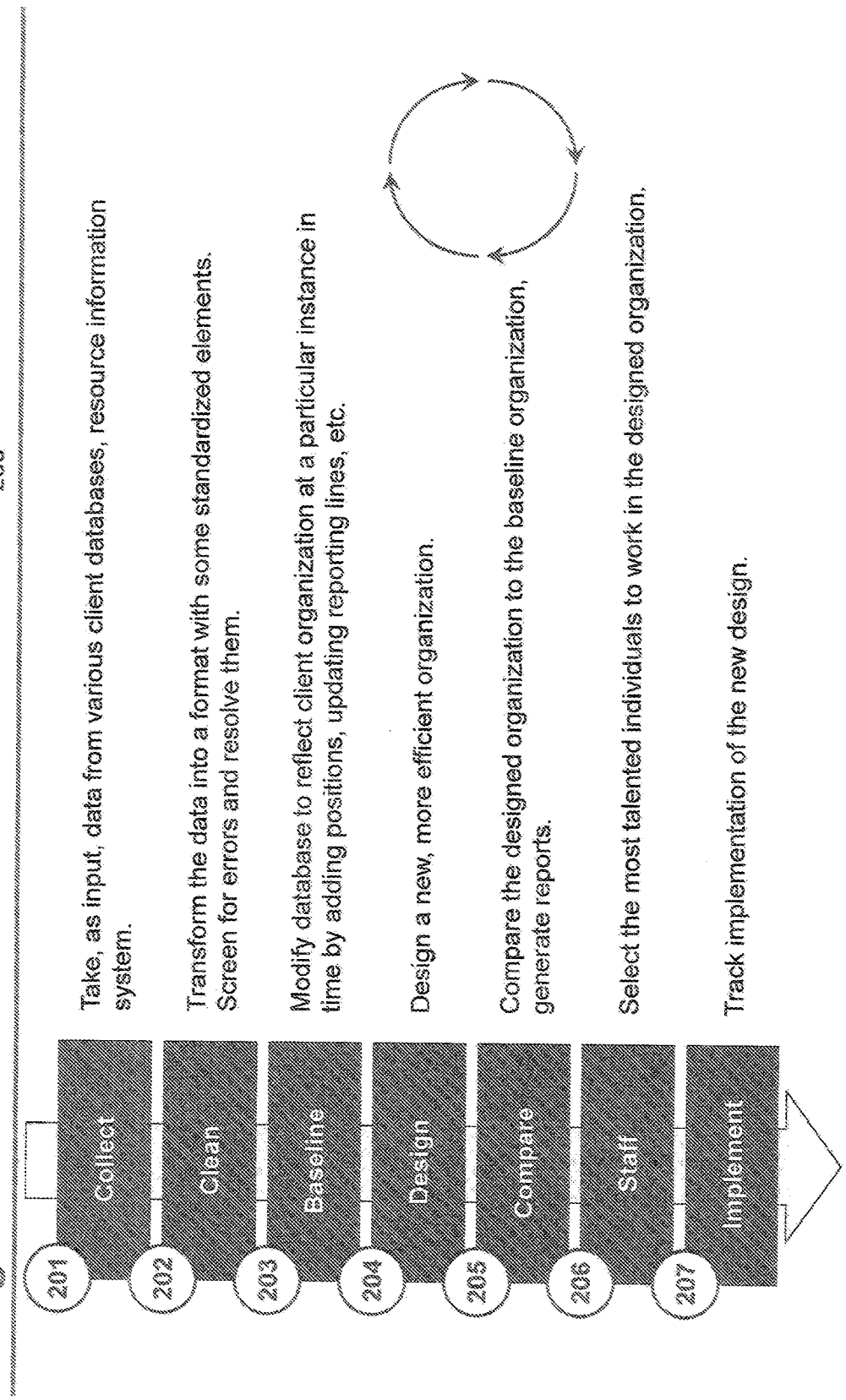

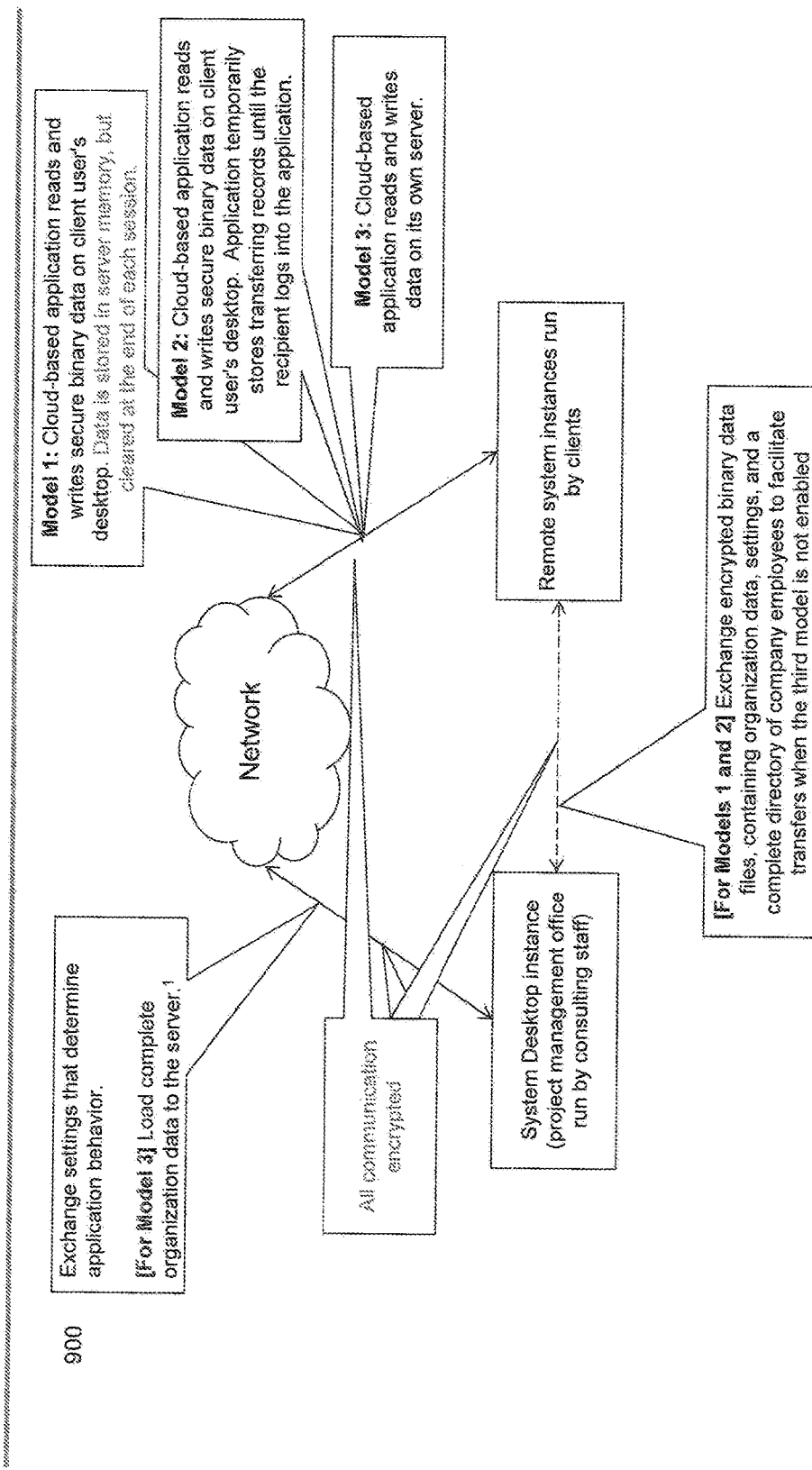

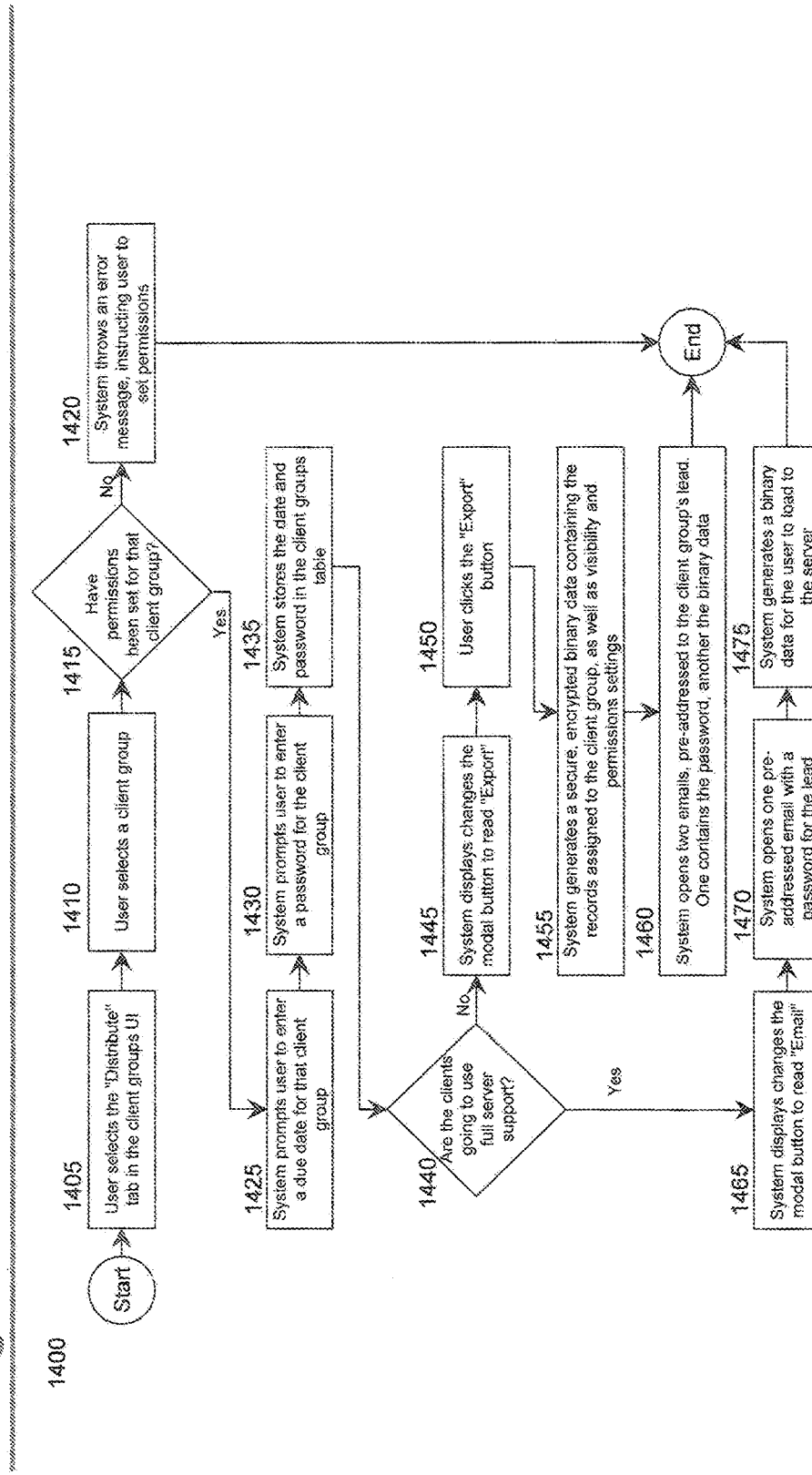

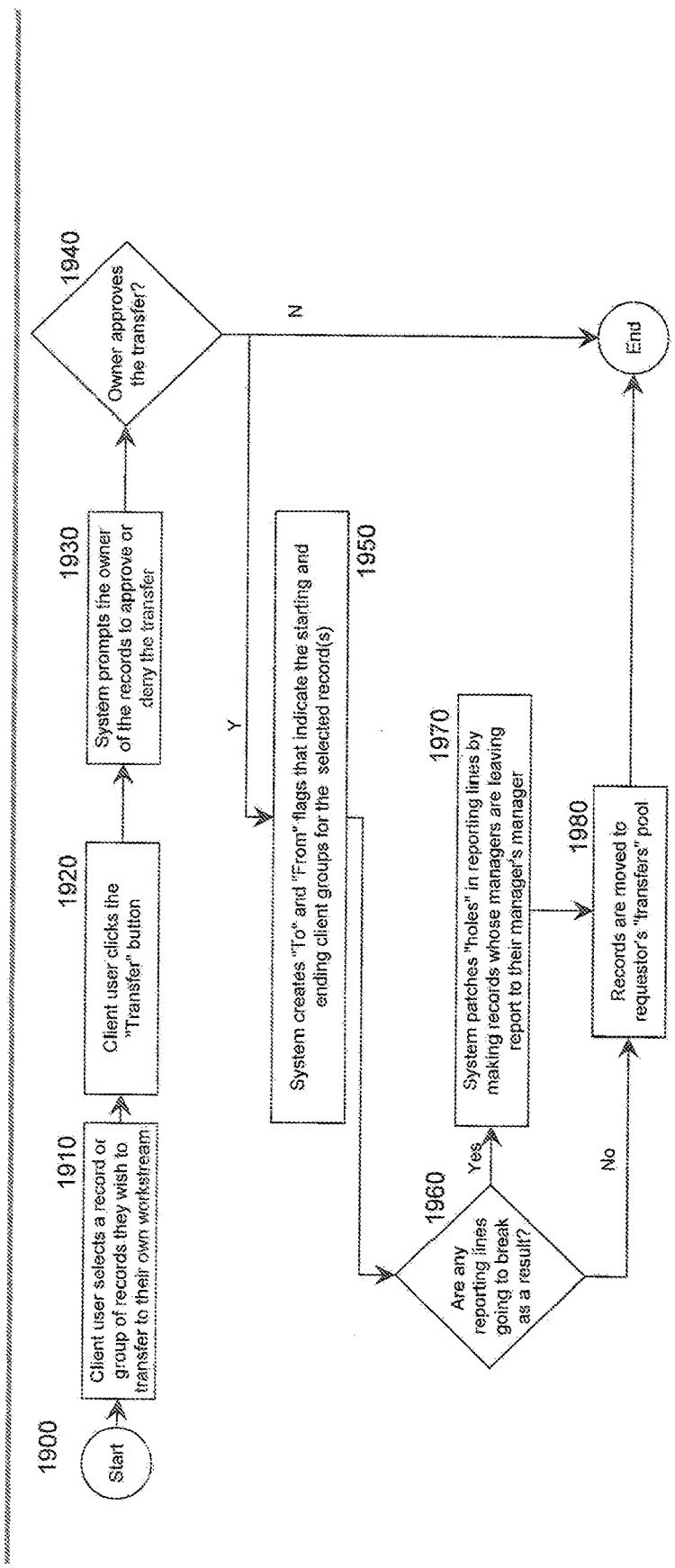

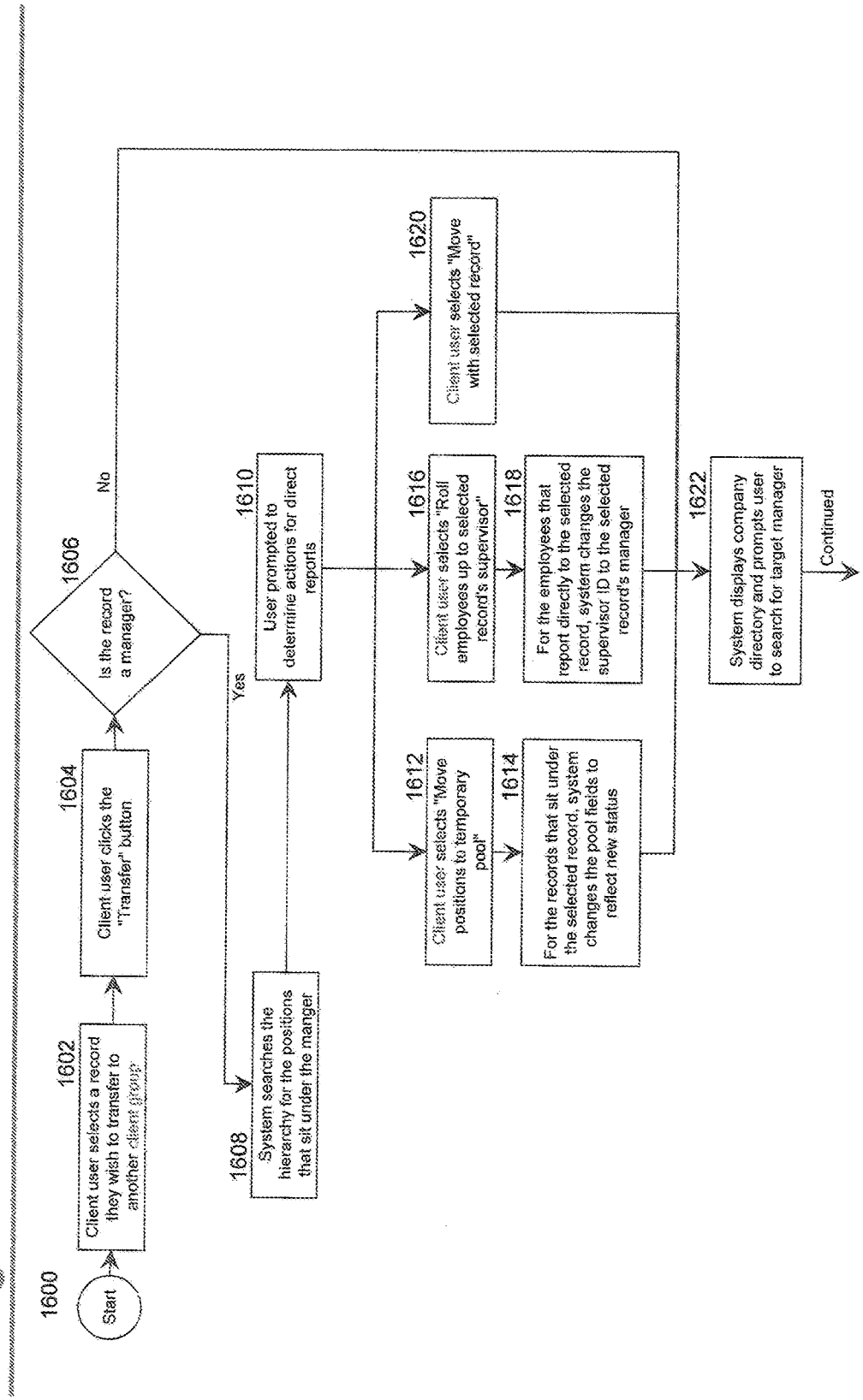

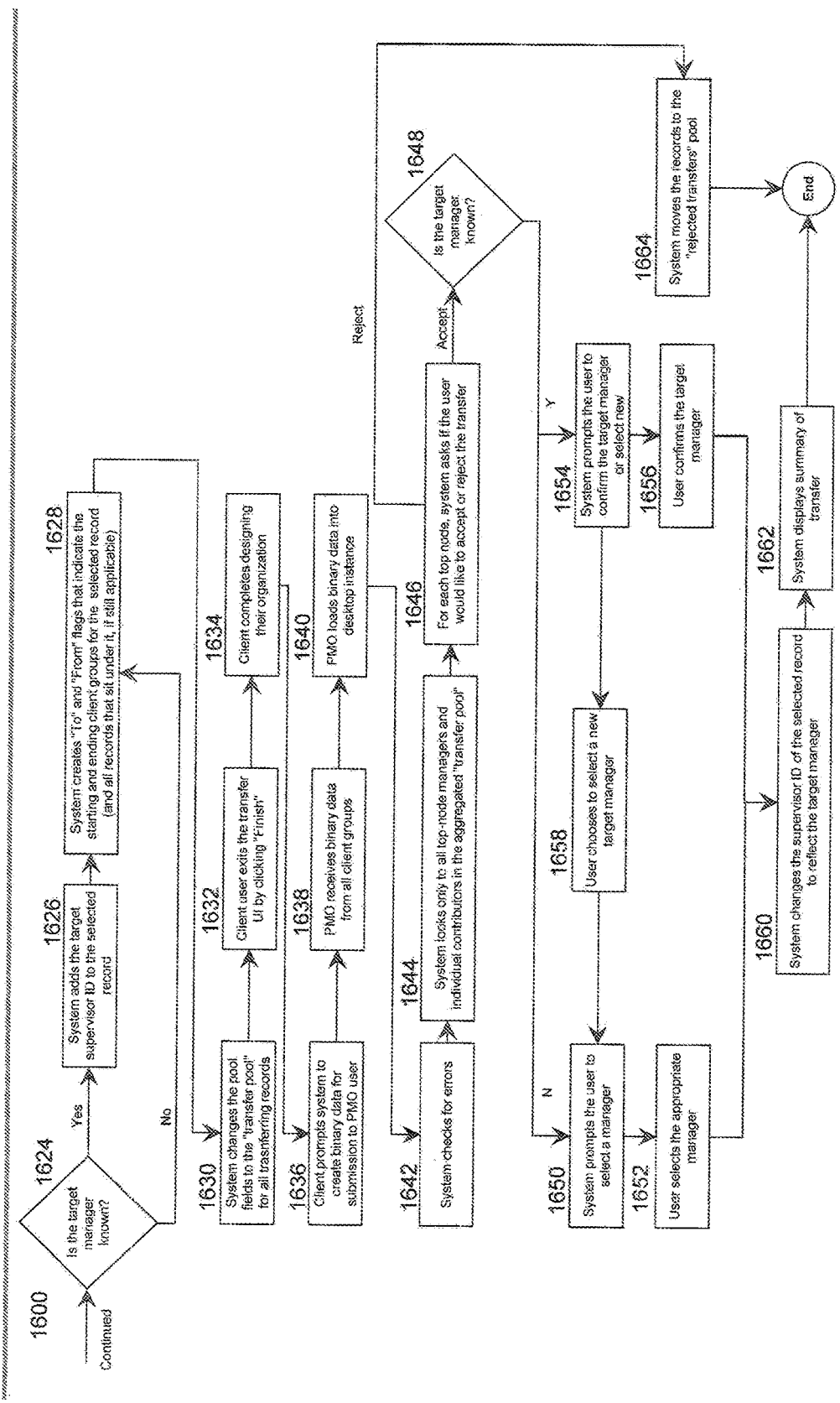

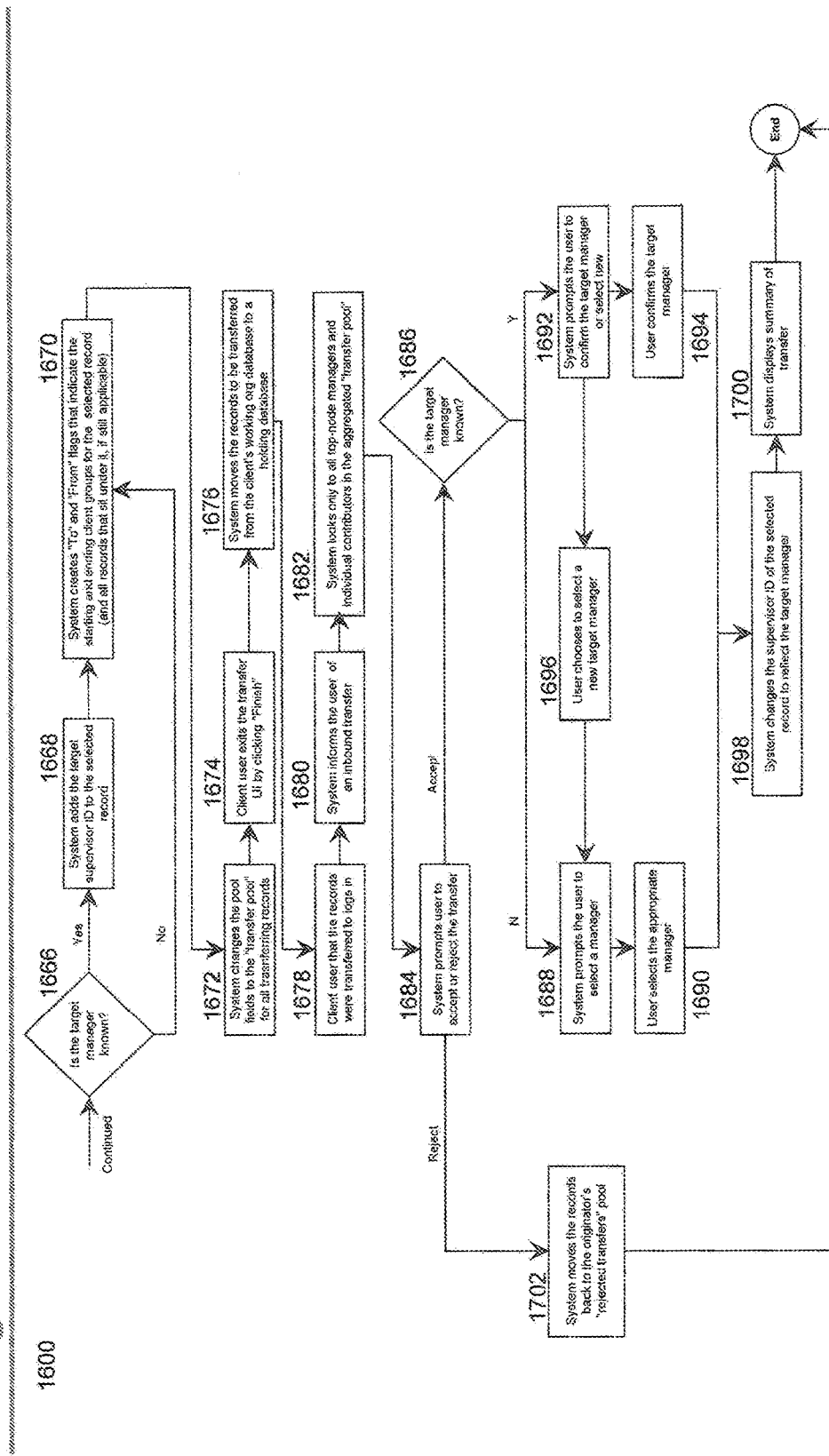

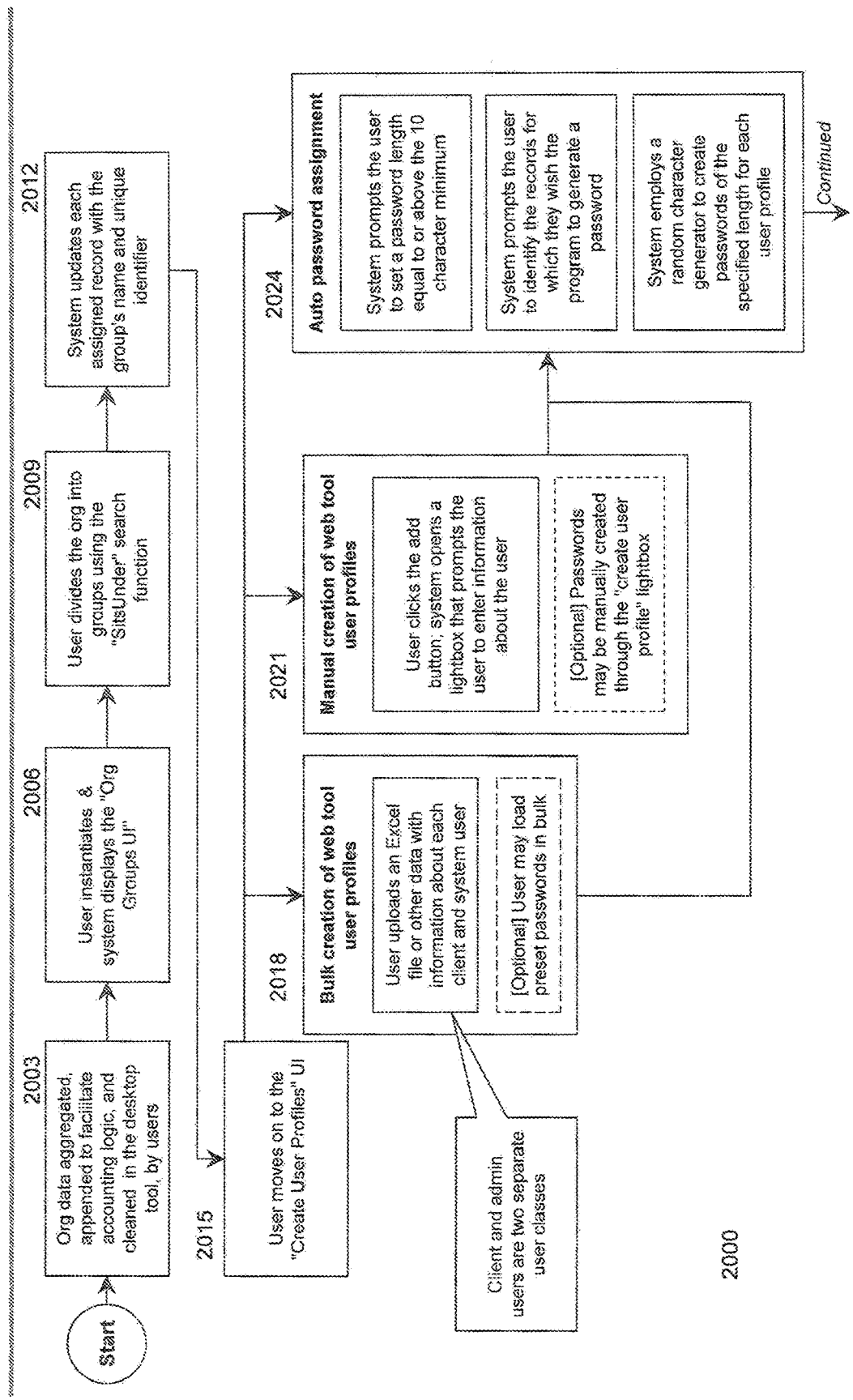

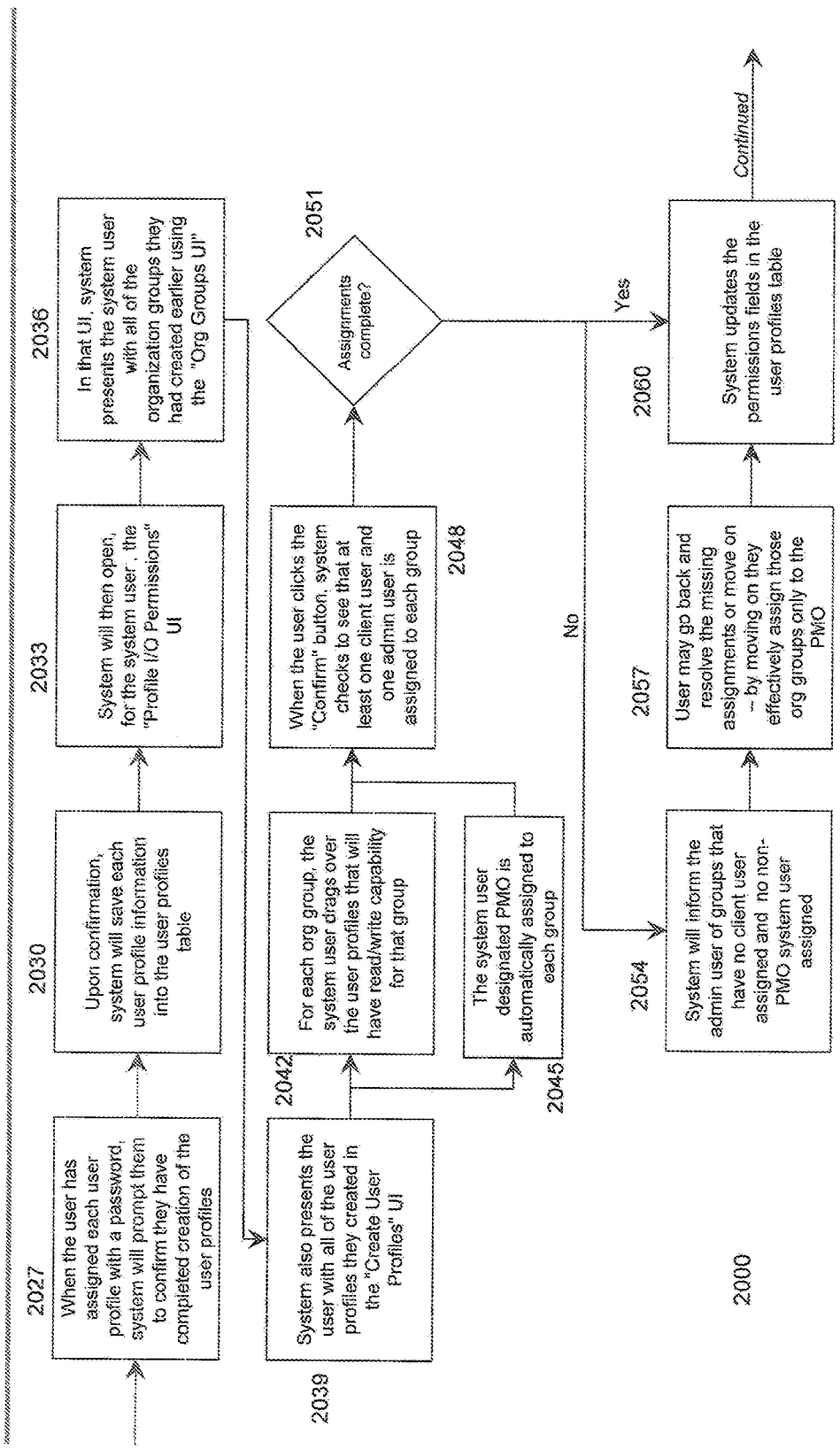

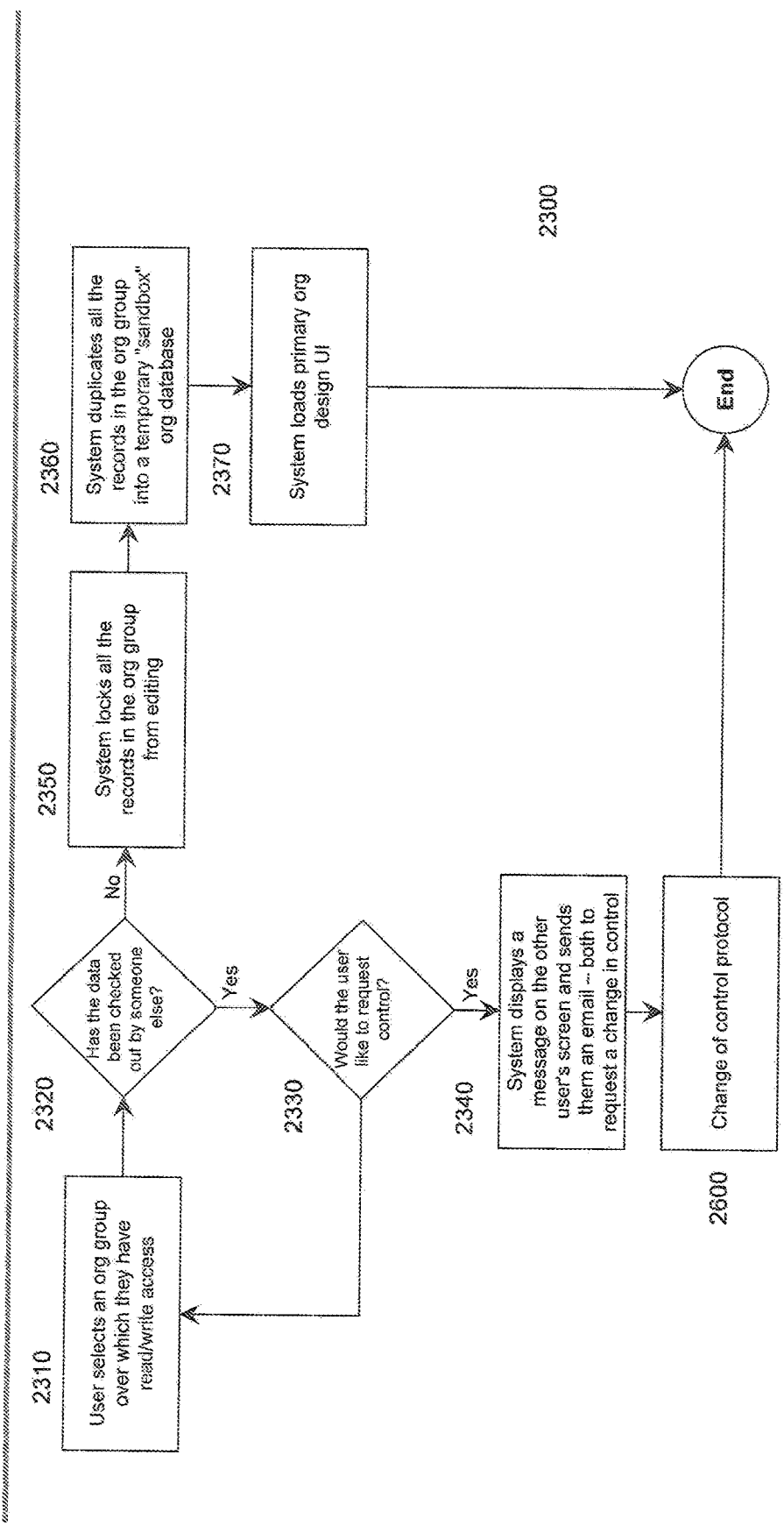

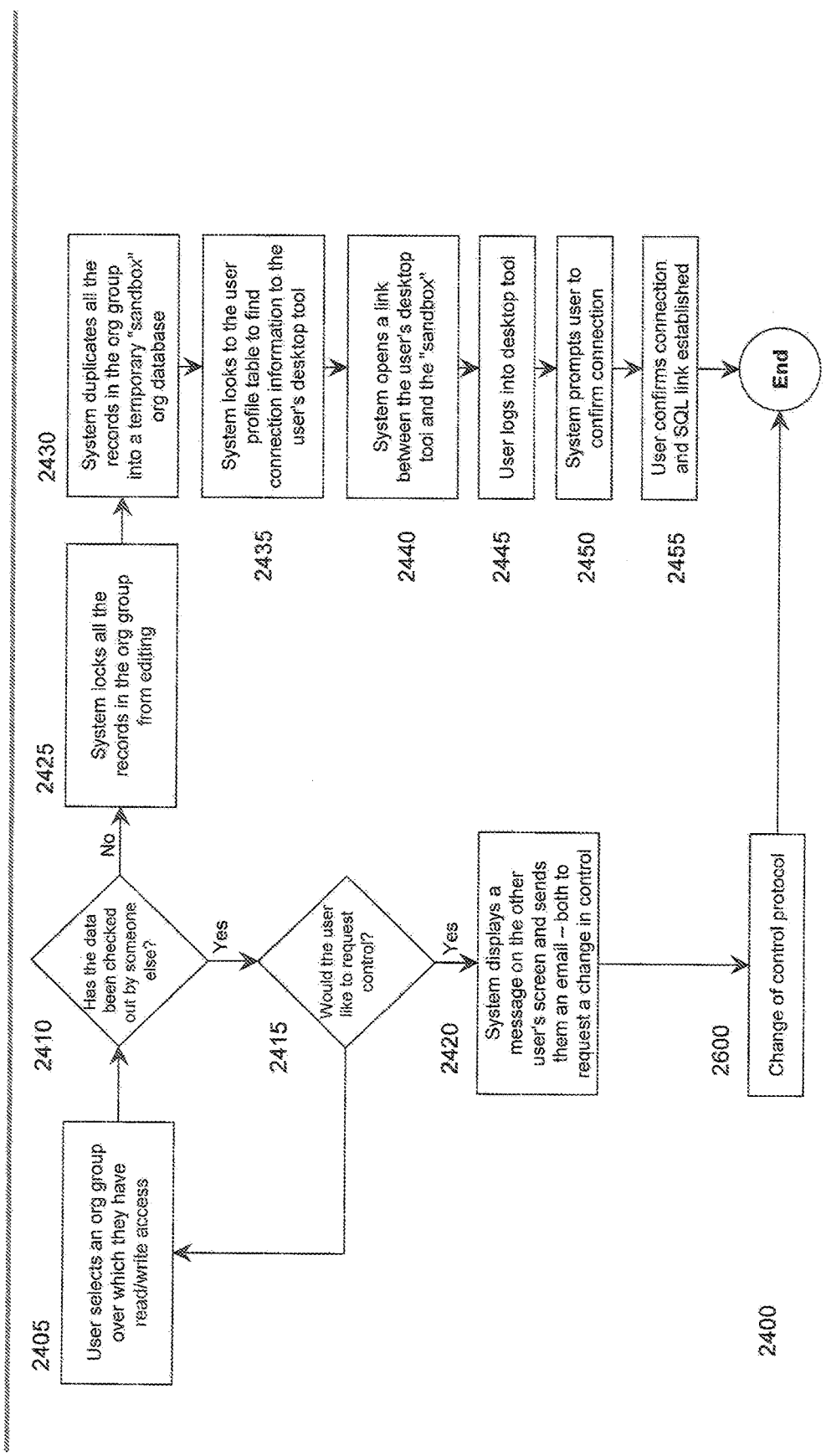

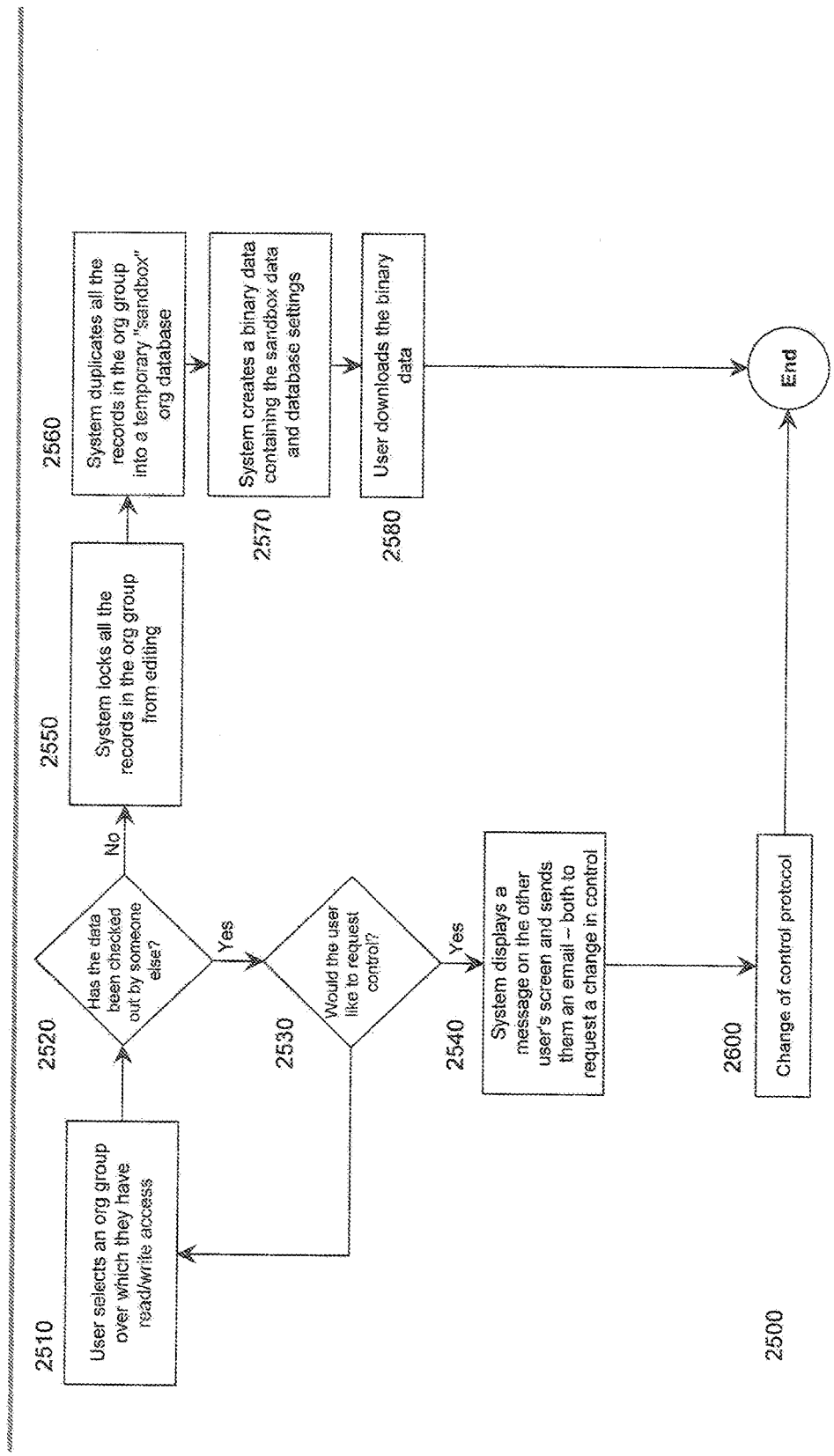

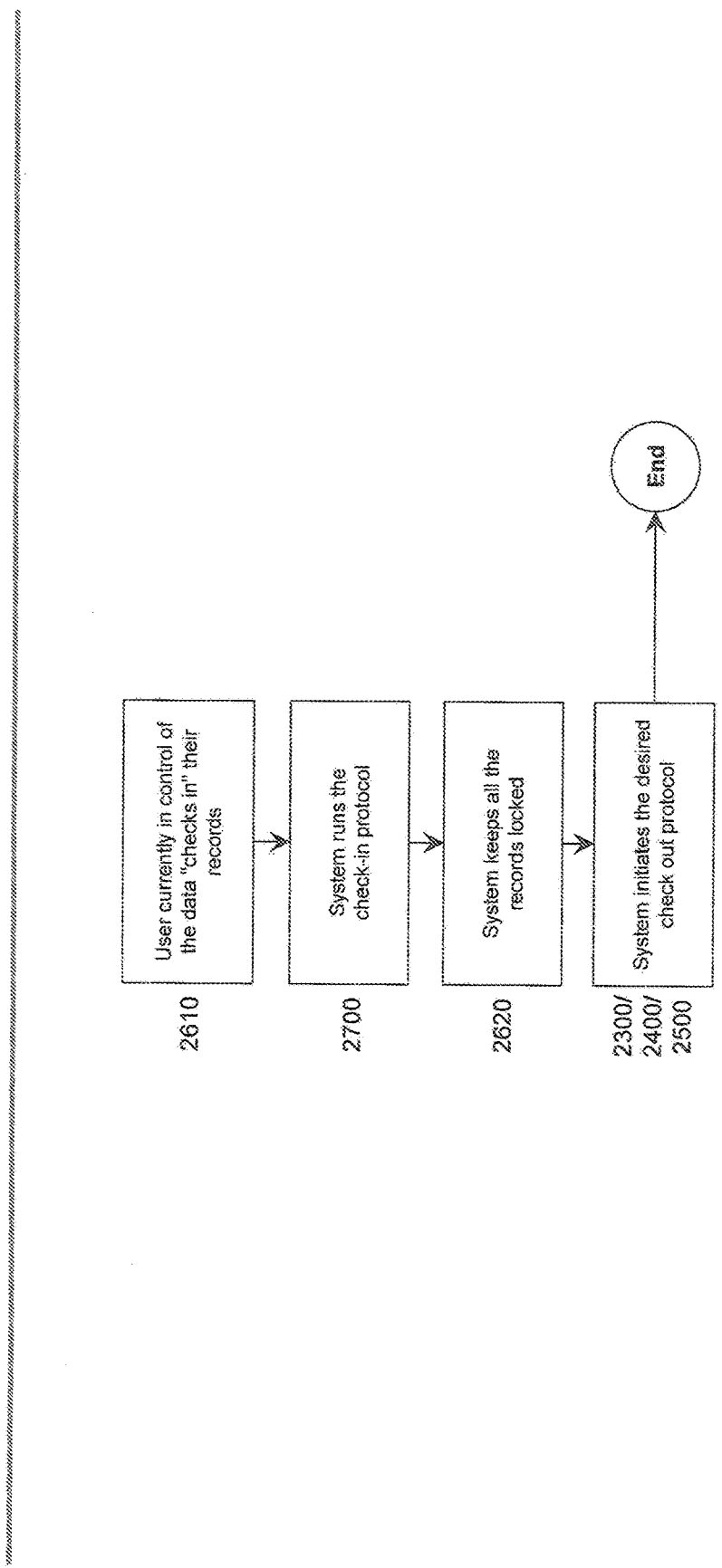

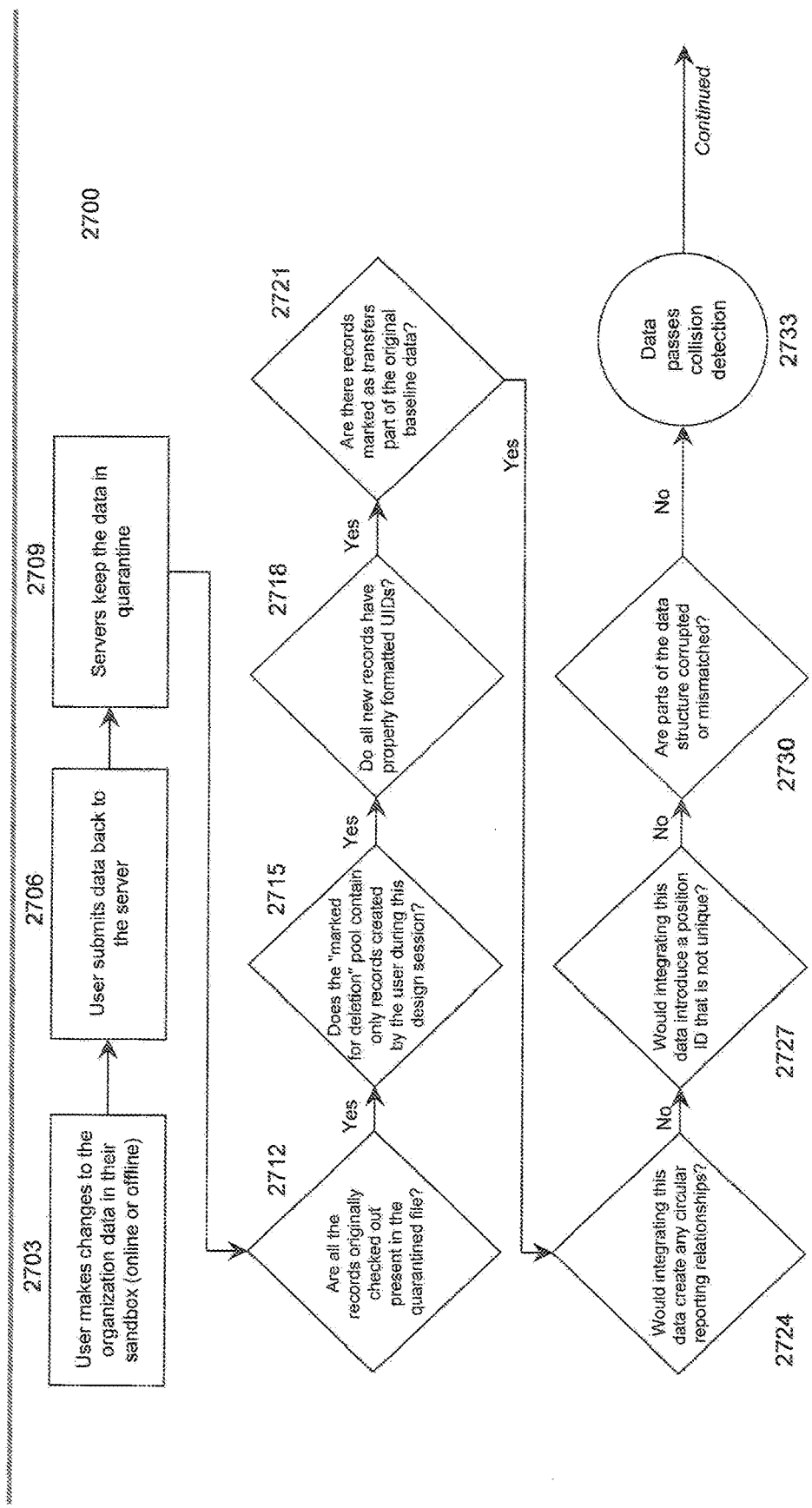

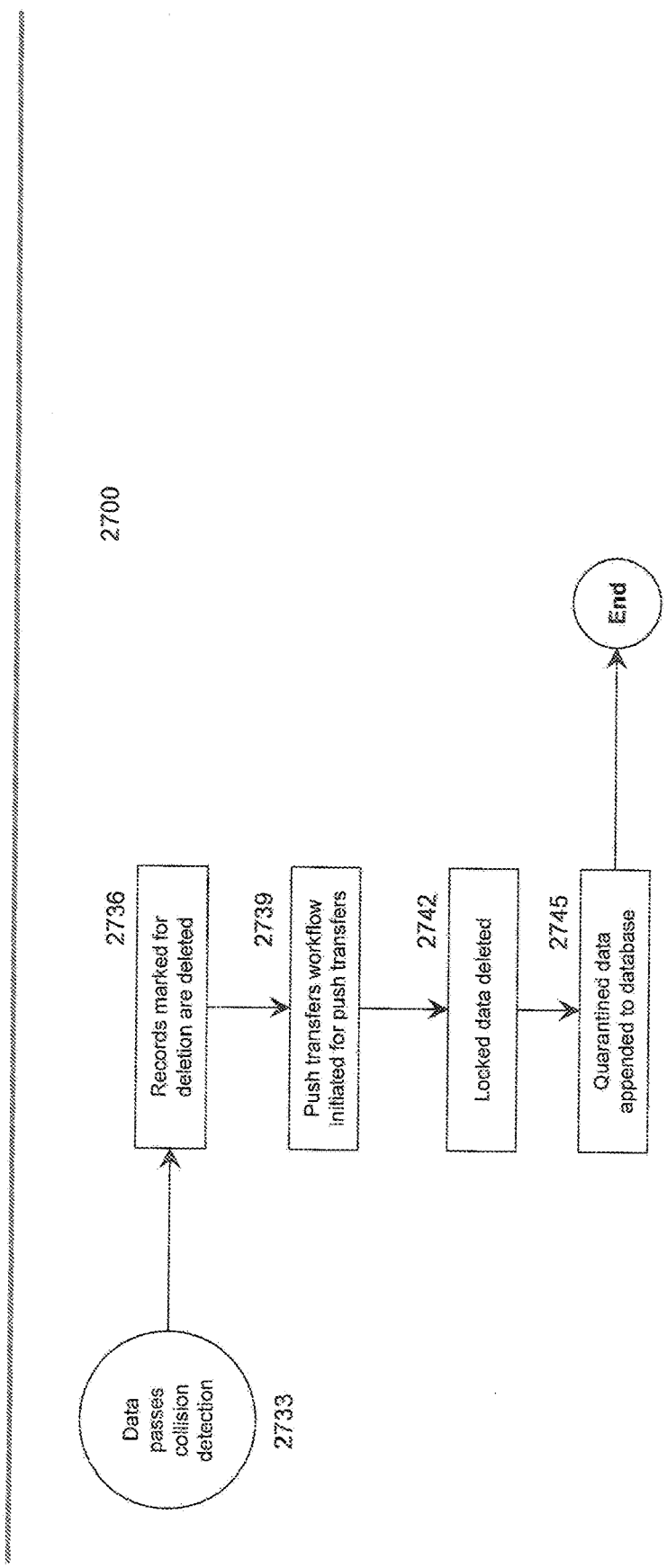

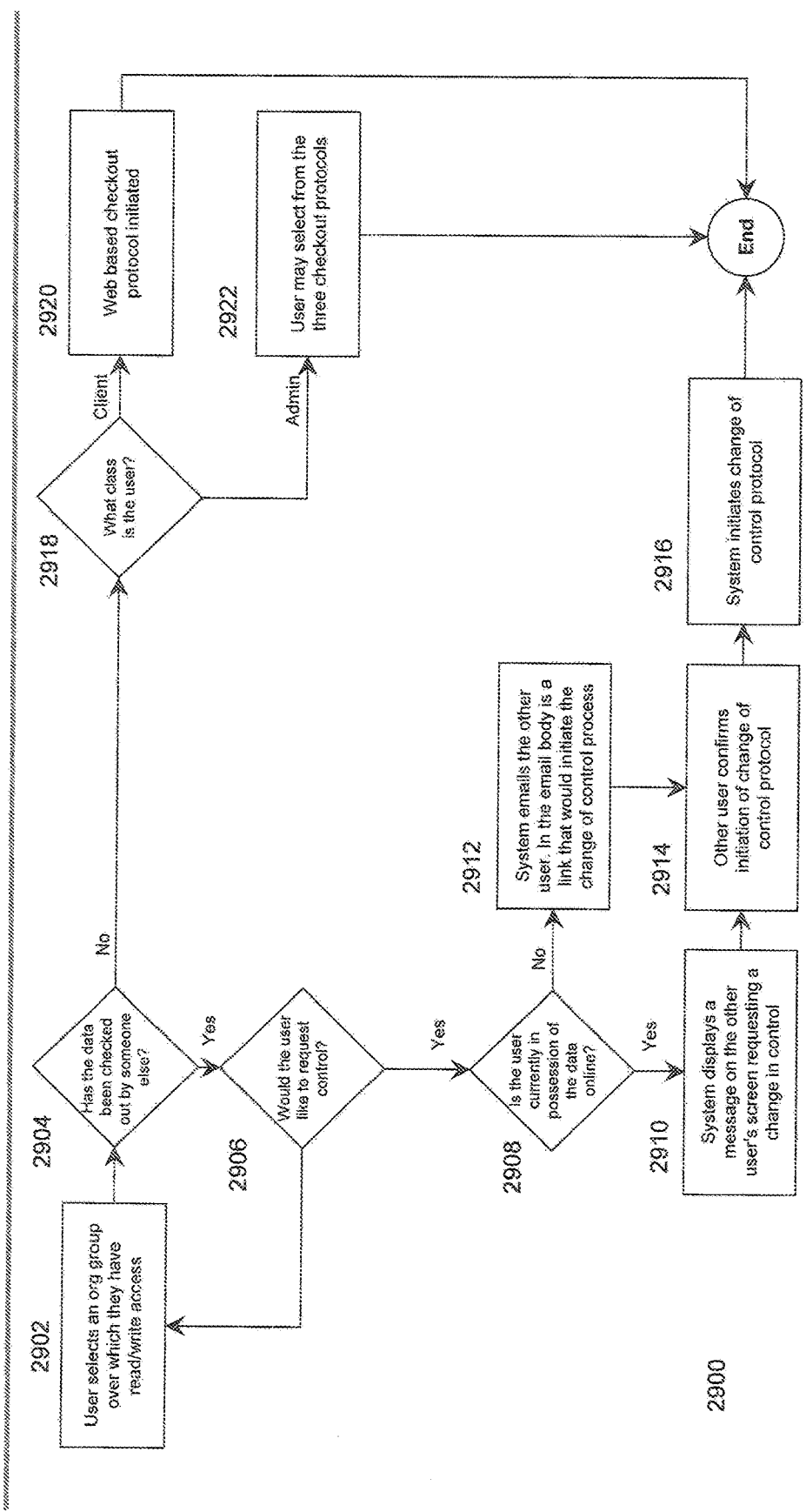

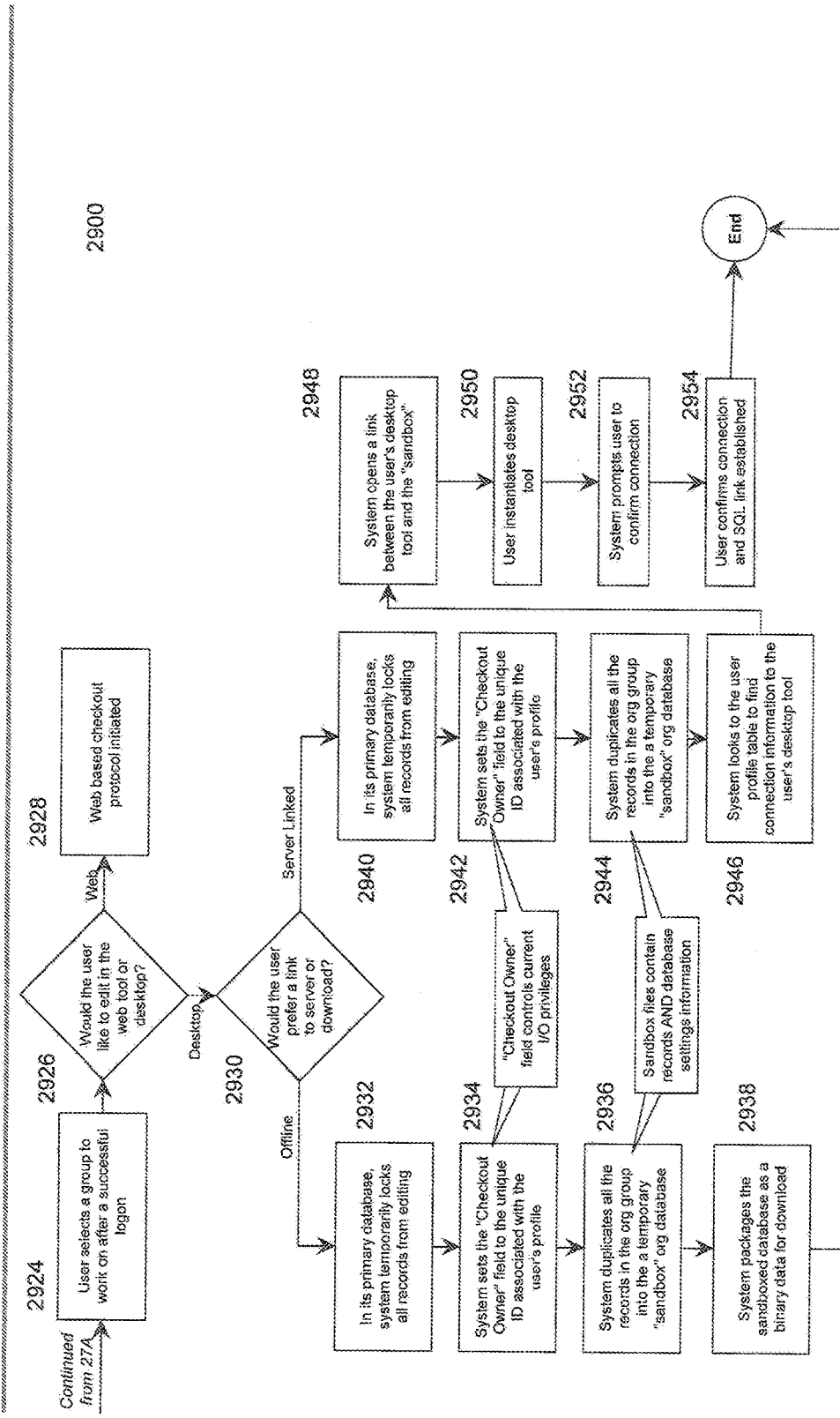

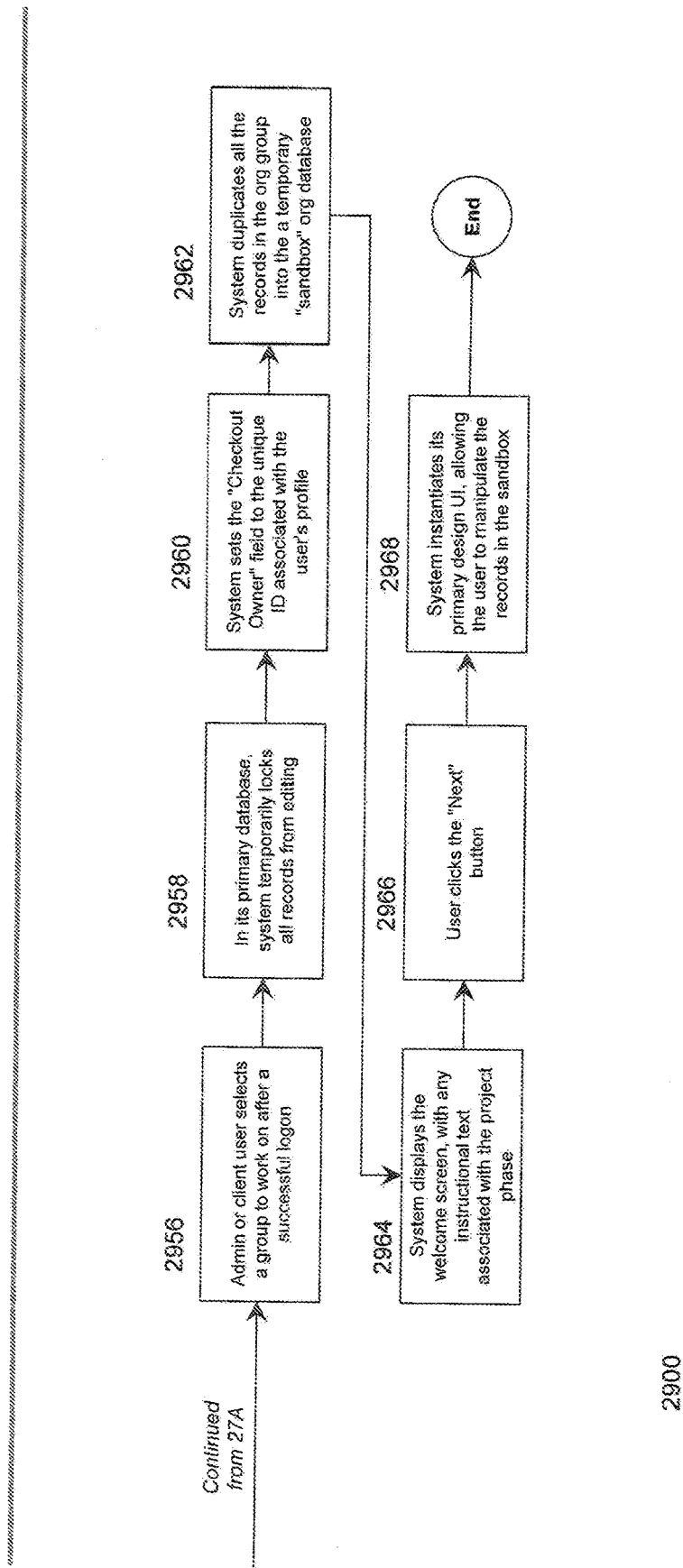

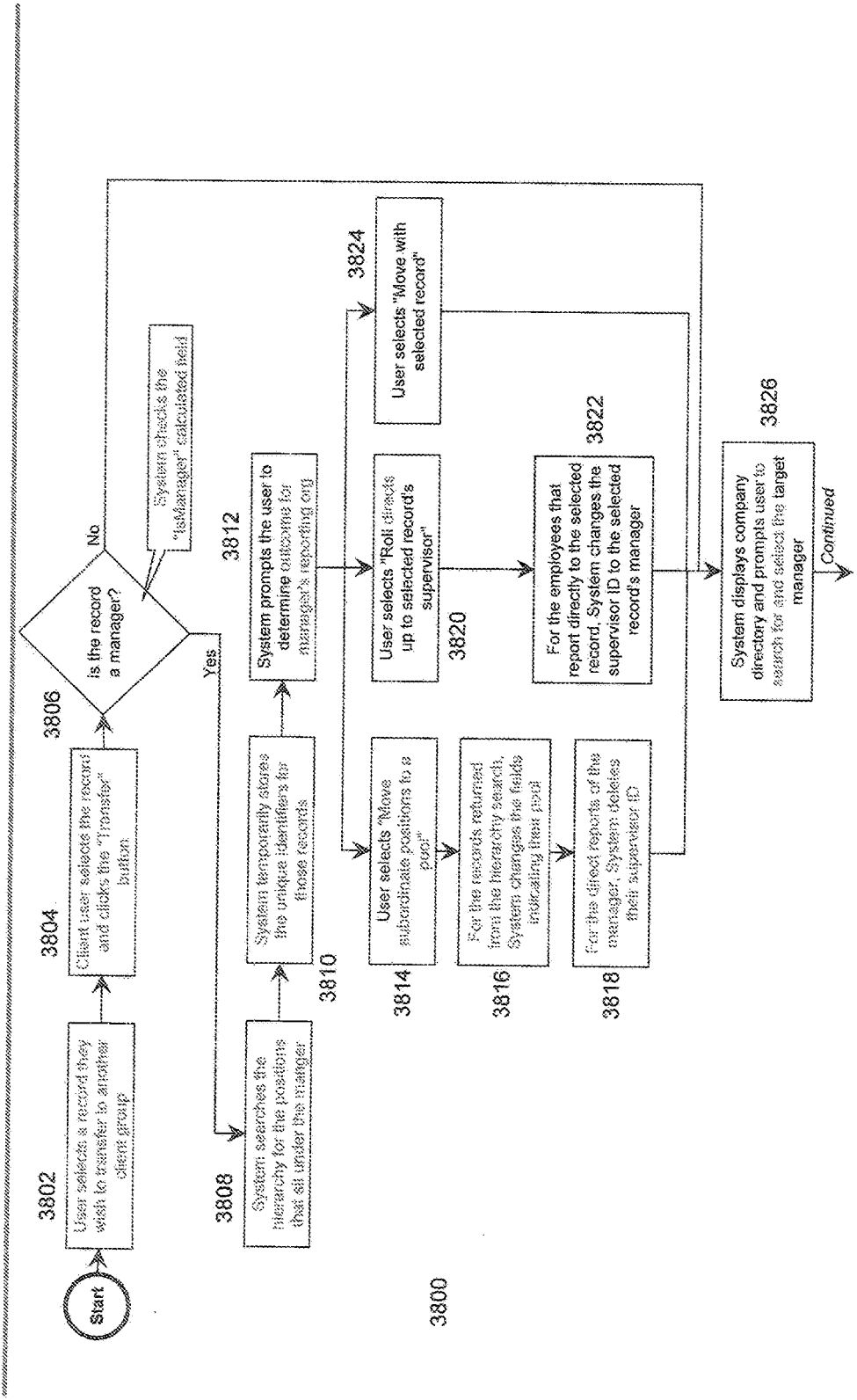

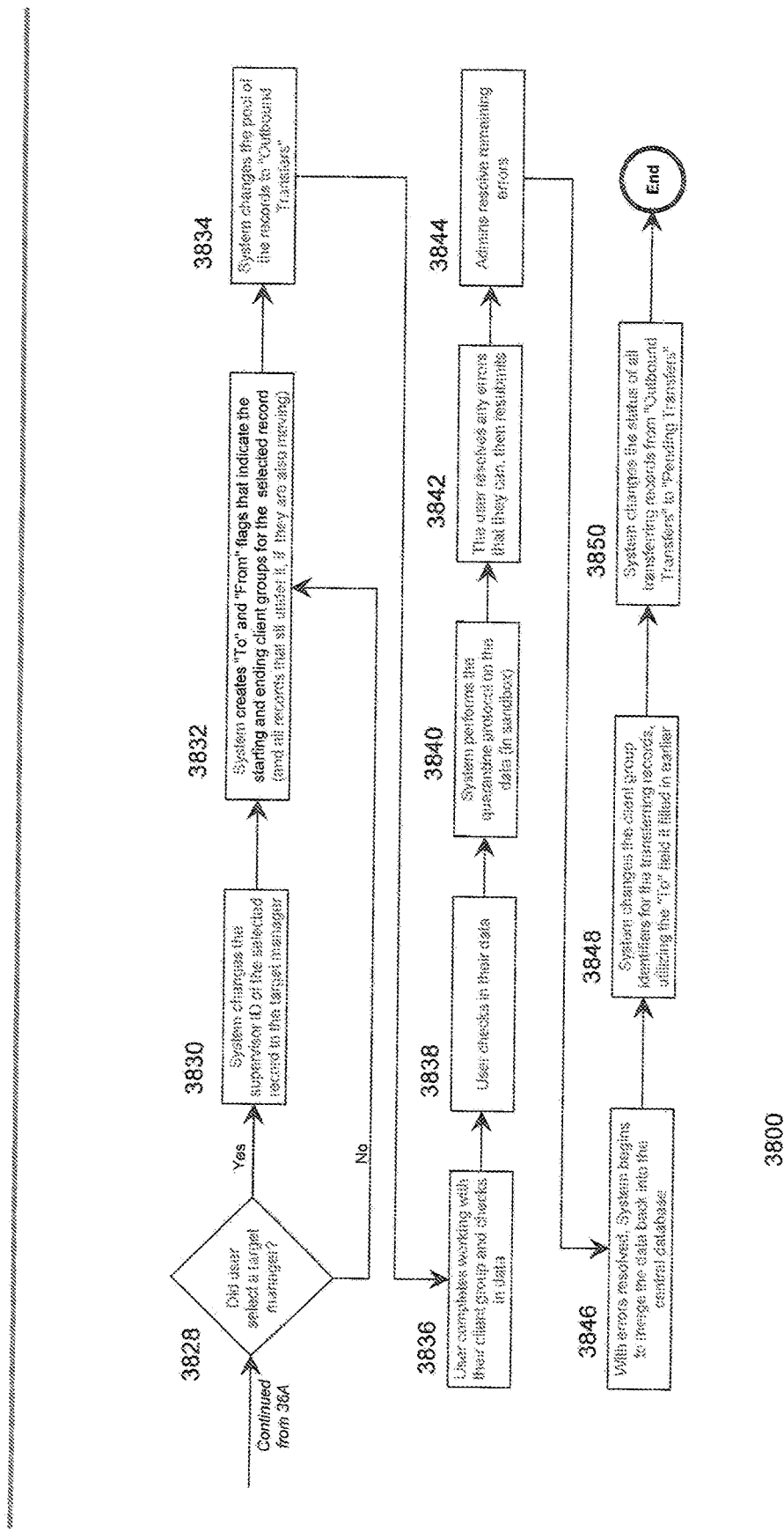

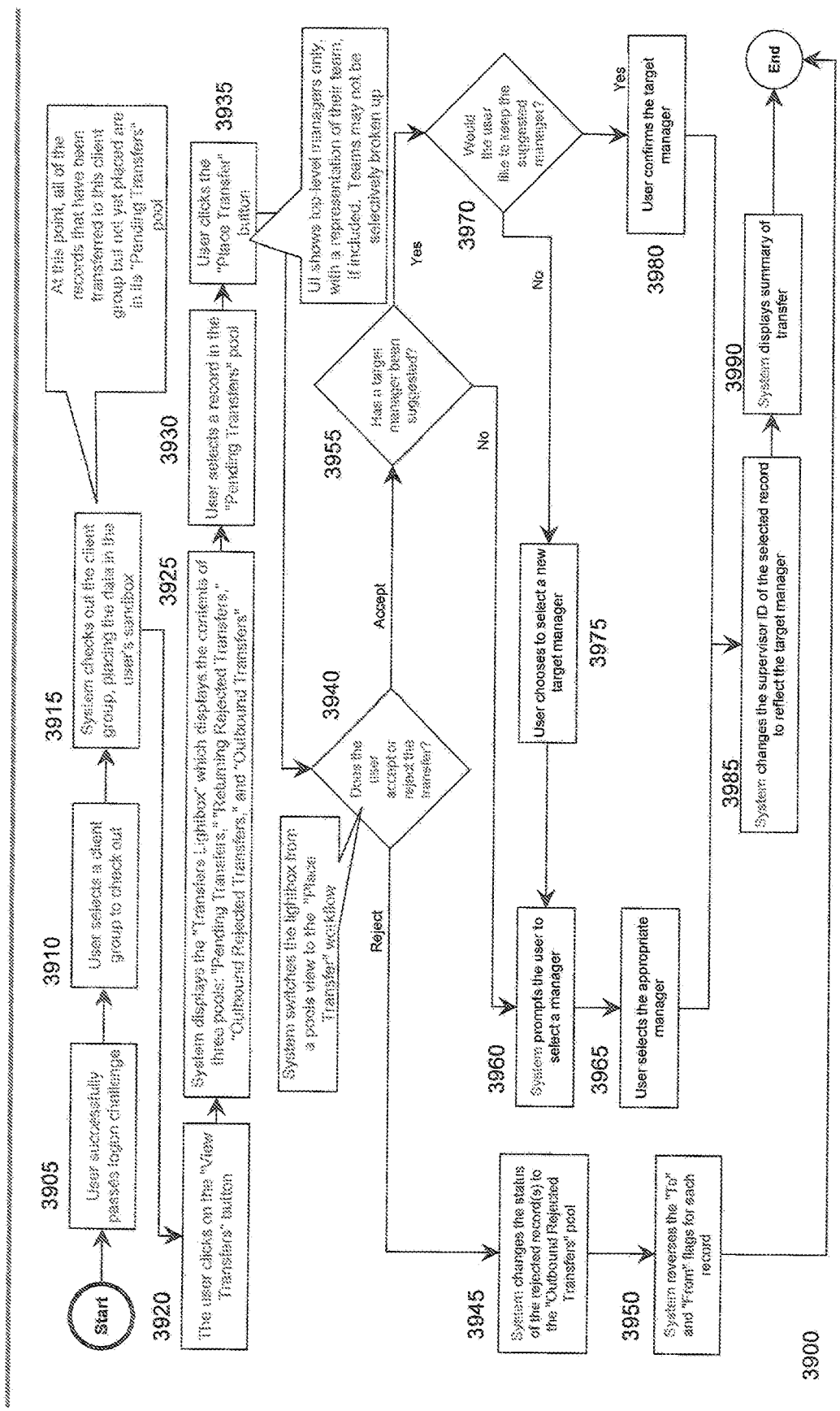

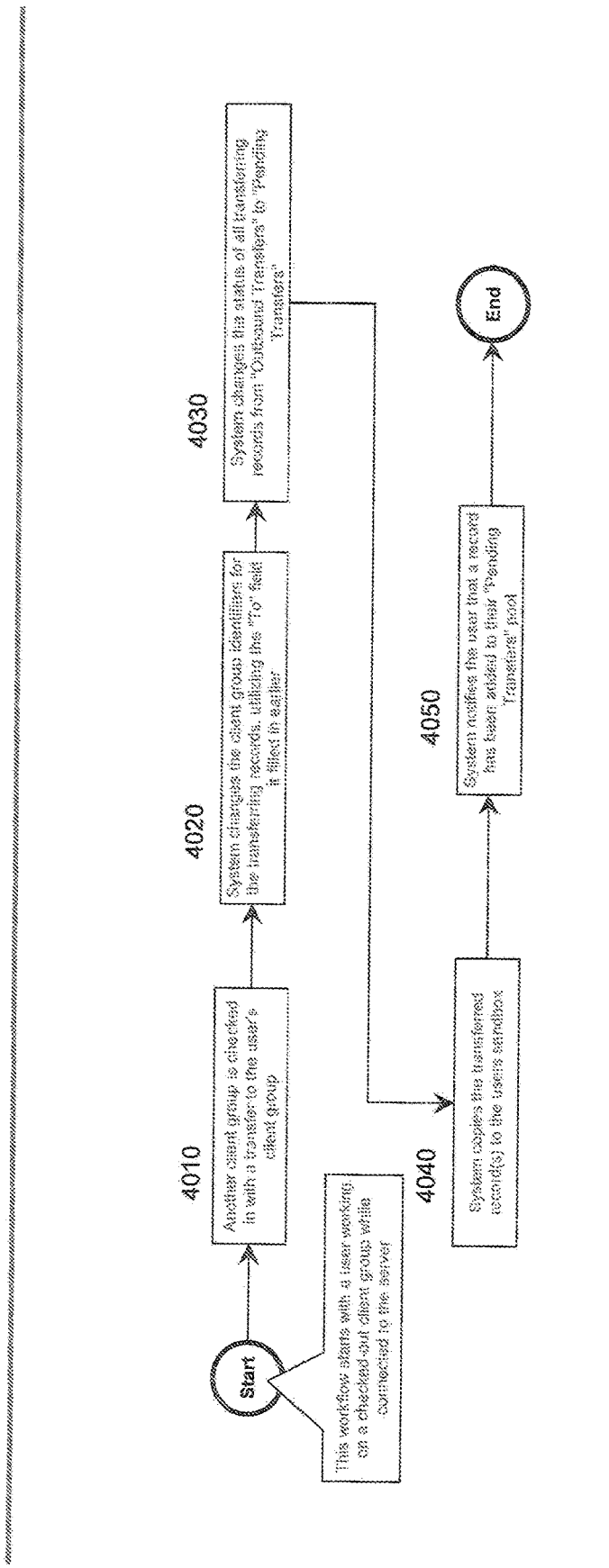

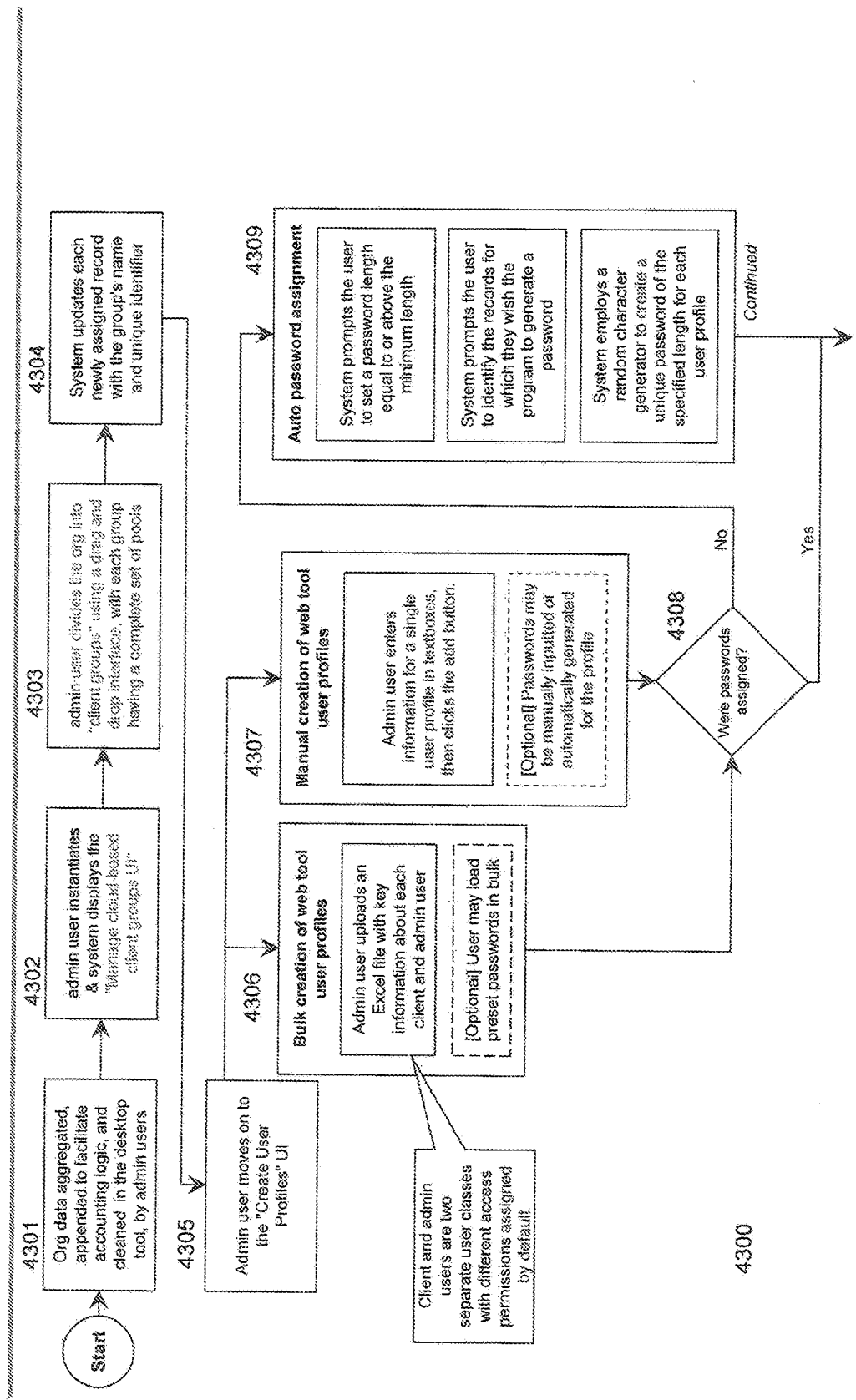

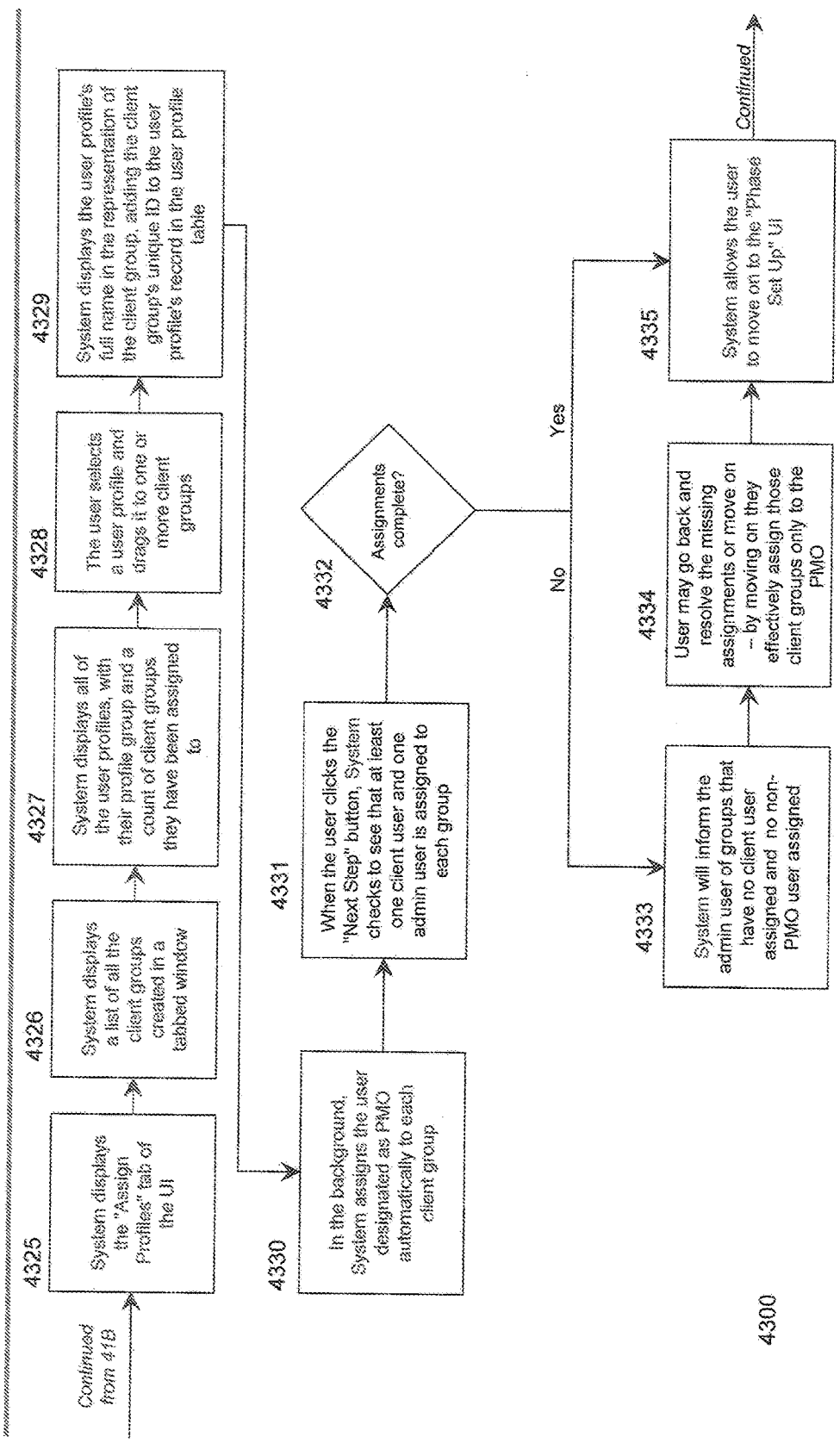

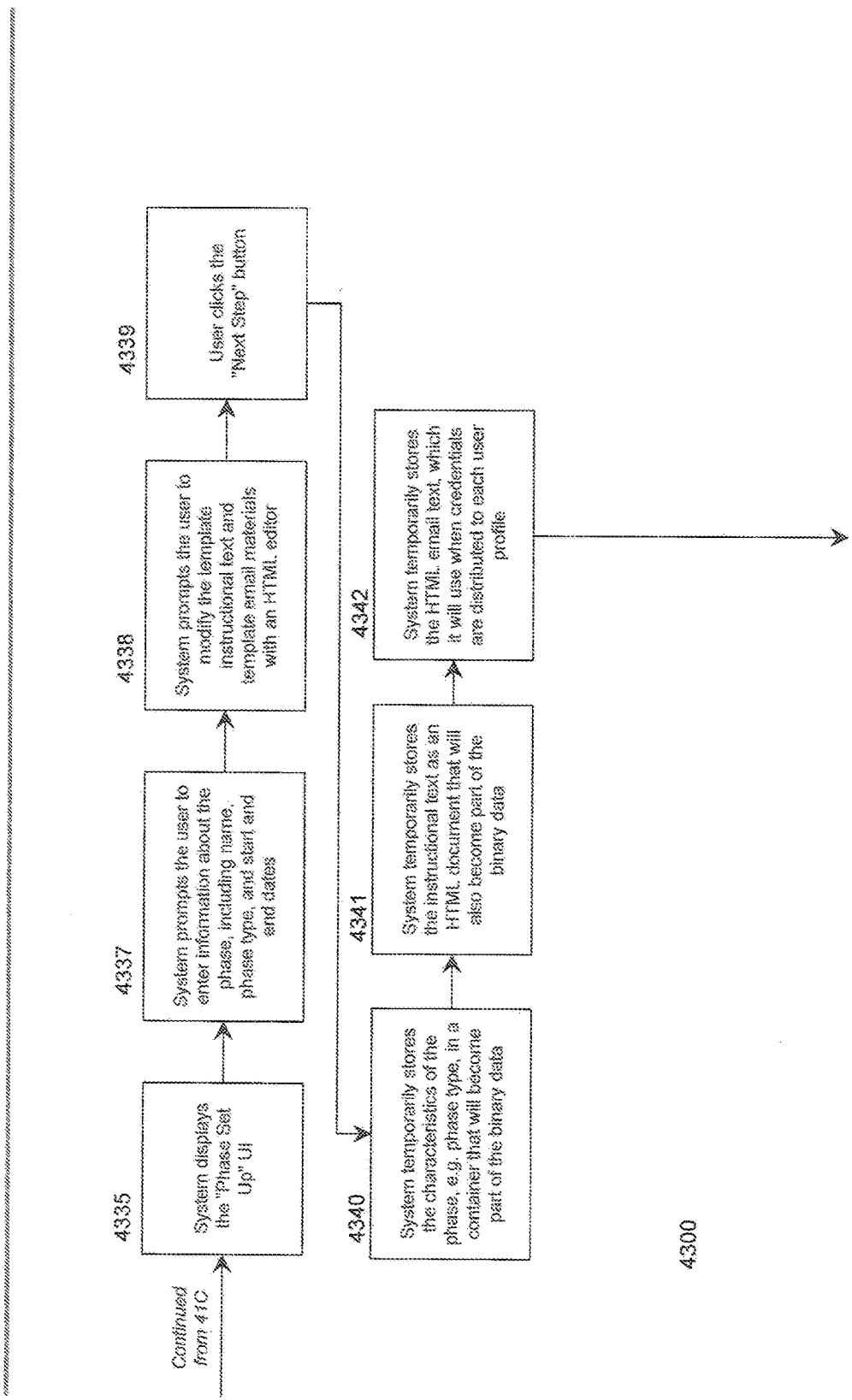

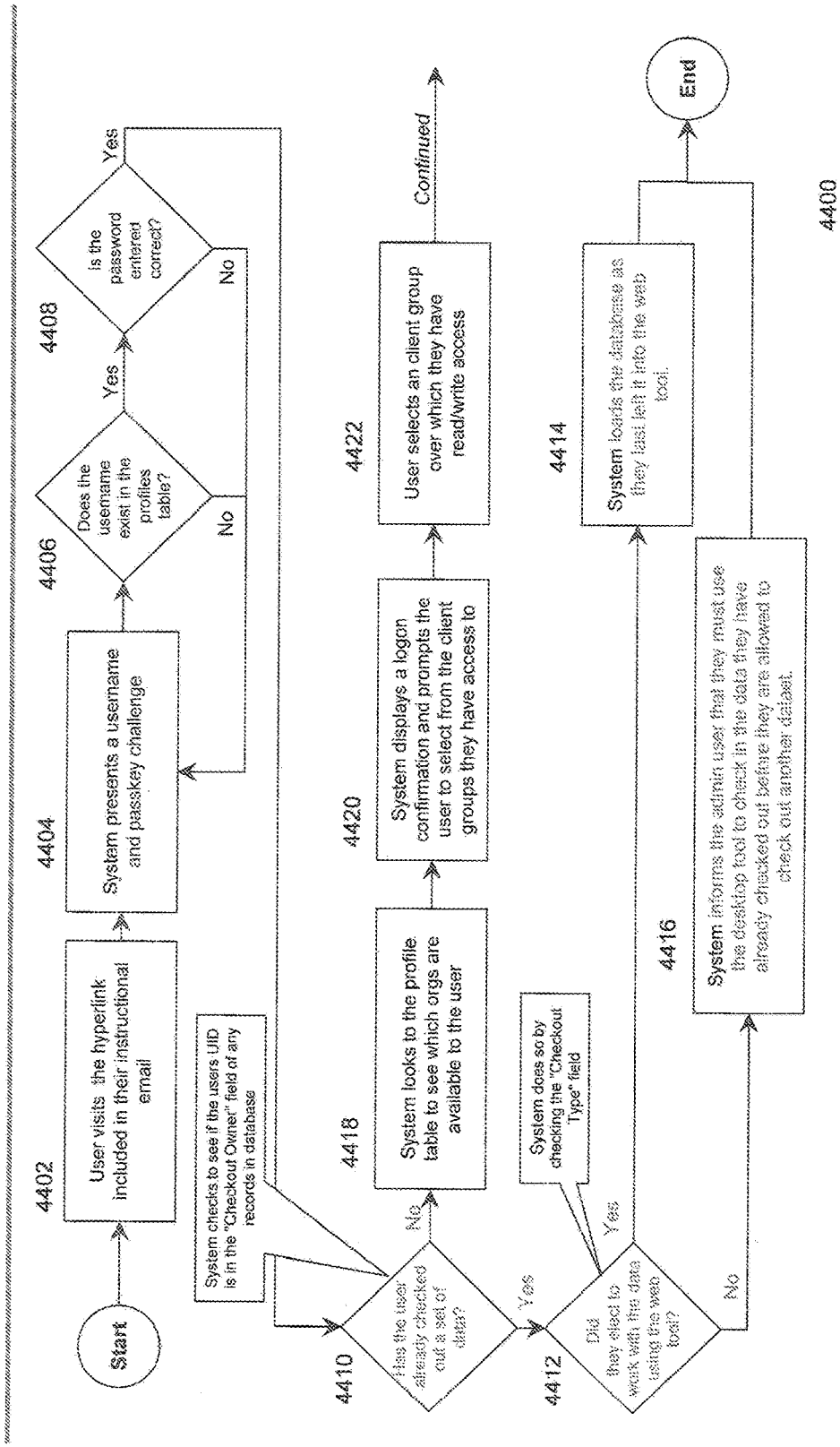

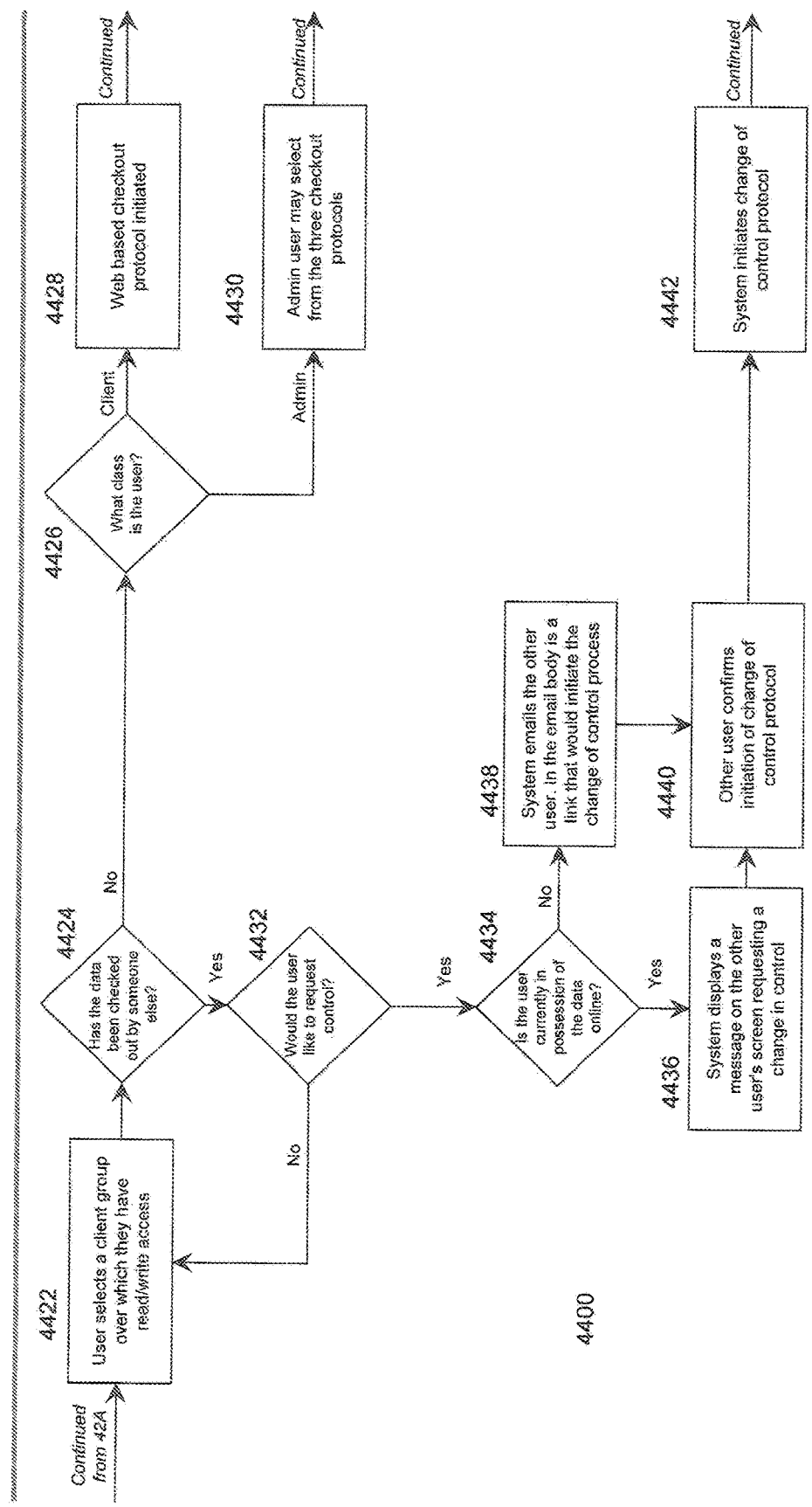

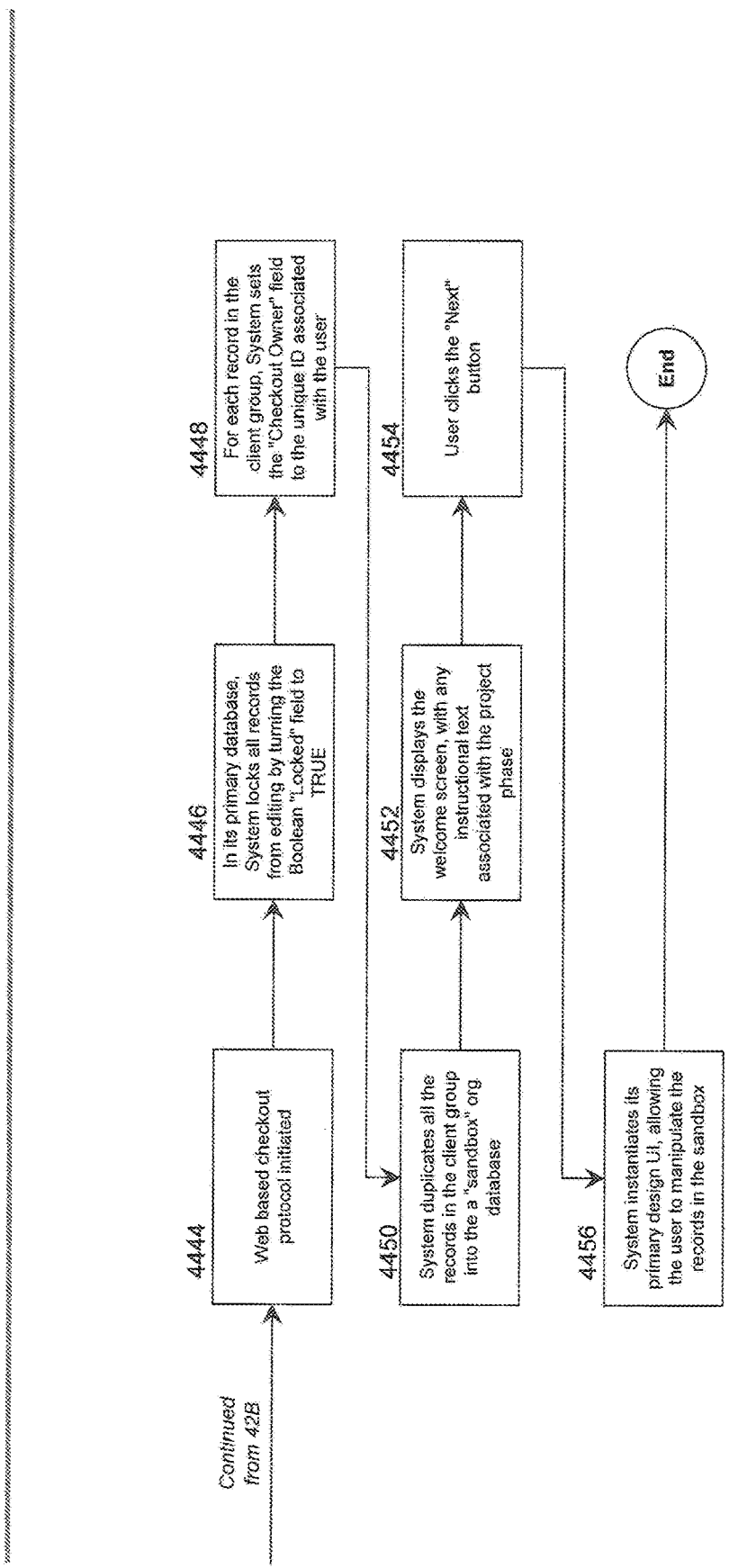

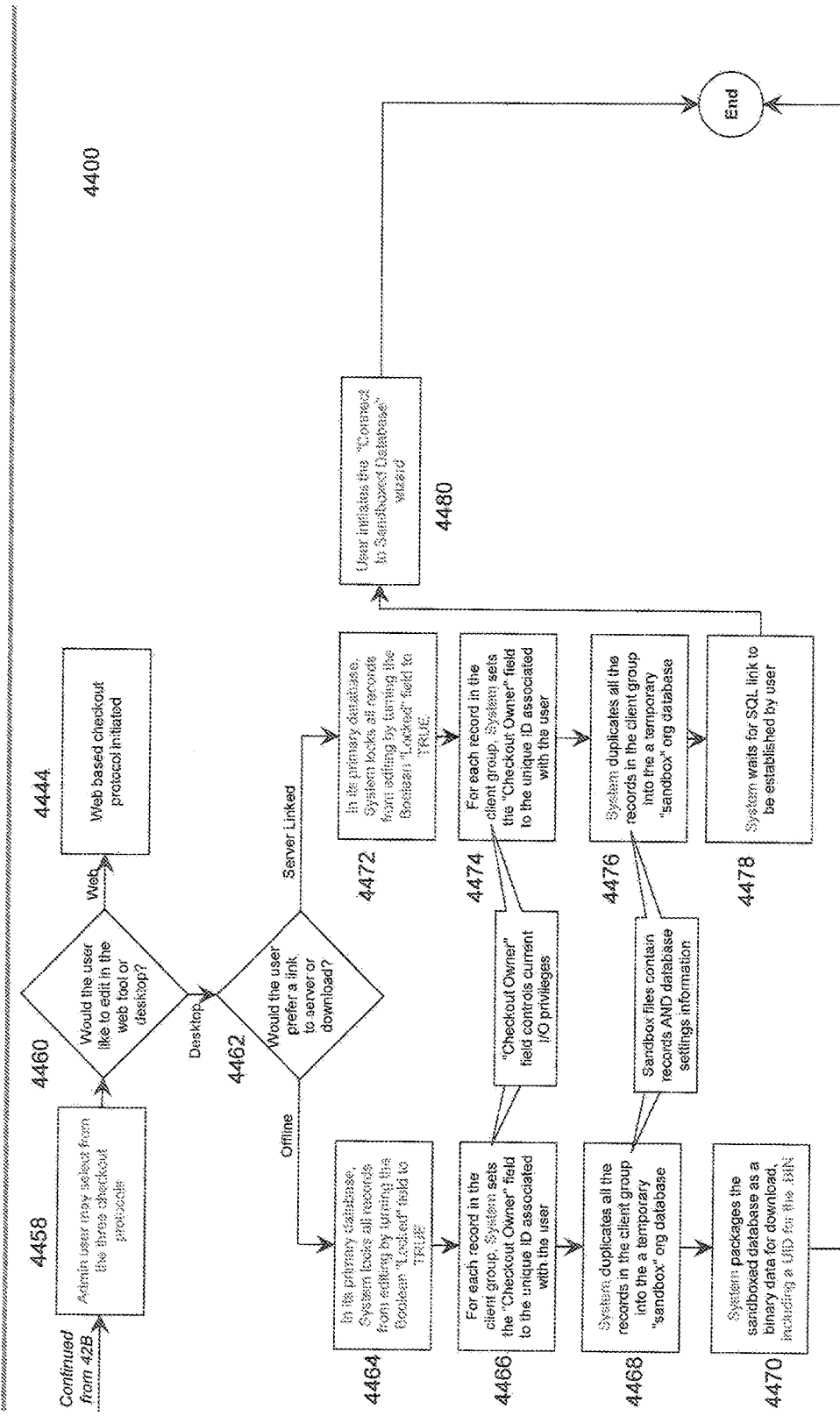

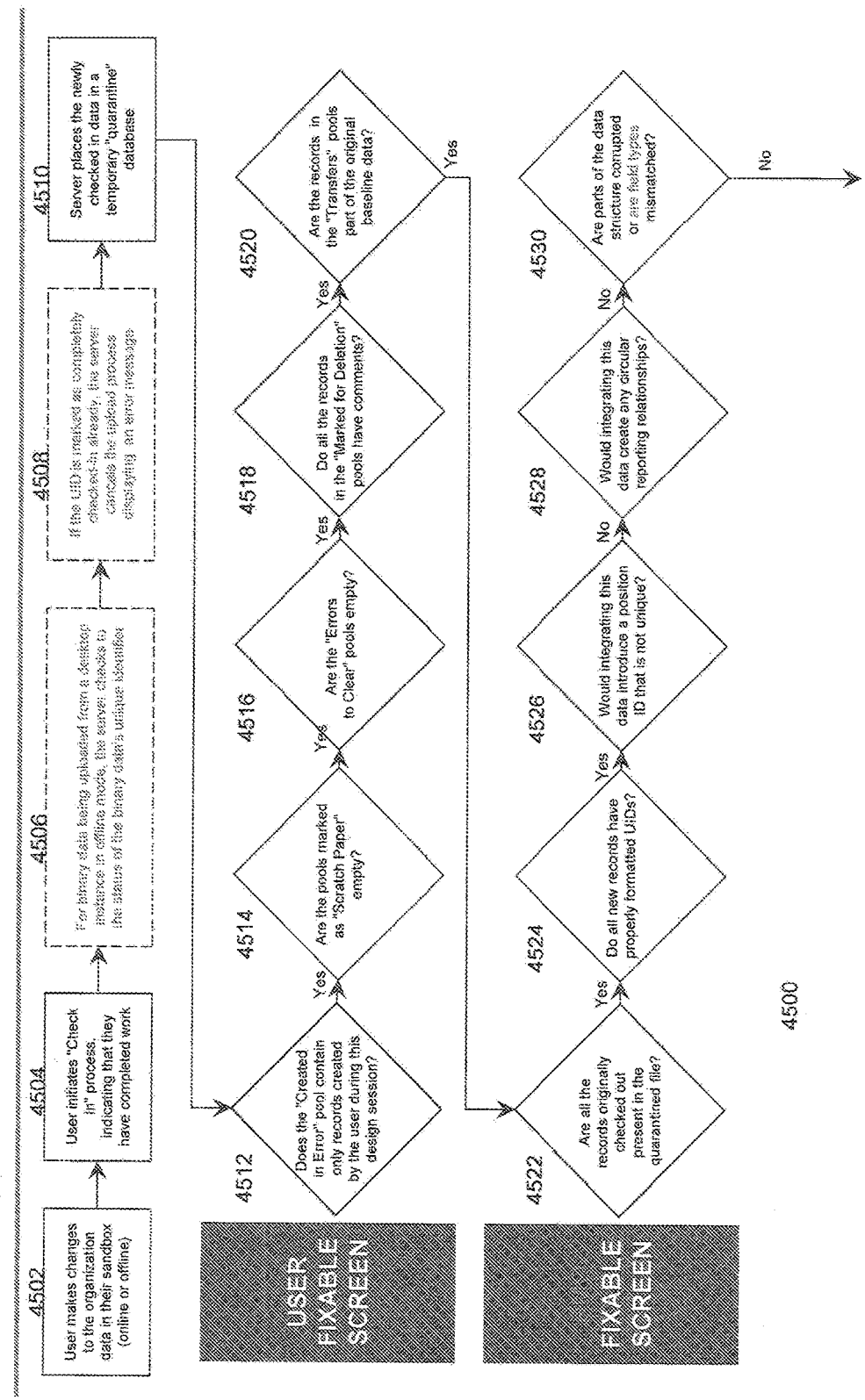

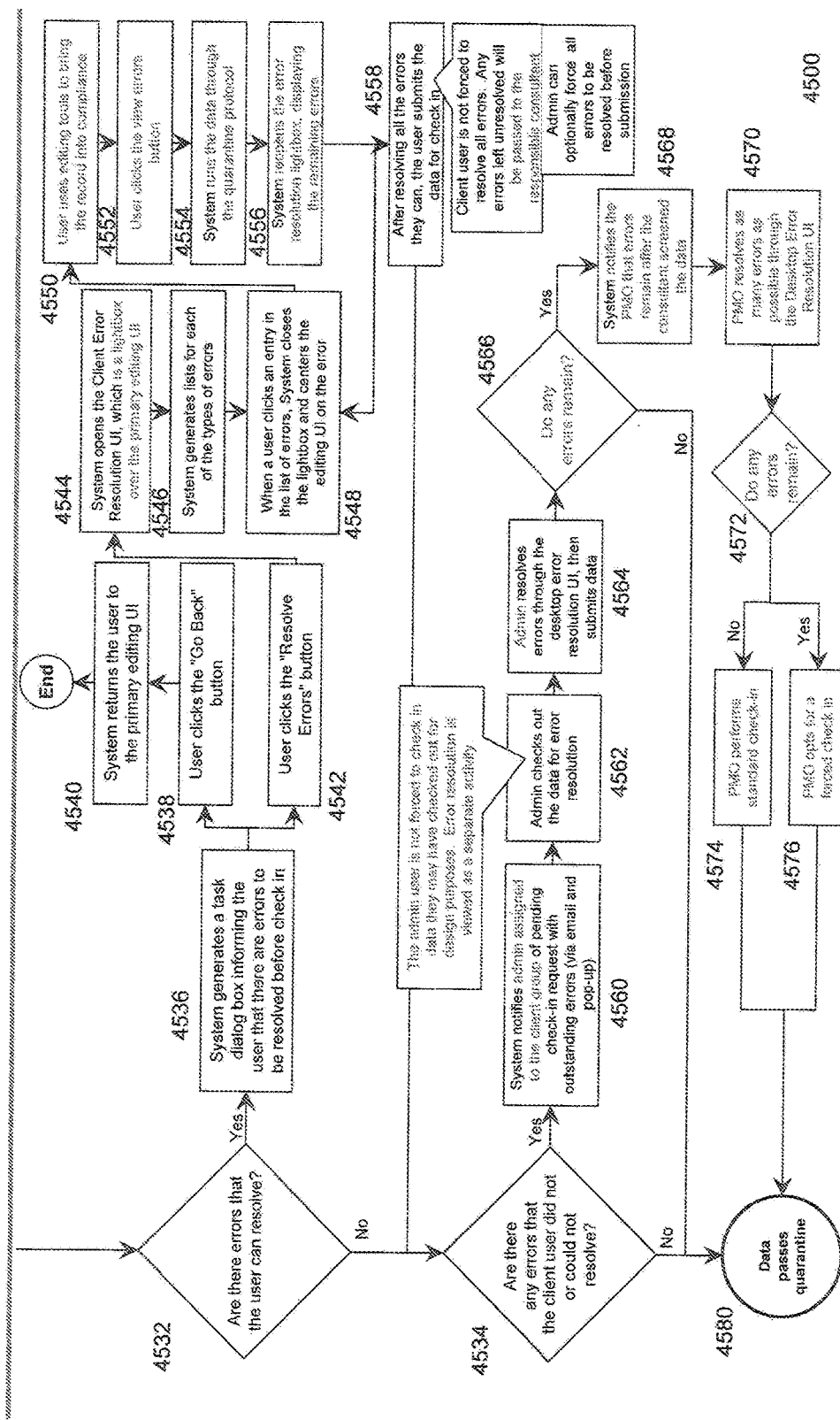

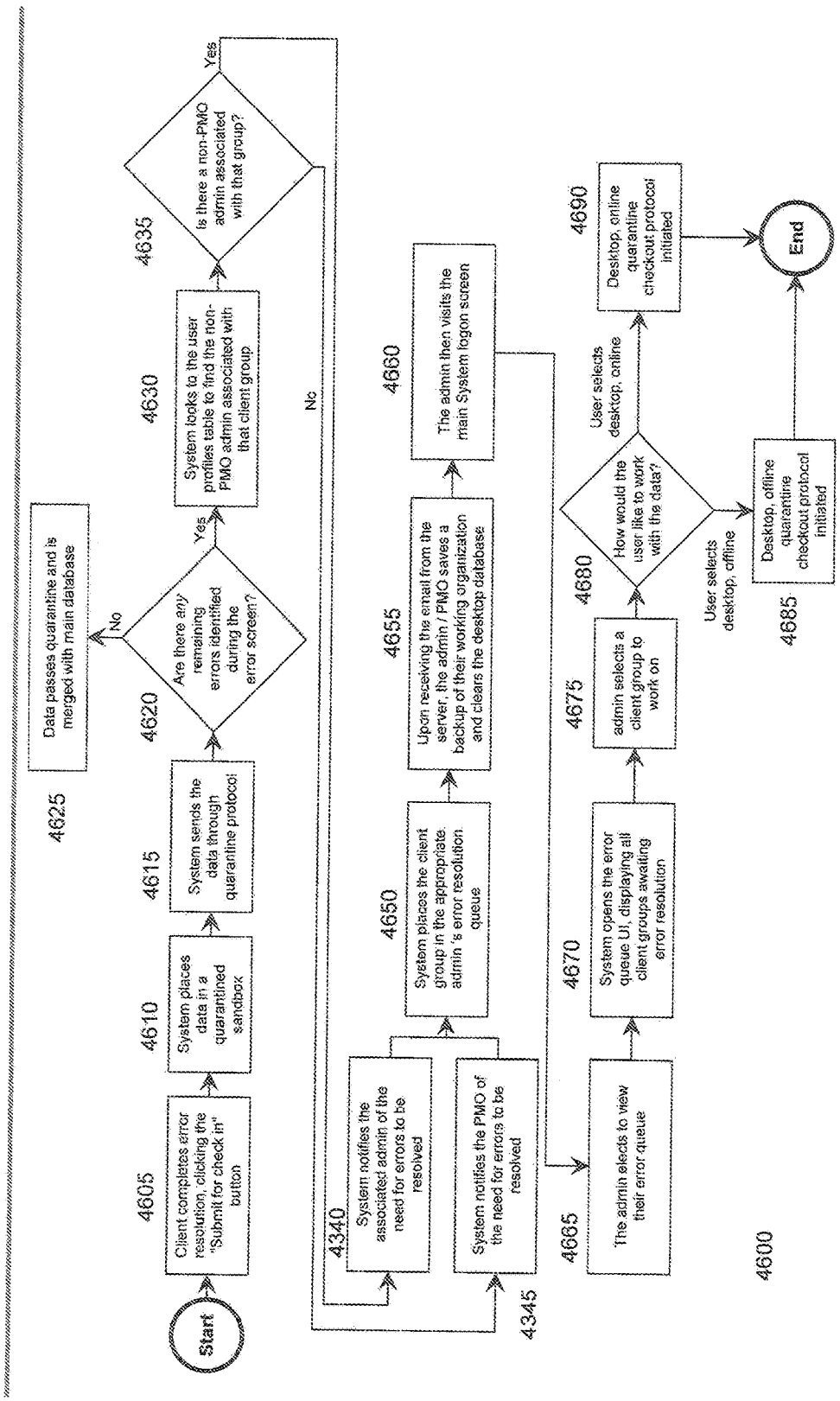

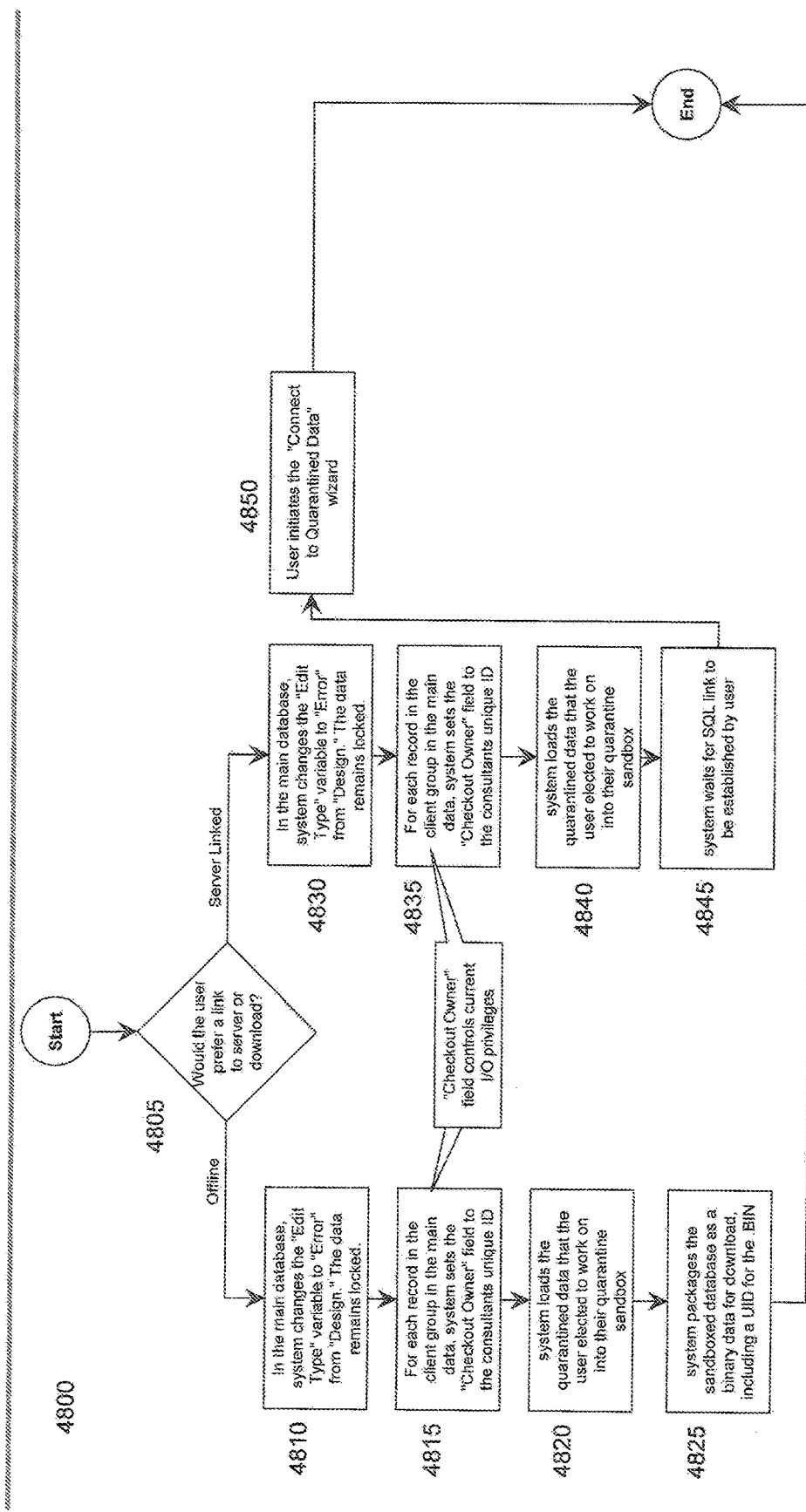

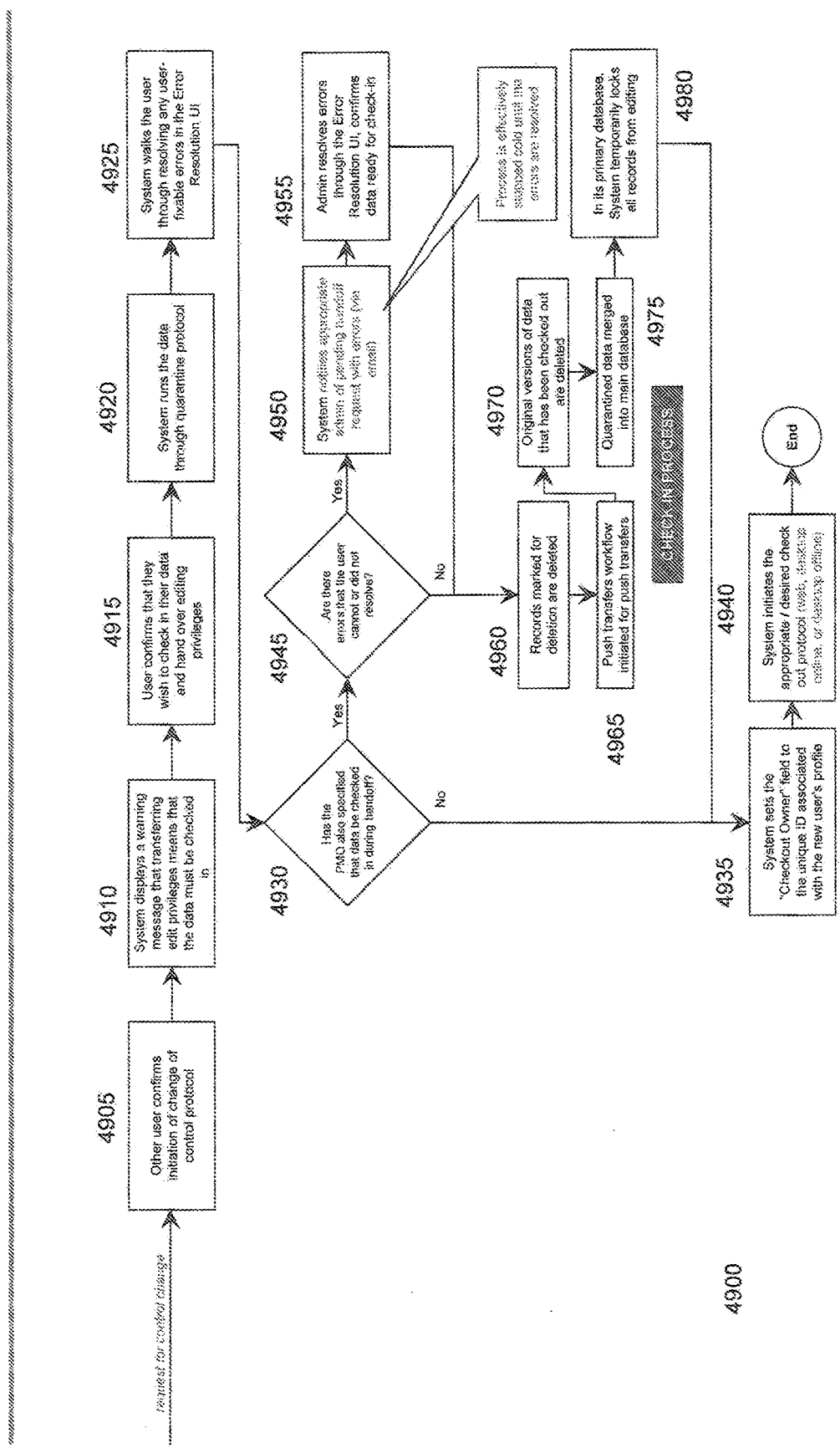

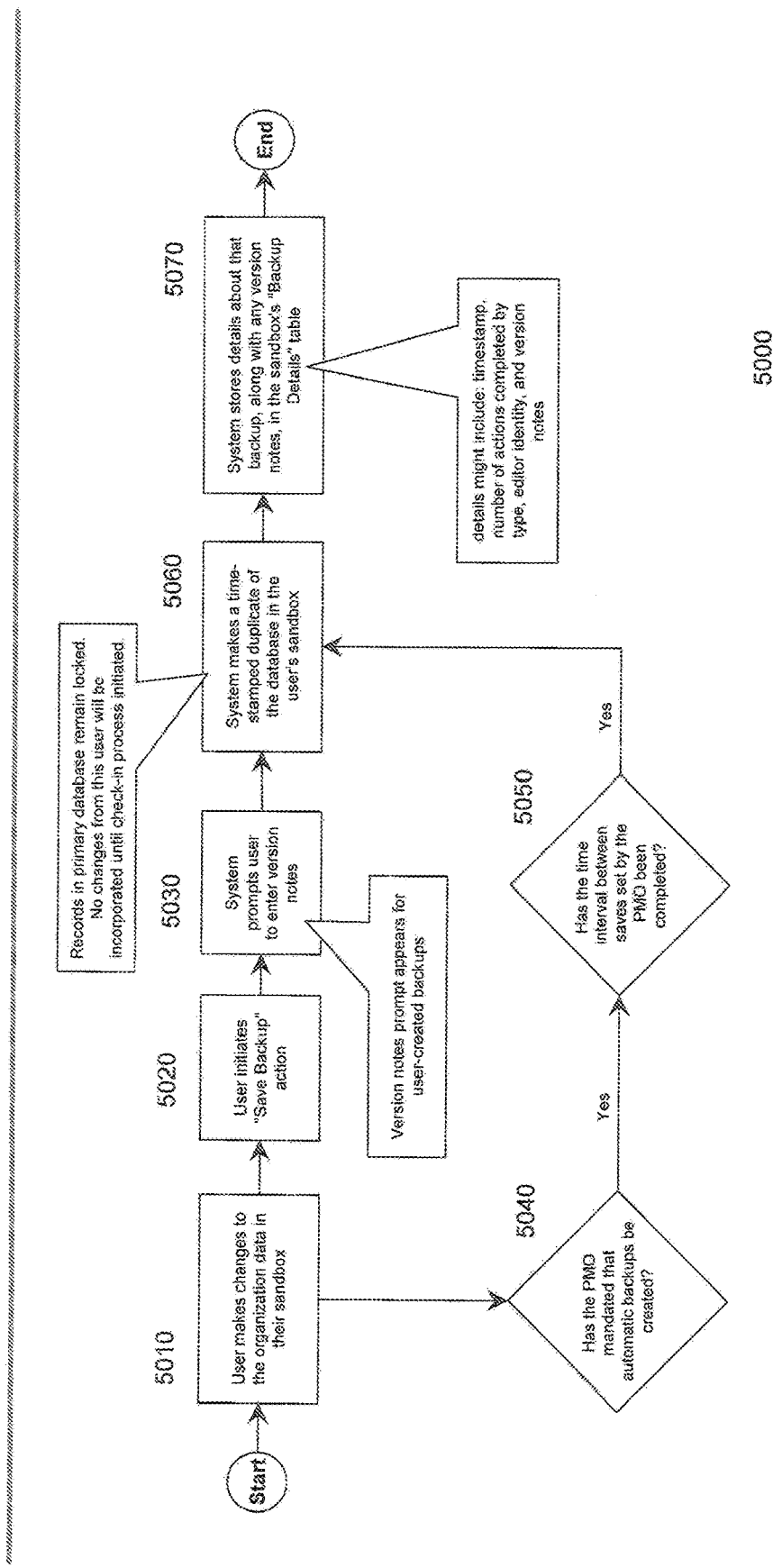

Figure 49

| Pool Type | Pool Name | Use Case |
|---|---|---|
| Errors to Clear | Supervisor ID not designated<br>Supervisor ID not found | • Upon data import system automatically places positions with broken reporting relationships into these two buckets, just as it does today |
| Scratch Paper | Holding Area<br>Holding Area - People | • These pools are like scratch paper – temporary holding areas for positions and people<br>• The desktop tool will place positions and people created by the PMO into these pools, as it does today with "Positions: Hold" and "People: Open Capacity" |
| Standard | Natural Attrition<br>Natural Attrition - People | • These pools are used to indicate instances of natural attrition, e.g. retirement<br>• If a client intends to backfill an existing position, they may use the people-only version |
| Transfers | Inbound transfers<br>Inbound transfers - People<br>Outbound transfers<br>Outbound transfers - People | • These pools are for the temporary storage of transferred records.<br>• They would be further subdivided by the status of the transfer.<br>• These pools can be cleared in the standard desktop operating mode, but not in other modes |
| Standard | Closed open reqs | • This pool is used to hold open requisitions closed for a "save" |
| Standard | Positions removed by separate effort | • Positions closed as a result of a separate effort in the same time frame are stored here. For example, an outsourcing effort may occur simultaneously with Delayering. |
| Standard | Awaiting selection | • This pool is used to mark people awaiting selection and positions removed for a "save." |
| Standard | Closed positions and people marked for exit<br>People marked for exit | • These pools contain people and positions marked for exiting the org during the selection process. |
| Created in Error | Created in Error<br>Created in Error - people | • These pools contain people or positions created in error by the client user. Effectively fulfill a non-sequential "Undo" function. The PMO can optionally confirm these deletions. |
| Standard | Marked for deletion<br>Marked for deletion - people | • These pools contain erroneous data identified by the client designers (e.g. duplicate open reqs). The PMO will confirm these deletions. |
| Delete | Delete - Positions<br>Delete - People | • These pools are for the exclusive use of the PMO to delete records<br>• They can be cleared just as in today's tool |

*Pool Contents:* ▓ Staffed pos. ░ Person only ▒ Position only

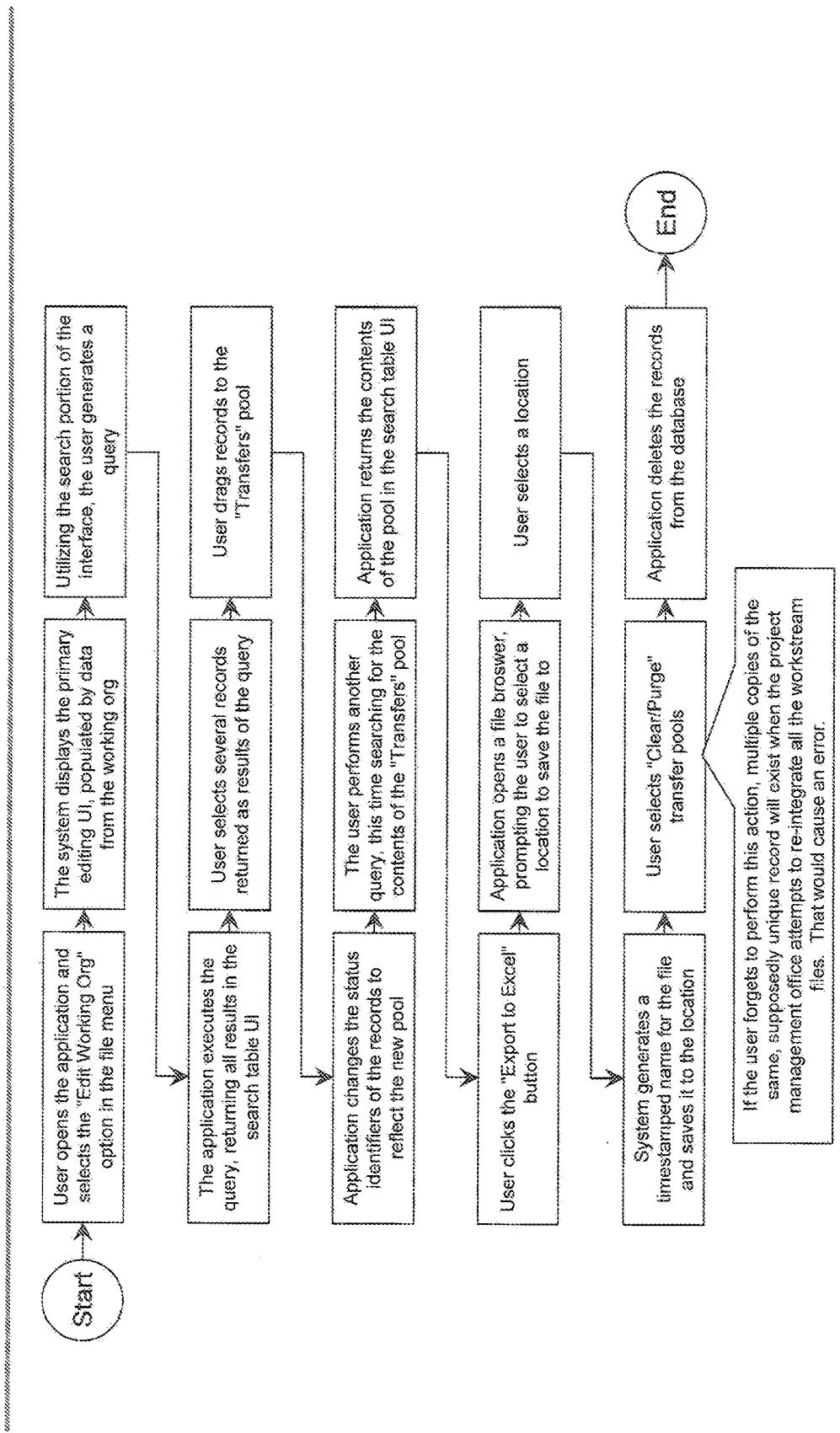

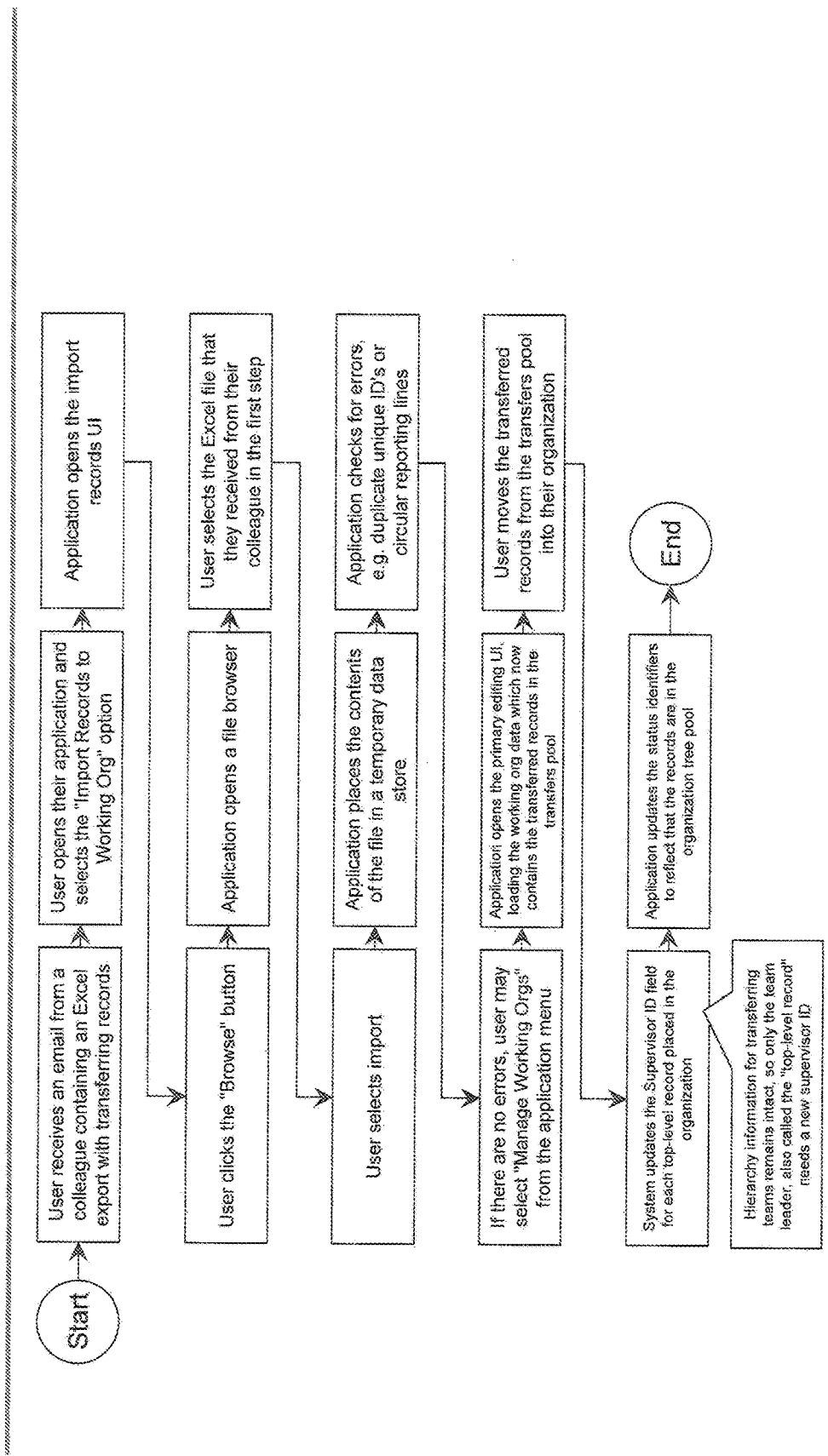

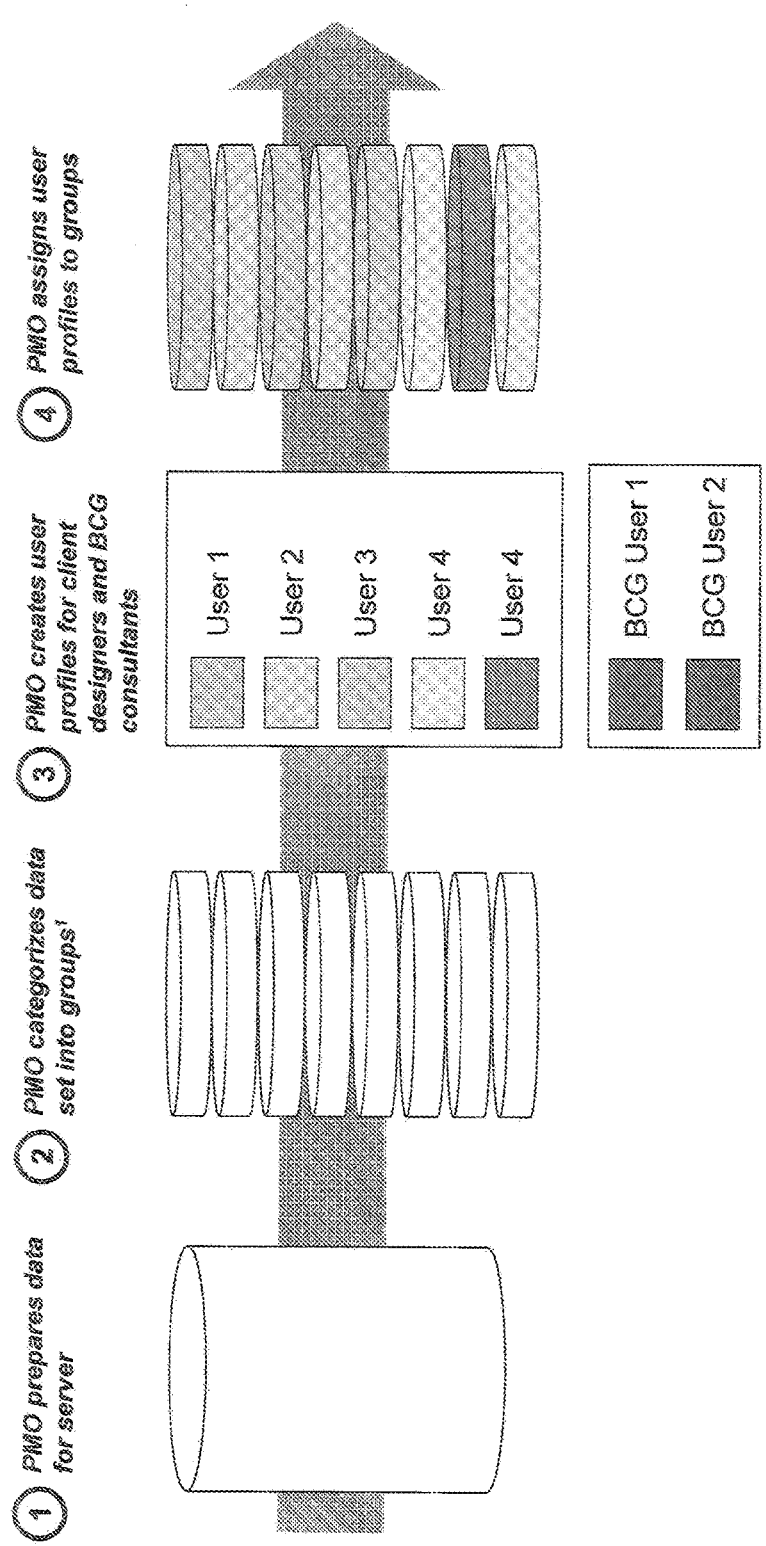

Figure 53

| Pool Type | Description | Status at end of quarantine if all errors corrected | Rationale |
|---|---|---|---|
| Standard | Pools as they currently exist — containers for groups of records of a specified type | N/A | These pools are the ongoing blueprint for the org; there should be no need to modify on rollup |
| Transfers | Pools used for transfers — foundation of the transfers workflows in the web tool | Contain only records present in the baseline (none user-created) | Records created by users should not be cost neutral on transfer — that would enable users to collude to add positions for free. Can be disabled by PMO for instances of massive missing data (e.g. 20K records absent). |
| Errors to Clear | Pools used to send Supervisor ID errors to client designers for resolution | Empty | Forces users to address errors before submission. |
| Created in Error | Pools used as a non-sequential "Undo" for positions and people created by the user | Contains only user-created positions, nothing from the baseline | Want to be able to clear these without adding overhead to the PMO |
| Scratch Paper | Temporary working space for client designers | Empty | Want to encourage users to submit changes as part of the org tree or in an informational pool |

Figure 54: fields used to facilitate the transfer process

| Field Type | Field Name | Values and detail |
|---|---|---|
| Pathing | To | Name of destination client group |
| | From | Name of originating client group |
| | $_ToID_$ | Unique ID of destination client group |
| | $_FromID_$ | Unique ID of originating client group |
| Reporting Line | Supervisor_ID | Unique ID for the record's current supervisor |
| | Target_Sup_ID | Target supervisor ID if selected during transfer process |
| | Orig_Sup_ID | Unique ID for the record's supervisor immediately before the transfer |
| Recipient Approval | Recip_Approval | Pending – transfer has not yet been approved by the recipient<br>Approved – transfer has been approved by the recipient<br>Rejected – transfer has been rejected by the recipient |
| PMO Approval | PMO_Approval | Pending – transfer has not yet been approved by the PMO<br>Approved – transfer has been approved by the PMO<br>Rejected – transfer has been rejected by the PMO |
| Pool | Status | Inbound transfers – positions that can come into the group<br>Inbound transfers – People – people that can come into the group<br>Outbound transfers – positions marked as leaving the group<br>Outbound transfers – People – people marked as leaving the group |
| | $_Status_$ | Unique ID of the records current pool |
| Audit | Transfer_ID | Unique ID for the transfer |
| | T_Timestamp | Date and time of transfer initiation in MSFT Excel format |
| | Last_Check_In | Date and time of last check in in MSFT Excel format |
| I/O Privileges | Client_Group | Name of client group in which the record sits |
| | $_GroupID_$ | Unique ID for the record's client group |
| Communication | Last_Touch | Full name from the last user profile to check in the records |

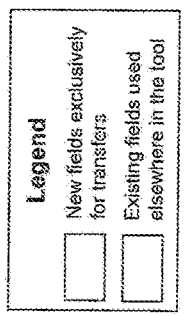

Legend
- New fields exclusively for transfers
- Existing fields used elsewhere in the tool Note: Empty values will be marked as NULL. All fields described will be part of the organization database.

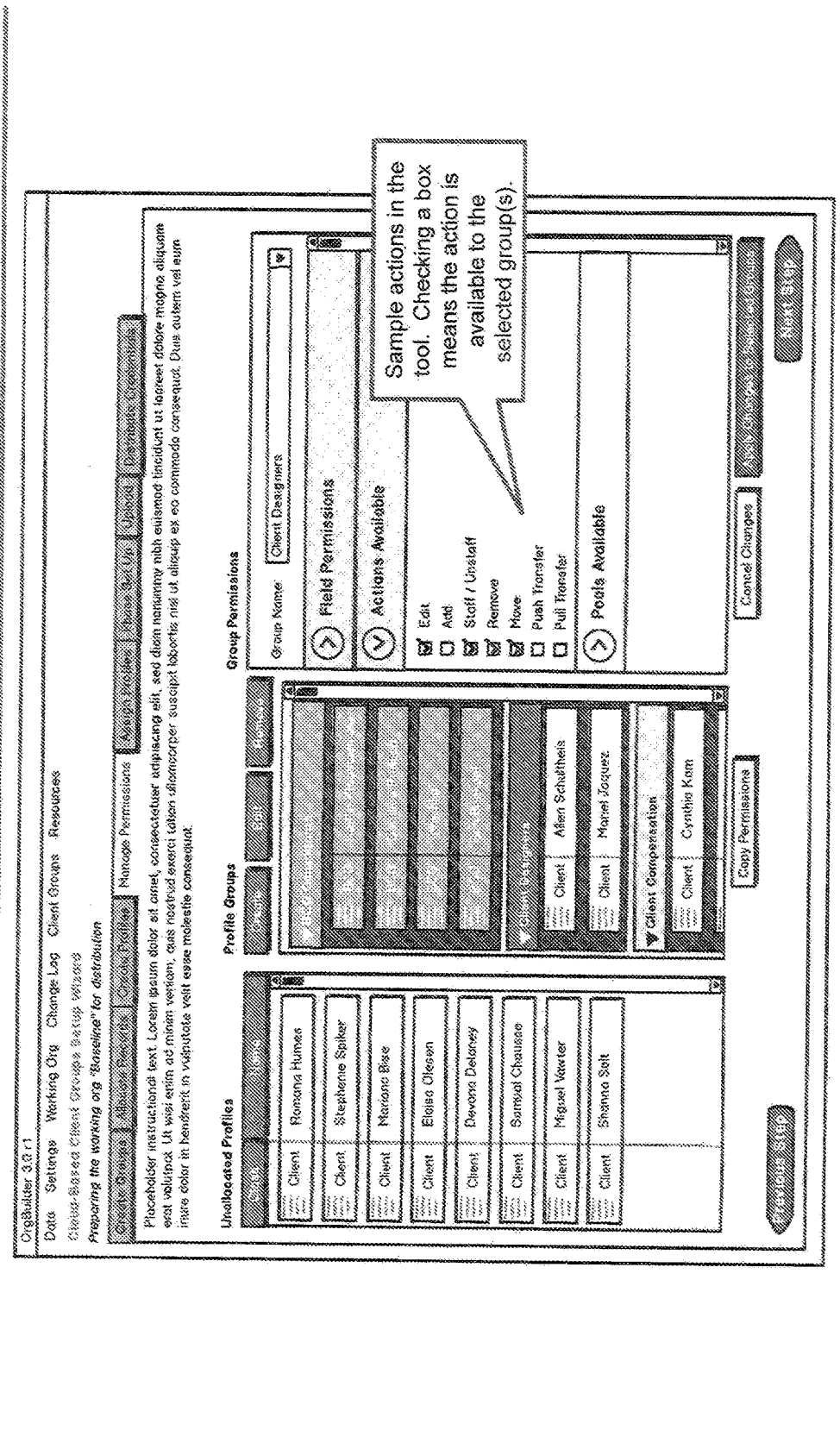
FIG. 55: Profile Permissions (V)

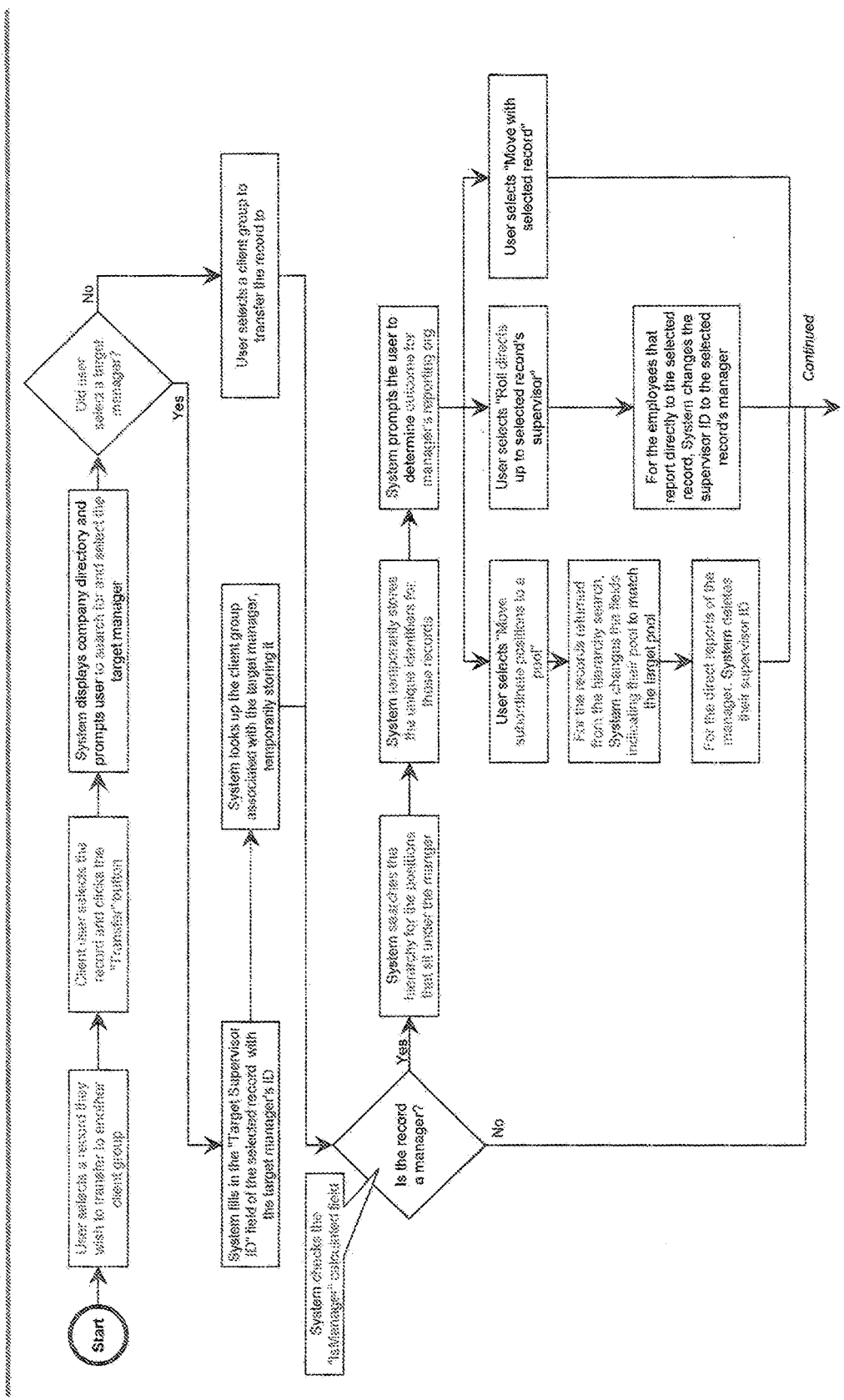

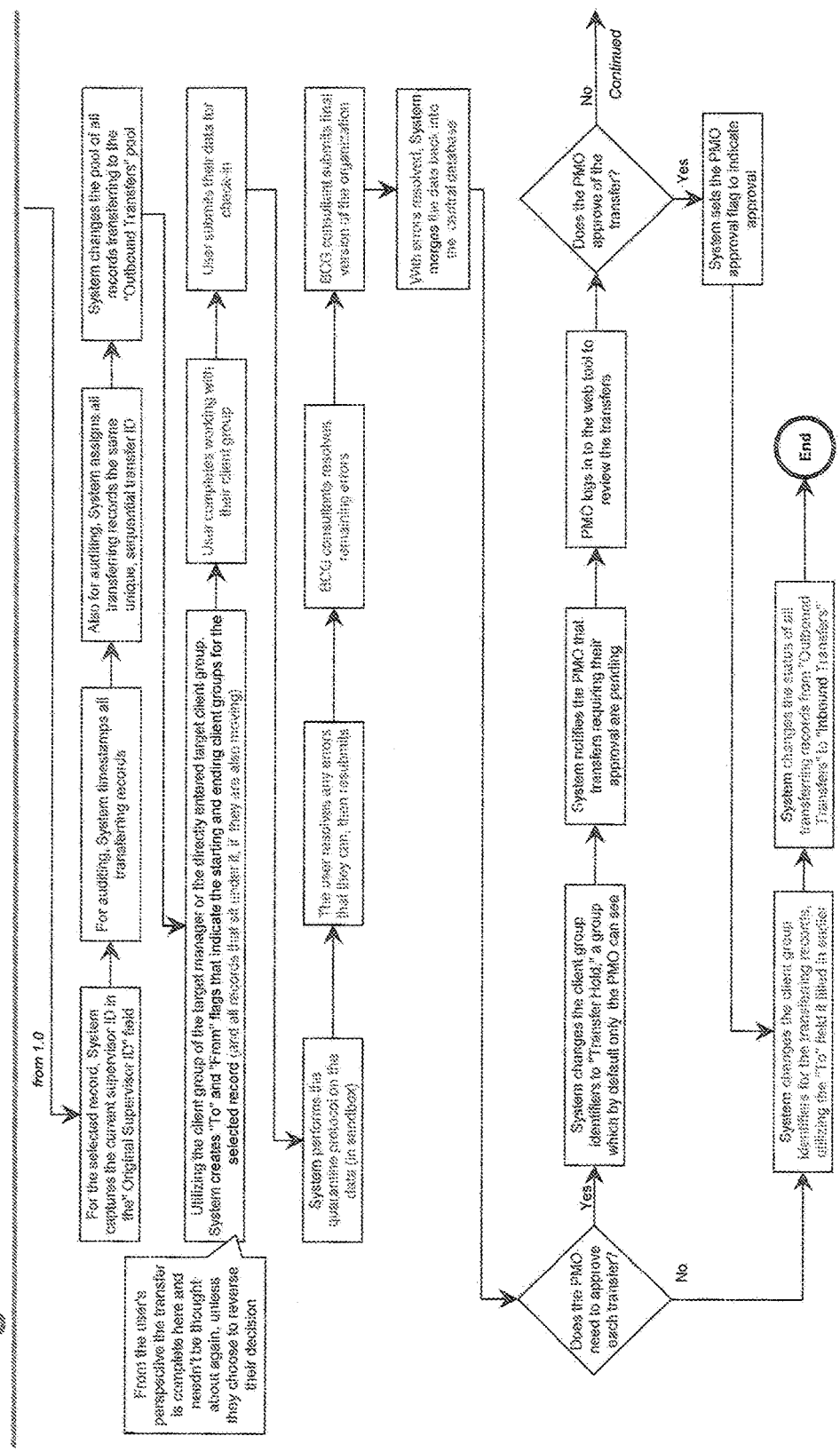

Changing flag states – PMO rejection for top-level/node record

FIG. 76

Time Remaining: 5:28 minutes

Different models for hierarchical data management

Model #1: Clear, single owner / editor

- Mutually exclusive allocation
- Clear, single owner per carve out
- Push transfers between groups
- Limited visibility outside groups

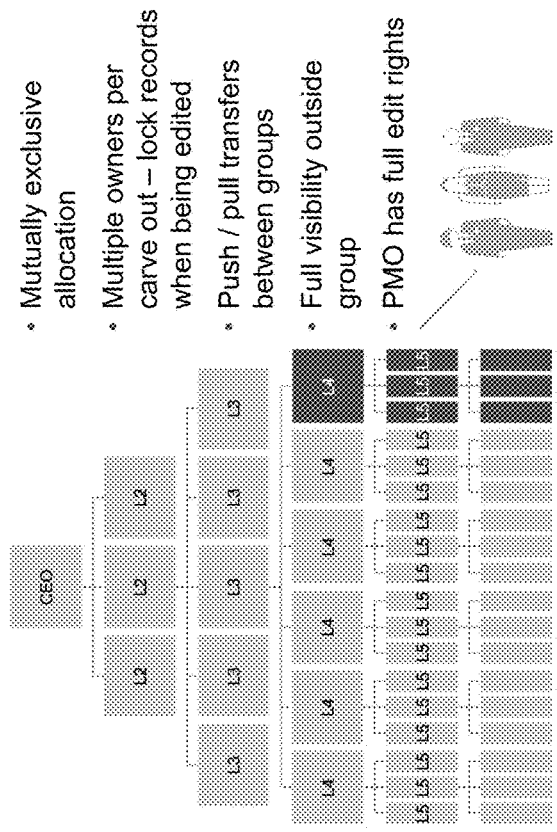

Model #2: Multiple owners / editors + full org visibility

- Mutually exclusive allocation
- Multiple owners per carve out – lock records when being edited
- Push / pull transfers between groups
- Full visibility outside group
- PMO has full edit rights

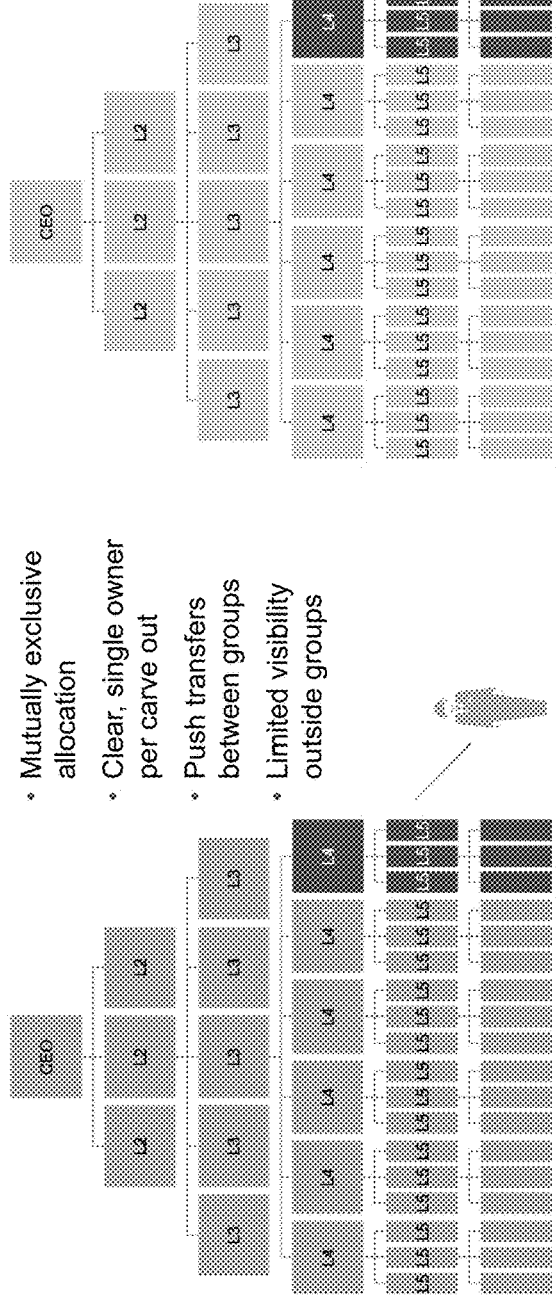

FIG. 77
Different models for hierarchical data management

Model #2 special case: Full org group

- All records allocated to one group
- Multiple users can access group
- No transfers necessary
- Full visibility for all users

Model #3: Non-hierarchical carve outs

- Flexible allocation
- Cross ownership of fields and records
- Push / pull transfers between groups
- Full visibility outside group

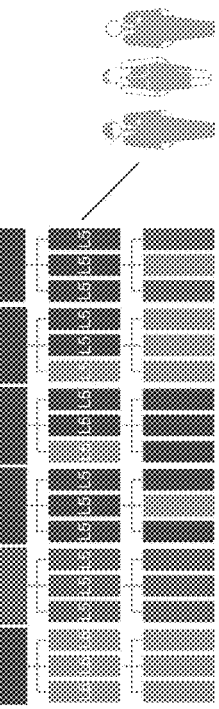
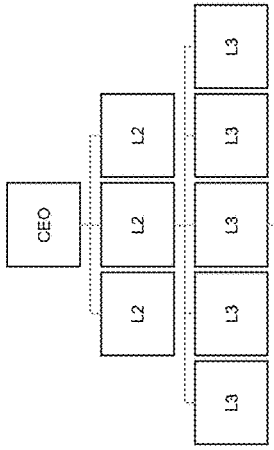
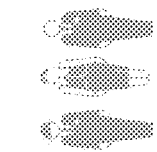
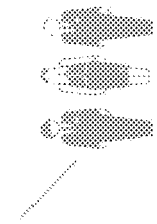

FIG. 80
Request count for people visible on slate and person view
Position view
Person view
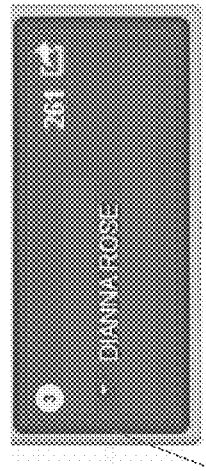
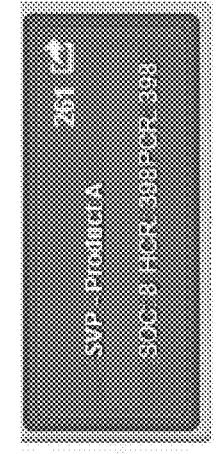
Request count per person tied between people and positions
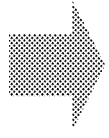
Candidate slate
| Name | Owner | Rationale | # requests |
|---|---|---|---|
| Diane | xx | xx | 3 |
| Rose | | | |

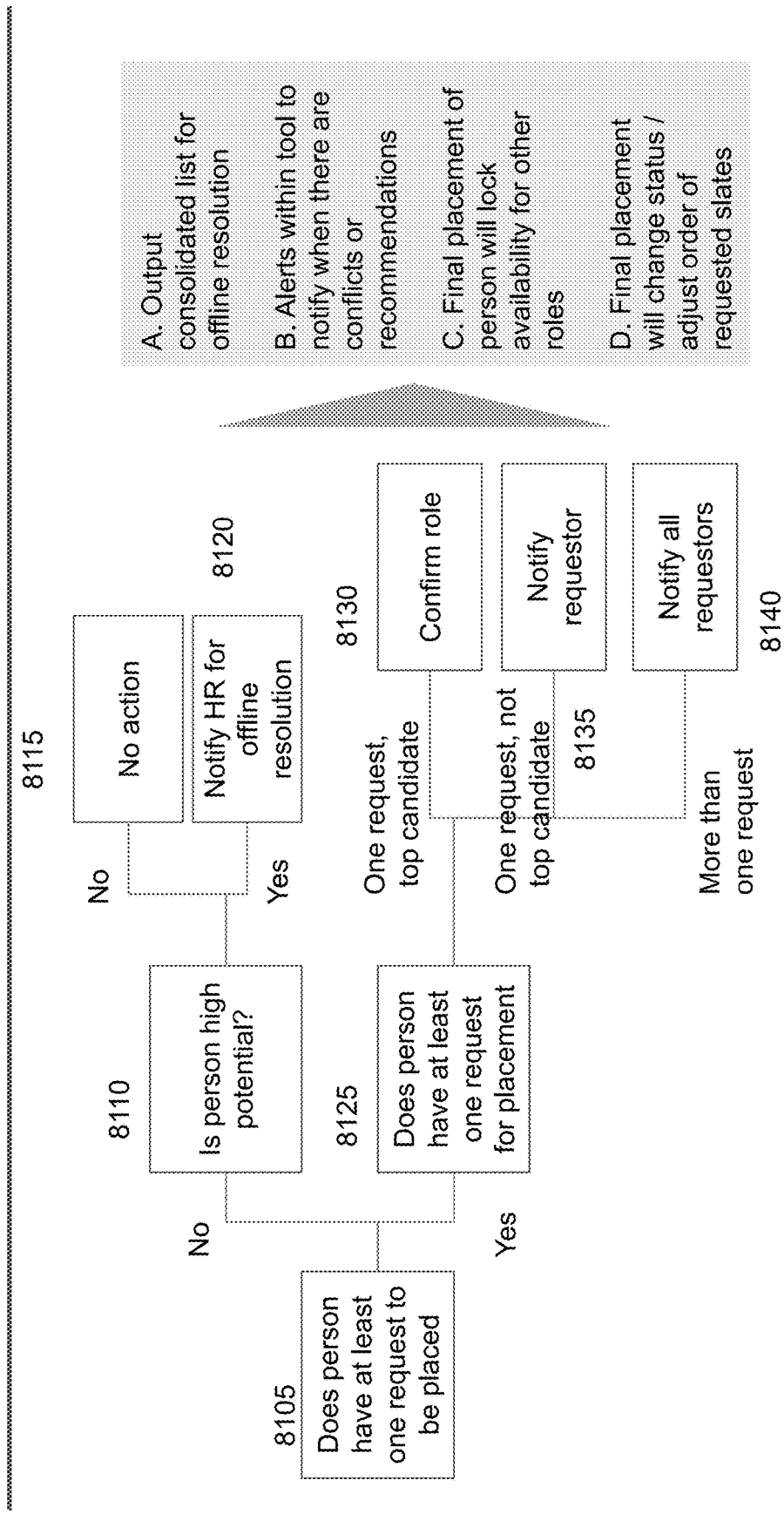

METHODS FOR EDITING HIERARCHICAL DATA

CROSS-REFERENCE TO RELATED APPLICATIONS

This application claims the benefit of U.S. Provisional Application No. 61/802,884, filed Mar. 18, 2013, which is incorporated by reference in its entirety.

BRIEF DESCRIPTION OF THE DRAWINGS

FIG. 2 is an organization building process according to an embodiment of the invention.

FIG. 11B is a network traffic flow according to an embodiment of the invention.

FIG. 15 is a client group preparation process according to an embodiment of the invention.

FIG. 17 is a transfer process according to an embodiment of the invention.

FIG. 18A is a transfer process according to an embodiment of the invention.

FIG. 18B is a transfer process according to an embodiment of the invention.

FIG. 18C is a transfer process according to an embodiment of the invention.

FIG. 19A is a group and profile creation process according to an embodiment of the invention.

FIG. 19B is a group and profile creation process according to an embodiment of the invention.

FIG. 22 is a checkout process according to an embodiment of the invention.

FIG. 23 is a checkout process according to an embodiment of the invention.

FIG. 24 is a checkout process according to an embodiment of the invention.

FIG. 25 is a change of control process according to an embodiment of the invention.

FIG. 26A is a check in process according to an embodiment of the invention.

FIG. 26B is a check in process according to an embodiment of the invention.

FIG. 27A is a checkout process according to an embodiment of the invention.

FIG. 27B is a checkout process according to an embodiment of the invention.

FIG. 27C is a checkout process according to an embodiment of the invention.

FIG. 36A is a transfer process according to an embodiment of the invention.

FIG. 36B is a transfer process according to an embodiment of the invention.

FIG. 37 is a transfer process according to an embodiment of the invention.

FIG. 38 is a notification process according to an embodiment of the invention.

FIG. 41A is a group and profile creation process according to an embodiment of the invention.

FIG. 41C is a group and profile creation process according to an embodiment of the invention.

FIG. 41D is a group and profile creation process according to an embodiment of the invention.

FIG. 42A is a checkout process according to an embodiment of the invention.

FIG. 42B is a checkout process according to an embodiment of the invention.

FIG. 42C is a checkout process according to an embodiment of the invention.

FIG. 42D is a checkout process according to an embodiment of the invention.

FIG. 43A is a quarantine and error resolution process according to an embodiment of the invention.

FIG. 43B is a quarantine and error resolution process according to an embodiment of the invention.

FIG. 44 is an admin notification process according to an embodiment of the invention.

FIG. 46 is a quarantine checkout process according to an embodiment of the invention.

FIG. 47 is a control change process according to an embodiment of the invention.

FIG. 48 is a save process according to an embodiment of the invention.

FIG. 49 is a set of pools according to an embodiment of the invention.

FIG. 50 is a transfer process according to an embodiment of the invention.

FIG. 51 is a receive process according to an embodiment of the invention.

FIG. 52A is a client group management process according to an embodiment of the invention.

FIG. 53 details acceptance criteria by pool type according to an embodiment of the invention.

FIG. 54 is a set of fields according to an embodiment of the invention.

FIGS. 55-57 are screenshots of user interfaces according to embodiments of the invention.

FIGS. 58A-58C are a transfer process according to an embodiment of the invention.

FIGS. 76-77 illustrate example models for hierarchical data management, according to embodiments of the invention.

FIG. 80 illustrates a request count in slate and person views, according to embodiments of the invention.

FIG. 81 illustrates a conflict resolution process, according to an embodiment of the invention.

DETAILED DESCRIPTION OF SEVERAL EMBODIMENTS

Figure 1A:
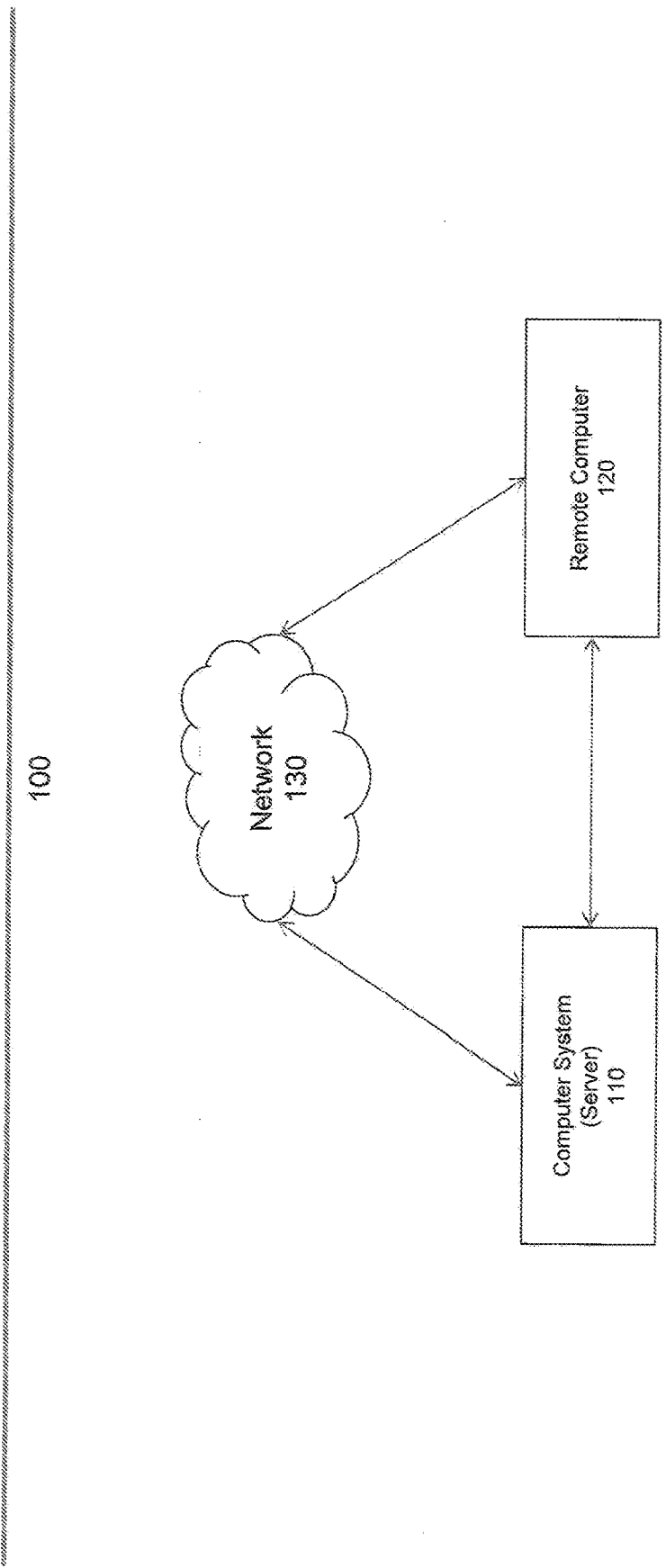
FIG. 1A is a computer network according to an embodiment of the invention.

Over time, organizations may experience a gradual decline in efficiency—they may lose their designed structure as decisions to add, promote, move, or remove employees are made on by many separate managers on a one-off basis. Thus, from time to time companies may engage in an organizational redesign process, in which they may seek to achieve efficiencies and adjust to new competitive realities by imposing a new design. Organizational design and/or redesign may take several forms. For example, design may be top-down or cascaded. In the top-down approach, senior managers in each business unit may design their entire organizations centrally. In the cascaded approach, a layer by layer process may be performed in which each manager responsible for a layer designs the layer below. As used herein, "layer" may mean a cadre of managers who are at the same reporting depth from a top layer, such as a layer including the CEO. For example, the CEO may be layer 1. The executive committee that reports to the CEO may be layer 2. A senior vice president that reports to a "C" level position, e.g. Chief Financial Officer, may be layer 3, and so on. In any case, organizational redesign may involve analysis and maintenance of large quantities of data which may be from a number of different sources, for example a human resources information system, a system for managing the recruiting and hiring process, a set of service-level agreements for the contractor workforce, a detailed budget by cost center, a talent assessment database, etc.

Systems and methods described herein may facilitate management of data that is linked in a hierarchical fashion, such as organizational data. Specific examples of hierarchical data may include organizational employee hierarchies, financial data, geographical and/or political data sorted by regions of varying level, and/or system user profile types based on access level. Devices operating the various applications and performing the various processes described herein may comprise one or more computers. Computers may be linked to one another via a network or networks. A computer may be any programmable machine or combination of machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via WiFi, WiMax, or other wireless connection). Connections between computers may use any protocols, including connection oriented protocols such as TCP or connectionless protocols such as UDP. Any connection through which at least two computers may exchange data can be the basis of a network.

System Architecture

FIG. 1A is a computer network 100 according to an embodiment of the invention. The network 100 may include, for example, a computer system 110 (e.g., comprising a server) and a client 120. As will be described in greater detail below with respect to FIG. 1B, the computer system 110 may perform various organization redesign functions. The remote computer 120 may enable a user to interact with the computer system 110, for example via a desktop or web tool as described in greater detail below. The remote computer 120 may be directly connected to the computer system 110 and/or may communicate with the computer system 110 via a network 130, such as the internet or a local intranet. In some embodiments, a user may be able to directly interact with the computer system 110 as well.

Figure 1B:
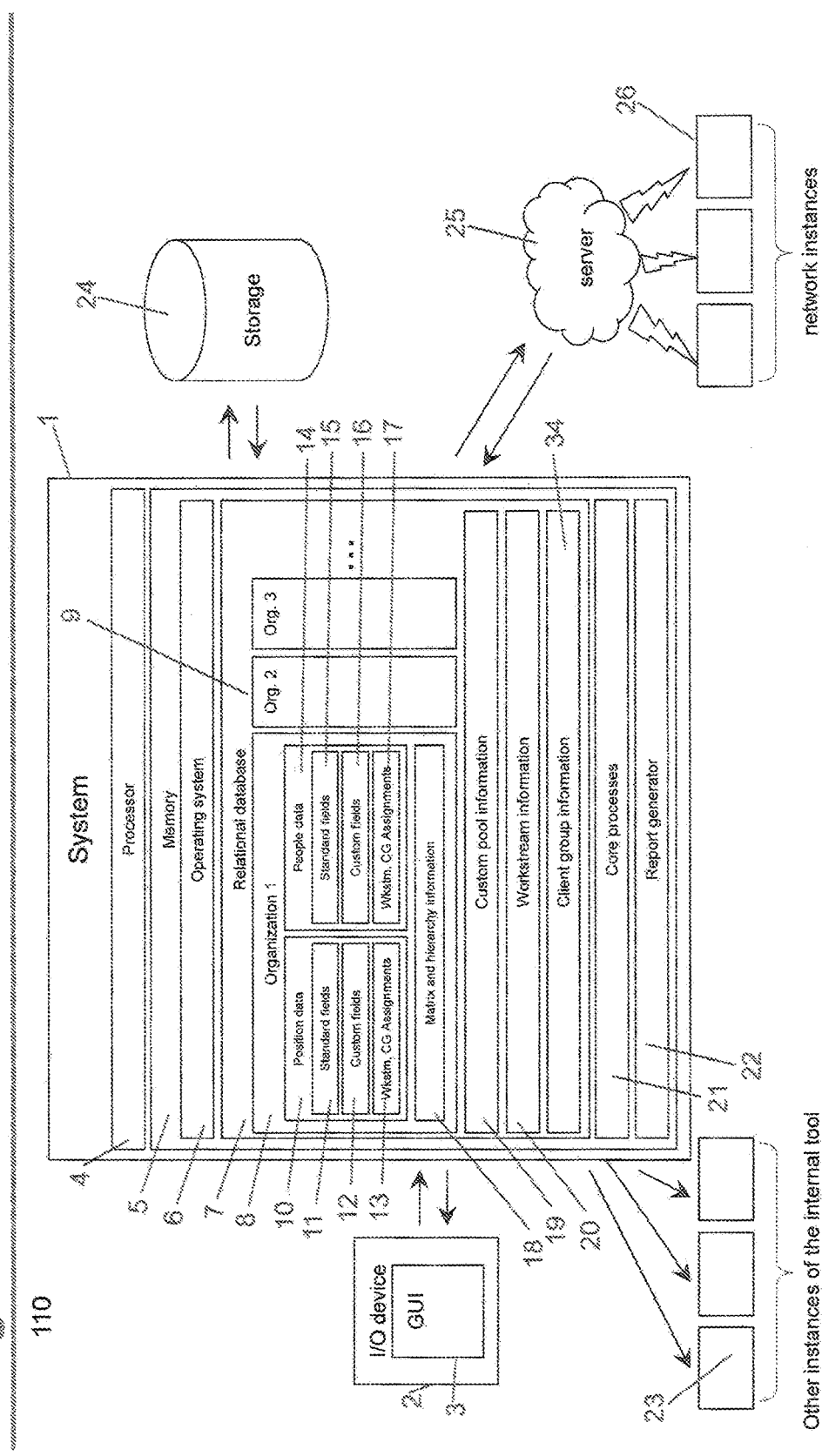
FIG. 1B is a computer system according to an embodiment of the invention.

FIG. 1B is a computer system 110 according to an embodiment of the invention. The system 110 may include one or more system computers 1 such as servers, I/O devices 2 such as remote computers or mobile devices (e.g., clients 120), storage elements 24 such as databases, and/or remote servers 25. The system computer 1 may include a processor 4 and memory 5. The system computer 1 may also include various modules whose functions are described in greater detail below. For example, the system computer 1 may include an operating system module 6, a relational database module 7, a core processes module 21, or a report generator module 22; or any combination thereof. At least one, some, or all of the modules may be considered a data management module, alone or collectively, which may perform a variety of functions described herein. In some embodiments, the system computer 110 may be implemented as a desktop computer which interacts with a server 25 to receive and upload data for editing. The system computer 110 may also be accessed by a remote computer 120, and some or all data editing may be handled by the system computer 110 based on user input from the remote computer 120. These processes are described in greater detail below.

The relational database module 7 may include, for example, various organizations 8,9, custom pool information 19, workstream information 20, staffing and talent information, and/or client group information 34. The individual organizations 8,9 may include position data 10 including standard fields 11, custom fields 12, and/or workstream and/or client group assignments 13. The individual organizations 8,9 may also include people data 14 including standard fields 15, custom fields 16, talent pools, and/or workstream and/or client group assignments 17. The individual organizations 8,9 may also include matrix and hierarchy information 18, for example direct and indirect reporting lines among personnel. Standardized fields 11,15 may be used for lookups (e.g., position ID) or critical calculations (e.g., salary, number of direct reports, etc.). Custom fields 12,16 may be informational, for example a business unit name or cost center number, or they can be used as the basis of calculations, pooling or searching. For example, a user might create a Boolean field called "IsContractor," then set the value of the field to "TRUE" for each contractor and "FALSE" otherwise. In some embodiments, the system 110 may be able to set values for custom fields based on business logic. For example, the system 110 may dynamically define a business unit as anyone sitting under a specific manager. Records moved to that manager's organization from elsewhere may have their business unit descriptors automatically changed.

Custom pool information 19 may include one or more pools. Pools may be containers for staffed positions, empty positions, and/or unstaffed people determined to be related along a dimension of interest. For example, all the people who are awaiting the selection and staffing phase of the project may be placed in one container, or a container may be created for positions and people marked as exiting the organization. One pool may be called the "Organization Tree." That pool may contain the entire reporting structure of the organization, up to and including the CEO. Some pools may be called "custom" because, while the system 110 may come with a set of pools by default, the user may modify the pools to suit the specific needs of the organization design engagement. An example set of pools which may be included by default is illustrated in FIG. 49. A user need which may have an impact on the pools employed may be the progress accounting system employed by a team, for example. Pools may be used in this case because they may clearly define the status of positions and/or people. In a simple example, one could count the people in the organization tree, then count the contents of pools marked as "Employees Removed by a Separate Effort" and "People Exiting the Org". Adding all three numbers together may give the number of people in the Organization Tree before the design process began.

The custom pool 19 table may contain at least the pool name, its type, and its unique identifier. The name and unique ID may be used to assign records to a specific pool in people and position databases' assignments fields. The system 110 may perform these assignments automatically as the user moves records from container to container. As used herein, a "record" refers to an unstaffed position, a staffed position (e.g., a position occupied by a person), and/or an unstaffed person (e.g., a person without a position). Each record may appear as an entry in the organizations database, which can take the form of a "flat file" with all data fields across the top and rows of data below, for example. Each row may be a record. Pool type may be a piece of metadata used to set up acceptance criteria for data. For example, all pools that contain errors (e.g. records with a missing supervisor) may be required to be cleared before the data can be accepted. For an example providing further detail on acceptance criteria by pool type, see FIG. 53.

Similarly, the workstream 20 and client groups 34 tables may contain information, such as names and unique identifiers, for workstreams and client groups. Both the workstream and client group tables may be containers that may contain information used to facilitate simultaneous editing by establishing unambiguous boundaries between different regions of the hierarchical data and clear ownership over those mutually exclusive and completely exhaustive subsets of the database. Alternately, ownership can be shared across users for simultaneous editing of groups or records with subsequent locking of fields to prevent errors and overwrites Each table may also contain information for managing the redesign process, such as the contact information for the owner of the subset. Both tables may also contain permissions information for each subset. 110

The report generator 22 may facilitate the comparison of two or more organizations stored by the system 110, as well as the generation of visual displays that may summarize those comparisons. To allow a user to customize those displays, the report generator 22 may output to common applications such as Microsoft's Excel and PowerPoint, or other data analysis and display software packages (e.g., third party or proprietary), and may include both the displays themselves as well as the data behind them. The report generator 22 may also handle custom business logic relating to pools and/or fields, which may, for example, underpin the mathematical calculations that facilitate the rapid creation of a waterfall-style display.

The I/O device 2 may include a graphical user interface (GUI) 3 which may enable user interaction with the system 110. The system computer 1 may comprise multiple instances 23 of the modules listed above. Thus, for example, multiple I/O devices 2 may be able to interact with the system computer 1, and multiple users may be able to view and/or edit an organizational redesign simultaneously. Instances 26 of the modules listed above may also be available on the remote servers 25.

Figure 1C:
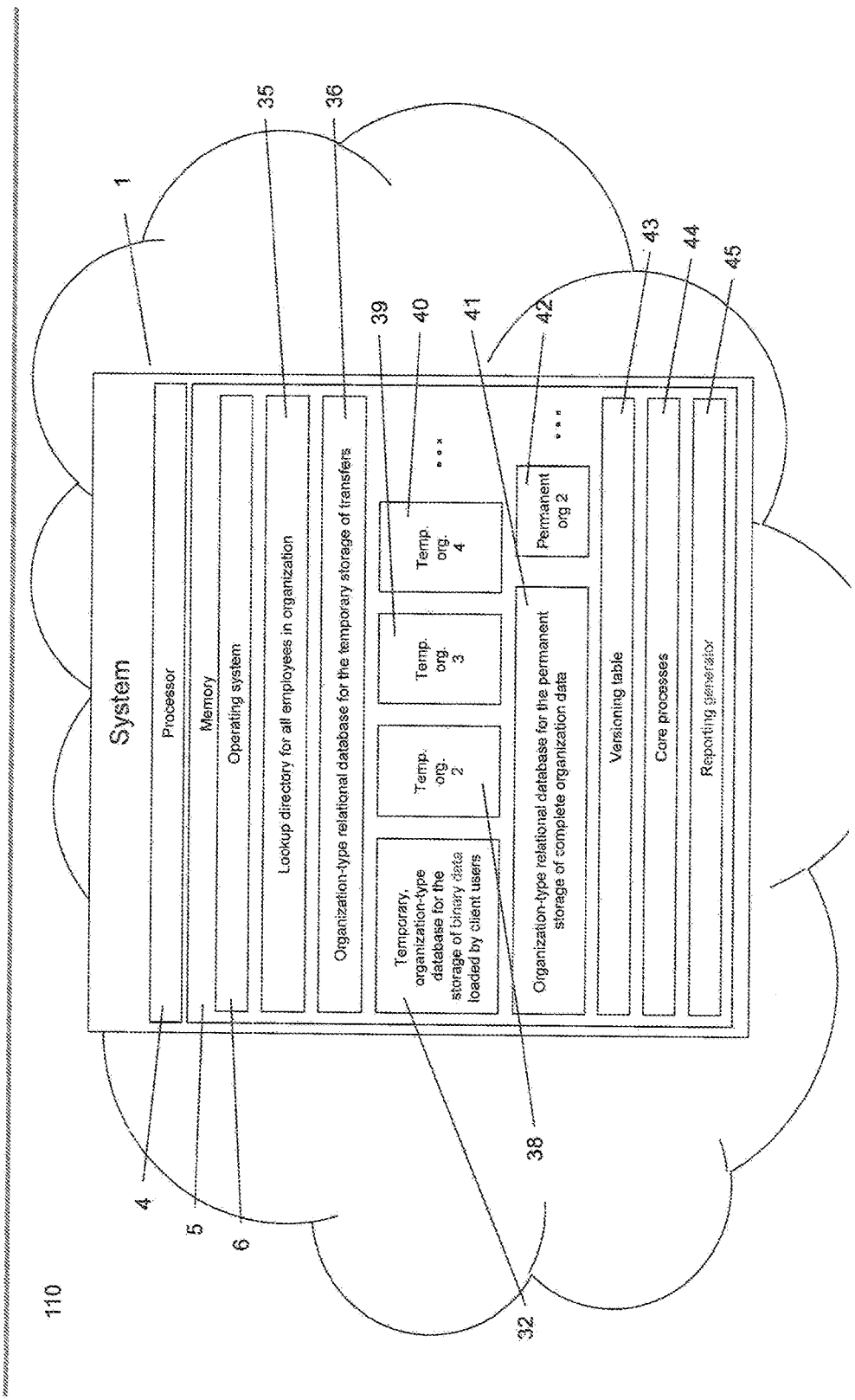
FIG. 1C is a computer system according to an embodiment of the invention.
Figure 1D:
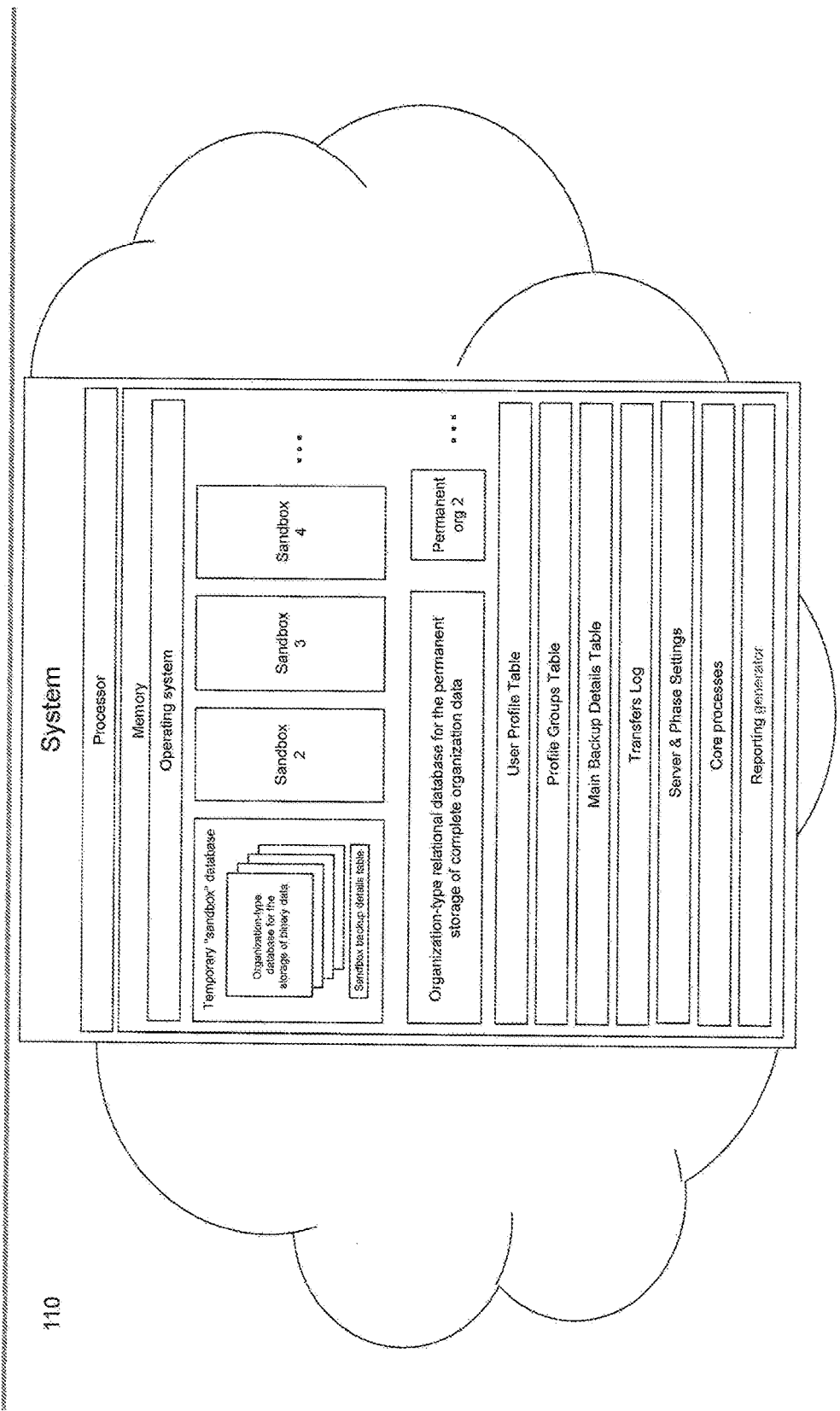
FIG. 1D is a computer system according to an embodiment of the invention.

FIG. 1C is a computer system 110 according to an embodiment of the invention. In addition to and/or instead of some or all of the components described above with respect to FIG. 1B, the system computer 1 may include elements such as a lookup directory module 35, databases 36-42, a core processes module 44, and/or a report generator 45. FIG. 1C may represent a computer system 110 wherein at least some data processing described below may be handled by a remote computer 120. FIG. 1D may also be a computer system 110 according to an embodiment of the invention. FIG. 1D may represent a computer system 110 wherein the data processing described below may be handled by the computer system 110 in a cloud-based environment. The following components may be present in the computer system 110 of FIG. 1C, as shown:

In some embodiments, each user may be able to access only data in their bounded subset. Thus, the system 110 may employ a table of all employees with information about each to allow users to search for employees outside of the data they own.

In other embodiments, a full organization view may allow users to see all or a portion of the organization that they cannot edit. This may enable users to view a broader organization structure, "pull" transfers (e.g., make a request for a position to be shifted into their organization) or request a person (e.g., for staffing, to a position's "slate"). Requests can be made for position only
person only
position and person "Database for the temporary storage of transfers"—used in the Server Model 2. Transferred records may be stored here while they are passed between two separate temporary data stores. For example, the records could be stored in the table until the recipient of the transferring records logs in to the application.

"Temporary data store"—these organization-type databases may be created when a user loads their binary data, which may include the portion of the organization over which they have dominion, onto the server 110. The database may support editing their portion of the organization. When the user has finished editing, they may download a file containing their organization data. After the download, the data may be cleared from the server's memory, which may minimize any security risks that may accompany storing such sensitive information online.

In some embodiments, the server may perform the load and save functions in the background, allowing the user to log in through a username and passkey challenge. In that embodiment, the PMO (project management office) that coordinates the redesign effort (e.g., a small group of consultants)—may download binary data for each subset of the database when the phase is complete.

The following components may be present in the computer system 110 of FIG. 1D, as shown:

User "Sandbox"—this may include a relational database used to store organization and/or hierarchy information as binary data, as described in FIG. 1B. Sandboxes may be accessed remotely through a secure SQL link, either by the desktop application or a web application instance. Sandboxes may contain multiple versions of the organizational database, either as alternative representations of the org or as saved backups that the user may revert to at any point, for example if their supervisor is unsatisfied with a set of actions.

The lookup directory may be omitted because the main organizational table can be referenced in search and lookup actions.

The main permanent organization database may be the "single source of truth"—client groups may be checked out from this database, edited in a sandbox, and merged back into the database when editing is complete.

As with other embodiments, multiple versions of the organization data table may exist in the computer system. These alternate versions may serve a variety of purposes. They may serve as backups of the main database. At least one of them may be a "baseline" organization, against which progress could be automatically measured by the reporting functionality. They may also represent the organization at different points in time. For example, during a post-merger integration ("also called PMI"), each designer may need to create a representation of their organization before the merger, on the first day after the merger, three months after the merger, and/or in "steady state."

The database used to store transfers temporarily may be omitted because transfers may be temporarily held for PMO review in a PMO-only client group.

The "User Profiles Table" may include details about each user, such as their full name, username, password, profile group, and the client groups that they may check out.

The "Profile Groups" table may include permissions information for each grouping of user profiles.

The "Main Backup" details table may include information about each backup of the database, such as the time the backup was created and the last database to be checked in, for example.

Figure 63:
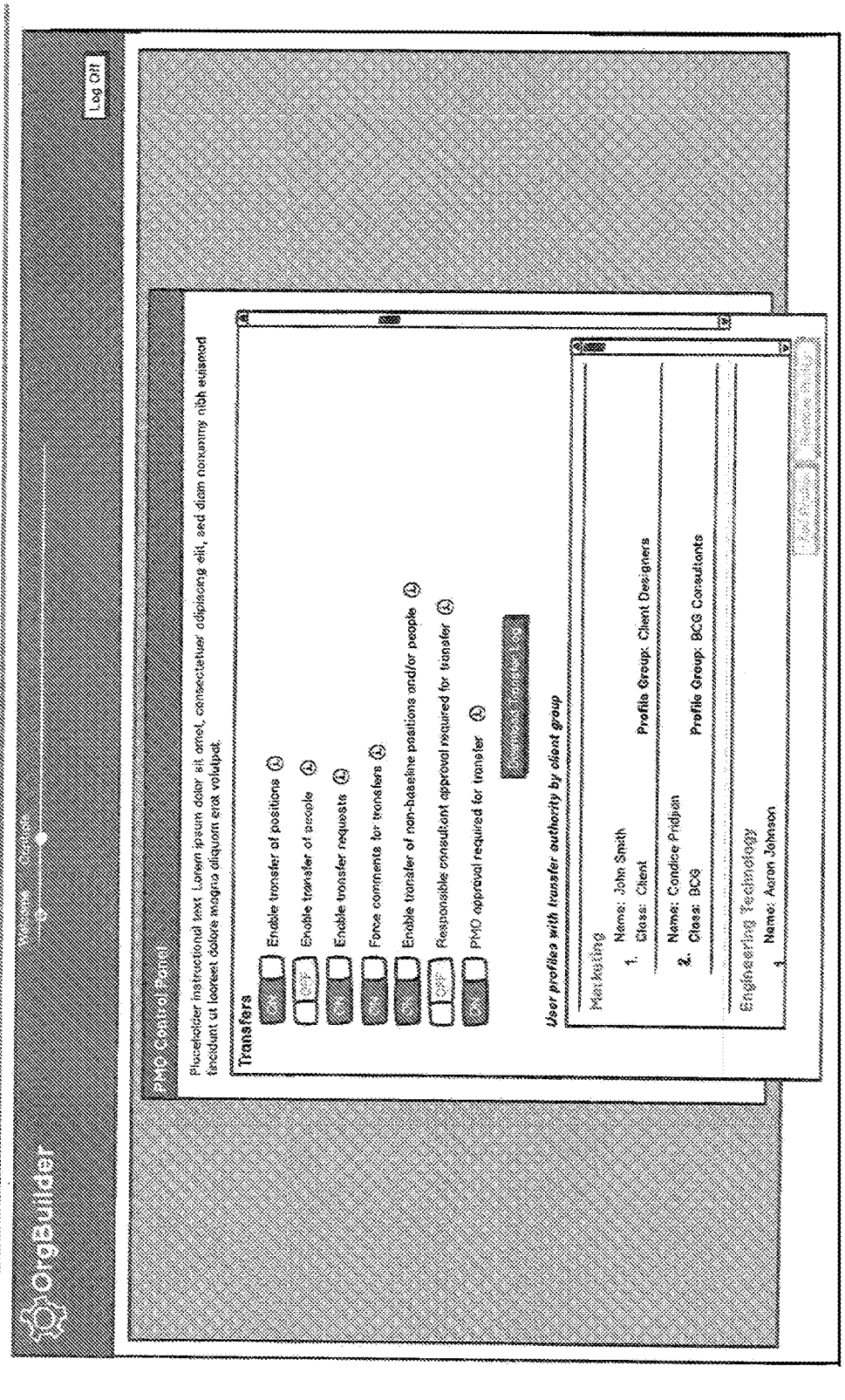
FIGS. 63-65 are screenshots of user interfaces according to embodiments of the invention.

The "Server and Phase Settings" storage unit may include many of the settings that define the user experience and operating characteristics of the program, for example, whether or not users may request transfers. These settings may be manipulated through the PMO control panel UI (see, for example, FIG. 63).

The "Transfers" log may include a data table that may consolidate information from the person and position tables for each record, creating a "snapshot" of the transferring record at every point in the process of moving from one client group to another.

Organization Management

FIG. 2 is an organization design process 200 according to an embodiment of the invention. To design or redesign an organization, the system 110 may first receive data 201. For example, this data may be a data dump from a human resource information system or "HRIS" (which may be provided by SAP or similar), a financial reporting system, a system for managing recruiting and hiring, and/or a system for managing talent. The system 110 may combine several data sets into one. The data may be standardized and/or checked for errors, and data errors may be resolved 202. This may include transforming the data into a semi-standardized format, meaning that some fields may persist across any system 110 implementation, while providing latitude for customization. For example, the system may require that any database has a set of unique position and employee identifiers, names for each employee, and titles for each position. Data errors may include, for example, data type mismatches, circular reporting relationships, positions with no supervisor ID specified, or positions whose specified supervisor is missing. The system 110 may prompt a user to resolve the errors, and the user may also manually check for additional errors such as business units with the wrong name, incorrectly added job postings, etc. Any necessary changes may be input and received by the system 110.

Figure 65:
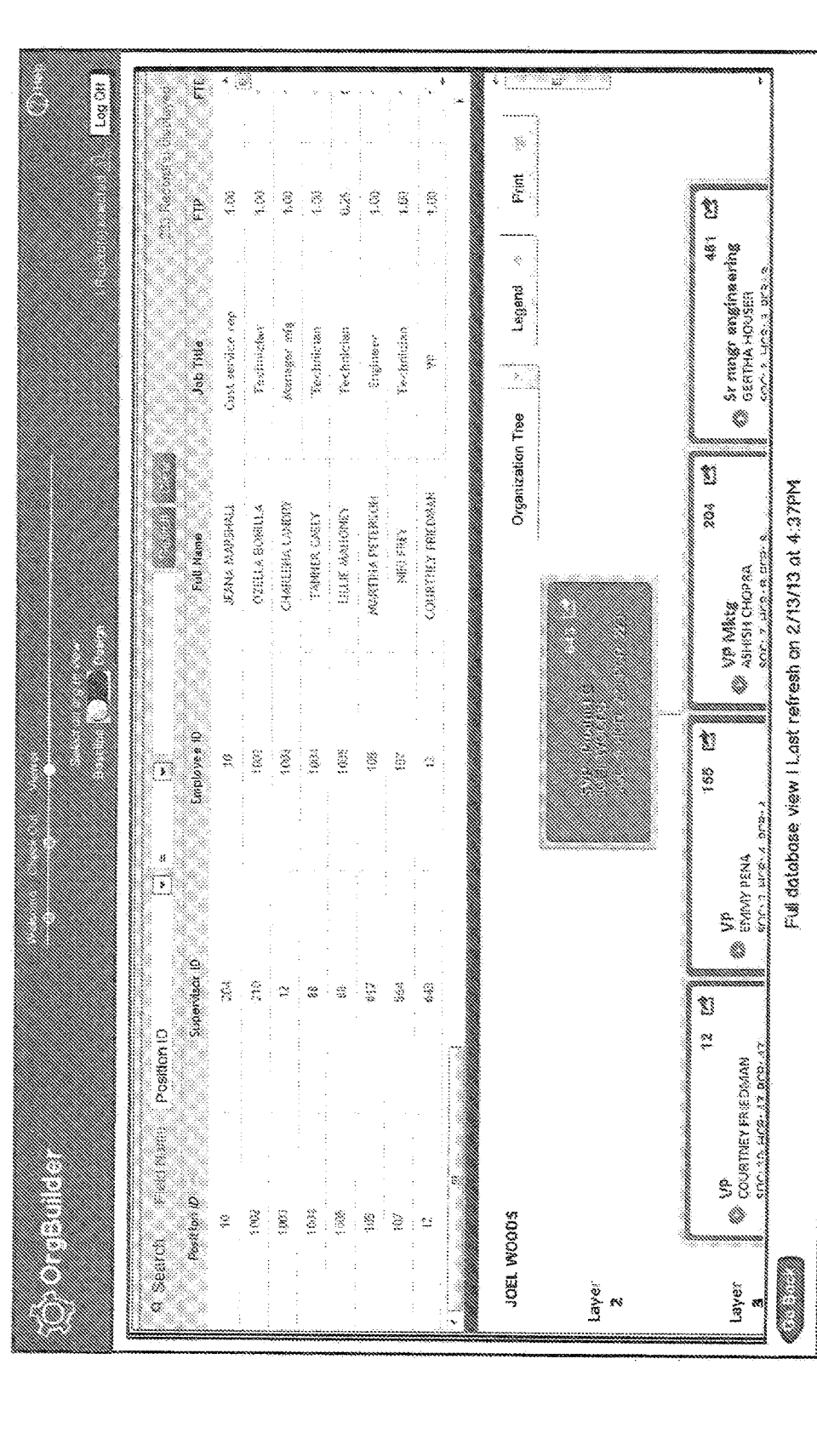

The data may be modified to create a baseline organization (e.g., a snapshot of the organization as it exists at the time of data entry), for example by adding, removing, and/or editing positions, reporting lines, and the like 203. Next, a new organization may be designed 204. The new organization design may be geared towards improving efficiency or achieving some other organizational goal. When the new organization is created, it may be compared to the baseline organization 205, to assess progress, assess remaining opportunity, or track decisions made. Reports may be generated illustrating the differences between the baseline organization and new organization. For example, reports may include information about total cost of the organization, average and median number of direct reports per manager (also called "span of control"), number of organizational layers, number of managers with less than a certain number (e.g., 3, 5, 20, etc.) of direct reports, cross references with other metrics and ratios, etc. New organization generation 204 and comparison 205 may be repeated as necessary until a satisfactory new organization is developed. Multiple new organizations may be compared with one another and/or the baseline. When a new organization is developed and approved, staff selection may be performed 206, thereby implementing the changes required to transform the baseline organization into the new organization. The system 110 may both separate people from their baseline positions, enabling their association with new positions, and may associate a new person with an existing position. Employees marked as exiting the organization must transition out of their roles, new employees must be found to fill new roles, etc. Accordingly, implementation may be tracked 207 once underway. See FIG. 65 for an example of a high level org view.

Workstreams

FIGS. 3-9, and 50-51 are directed to workstream processes. Workstreams may be used to establish non-overlapping subsets of the database 24 that may be simultaneously edited by multiple instances 23 of the system 110—meaning one data set per application instance Consulting teams working on a project may be forced to split up in order to take input from multiple stakeholders. The workstreams functionality may enable the team leader (also called project management office/PMO) to divide the organizational database into several smaller, non-overlapping pieces and to distribute those pieces to team members. Thus, each team member may have total dominion over a small piece of the database. Since the pieces do not overlap, there may be no concern that team members will make changes to each other's pieces and, in so doing, force a detailed comparison of changes. Each non-overlapping piece may be versioned at a different pace than the other pieces. For example, when all of the workstreams are finally aggregated, one workstream, representing the marketing function of the business, may be on its second iteration. Another workstream, representing the engineering function, may be on its tenth iteration.

Figure 3:
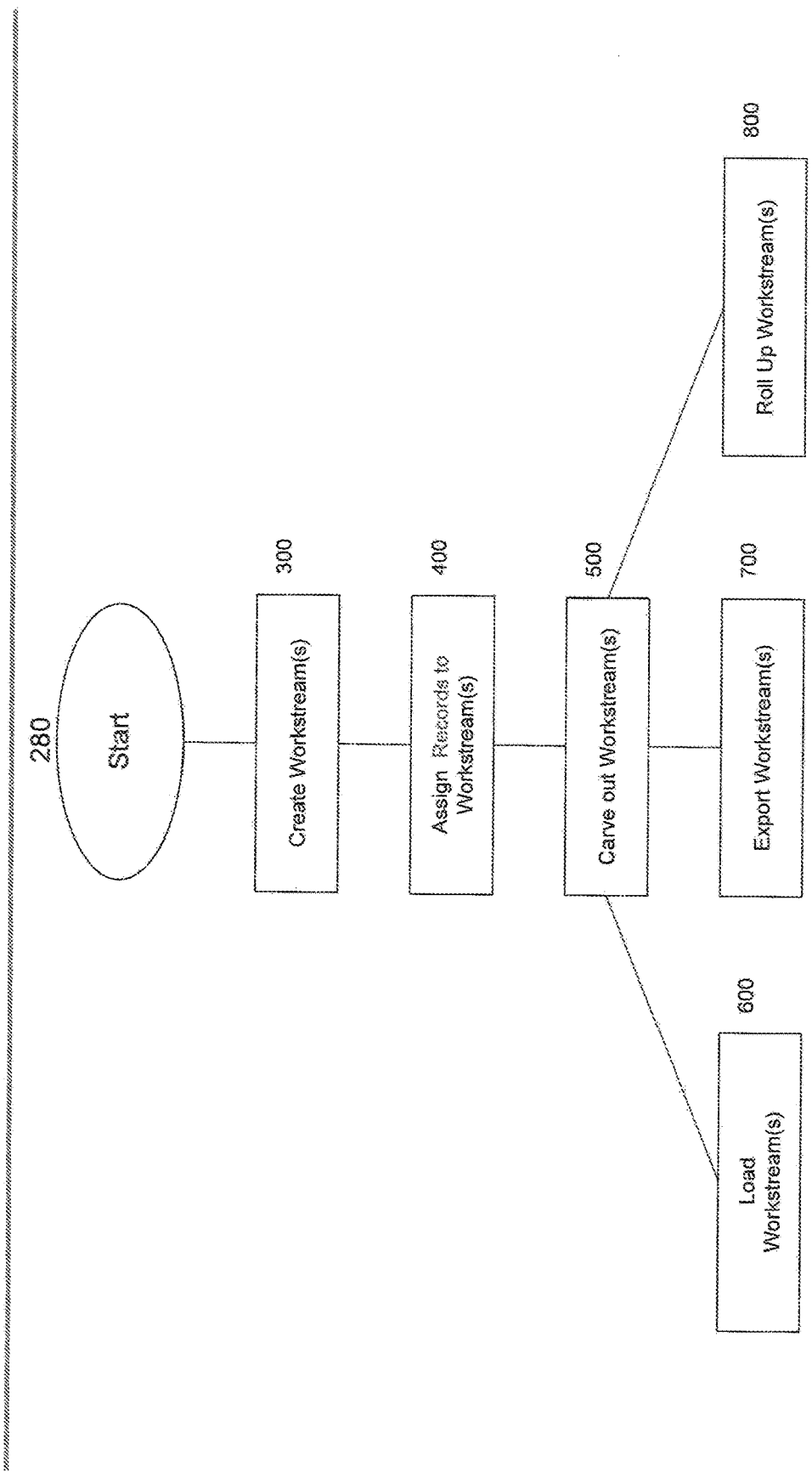
FIG. 3 is a workstream process according to an embodiment of the invention.

FIG. 3 is a workstream process 280 according to an embodiment of the invention. One or more workstreams may be created 300, for example according to the process described below with respect to FIG. 4. Once created, positions and people may be assigned to each workstream 400, for example according to the process described below with respect to FIG. 5. Assigning records to workstreams may associate workstreams with specific organization data and/or users. The assigned workstreams may be carved out 500, for example according to the process described below with respect to FIG. 6. "Carving out" workstreams may involve dividing a single database along the boundaries of each workstream/subset, enabling the workstreams to be viewed and/or modified separately, for example in separate application instances 26. Workstreams that are assigned and separated may be loaded into an application instance 600 (see, for example, FIG. 7), modified by that instance, exported into a common file format 700 (see, for example, FIG. 8), and/or "rolled up" 800 (see, for example, FIG. 9). Loading 600 may involve loading the workstream into an application instance, so that it may be viewed and/or edited. Exporting 700 may involve creating a snapshot of the modified data subset as a file of binary data or a common file format (e.g. comma separated values). That snapshot may be passed back to the process coordinator, also called the PMO, or handed off to another user for further edits. Rolling up 800 may involve aggregating the data from each non-overlapping workstream/subset to form a complete picture of the organization for reporting and documentation, or to be carved out into different subsets.

Workstream Creation

Figure 4:
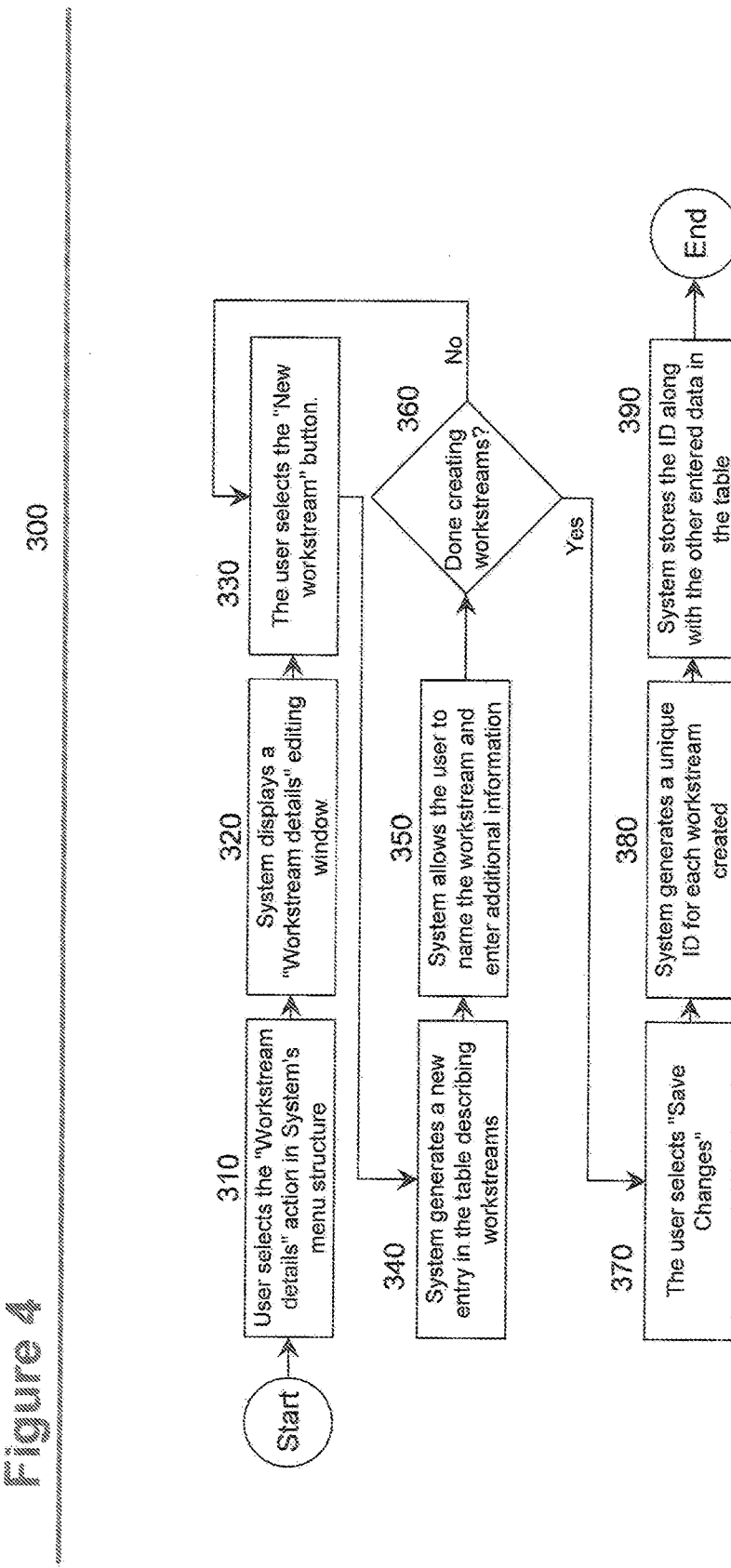
FIG. 4 is a workstream creation process according to an embodiment of the invention.

FIG. 4 is a workstream creation process 300 according to an embodiment of the invention. As noted above, the system 110 may design or redesign an organization. This process may begin with creation of a workstream. A user, for example a user of an I/O device 2, may request initiation of this process 300, for example by selecting a "workstream details" option in a GUI 3 menu 310. The system 110 may cause the GUI 3 to display a "workstream details" editing window to the user 320. The system 110 may receive a user selection of a "new workstream" request 330. The system 110 may generate a new table entry describing a new workstream 340. For example, the new entry may be created by the workstream information module 20 and the table may be stored in the database 24. The system 110 may receive a workstream name and/or additional workstream information from the user 350. In some cases, a user may wish to create multiple workstreams. The system 110 may check whether more workstreams are to be created 360. If the system 110 receives an indication from the user that another workstream is to be created 330, the system 110 may again generate a new table entry 340 and receive workstream name and/or information 350. If no more workstreams are to be created, the system 110 may receive a request to save changes (including the new workstream) 370. The system 110 may generate a unique ID for each created workstream 380, and store the ID and workstream data 390 in the table in the database 24.

Assigning Records to Workstreams

Figure 5:
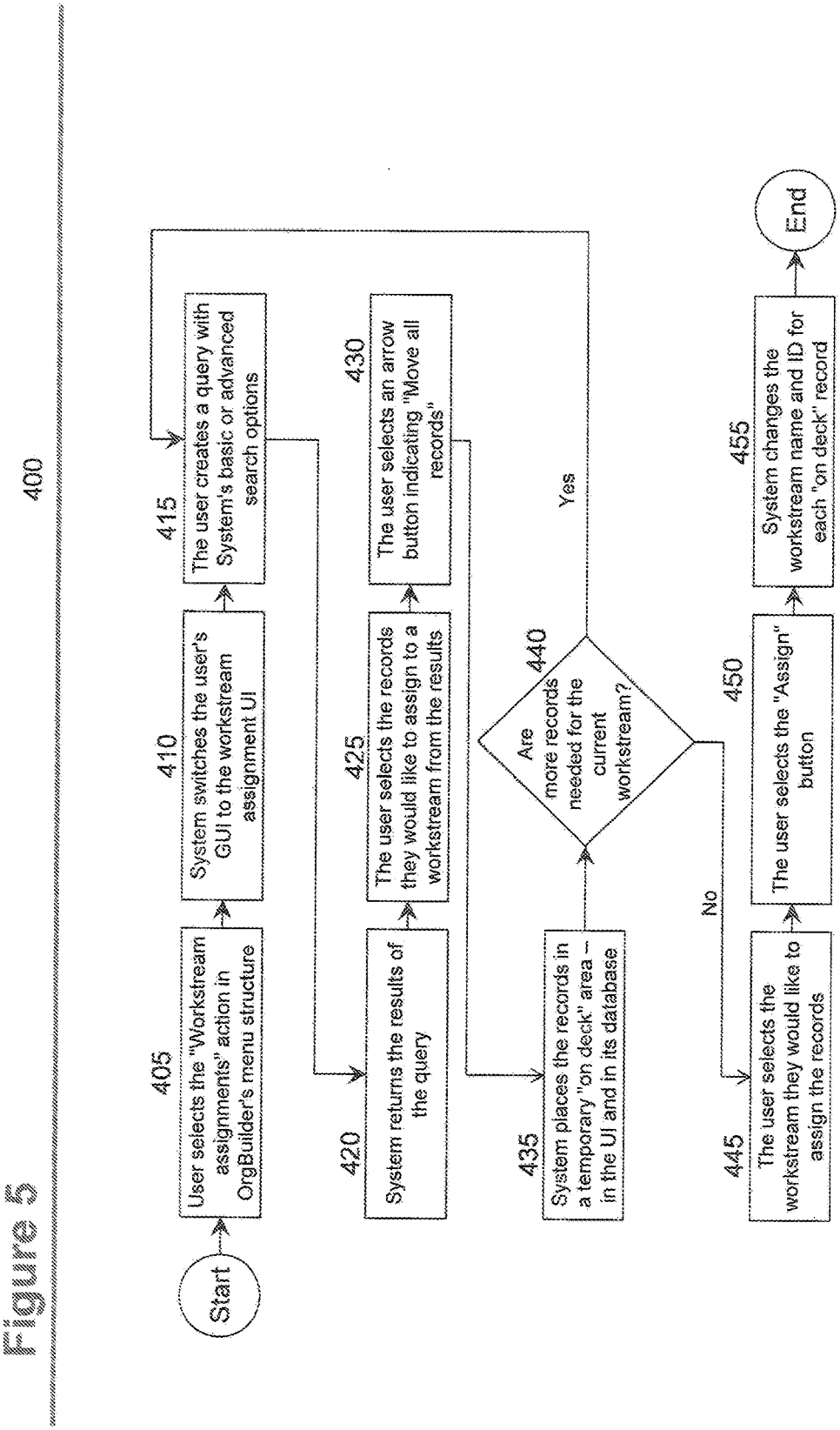
FIG. 5 is a workstream assignment process according to an embodiment of the invention.

FIG. 5 is a workstream assignment process 400 according to an embodiment of the invention. Created workstreams may be associated with records, for example HR records of an organization, through this process 400. The system 110 may receive a user request to perform workstream assignments 405. The system 110 may cause the GUI 3 to display a workstream assignment interface 410. The workstream assignment interface may allow the user to make a search query, which may be received by the system 110 to enable the system 110 to search the database 24 for data matching the query 415. The system 110 may return the results of the query 420, and these results may be displayed on the GUI 3. The user may select data from the search results for assignment to a workstream 425 and may indicate that the system 110 should move the selected records to the workstream 430. The system 110 may store the selected records temporarily 435 in the database 24 and indicate this through the GUI 3. If more records are needed for the workstream 440, the user may request another search 415. The search process 420-435 may be repeated as needed. If no more records are needed 440, the user may select a workstream to which the records will be assigned 445 and initiate assignment 450. The system may assign the records to the workstream 455, for example by adding the workstream name and ID to each record in the temporary storage.

Carving Out Workstreams

Figure 6:
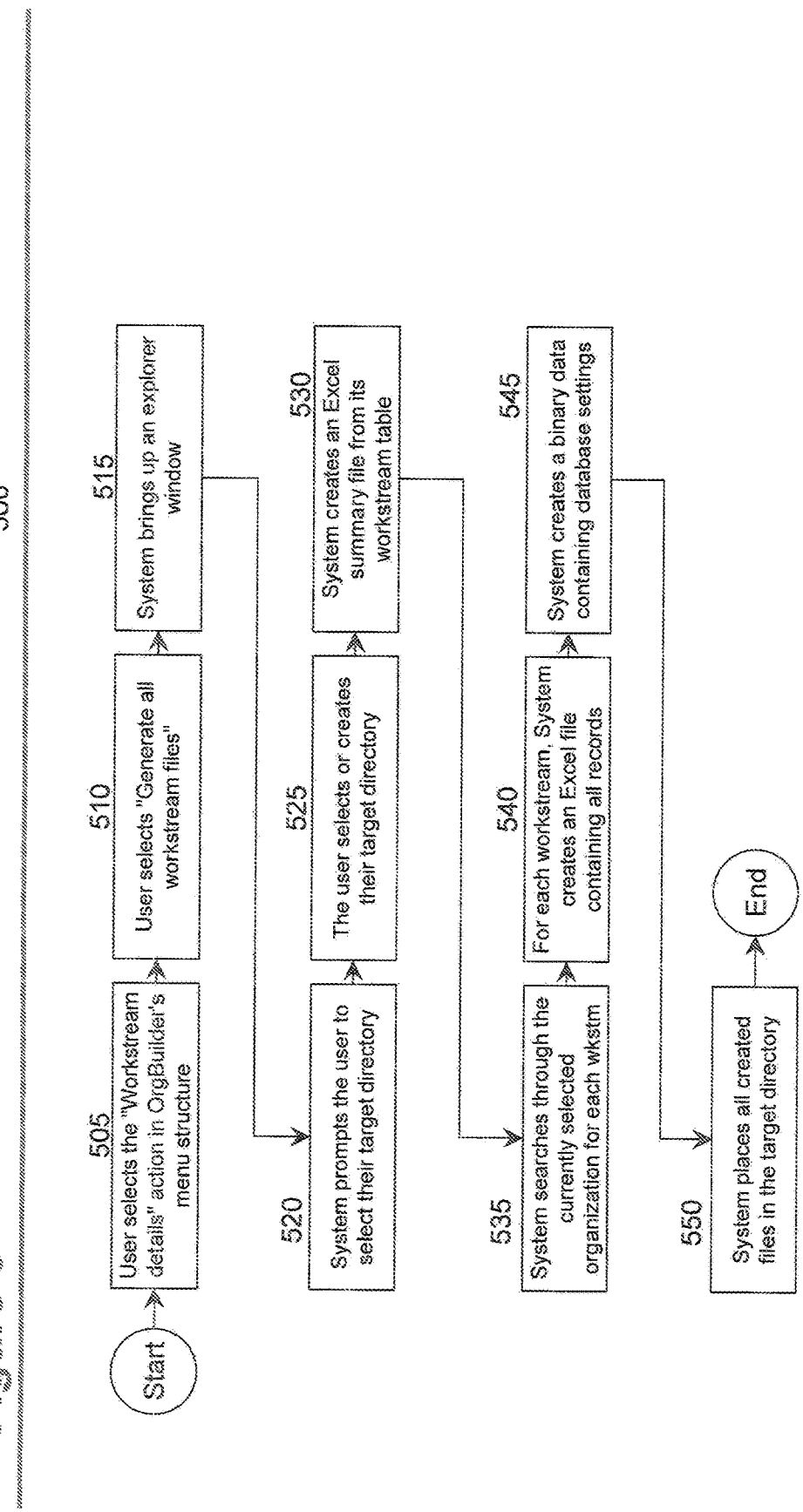
FIG. 6 is a workstream carve out process according to an embodiment of the invention.

FIG. 6 is a workstream carve out process 500 according to an embodiment of the invention. The system 110 may receive a user selection of a "workstream details" action 505 and a "generate all workstream files" action 510. In response, the system 110 may cause the GUI 3 to display an explorer window 515 and a prompt for a target directory selection 520. The user may select or create a target directory 525, and the system may create a summary report from the workstream table 530. As noted above, the workstream table may be stored in the database 24. The summary report may be, for example, a spreadsheet such as a Microsoft Excel spreadsheet which may contain a summary of the workstream. The system 110 may search through a currently selected organization for workstreams 535, and for each workstream found by the system 110, a report containing all workstream records may be generated 540. The report may be, for example, a spreadsheet such as a Microsoft Excel spreadsheet. The system 110 may create a file, such as a binary data, containing database settings 545. The system 110 may place all created files in the selected target directory 520, which may be a directory within the database 24.

Loading a Workstream into an Application Instance

Figure 7:
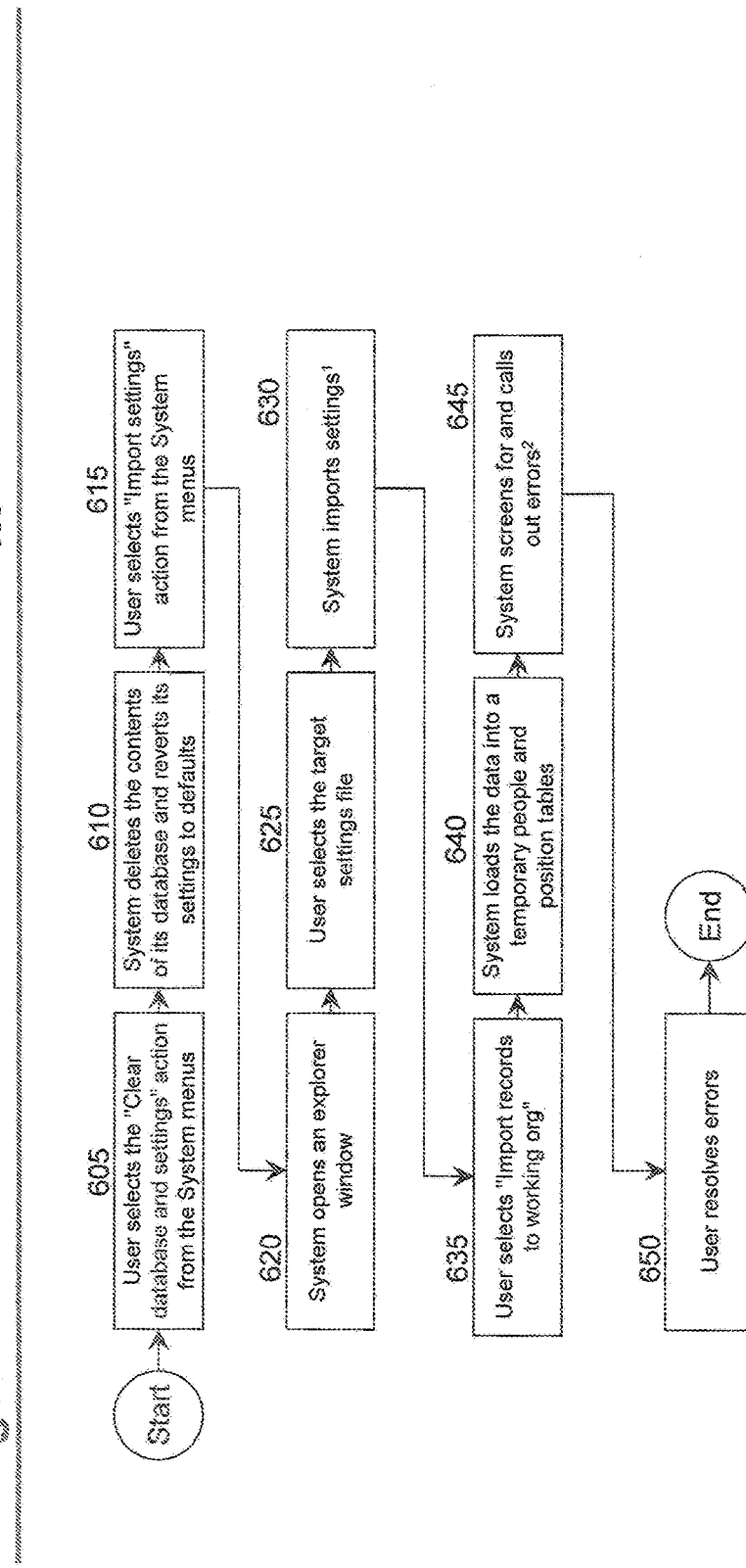
FIG. 7 is a workstream load process according to an embodiment of the invention.

FIG. 7 is a workstream load process 600 according to an embodiment of the invention. A user may select a "clear database and settings" option in the GUI 3, and the system 110 may receive this selection 605. The system 110 may delete contents of the database 24 and revert to default settings in response 610. The user may select an "import settings" option from the GUI 3, and the system 110 may receive this selection 615. In response, the system 110 may cause the GUI 3 to display an explorer window 620, and the user may select a target settings file 625 in the window. The system 110 may import settings from the target settings file 630. The settings may include a full list of fields, data types for each field, workstream details, custom calculation logic, pool information, and/or other information. The user may select an "import records to working organization" option from the GUI 3, and the system 110 may receive this selection 635. The system 110 may load the data from the records to be imported into a temporary table 640 in the database 24 and check for errors in the data 645. For example, the system 110 may check for unfound or undesignated supervisor IDs, circular hierarchy references, data/ field type errors, and/or other errors. The system 110 may present any errors that are found to the user through the GUI 3, and the system 110 may receive user corrections of the errors 650.

Transfers Between Workstreams

When the database is carved out into several mutually exclusive pieces, the need may arise to transfer some data from one workstream to another. For example, a team that creates training materials may need to move from the sales operations business unit to the human resources business unit as a result of the redesign effort. These requests to transfer records from one workstream to another may occur so frequently that it may be impractical to re-aggregate the database each time a transfer must be completed. So, the system 110 may employ several methods for transferring records between non-overlapping subsets of the database. FIG. 50 is a transfer process according to an embodiment of the invention, whereby records may be transferred out from one workstream to another. FIG. 51 is a receive process according to an embodiment of the invention, whereby records may be transferred in from one workstream to another.

Under the workstreams paradigm, the transfer functionality may rely on exporting and transmitting very small files (sometimes containing only one record) from one workstream to another. Under several operating paradigms described later, the process may be much more automated.

Exporting Data for Re-Integration

Figure 8:
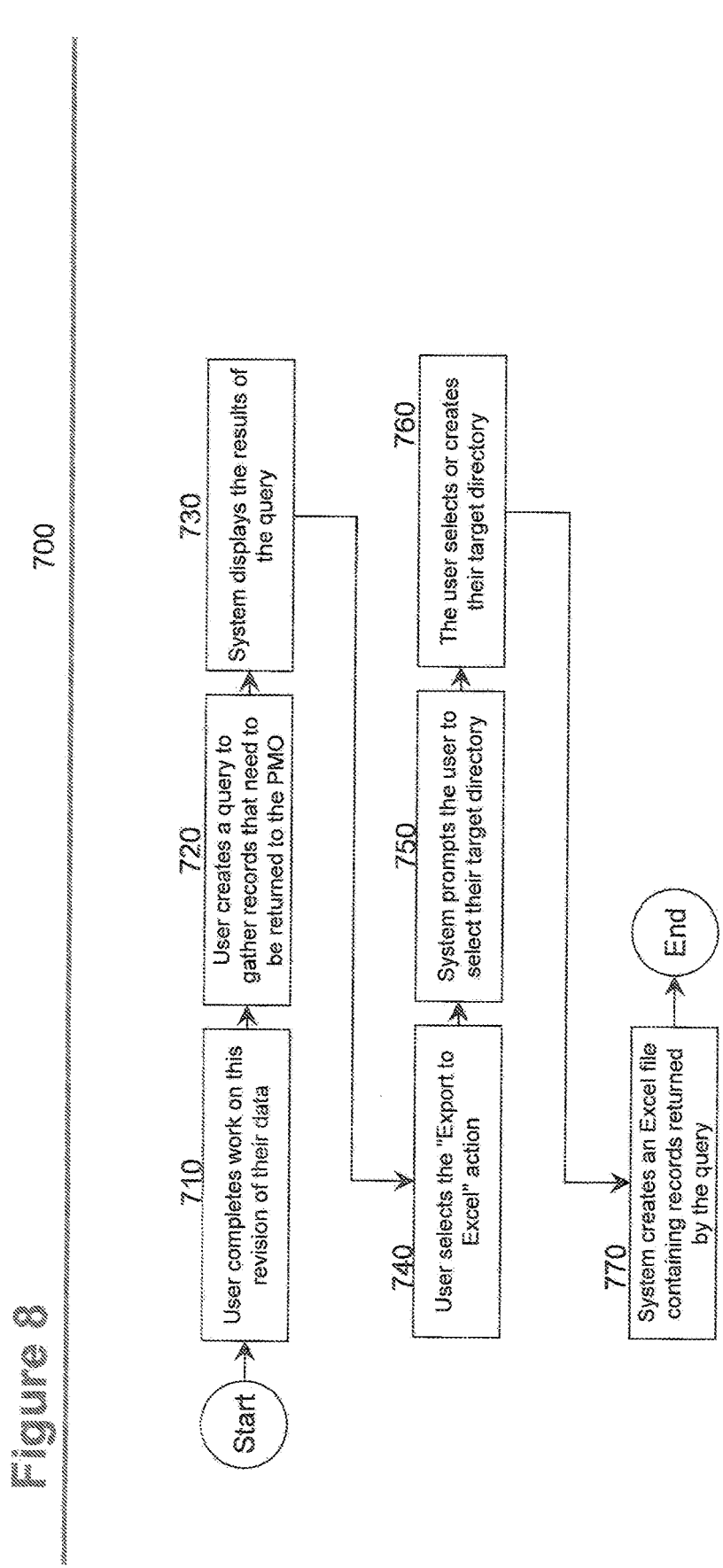
FIG. 8 is a workstream export process according to an embodiment of the invention.

FIG. 8 is a workstream export process 700 according to an embodiment of the invention. The user may revise workstream data 710 and create a query to gather records to be returned to the Project Management Office 720. The system 110 may receive the query request, perform the search, and display search results 730. The system 110 may also present an "export to Excel" option in the GUI 3, and the user may select this option 740. In this case, the system 110 may prompt the user to select a target directory 750 and receive the user selection or creation of the target directory 760. The system 110 may save the records returned by the query 770, for example as an Excel sheet in the selected target directory.

Rolling Up Workstream Data

Figure 9:
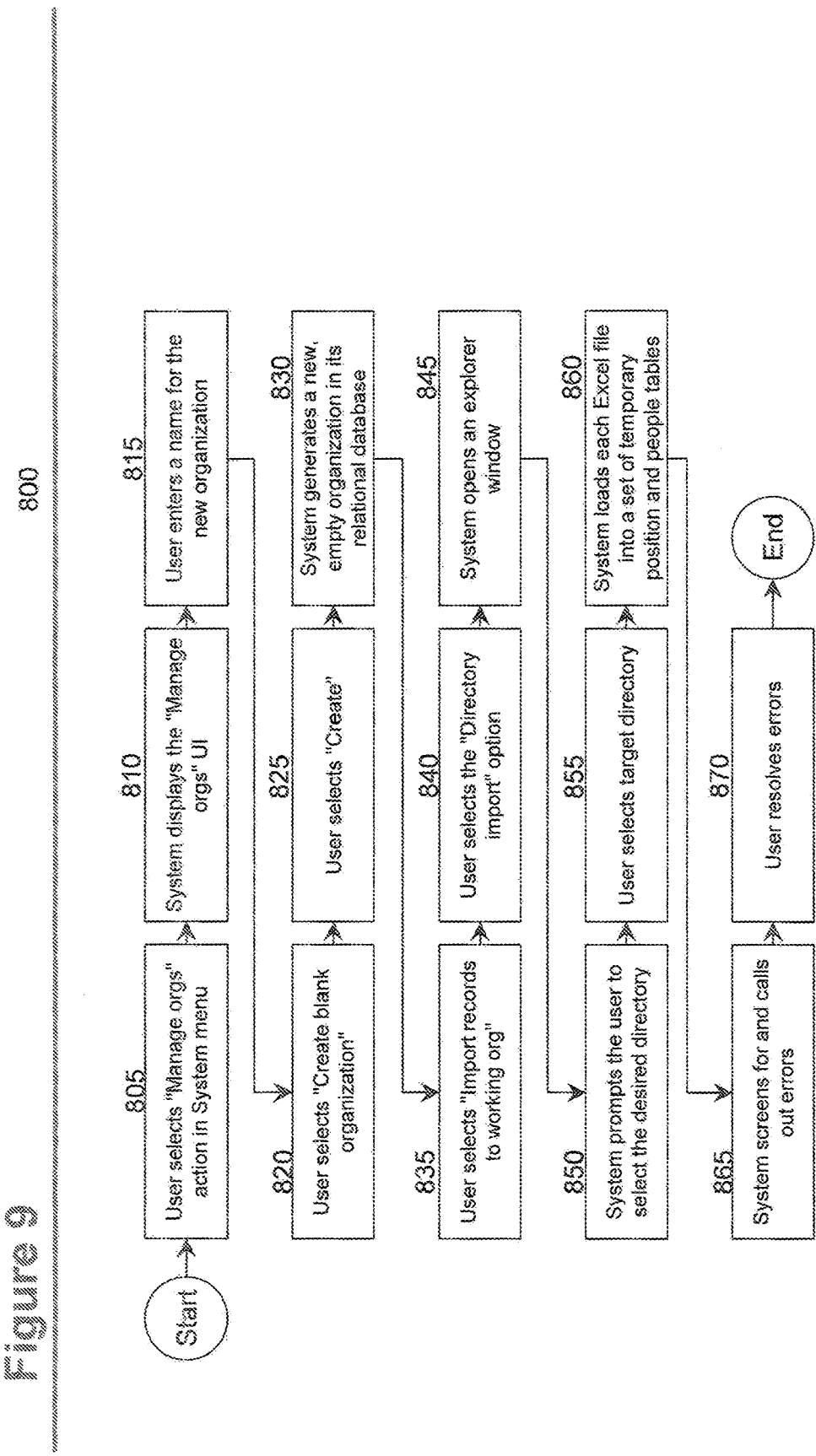
FIG. 9 is a workstream roll up process according to an embodiment of the invention.

FIG. 9 is a workstream roll up process 800 according to an embodiment of the invention. A user may select a "manage organizations" option in the GUI 3, and the system 110 may receive this selection 805. The system 110 may cause a manage organizations interface to be displayed in the GUI 3 in response 810. The user may enter a name for the new organization 815, select "create blank organization" 820, and initiate the creation process 825. The system 110 may receive these selections and generate a new empty organization 830. The new organization may be stored in the database 24. The user may choose to import records to the new organization 835 and select a directory import option 840. This may cause the system 110 to cause the GUI 3 to display an explorer window 845 and prompt the user to select a desired directory 850. The system 110 may receive the user selection of a target directory 855 and load files from the directory (e.g., Excel sheets created through one of the processes described above) into temporary storage 860, for example in the database 24. The system may check for errors and identify them 865, for example as described above, and the user may provide corrections to the errors 870.

Distributed Data Management

The workstreams functionality described above may utilize highly-trained users working together on a project. Those users may follow a strict set of rules to ensure data quality and facilitate various aspects of the organization design process. For example, users may employ a pre-defined nomenclature to indicate positions of various types (contractor, full-time, admin, relocation, etc.) to facilitate rapid tabulation of progress, and they may use a pre-defined set of queries to ensure consistent output from the report generator across workstreams. These highly trained users may be consultants specializing in organization design or HR professionals, for example.

In a cascade-type organization design process, the number of stakeholders may multiply as the process moves to the lower layers of the organization. For example, there may be 1 stakeholder—the CEO-designing layer 2. There may be 7 stakeholders—the remainder of the "C-suite" executives—designing layer 3. Each of those 7 executives may themselves have 5 direct reports, so 35 people may need to be consulted for the design of layer 4. And so on. As the number of stakeholders increases, the number of working sessions, reports, emails, etc. may increase. Under the workstreams paradigm, large teams of consultants may facilitate the organization design process, or individuals within the organization being designed can self facilitate.

In the embodiments discussed below, the system 110 may employ a distributed data management system. Compared to the workstreams paradigm, this approach may limit the actions available to a user in order to decrease the training and operating burdens for those users. The distributed system may allow a multitude of stakeholders to input their designs directly, without the aid of consultants. Thus, a small team of centralized resources or "PMO" may be able to achieve a desired process outcome.

Figure 11A:
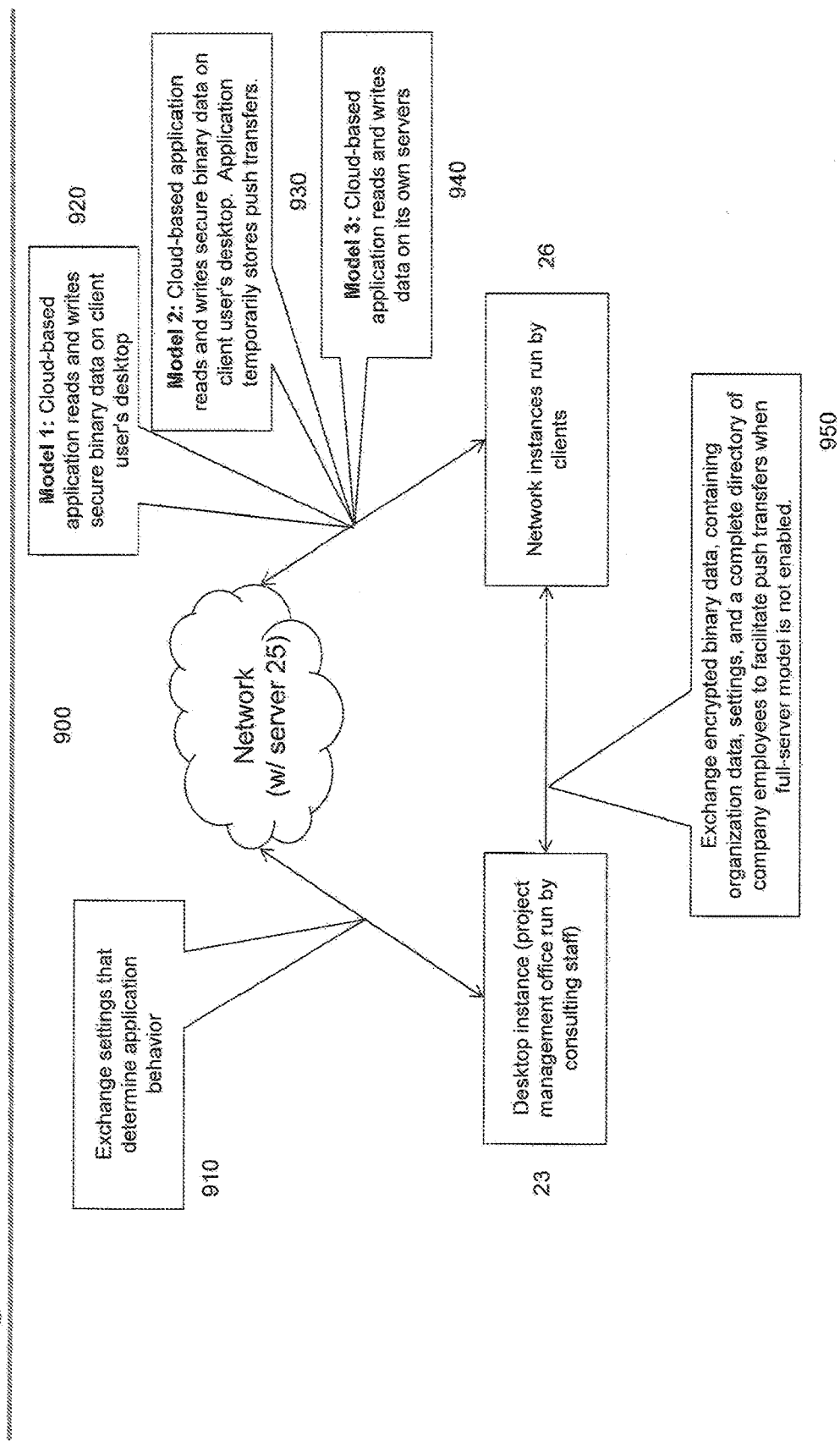
FIG. 11A is a network traffic flow according to an embodiment of the invention.

FIG. 11A is a network traffic flow 900 according to an embodiment of the invention. FIG. 11B is another view of the network traffic flow 900 including additional features such as data communication encryption. The system 110 may cause data to be exchanged via a network between desktop instances 23, such as those used by the PMO user, and network instances 26, such as those used by remote users. For example, a server 25 may exchange data with the desktop instance 23 which may include settings that may determine application behavior 910. The server 25 may also exchange data with the remote instance 26.

FIG. 11A describes three related, but separate operating modes employed by the system 110 which may provide varied approaches towards storing data in the cloud. For example, in Model 1 (920), the sensitive organization data may be temporarily stored on the server for the duration of a design session. Once the user downloads a file containing their progress, the data may be deleted from the server. Only small portions of the sensitive data may be temporarily stored on the server at any time. Thus, Model 1 may appeal to clients with data security concerns. Model 1 is also called "file-based client groups" because it employs the client groups paradigm but depends on the transfer of files between the project management office and users, in this embodiment.

Clients who are more concerned with application performance may choose Model 3 (940), in which the organization data is stored on the server for the duration of the design exercise. Model 3 is also called "cloud-based client groups" because all the data is loaded by the project management office to a central server ("the cloud"). Because the complete data is stored on the server, desirable performance outcomes may be possible. For example, transfers of record ownership can happen in real time, users may request records from other areas of the database, the project management office may intervene in the design process, and progress can be assessed in real-time with an extensive set of dashboards. Model 2 (930) may represent a middle-point between the first and third models: such as Model 1, a complete organizational database is not stored on the server. And, like Model 3, the transfer of records between organizational subsets is facilitated by storing transferring records on the server. Model 2 is also referred to as "file-based client groups with server support for transfers."

In summary, from an application architecture standpoint, Models 1 & 2 may employ substantively the same server architecture, described in FIG. 1C for example. The overarching principle may be that the data for each subset of the organization may be separately and temporarily stored on the server. At the end of each working session, the data may be cleared from the server's memory in order to minimize the risk of attack. Model 2 differs from Model 1, in that there is a separate organization database for the temporary storage of transferring records (FIG. 1C, 36). The third server model employs its own distinct architecture. It may include one organizational database that may function as the single source of truth, allowing users to view the most up-to-date version of the organization as the design effort progress (FIG. 1D, 49). Users can edit the data by first copying a subset for which they have been granted editing privileges into their "sandbox," which may be a temporary data store used to save their progress as they edit, in a process known as checking out the data. Once they complete editing their data, they can check their data back in. On check in, the system 110 may run the data through a rigorous set of tests before finally replacing the data that was checked out with the newly checked-in data in the central database. The third server model may employ more elaborate strategies for managing users and permissions at an individual position or field level, hence the additional tables containing information on user profiles and profile groups.

For example, a cloud based application may be used to read and/or write secure binary data on a client user's computer 920, a cloud based application may be used to read and/or write secure binary data on a client user's computer and temporarily store push transfers 930, and/or a cloud based application may read and write data on its own servers 940. In some cases, data may be stored in server 25 memory and later cleared at the end of a session, for example when the cloud based application is used to read and/or write secure binary data on a client user's computer 920. Also, the desktop instances 23 and remote instances 26 may exchange data with one another. For example, these devices may exchange encrypted binary data containing, for example, organization data, settings, and/or directories of employees to facilitate transfers 950. The desktop instances 23 and remote instances 25 may exchange data when the system 110 is operating in a mode wherein the cloud based application may not read and write data on its own servers. Modes wherein the cloud based application may be used to read and/or write secure binary data on a client user's computer 920 and/or wherein a cloud based application may be used to read and/or write secure binary data on a client user's computer and temporarily store push transfers 930 may provide situations wherein the desktop instances 23 and remote instances 25 may exchange data. Any or all of the communications described above may be encrypted with HTTPS and/or some other encryption technology.

Client Groups

Much like workstreams, client group functionality may be used to generate non-overlapping subsets of data and distribute the subsets for simultaneous editing by consultants, clients, and/or designers. For example, in a top-down organization design exercise, many client groups are created along the lines of business units, encompassing all records from a C-suite executive down to "frontline" employees (e.g. retail store clerks). In a cascade process, each client group may contain only a few layers, representing a manager, their direct reports, and their directs' reports. Because in the cascade process client groups are created for each designing manager, many more client groups may be created.

The client group may not only encompass records that report up to the manager at the time records are allocated, also known as records that are "in the org." It can also include records from any pool in the org database, with full hierarchy and matrix information, etc. In other words, it may be a subset of the organizational database whose structure can mirror the complete database.

However, the project management office may alter permissions to limit the actions available to the user of a client group. For example, an organization design project may be divided into phases. In one phase, managers may design the organization—matching the number and type of positions to their anticipated mix of work. During that phase, specific staffing choices may not be allowed: A user could remove a "Financial Analyst 1" position from the designed organization. In so doing, they may only be indicating that they need one less financial analyst, not that John Smith, who currently occupies the specific financial analyst position that the user has removed, is going to be exited. So, during this design phase, the PMO may hide the pools used to exit employees, instead offering a pool that indicates the employees attached to removed positions are "Awaiting Staffing." Different staffing pools can also be used to filter and/or identify individuals for placement to open roles. This ability to determine what specific users can and cannot do may make client groups less independently powerful, but more accessible, than workstreams in this sense.

In the file-based client groups paradigm (encompassing models 1 and 2), a user may be able to edit a single, non-overlapping subset of data if they have the binary data file and the encryption key for said file. The desktop tool, which may create and distribute the binary files and encryption keys may implicitly acknowledge only one "owner" for each subset. (However, in some embodiments a user could edit their data, save a new version of the binary file from the application, and pass the new file, which utilizes the same encryption key, to another user.)

In the cloud-based client groups paradigm, detailed in later sections, multiple users may have access to the same client group/subset, either at the same time or not at the same time. That functionality may facilitate cross-functional collaboration. For example, a business unit owner may design their organization; then, a compensation and benefits specialist could provide compensation and pay-grade detail for each position that the business unit owner added. A legal specialist could then review any staffing decisions for adverse impact.

Server Models 1 & 2: File-Based Client Groups

Server Models 1 & 2 may be regarded as examples of the file-based client groups paradigm. As mentioned earlier, they may divide the database into non-overlapping subsets, distribute those subsets for editing, and aggregate the subsets back into a complete database when the editing tasks are complete. They may allow multiple users to work on different parts of the organization simultaneously. They may employ substantively the same server architecture, and in some embodiments, may be created and managed the same way. For example, a web-based tool may be utilized to edit each subset, or some systems may allow for a hybrid desktop/web application. Server Model 2 may employ digital facilities to temporarily store data as records are passed from one client group to the other.

Creating File-Based Client Groups and Assigning Records

Figure 12A:
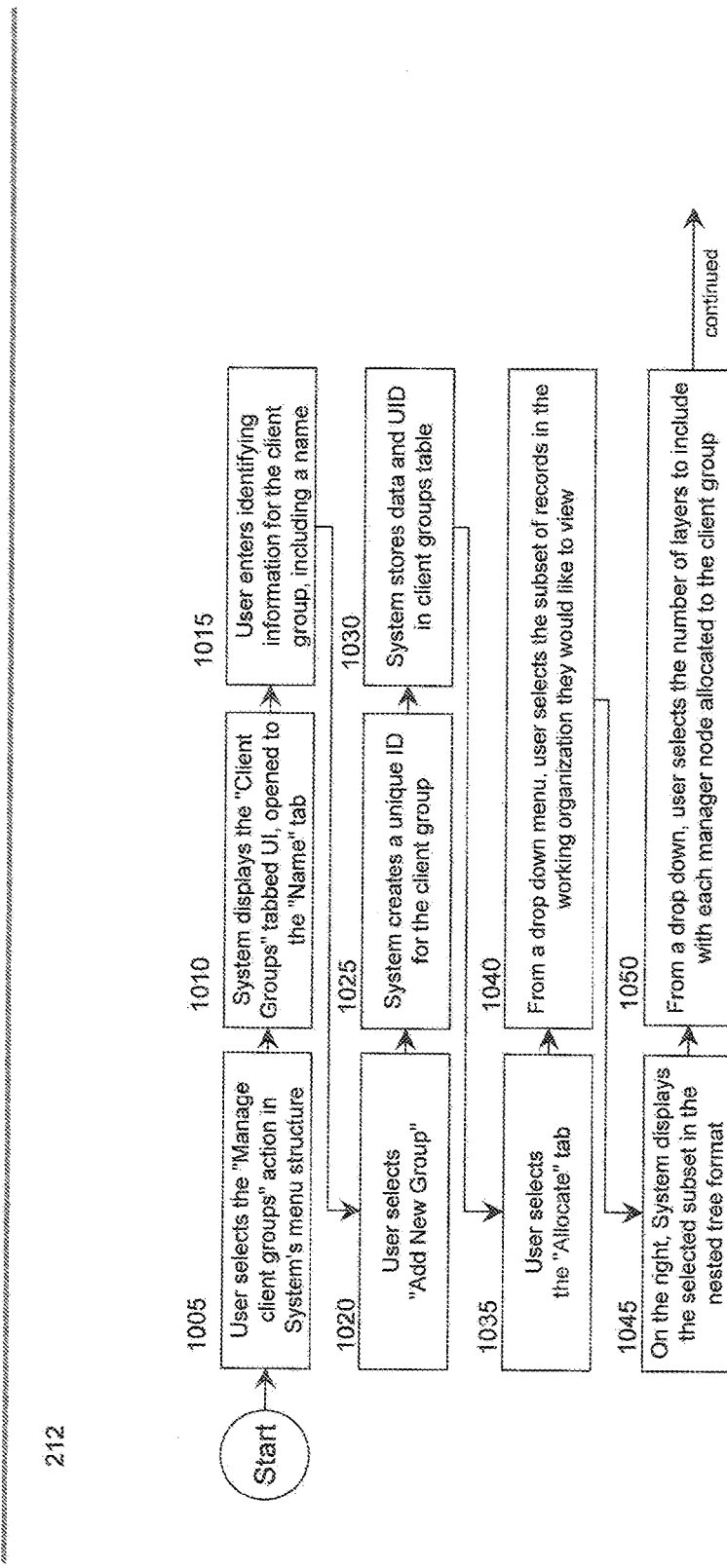
FIG. 12A is a client group assignment process according to an embodiment of the invention.
Figure 12B:
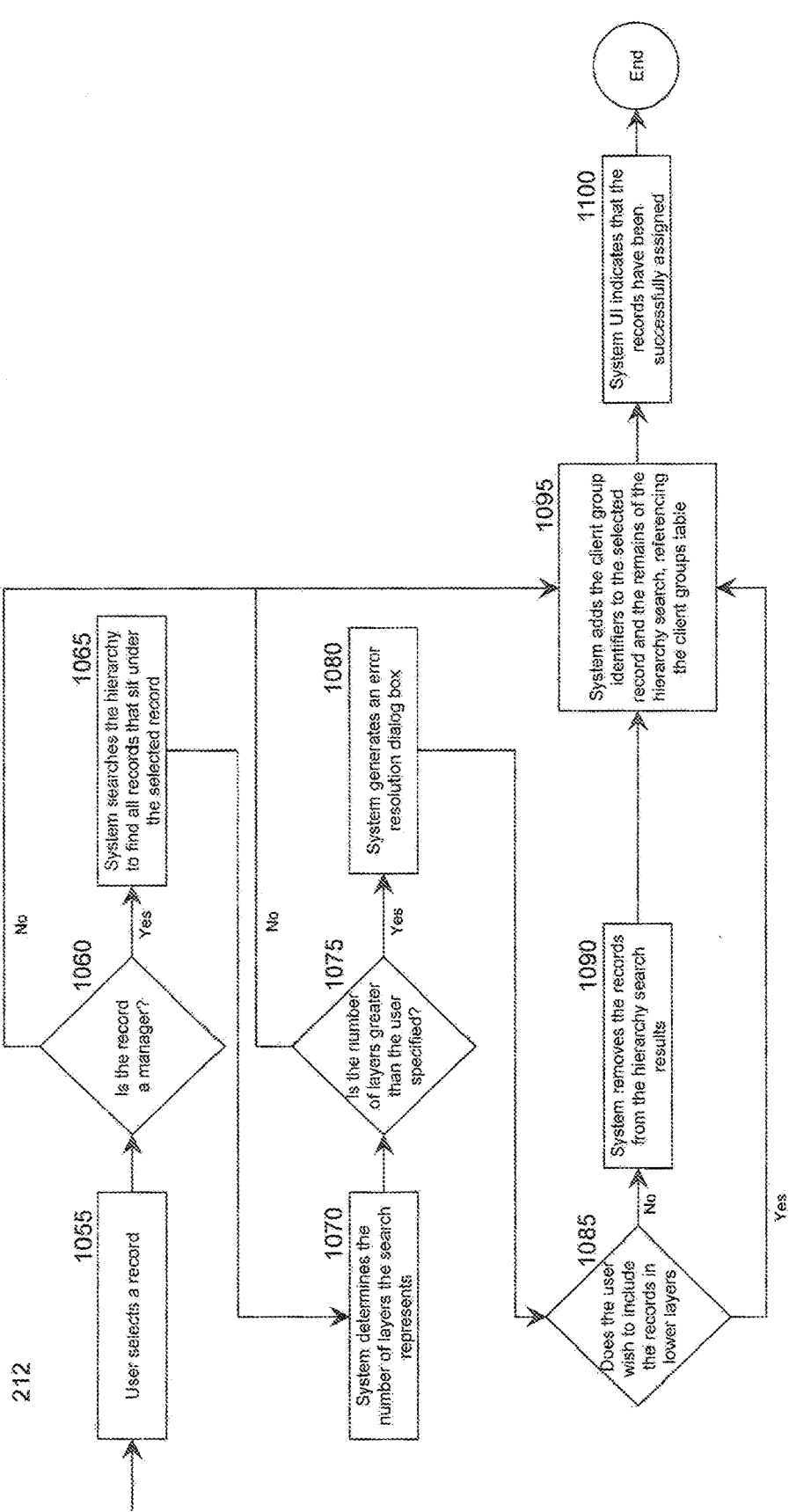
FIG. 12B is a client group assignment process according to an embodiment of the invention.

FIGS. 12A-12B show a client group assignment process 212 according to an embodiment of the invention. A client management process 210 may include assigning data to client groups. In 1005, the system 110 may receive a user selection of a "manage client groups" option or the like in a UI. In 1010, the system 110 may display a client groups interface in response to the user selection in 1005. In 1015, the system 110 may receive user input of identifying information for a client group, which may include a name for the group, for example. In 1020, the system 110 may receive a user request to add the new group which has been named in 1015. In 1025, the system 110 may create a unique ID for the new group, and in 1030 the system 110 may store the identified group in a database 24, for example by storing group data and the unique ID in a client groups table.

Figure 56:
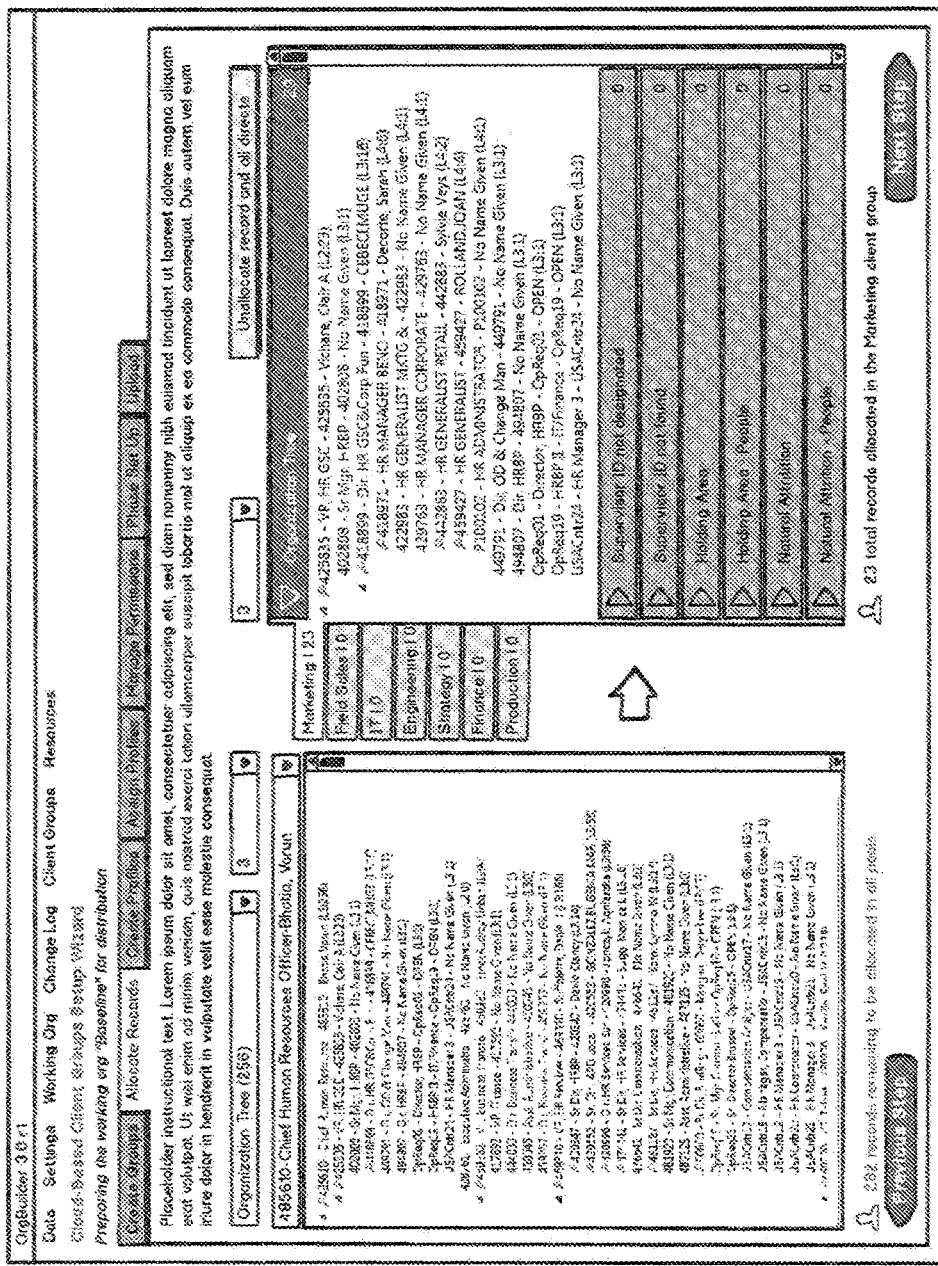

In 1035, the system 110 may receive an "allocate" selection from the user and display a menu of records in response. In 1040, the system 110 may receive user selection of one or more records from the menu for display, and in 1045 the system 110 may display the selected records. In 1050, the system 110 may receive a user selection of a number of layers to include with each manager node allocated to the client group. For example, a manager may supervise five layers of employees (e.g., a hierarchy with five levels may exist under the manger). The user may only be interested in the two highest layers under the manager and may indicate this via the selection in 1050. FIG. 56 is an example records allocation UI.

In 1055, the system 110 may receive a user selection of a record. In 1060, the system 110 may determine whether the selected record is a manager record. If the record is not a manager record, in 1095 the system 110 may add the client group identifiers to the selected record, for example by referencing a client groups table in the database 24. If the record is a manager record, in 1065 the system 100 may search the database 24 to find records of employees under the manager. For example, the database 24 may include hierarchy information for each employee which may define employee relationships and indicate which employees answer to the selected manager.

Figure 57:
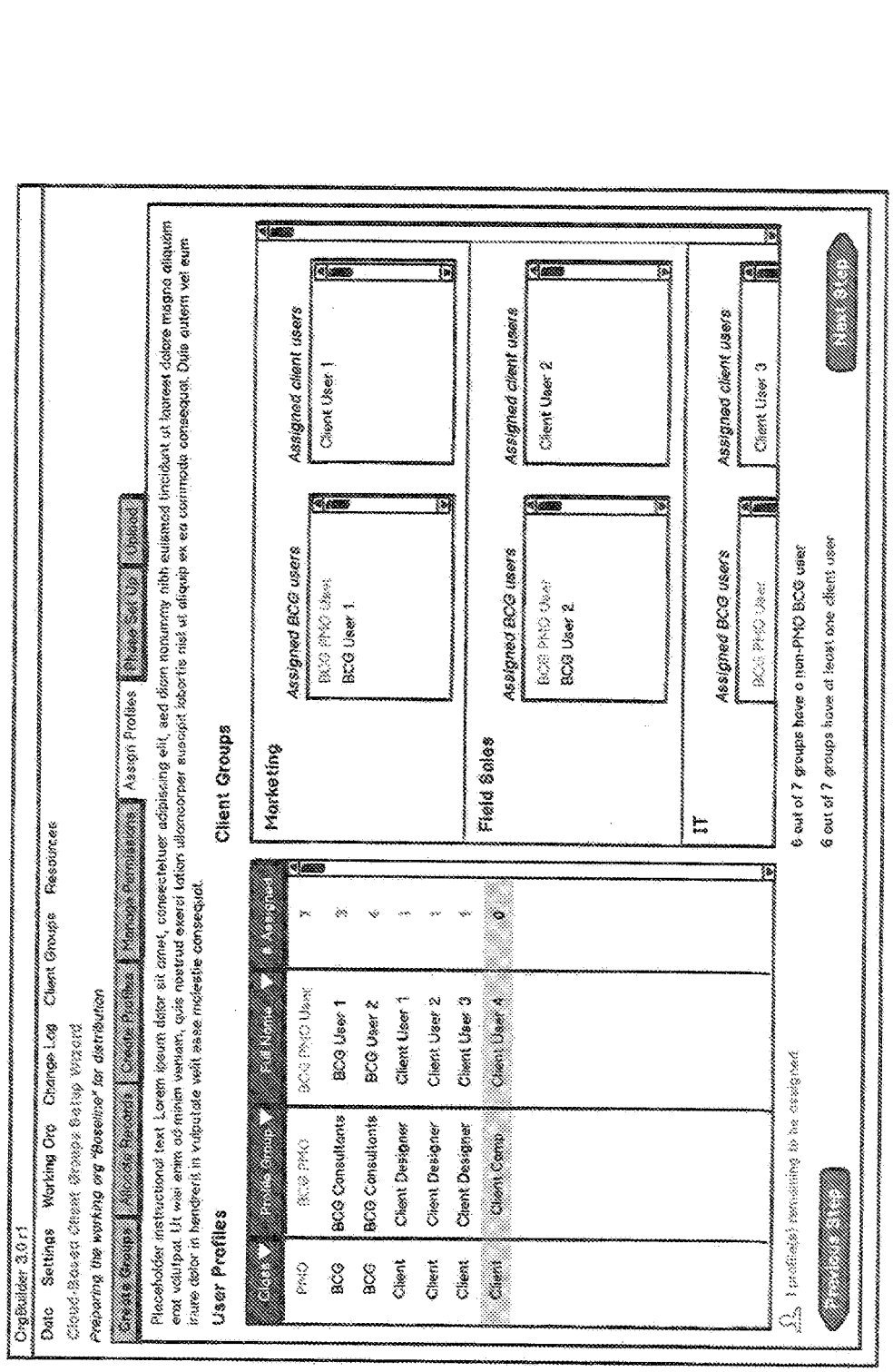

In 1070, the system 110 may determine a number of layers represented by the search results and, in 1075, determine whether the number of layers is greater than the user specified number from 1050. If the number of layers is less than or equal to the user specified number, in 1095 the system 110 may add the client group identifiers to the selected record and the results of the hierarchy search, for example by referencing a client groups table in the database 24. If the number of layers is greater (e.g., five, when the user selected two), in 1080 the system 110 may generate an error resolution dialog box and present it to the user. In 1085, the system 110 may receive a user selection of whether the user would like to include the records in the unselected layers. If not, in 1090 the system 110 may remove the undesired records from the hierarchy search results. After removal, or if the user decides to keep all records, in 1095 the system 110 may add the client group identifiers to the selected record and the results of the hierarchy search that have not been removed, for example by referencing a client groups table in the database 24. In 1100, the system may inform the user that the records have been successfully assigned. FIG. 57 is an example assignment UI.

Setting Up Permissions for Client Groups and Phases

Figure 13:
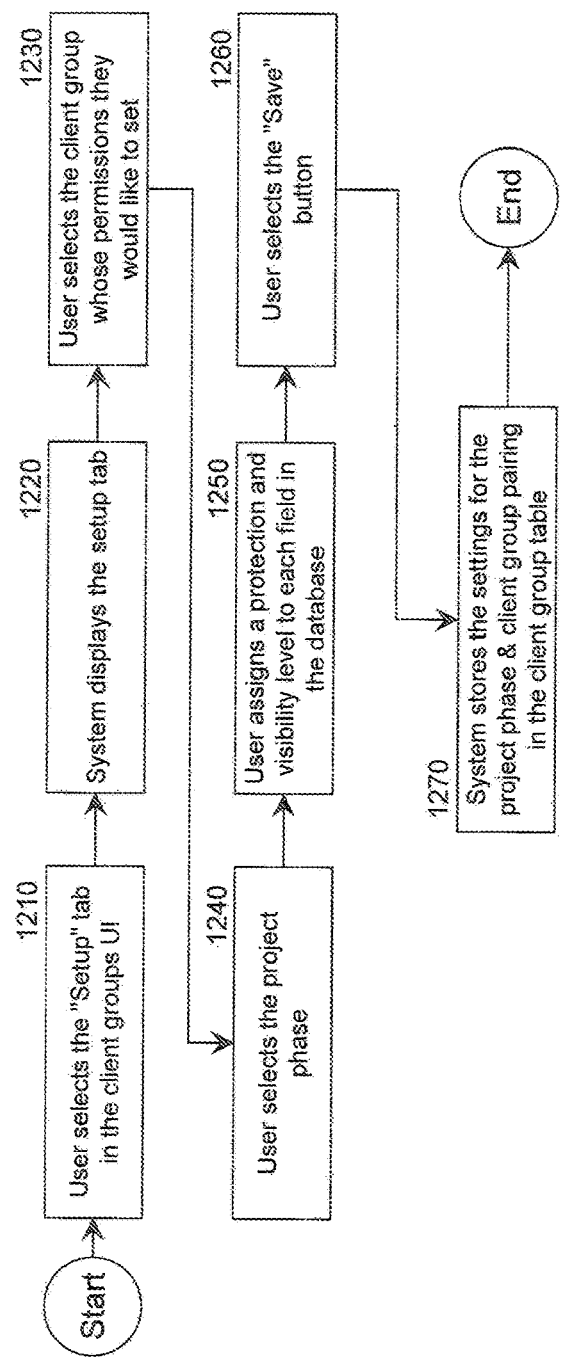
FIG. 13 is a permission setting process according to an embodiment of the invention.

FIG. 13 is a permission setting process 214 according to an embodiment of the invention. In 1210, the system 110 may receive a user selection of a "setup" tab or the like in a UI. In 1220, the system 110 may display a setup tab or menu in response. In 1230, the system 110 may receive a user selection of a client group for which permissions may be set, and in 1240 the system may receive a user selection of a project phase associated with the client group. A "project phase" may be a period of time in the organizational design process defined by a common goal. For example, "Baseline Validation," for which the goal may be to generate an accurate picture of the organization compiled from multiple sources (e.g., HRIS and financial reporting systems). The interface may facilitate changes in permissions as the project changes phases In 1250, the system 110 may receive a user selection of a protection and visibility level for each field in the client group Other embodiments of the invention, for example, the cloud-based client groups embodiments may present the user with the ability to set additional permissions, such as which pools are associated with each action. Thus, the user may be able to specify permissions for subsets of a group and/or a whole group. In 1260, the system 110 may receive a request to save the settings, and in 1270 the system 110 may store the settings for the project phase and client group in the database 24, for example in a client group table.

Creating Instructional Materials

Figure 14:
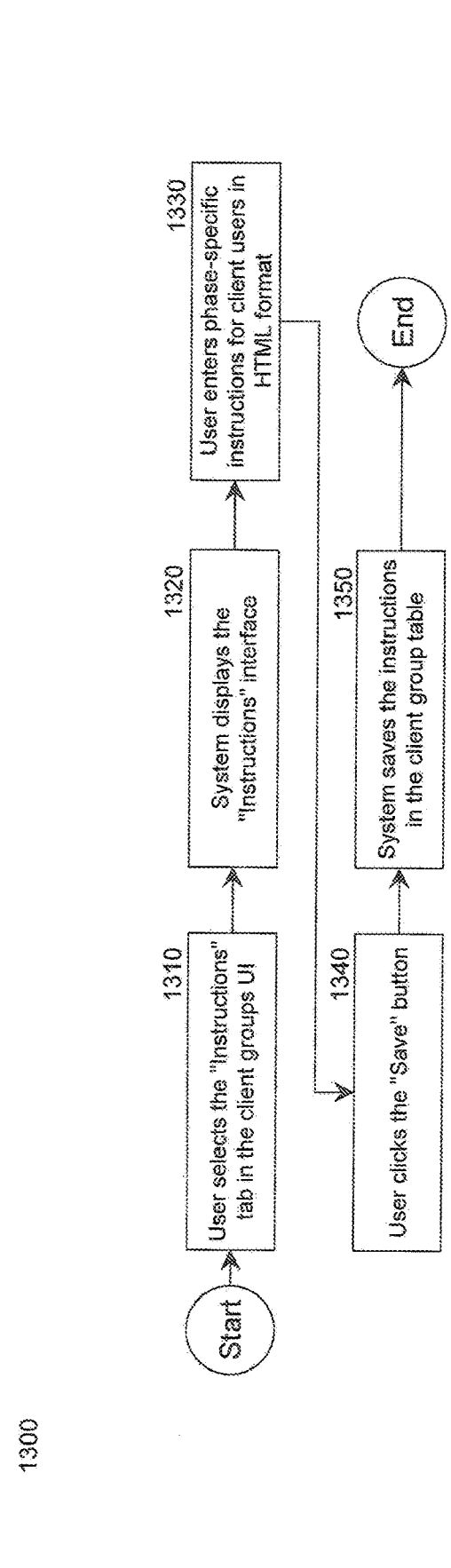
FIG. 14 is an instruction writing process according to an embodiment of the invention.

FIG. 14 is an instruction writing process 1300 according to an embodiment of the invention. In 1310, the system 110 may receive a user selection of an "instructions" tab or the like in a UI. In 1320, the system 110 may display an instructions interface in response. In 1330, the system 110 may receive phase-specific instructions from the user for other users. For example, these instructions may be in the form of HTML code or some other programming language. In 1340, the system 110 may receive a request to save the instructions, and in 1350 the system 110 may store the instructions in the database 24, for example in a client group table.

Distributing Client Group Data Files

FIG. 15 is a client group preparation process 1400 according to an embodiment of the invention. In 1405, the system 110 may receive a user selection of a "distribute" tab or the like and may display a distribute interface in response. In 1410, the system 110 may receive a user selection of a client group. In 1415, the system 110 may determine whether permissions have been set for the client group that has been selected. If they have not, in 1420 the system 110 may present an error message to the user to indicate that permissions must be set. If they have, in 1425 the system 110 may prompt the user to enter a due date for the selected client group, and in 1430 the system 110 may prompt the user to enter a password for the client group's binary data. In another example, the system 110 may automatically generate encryption keys for each client group's binary data. In 1435, the system 110 may store the entered date and password, for example in a client group table. In 1440, the system 110 may determine whether full server support will be used. If full server support is not to be used, in 1445 the system 110 may present an "export" button or interface to the user. In 1450, the system 110 may receive user selection of the export button, and in 1445 the system 110 may generate a secure, encrypted binary data containing the records assigned to the client group and visibility and permissions settings in response. In 1460, the system may open two emails which may be pre-addressed to the client group's lead. One email may contain the password, and the other email may contain the binary data. If full server support is to be used, in 1465 the system 110 may present an "email" button or interface to the user and, in 1470, the system 110 may open an email which may be pre-addressed to the client group's lead and may contain a password. In 1475, the system 100 may generate a binary data file which may be stored on the server 1 and may be accessible using the password.

Desktop Application Behavior and Aggregating Client Groups

Figure 10:
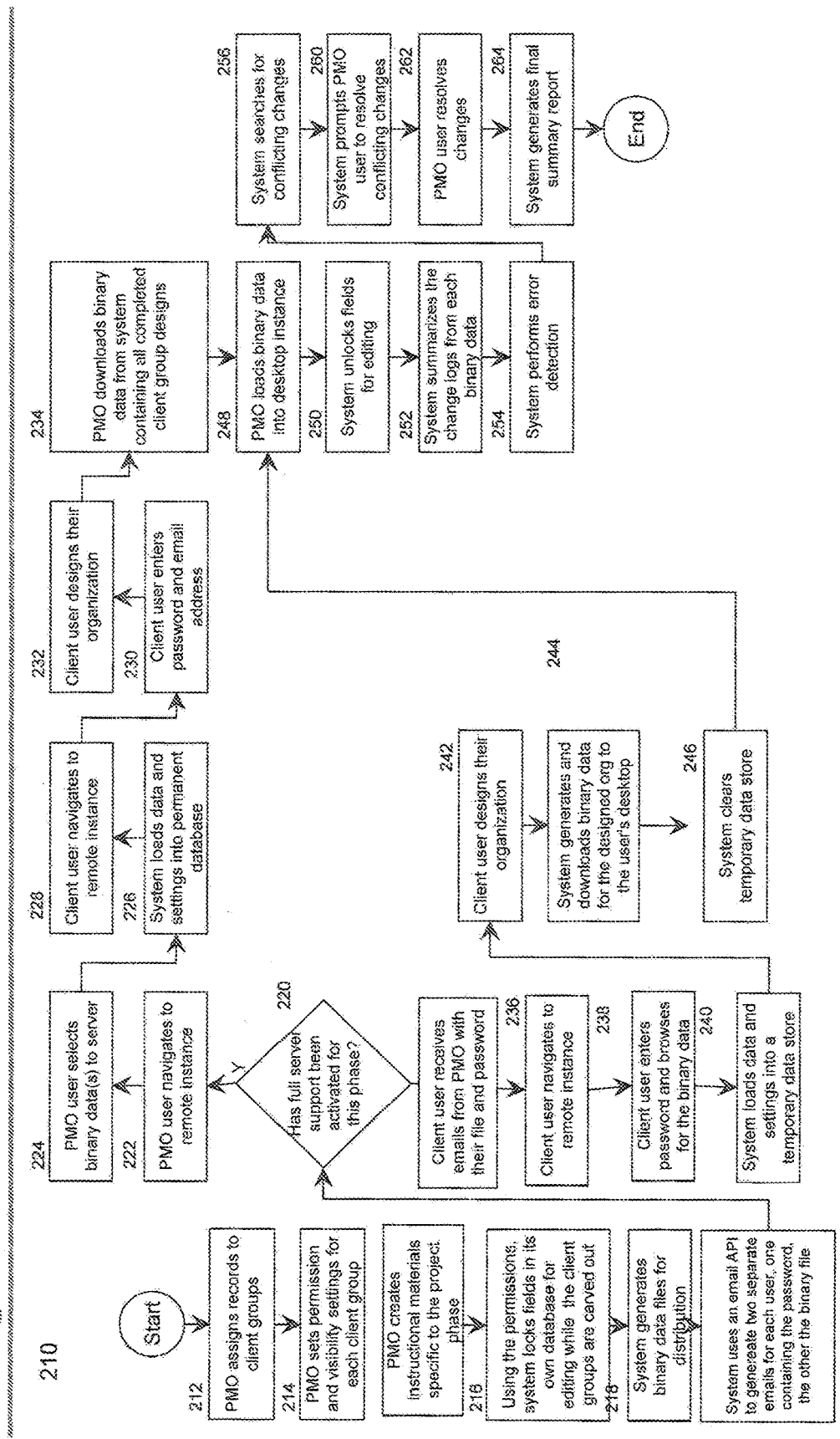
FIG. 10 is a client management process according to an embodiment of the invention.

FIG. 10 is a client management process 210 according to an embodiment of the invention. This process 210 may be an overall process for creating and distributing client groups. In 212, the system 110 may receive user assignments of records, wherein a user such as an administrator may designate data records to be added to client groups. In 214, the system 110 may receive permission and visibility settings for each client group from the user. For example, these settings may define other users who may edit and/or view the client groups. In 216, the system 110 may use the permissions to lock fields and/or records in the database 24 from editing while client groups are distributed. This may prevent records associated with a client group from being changed by the PMO while the same records are being edited by a client user, which may require complex "collision detection" to address and resolve conflicting instructions. The permissions may enable or disable user access, editing, and/or edit functions. Permissions may vary based on user type (e.g., admin, client, or PMO) and/or among individual users. In 218, the system 110 may generate the client groups, which may be binary data, for example.

When the groups have been created, in 220 the system 110 may determine whether full server support has been activated. If so, in 222 the system 110 may receive a command from a PMO user to navigate to a remote instance 26. In 224, the system 110 may receive a selection of binary data from the user. In 226, the system may load data and settings from the binary data into a database. At this point, the data may be available for a remote user, provided that the remote user has permission to view and/or edit this data. In 228, the system 110 may receive a command from a remote user to navigate to a remote instance 26. In 230, the system 110 may receive identification data, such as a password and username or email address, and verify permission of the user and provide access to the user. In 232, the system 110 may receive input from the user regarding organizational design choices related to the data in the client group. These choices may be saved in the binary data In 234, the PMO may receive the binary data including the choices from the system 110.

In some embodiments, the process 210 may not check whether full support has been activated in 220. Instead, the system 110 may proceed automatically as follows, because access to full support modes (server model 3, for example) may be provided via a different access method, examples of which are described below.

If full server support has not been activated, or if the check is not performed, in 236 the system 110 may receive a command from a remote user to navigate to a remote instance 26. In 238, the system 110 may receive identification data, such as a password and username or email address, and verify permission of the user and provide access to the user. In 240, the system 110 may load the data and settings from the binary data into a temporary data store. In 242, the system 110 may receive input from the user regarding organizational design choices related to the data in the client group. In 244, these choices may be saved in a new binary data, which may be sent to the PMO. In 246, the system 110 may clear the temporary data store.

After the PMO receives the binary data, in 248 the system 110 may load the binary data into the PMO's desktop instance 23. In 250, the system 110 may unlock the previously locked fields for editing. In 252, the system 110 may generate a summary of change logs for the binary data. In 254, the system 110 may perform error detection for the binary data. In 256, the system 110 may search for conflicting changes made to the binary data, for example by multiple users or in separate user sessions. In 260, if any conflicts are identified, the system 110 may prompt the PMO user to resolve the conflicts. In 262, the system 110 may receive the PMO's requested resolutions to the conflicts and implement these resolutions. In 264, the system 110 may generate a summary report of the client groups.

In Model #3 of FIG. 77, all desktop functionality to manage users, groups, permissions and/or pools may be applied to the server without the need to use desktop applications.

Model 1: Transferring Records Between Client Groups without Server Support

Figure 16A:
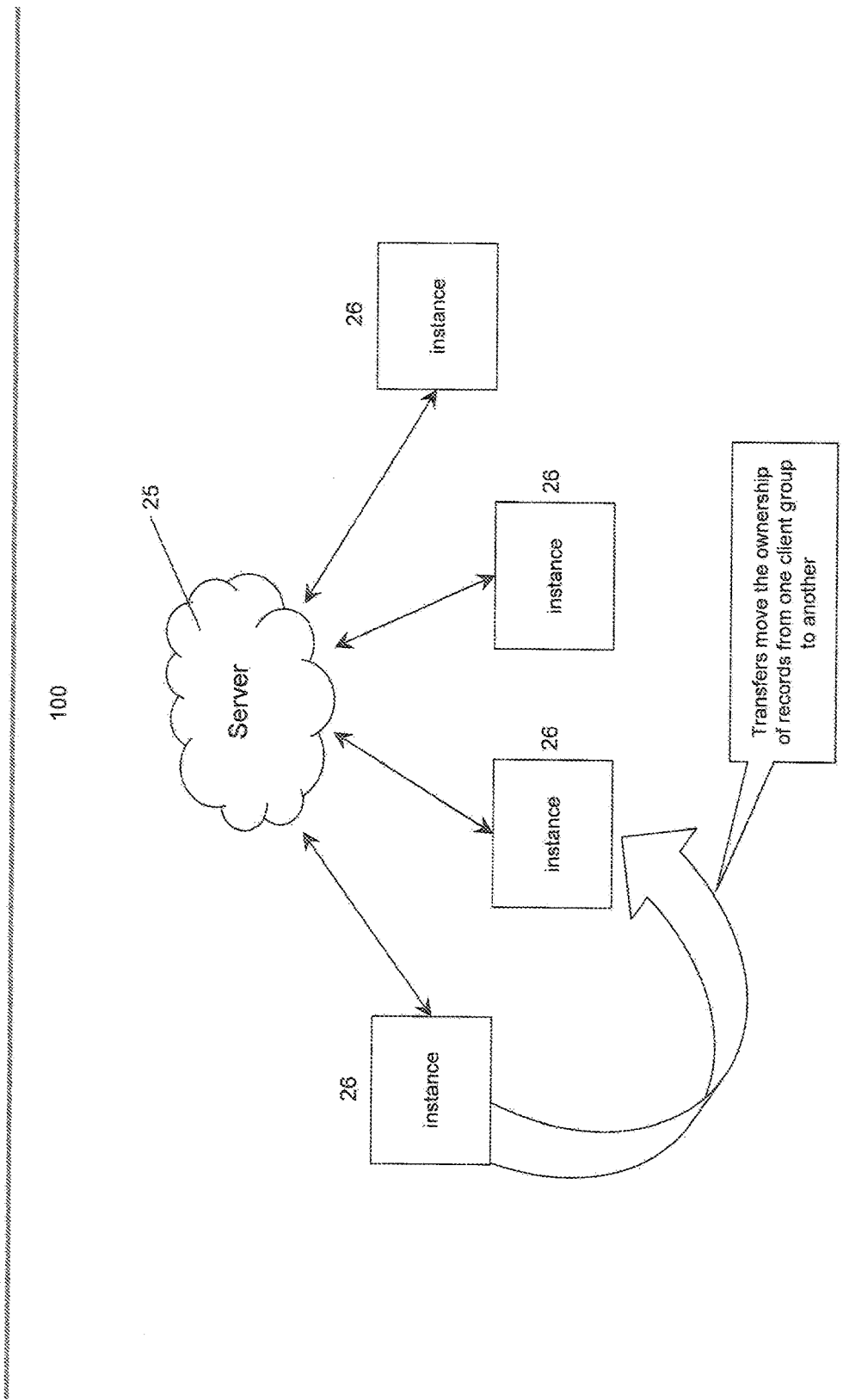
FIG. 16A is a computer network according to an embodiment of the invention.

FIG. 16A is a computer network 100 according to an embodiment of the invention. As shown in this figure, data transfers between instances (here, remote instances 26, for example) may move the ownership of records from one client group to another. As noted above, data may be carved into mutually exclusive groups. However, in many cases records may be transferred from one instance of the system 110 to another. For example, client employee Jim may take an internal job posting which moves him from accounting to HR. If HR and accounting are monitored by different organizational design consultant users, the consultants may need to transfer the record in order for the organization design to continue. Transfers may be equally applicable to workstreams and client groups, but the examples below are presented in the context of client groups. Various server support models may be employed for the system 100, and the different support models may employ different transfer options and rules.

FIGS. 18A-18B show a transfer process 1600 according to an embodiment of the invention. In 1602, the system 110 may receive a user selection of a record to be transferred, and in 1604 the system 110 may receive a user request to transfer the selected record. In 1606, the system 110 may check to see whether the record is a manager record. If the record is a manger record, in 1608 the system 110 may determine which positions sit beneath the manager, for example by searching hierarchy data in the database 24. In 1610, the system 110 may prompt the user to determine actions for direct reports. For example, three options may be available in some embodiments. In 1612, the system 110 may receive a user request to move positions to a temporary pool, and in 1614 the system 110 may change the pool fields for the records under the manager to reflect the new move to the temporary pool. In 1616, the system may receive a user request to roll employees up to the selected record's supervisor, and in 1618 the system may change the supervisor ID for any employees that report directly to the record to the record's manager. In 1620, the system 110 may receive a user selection to move the lower positions with the selected record. After any of the above selections are made, or in the case that the selected record is not a manager, in 1622 the system 110 may display a company directory and may prompt the user to search for a target manager.

At this point, the process may proceed differently depending on whether server (model 1 or server model 2 is utilized. In the case of model 1, in 1624 the system 110 may check to determine whether the target manager is known. If so, in 1626 the system 110 may add the target supervisor ID to the selected record. After adding the ID, or if the target manager was not known, in 1628 the system 110 may create "to" and "from" flags which may indicated starting and ending client groups for the selected record. If records still sit under the selected record after 1610-1620, these records may also be given "to" and "from" flags. In 1630, the system 110 may change the pool fields for all records to be transferred to a "transfer pool" setting. In 1632, the system 110 may receive an indication that the user has finished using the transfer UI. In 1634, the system 110 may receive an indication that the user has finished designing the organization. In 1636, the system 110 may receive a request from the user to create binary data for submission to an administrative user such as a PMO. The system 110 may create the binary data, and in 1638 the system 110 may send the created binary data to the PMO. In 1640, the system 110 may load the binary data into the PMO's desktop instance 25. In 1642, the system 110 may check the files for errors. In 1644, the system 110 may identify top node managers and individual contributors in the transfer pool. In 1646, for each top node manager identified, the system 110 may prompt the user to accept or reject the transfer. If the user rejects the transfer, in 1664 the system 110 may move the record to a rejected transfer pool. If the user accepts the transfer, in 1648 the system 110 may determine whether the target manager is known. If not, in 1650 the system 110 may prompt the user to select a manager, and in 1652 the system 110 may receive the user selection of the manager. If the manager is known, in 1654 the system 110 may prompt the user to confirm the target manager or select a new manager. If the user wants to select a new manager, in 1658 the system 110 may receive an indication of this choice. Then in 1650 the system 110 may prompt the user to select a manager, and in 1652 the system 110 may receive the user selection of the manager. If the user does not wish to select a new manager, in 1656 the system 110 may receive user confirmation of the target manager. After all managers have been selected and/or confirmed, in 1660 the system 110 may change the supervisor ID of the selected record to reflect the target manager. In 1662, the system 110 may display a summary of transfers.

Model 2: Transferring Records Between Client Groups with Server Support

FIG. 18C shows a transfer process 1600 according to an embodiment of the invention in which server model 2 access is permitted and requested. In the case of server model 2, in 1666 the system 110 may check to determine whether the target manager is known. If so, in 1668 the system 110 may add the target supervisor ID to the selected record. After adding the ID, or if the target manager was not known, in 1670 the system 110 may create "to" and "from" flags which may indicated starting and ending client groups for the selected record. If records still sit under the selected record after 1610-1620, these records may also be given "to" and "from" flags. In 1672, the system 110 may change the pool fields for all records to be transferred to a "transfer pool" setting. In 1674, the system 110 may receive an indication that the user has finished using the transfer UI. In 1676, the system 110 may move the records to be transferred to a holding database. In 1678, the system 110 may receive indication that a user to which the records are to be transferred has logged in. In 1680, the system 110 may informed the transferee user of an inbound transfer. In 1682, the system 110 may identify top node managers and individual contributors in the transfer pool. In 1684, for each top node manager identified, the system 110 may prompt the user to accept or reject the transfer. If the user rejects the transfer, in 1702 the system 110 may move the record to a rejected transfer pool associated with the user with which the transfer request originated. If the user accepts the transfer, in 1686 the system 110 may determine whether the target manager is known. If not, in 1688 the system 110 may prompt the user to select a manager, and in 1690 the system 110 may receive the user selection of the manager. If the manager is known, in 1692 the system 110 may prompt the user to confirm the target manager or select a new manager. If the user wants to select a new manager, in 1696 the system 110 may receive indication of this choice. Then in 1688 the system 110 may prompt the user to select a manager, and in 1690 the system 110 may receive the user selection of the manager. If the user does not wish to select a new manager, in 1694 the system 110 may receive user confirmation of the target manager. After all managers have been selected and/or confirmed, in 1698 the system 110 may change the supervisor ID of the selected record to reflect the target manager. In 1700, the system 110 may display a summary of transfers.

Figure 18D:
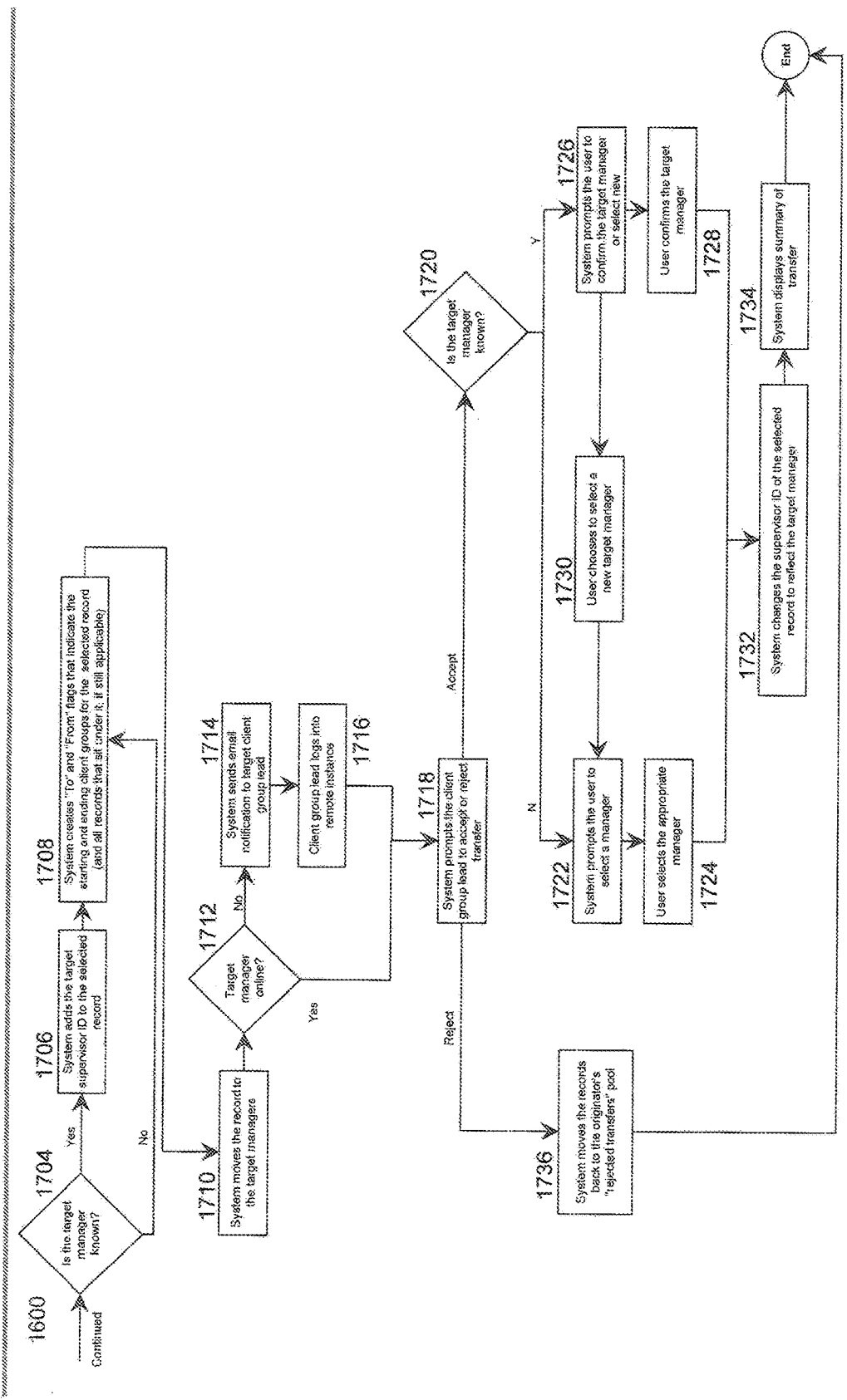
FIG. 18D is a transfer process according to an embodiment of the invention.

FIG. 18D shows a transfer process 1600 according to an embodiment of the invention in which server model 3 access is permitted and requested. In 1704 the system 110 may check to determine whether the target manager is known. If so, in 1706 the system 110 may add the target supervisor ID to the selected record. After adding the ID, or if the target manager was not known, in 1708 the system 110 may create "to" and "from" flags which may indicated starting and ending client groups for the selected record. If records still sit under the selected record after 1610-1620, these records may also be given "to" and "from" flags. In 1710, the system 110 may move the records to a target manager. In 1712, the system 110 may determine whether the target manager is online. If not, in 1714 the system 110 may send a notification, for example via email, to a target client group lead, and in 1716 the system 110 may receive indication that the client group lead has logged into an instance, such as a remote instance 26. After the lead has logged in, or if a target manager was already online, in 1718 the system 110 may prompt the user (e.g., the lead or manager) to accept or reject the transfer. If the user rejects the transfer, in 1736 the system 110 may move the record to a rejected transfer pool associated with the user with which the transfer request originated. If the user accepts the transfer, in 1720 the system 110 may determine whether the target manager is known. If not, in 1722 the system 110 may prompt the user to select a manager, and in 1724 the system 110 may receive the user selection of the manager. If the manager is known, in 1726 the system 110 may prompt the user to confirm the target manager or select a new manager. If the user wants to select a new manager, in 1730 the system 110 may receive indication of this choice. Then in 1722 the system 110 may prompt the user to select a manager, and in 1724 the system 110 may receive the user selection of the manager. If the user does not wish to select a new manager, in 1728 the system 110 may receive user confirmation of the target manager. After all managers have been selected and/or confirmed, in 1732 the system 110 may change the supervisor ID of the selected record to reflect the target manager. In 1734, the system 110 may display a summary of transfers.

Transfer Processes

Server Model 1.

In some embodiments, a server 1 may run a client data entry tool and may not store data in its own memory. Any or all elements of the system 110 may be hosted on one or more servers 1. Users of this embodiment may be able to see all records in their file, with identifying information for other positions stored in a directory. Data reporting and/or transfers may occur on rollup (e.g., aggregation of files back into the main database). Transfers may be supported in push or pull mode and may be facilitated through the use of a wizard in some embodiments.

Server Model 2.

In other embodiments, a server 1 may run a client data entry tool and may temporarily store full records used in transfers in its memory. The stored data may include less sensitive data such as client names, and may omit more sensitive data such as compensation. Some elements of the system 110 may be hosted on one or more servers 1, and other elements may be stored on local client computers 2. Users of this embodiment may be able to see all records in their file, with identifying information for other positions stored in a directory. Data reporting may occur on rollup. Transfers may be supported in push mode, and users may be prompted to confirm transfers, for example upon user login. PMO notification and/or approval for transfers may be available. Users may be able to designate target managers for transfer. Transfers may also be supported in pull mode where the user may view the full organization to identify requested positions and/or person, and request a transfer for PMO approval.

Server Model 3.

In still other embodiments, a server 1 may run a client data entry tool and may permanently store full records in its memory. Some elements of the system 110 may be hosted on one or more servers 1, and other elements may be stored on local client computers 2. Users of this embodiment may be able to see all records in their file in PMO specified detail, and also the rest of the organization via "full org view" (assuming the users have permission). Data reporting may occur in real time or near real time. Transfers may occur in real time or near real time and may be supported in push and/or pull mode. PMO notification and/or approval for transfers may be available.

Figure 16B:
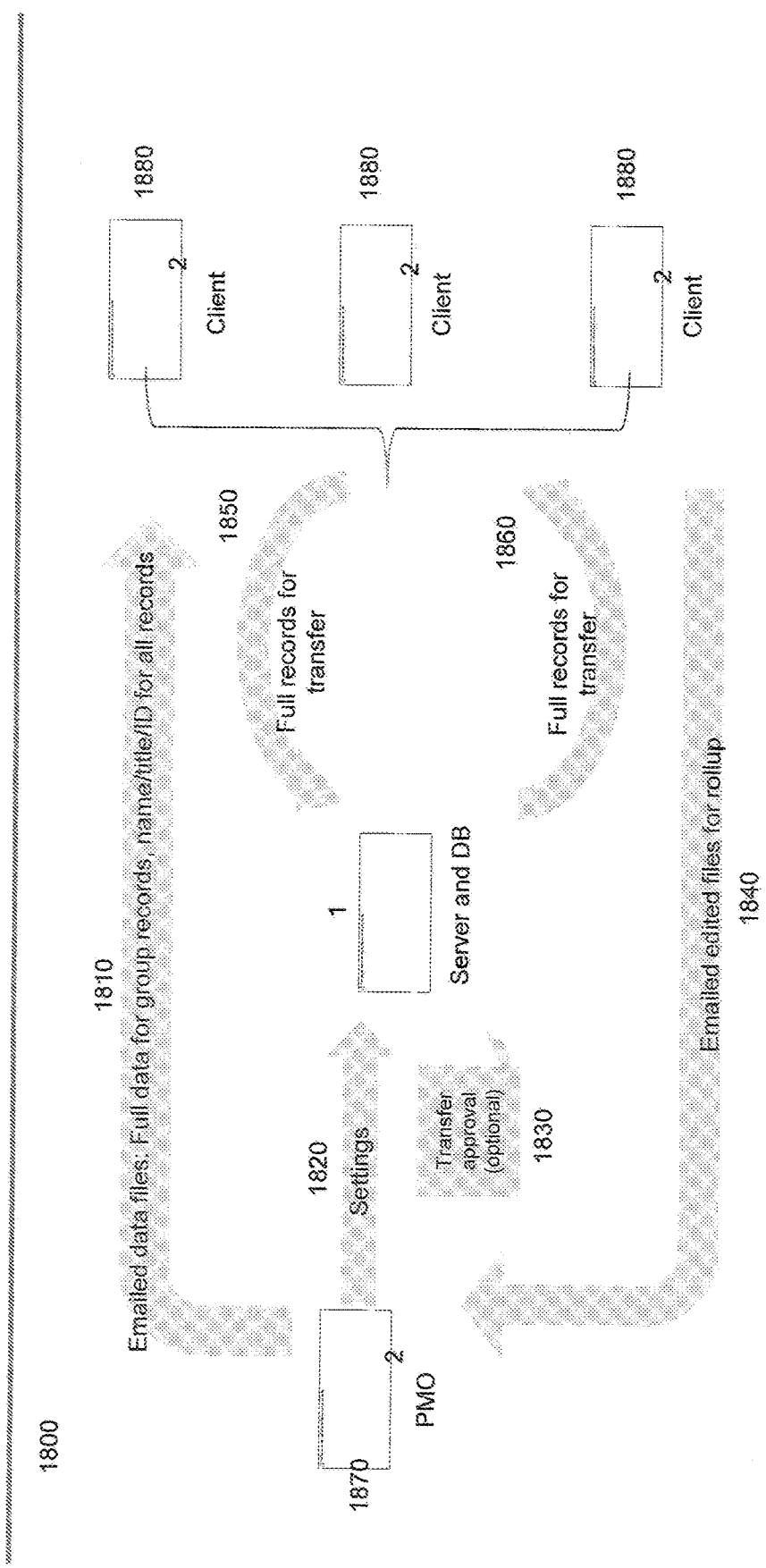
FIG. 16B is a transfer process according to an embodiment of the invention.

FIG. 16B is a transfer process 1800 according to an embodiment of the invention. This figure shows example data flows to and from PMO computers 1870, which may be remote computers 2 for example, client computers 1880, which may also be remote computers 2 for example, and system 110 servers 1. The PMO computer 1870 may email or otherwise send data files 1810, which may include group records and their associated data, to the client computers 1880. The PMO computer 1870 may also send settings data 1820 to the server 1. Client computers 1880 may send records for transfer 1850 to the server 1 and/or receive records for transfer 1860 from the server 1. Client computers 1880 may also email or otherwise send edited files for rollup 1840 to the PMO computer 1870. Also note that transfer approval 1830 may be required for records to be transferred to and/or from the client computers 1880 in some cases. Example methods by which these data exchanges may be facilitated are described in the context of FIGS. 17-18D below.

FIG. 17 is a transfer process 1900 according to an embodiment of the invention. In 1910, the system 110 may receive a user selection of a record or group of records to be transferred. For example, a user may select records they would like to transfer in to a client group to which they have access. Once the selection is made, in 1920 the system 110 may receive a user request to transfer the selected records. In 1930, the system 110 may prompt the current owner of the records to approve or deny the transfer. For example, a second user may be assigned to a client group in which the records are currently located. The second user may be shown the prompt. In 1940, the system 110 may receive the second user's approval or denial of the transfer request. If the second user approved, in 1950 the system 110 may create "to" and "from" flags that may indicate starting and ending client groups for the selected records. In 1960, the system 110 may check to determine whether any reporting lines between org levels may break as a result of the transfer. If not, in 1980 the system 110 may move the selected records to a transfer pool associated with the user to which the records are to be transferred. If reporting lines may break as a result of the transfer, in 1970 the system 110 may patch holes in the reporting lines by making records of which managers are leaving report to their manager's manager. Then, in 1980 the system 110 may move the selected records to a transfer pool associated with the user to which the records are to be transferred.

Server Model 3: Cloud-Based Client Groups

FIG. 52A-52D illustrate a high level view of a cloud-based client group management process according to an embodiment of the invention.

Setting Up Cloud-Based Client Groups in the Desktop Tool

As discussed above, the third server model may provide cloud based data access to users. The system 110 may enable a first user to check out data and lock that data from editing by other users while the first user has the data checked out.

Creating User Profiles

Figure 41B:
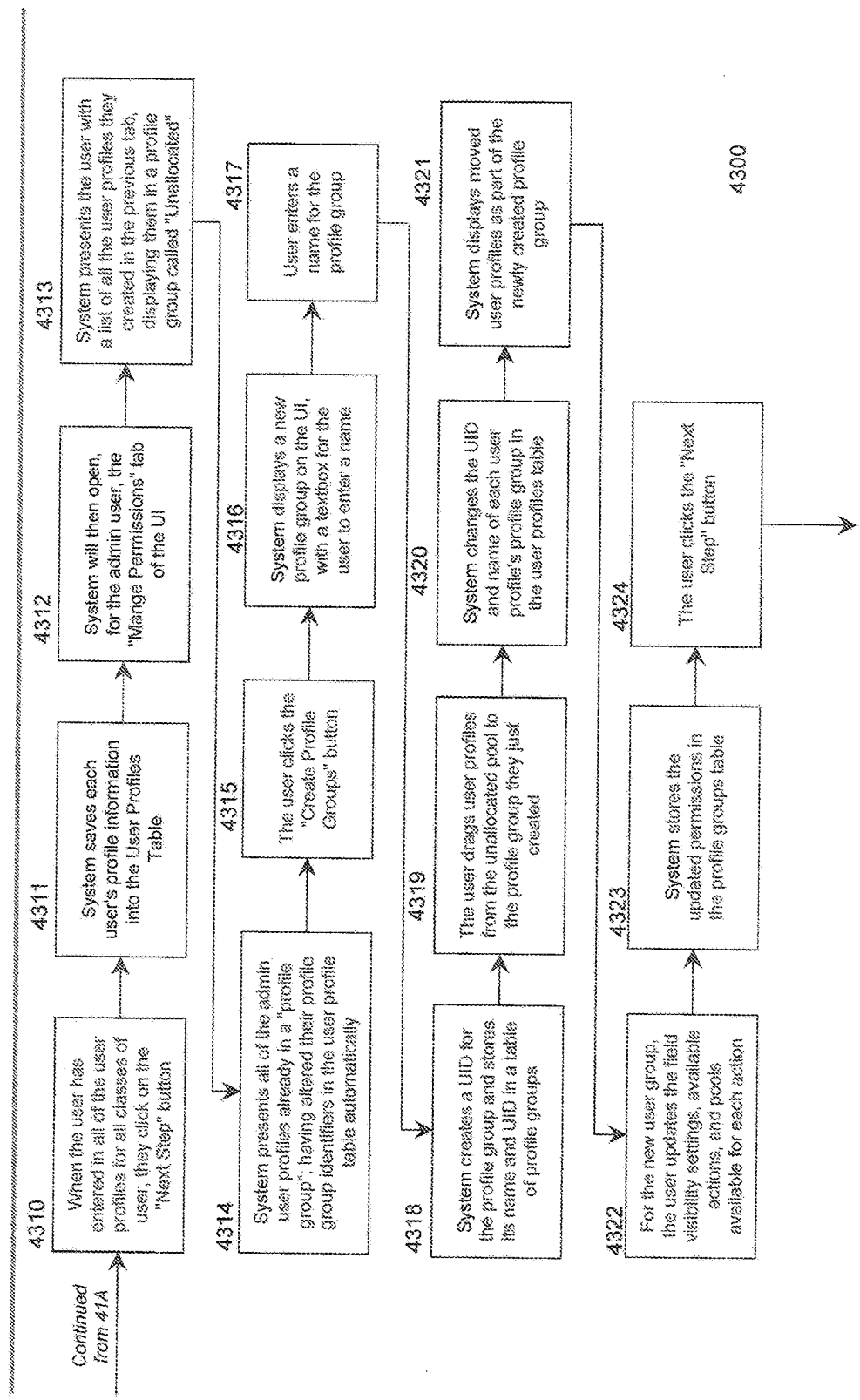
FIG. 41B is a group and profile creation process according to an embodiment of the invention.

FIGS. 41A-41E show a group and profile creation process 4300 according to an embodiment of the invention. Administrators or other users may be able to create user profiles and designate which profiles may provide access to various information. For example, these user profiles may be associated with the web tool or other software for interacting with the system 110 described above. As shown in FIG. 41A, in 4301, the system 110 may receive user input indicating how organizational data may be aggregated, appended, and/or cleaned. In 4302, the system 110 may display a UI for creating org groups, for example a "manage cloud-based client groups" UI. In 4303, the system 110 may receive user designated divisions of an organization into groups. The divisions may be generated by a sits under search function, for example, which may allow a user to identify client groups based on organizational hierarchies (e.g., who is supervised by which manager). The divisions may be generated with user input into a drag and drop interface, as well. In 4304, the system 110 may update each assigned record with the group's name and unique identifier.

In 4305, the system 110 may present a create user profiles UI to the user. Via the user profiles UI, the user may direct the system 110 to perform bulk creation of web tool user profiles, manual creation of web tool user profiles, and/or automatic password assignment for web tool user profiles. In 4306, the system 110 may perform bulk creation of web tool user profiles. Through the UI, the user may upload an Excel file or other data with information about each client and system user. Client users and admin users may be separate user classes with different access permissions, which may be assigned by default or edited. The user may also add preset passwords. In 4307, the system 110 may allow the user to perform manual creation of web tool user profiles. The user may enter information about the user for whom a profile is being made, and the user may manually create a password as well. In 4308, the system 110 may determine whether passwords were assigned during user profile creation. If not, in 4309 the system 110 may perform automatic password assignment for user profiles. This may be performed for profiles created in bulk, manually, or by some other method, previously or during the current session. The system 110 may prompt the user to set a password length equal to or above a character minimum, for example 10 characters, and receive the user selection. The system 110 may prompt the user to identify the records for which they wish the system 110 to generate a password and receive the user selection. The system 110 may employ a random character generator to create passwords of the specified length for each identified user profile.

Grouping Profiles and Assigning Permissions

As shown in FIG. 41B, when each user profile has been assigned a password, in 4310 the system 110 may prompt the user to confirm they have completed creation of the user profiles and receive the user's response. In 4311, upon receiving confirmation the system 110 may save each user profile into a user profiles table.

In 4312, the system 110 may present a profile I/O permissions UI to the user. In 4313, the system 110 may retrieve org groups information saved in 4311 and present it in the profile I/O permissions UI. For example, the system 110 may display these groups in a profile group labeled "unallocated". In 4314, the system 110 may retrieve user profile information already in profile groups and present it in the profile I/O permissions UI. In 4315, the system 110 may receive a user request to create profile groups, and in 4316, the system 110 may present a textbox to the user. In 4317, the system 110 may receive a group name from the user, for example a name entered via the textbox. In 4318, the system 110 may create a unique ID for the profile group and store the unique ID, for example in a profile group table. In 4319, the system 110 may receive user selections of unallocated user profiles to be assigned to the newly created profile group. In 4320, the system 110 may update the selected user profiles by changing the unique ID and name of each profile's profile group, for example in a user profiles table. In 4321, the system 110 may display the changes to the user. In 4322, the system 110 may receive user updates to profile group settings, for example the field visibility settings, available actions, and/or pools available for each action. In 4323, the system 110 may store the setting updates, and in 4324, the system 110 may receive user confirmation that the settings are set and the process 4300 may be advanced.

Assigning client group access rights to user profiles.

As shown in FIG. 41C, in 4325 the system 110 may present a profile assignment interface to the user. In 4326, the system 110 may display a list of client groups, and in 4327 the system 110 may display user profiles. The user profile displays may include indications of groups to which the profiles are assigned. In 4328, the system 110 may receive user selection of a profile and a group to which the profile is to be assigned. In 4329, the system 110 may display profile information such as profile name and may add the selected group's ID to the profile record. In 4330, the system 110 may automatically assign the system user designated PMO to each group. In 4331, the system 110 may receive user input indicating that the assignments are confirmed and may check whether at least one client user and one system user is assigned to each group. In 4332, the system 110 may determine whether the assignments are complete based on whether at least one client user and one admin user is assigned to each group. If they are incomplete because at least one client user and one admin user is not assigned to each group, in 4333 the system 110 may inform the user of groups lacking assignments. In 4334, the system 110 may receive user input resolving the missing assignments or moving on. By moving on, the user may direct the system 110 to assign those org groups that may be missing assignments only to the PMO. In 4335, after assignments are determined to be complete in 4332 or after user correction in 4333 and 4334, the system 110 may determine that phase setup may be performed. In 4335, the system 110 may display a phase setup UI to the user, which may enable the user to begin creating instructional materials as described below. FIG. 55 illustrates an example permissions UI.

Creating Instructional Materials

As seen in FIG. 41D, in 4337 the system 110 may receive user supplied information about the phase, for example a name, phase type, and/or start and end dates. In 4338, the system 110 may receive user supplied modifications to the template instructional text and/or template email materials, which may be made with an HTML editor for example. In 4339, the system 110 may receive user confirmation that information entering and/or modification is complete. In 4340, the system 110 may temporarily store the characteristics of the phase (e.g. phase type), in a container that may become part of the binary data or data set described in greater detail above. In 4341, the system 110 may temporarily stores the instructional text, for example as an HTML document, that may also become part of the binary data or data set. In 4342, the system 110 may temporarily store email text (and/or HTML data), which it may use when credentials are distributed to each user profile.

Uploading Data to the Server

Figure 41E:
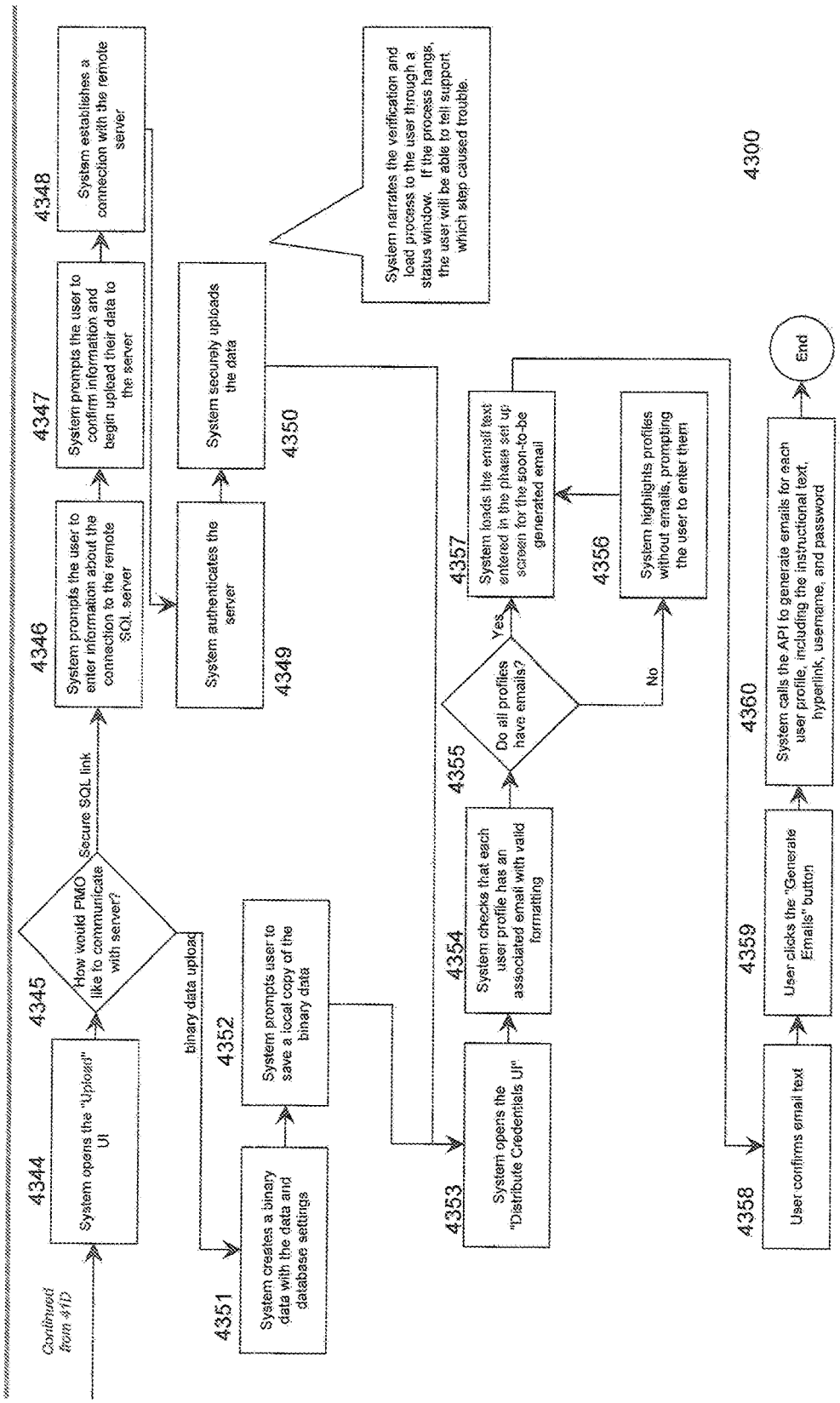
FIG. 41E is a group and profile creation process according to an embodiment of the invention.

As seen in FIG. 41E, in 4344 the system 110 may present an upload UI to the user. In 4345, the system 110 may determine how the user will communicate with the server, via secure SQL link or other network connection, or by uploading binary data or other data. In the case of the SQL link, in 4346 the system 110 may receive information about the connection to the remote SQL server from the user. In 4347, the system 110 may receive user confirmation. In 4348, the system 110 may establish a connection with the remote server. In 4349, the system 110 may authenticate the server. In 4350, the system 110 may upload the data to the server. In the case of the binary data upload, in 4351 the system 110 may create a binary data file with the data and database settings. In 4352, the system 110 may prompt the user to save a local copy of the binary data.

Distributing Login Credentials

Continuing with FIG. 41E, in 4353 the system 110 may present a distribute credentials UI to the user. In 4354, the system 110 may check whether each user profile has an associated email address with valid formatting. In 4355, the system 110 may determine whether each profile has an email address. If not, in 4356 the system 110 may highlight profiles without email addresses, prompt the user to enter the email addresses, and receive the user entries. In 4357, if email addresses were present in 4355 or after user correction in 4356, the system 110 may load the instructional text generated during phase setup as described above. In 4358, the system 110 may receive user modification and/or confirmation of instructional text. In 4359, the system 110 may receive a user prompt to generate emails. In 4360, the system 110 may call an Outlook API or other suitable program to generate emails for each user profile. The emails may include the instructional text, hyperlink, username, and password, for example. Users who receive the emails may use the information included therein to access the system 110.

Figure 19C:
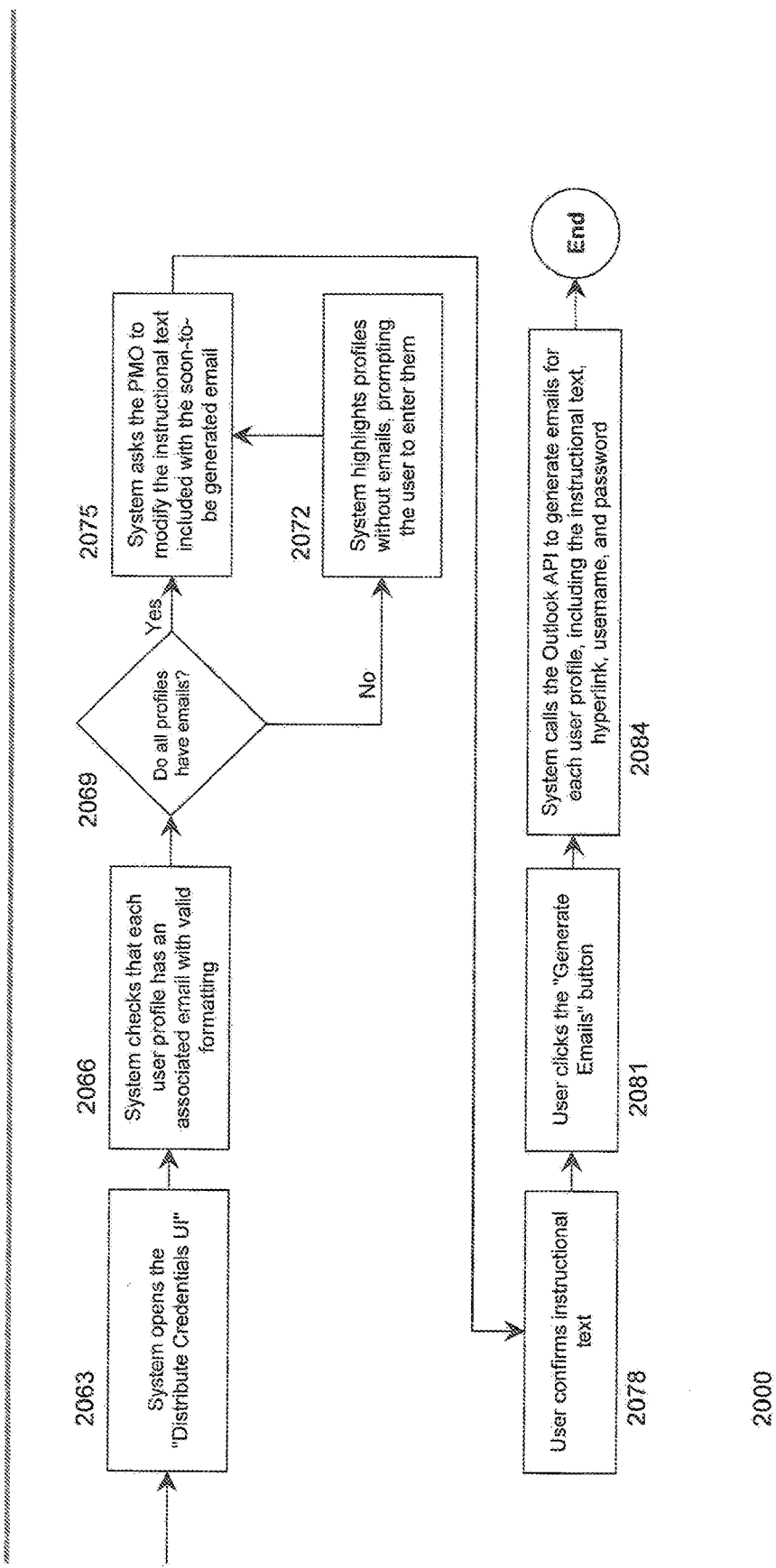
FIG. 19C is a group and profile creation process according to an embodiment of the invention.

FIGS. 19A-19C show another embodiment of a group and profile creation process 2000 according to an embodiment of the invention. Administrators or other users may be able to create user profiles and designate which profiles may provide access to various information. For example, these user profiles may be associated with the web tool or other software for interacting with the system 110 described above. The example of FIGS. 19A-19C is presented in the context of the web tool, but may apply to other embodiments. In 2003, the system 110 may receive user input indication how organizational data may be aggregated, appended, and/or cleaned. For example, Boolean values may be added to indicate membership in a group for a particular ID, ensuring a supervisor's ID is unique, ensuring that the hierarchy information in the data reflects actual org hierarchy data, and/or adding in costs for contractors based on things such as hourly rate and hours worked. Some or all of this data may come from an outside source and be added to the org data. In 2006, the system 110 may display a UI for creating org groups, for example a "manage cloud-based client groups" UI. In 2009, the system 110 may receive user designated divisions of an organization into groups. The divisions may be generated by a sits under search function, for example, which may allow a user to identify client groups based on organizational hierarchies (e.g., who is supervised by which manager). The divisions may be generated with user input into a drag and drop interface, as well. In 2012, the system 110 may update each assigned record with the group's name and unique identifier.

In 2015, the system 110 may present a create user profiles UI to the user. Via the user profiles UI, the user may direct the system 110 to perform bulk creation of web tool user profiles, manual creation of web tool user profiles, and/or automatic password assignment for web tool user profiles. In 2018, the system 110 may perform bulk creation of web tool user profiles. Through the UI, the user may upload an Excel file or other data with information about each client and system user. Client users and admin users may be separate user classes with different access permissions, which may be assigned by default or edited. The user may also add preset passwords. In 2021, the system 110 may allow the user to perform manual creation of web tool user profiles. The user may enter information about the user for whom a profile is being made, and the user may manually create a password as well. In 2024, the system 110 may perform automatic password assignment for user profiles. This may be performed for profiles created in bulk, manually, or by some other method, previously or during the current session. The system 110 may prompt the user to set a password length equal to or above a character minimum, for example 10 characters, and receive the user selection. The system 110 may prompt the user to identify the records for which they wish the system 110 to generate a password and receive the user selection. The system 110 may employ a random character generator to create passwords of the specified length for each identified user profile. When each user profile has been assigned a password, in 2027 the system 110 may prompt the user to confirm they have completed creation of the user profiles and receive the user's response. In 2030, upon receiving confirmation the system 110 may save each user profile into a user profiles table.

In 2033, the system 110 may present a profile I/O permissions UI to the user. In 2036, the system 110 may retrieve org groups information saved in 2030 and present it in the profile I/O permissions UI. For example, the system 110 may display these groups in a profile group labeled "unallocated". In 2039, the system 110 may retrieve user profile information saved in 2030 and present it in the profile I/O permissions UI. In 2042, for each org group, the system 110 may receive user selection of the user profiles that will have read/write capability for that group. In 2045, the system 110 may automatically assign the system user designated PMO to each group. In 2048, the system 110 may receive user input indicating that the read/write capability assignments are confirmed and may check whether at least one client user and one system user is assigned to each group. In 2051, the system 110 may determine whether the assignments are complete based on whether at least one client user and one admin user is assigned to each group. If they are incomplete because at least one client user and one admin user is not assigned to each group, in 2054 the system 110 may inform the user of groups lacking assignments. In 2057, the system 110 may receive user input resolving the missing assignments or moving on. By moving on, the user may direct the system 110 to assign those org groups that may be missing assignments only to the PMO. In 2060, after assignments are determined to be complete in 2051 or after user correction in 2054 and 2057, the system 110 may update permissions fields in the user profiles table to reflect the assignments.

In 2063, the system 110 may present a distribute credentials UI to the user. In 2066, the system 110 may check whether each user profile has an associated email address with valid formatting. In 2069, the system 110 may determine whether each profile has an email address. If not, in 2072 the system 110 may highlight profiles without email addresses, prompt the user to enter the email addresses, and receive the user entries. In 2075, if email addresses were present in 2069 or after user correction in 2072, the system 110 may ask the PMO to modify the instructional text included with an email to be subsequently generated. In 2078, the system 110 may receive user modification and/or confirmation of instructional text. In 2081, the system 110 may receive a user prompt to generate emails. In 2084, the system 110 may call an Outlook API or other suitable program to generate emails for each user profile. The emails may include the instructional text, hyperlink, username, and password, for example. Users who receive the emails may use the information included therein to access the system 110.

Checking Out Data for Editing

Once data is in the system 110, it may be later accessed by users for additional editing. In order to prevent issues arising from multiple sets of the same data receiving different changes from different users, the client group models may require data to be checked in and out as described below. The cloud-based model may reduce the practice of sending files and encryption keys. Instead, multiple users may be allowed to access any number of client groups, albeit not at the same time. This may forgo having to merge multiple sets of changes simultaneously or facilitate collaboration in real-time because only one user profile may "check out" or "own" data at any time. Alternately, with simultaneous editing of the same client group, select records may lock out other editors until the action is completed. There may be a timer to let the active user know how much time is remaining to complete an action before the record(s) are unlocked for other editors to access.

Logon Challenge

Figure 20:
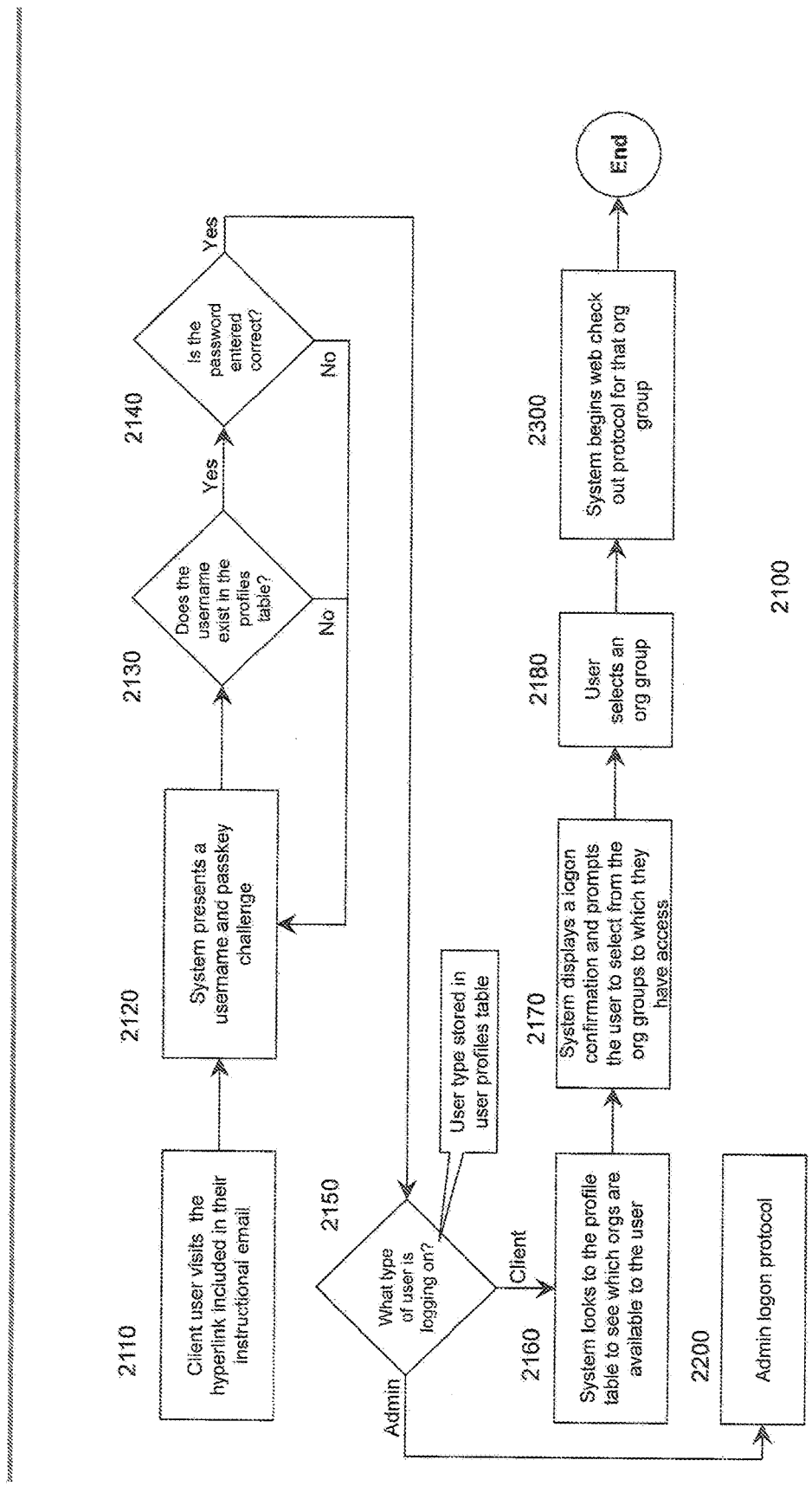
FIG. 20 is a logon process according to an embodiment of the invention.

FIG. 20 is a logon process 2100 according to an embodiment of the invention. This may be a process 2100 intended for a client user. In 2110, the system 110 may be accessed by a user, for example a client user following an email link generated according to the process 2000 described above. In 2120, the system 110 may present a username and passkey challenge to the user and receive user input. In 2130, the system 110 may determine whether the received username exists in the profiles table. If not, the system 110 may return to 2120 and present the challenge again. If so, in 2140 the system 110 may determine whether the correct password was entered. If not, the system 110 may return to 2120 and present the challenge again. If a valid username and password have been entered, in 2150 the system 110 may determine what type of user is associated with the username and password by examining the associated entry in the user profiles table. If the user is an admin user, the system 110 may enter the admin login protocol 2200 described below with respect to FIG. 21. If the user is a client user, in 2160 the system 110 may look to the profile table to see which orgs are available to the user. In 2170, the system 110 may display a logon confirmation and prompt the user to select from the org groups to which they have access. In 2180, the system 110 may receive a user selection of an org group. The system 110 may start a checkout protocol for that org group, for example a web checkout protocol 2300 described below with respect to FIG. 22 or some other protocol.

Figure 21:
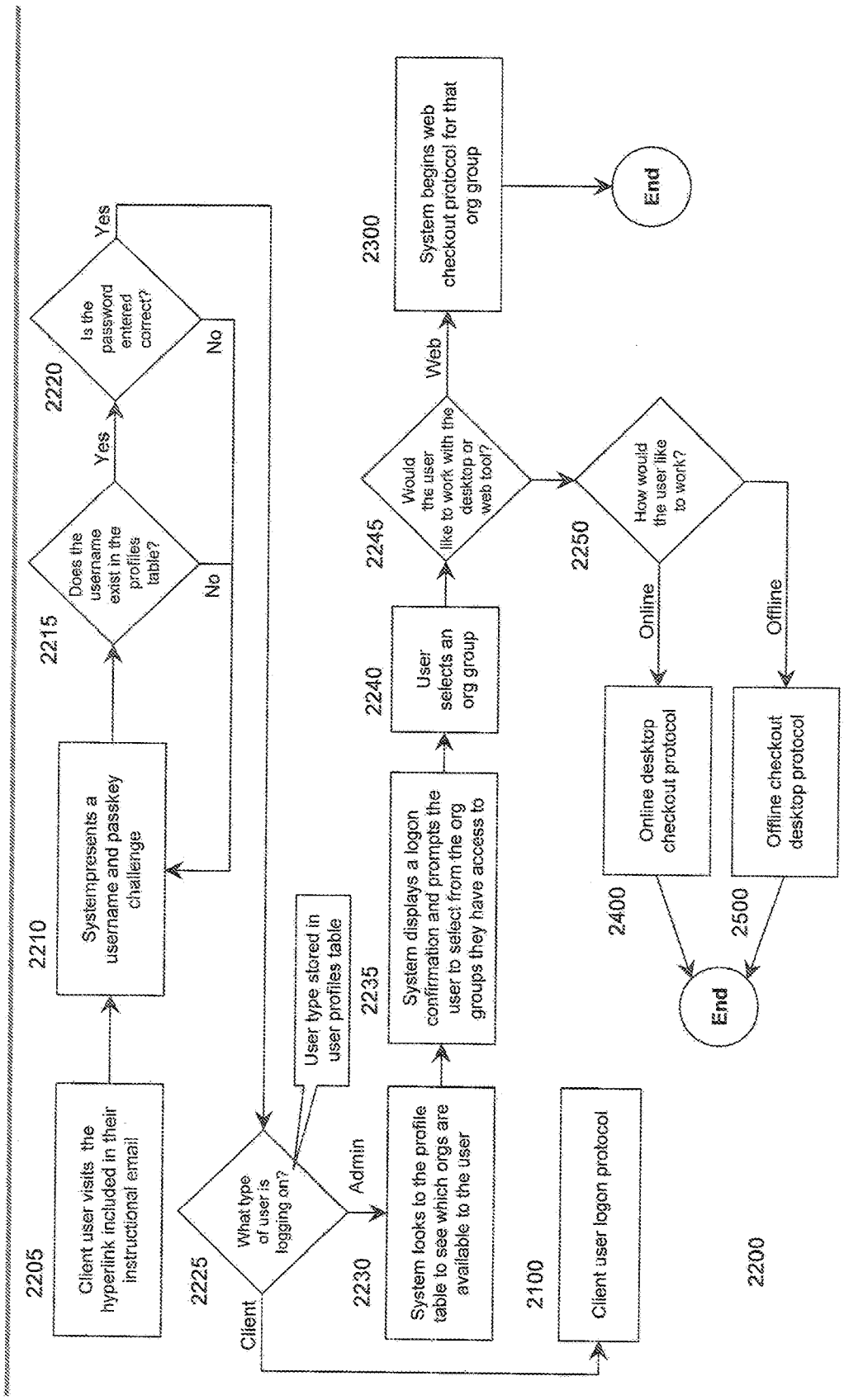
FIG. 21 is a logon process according to an embodiment of the invention.

FIG. 21 is another logon process 2200 according to an embodiment of the invention. This may be a process 2200 intended for an admin user. In 2205, the system 110 may be accessed by a user, for example an admin user following an email link generated according to the process 2000 described above. In 2210, the system 110 may present a username and passkey challenge to the user and receive user input. In 2215, the system 110 may determine whether the received username exists in the profiles table. If not, the system 110 may return to 2210 and present the challenge again. If so, in 2220 the system 110 may determine whether the correct password was entered. If not, the system 110 may return to 2210 and present the challenge again. If a valid username and password have been entered, in 2225 the system 110 may determine what type of user is associated with the username and password by examining the associated entry in the user profiles table. If the user is a client user, the system 110 may enter the client login protocol 2100 described above with respect to FIG. 20. If the user is a client user, in 2230 the system 110 may look to the profile table to see which orgs are available to the user. In 2235, the system 110 may display a logon confirmation and prompt the user to select from the org groups to which they have access. In 2240, the system 110 may receive a user selection of an org group. In 2245, the system 110 may prompt the user to determine whether the desktop or web tool is to be used for org group access and receive the user's selection. If the web tool is selected, the system 110 may start a web checkout protocol 2300 described below with respect to FIG. 22. If the desktop tool is selected, in 2250 the system 110 may prompt the user to select an online or offline mode and receive the user's selection. In response, the system 110 may start an online checkout protocol 2400 described below with respect to FIG. 23 or an offline checkout protocol 2500 described below with respect to FIG. 24.

FIG. 42A is another logon process 4400 according to an embodiment of the invention. In 4402, the system 110 may be accessed by a user, for example an admin user following an email link generated according to the process 2000 described above. In 4404, the system 110 may present a username and passkey challenge to the user and receive user input. In 4406, the system 110 may determine whether the received username exists in the profiles table. If not, the system 110 may return to 4404 and present the challenge again. If so, in 4408 the system 110 may determine whether the correct password was entered. If not, the system 110 may return to 4404 and present the challenge again. If a valid username and password have been entered, in 4410 the system 110 may determine whether the user has already checked out a set of data. If so, in 4412 the system 110 may determine whether the user has elected to work with the data using a web tool. If so, in 4412 the system 110 may load the database as the user last left it into the web tool. If not, in 4414 the system 110 may inform the admin user that they must use the desktop tool to check in the data they have already checked out before they are allowed to check out another dataset.

FIG. 42B is a continuation of FIG. 42A wherein a decision about a checkout process (e.g., described below) is initiated. If the user has not checked out data, in 4418 the system 110 may look to the profile table to see which orgs are available to the user. In 4420, the system 110 may display a logon confirmation and prompt the user to select from the org groups to which they have access. In 4422, the system 110 may receive a user selection of an org group. In 4424, the system 110 may check whether the org group data is in use by another user. If so, in 4432 the system 110 may ask the user whether they would like to request control of the org group data. If not, the system 110 may receive another user selection in 4422. If so, in 4434 the system 110 may determine whether the user who has checked out the data is currently online. If so, in 4436 the system 110 may notify the other user who has checked out the data of the request a change in control by displaying a message on the other user's screen. If the user who has checked out the data is not online, in 4438 the system 110 may notify the other user who has checked out the data of the request a change in control by sending an email to this user. The email may include a link that, when clicked, may initiate a change of control process. If the other user agrees to allow the change in control, in 4440 they may indicate this to the system 110, for example by clicking a link in the email or onscreen message. In 4442, the system 110 may initiate a change in control protocol such as the process 2600 described in FIG. 25. If the data has not been checked out by another user, in 4426 the system 110 may determine what type of user is requesting the data. If it is a client user, in 4428 the system 110 may initiate a web based checkout protocol. If it is an admin user, in 4430 the system 110 may present the user with a set of optional checkout protocols from which to choose, examples of which are described in greater detail below.

Web Tool Checkout

FIG. 22 is a checkout process 2300 according to an embodiment of the invention. For example, this process 2300 may be used for web checkout compatible with server model 3 940 illustrated in FIG. 11 above. In 2310, the system 110 may receive the user selection of an org group accessible to the user generated in a logon process 2100/2200. In 2320, the system 110 may check whether the org group data is in use by another user. If so, in 2330 the system 110 may ask the user whether they would like to request control of the org group data. If not, the system 110 may receive another user selection in 2310. If so, in 2340 the system 110 may notify the other user who has checked out the data of the request a change in control, for example by displaying a message on the other user's screen and/or emailing them. If the other user agrees to allow the change in control, the system 110 may initiate a change in control protocol such as the process 2600 described in FIG. 25 below. If the data has not been checked out by another user, in 2350 the system 110 may lock all the records in the org group from editing. In 2360, the system 110 may duplicate all the records in the org group into a temporary sandbox org database. In 2370, the system 110 may load a primary org design UI for the user. FIG. 121 illustrates an example screenshot of an online mode.

FIG. 42C is a web checkout process 4400 according to an embodiment of the invention. In a case wherein a client user is checking out the data, or wherein an admin user has requested a web based checkout, in 4444, the system 110 may initiate a web based checkout protocol. In 4446 the system 110 may lock all the records in the org group from editing. In 4448, the system 110 may set a "checkout owner" field associated with the data to the unique ID associated with the requesting user. In 4450, the system 110 may duplicate all the records in the org group into a temporary sandbox org database. In 4452, the system 110 may display a welcome screen to the user, which may include instructional text. In 4454, the system 110 may receive an indication from the user that the user is ready to proceed with viewing and/or editing the data. In 4456, the system 110 may load a primary org design UI for the user. Desktop online Checkout FIG. 23 is a checkout process 2400 according to an embodiment of the invention. For example, this process 2400 may be used for desktop online checkout compatible with server model 2 930 illustrated in FIG. 11 above. In 2405, the system 110 may receive the user selection of an org group accessible to the user generated in a logon process 2100/2200. In 2410, the system 110 may check whether the org group data is in use by another user. If so, in 2415 the system 110 may ask the user whether they would like to request control of the org group data. If not, the system 110 may receive another user selection in 2405. If so, in 2420 the system 110 may notify the other user who has checked out the data of the request a change in control, for example by displaying a message on the other user's screen and/or emailing them. If the other user agrees to allow the change in control, the system 110 may initiate a change in control protocol such as the process 2600 described in FIG. 25 below. If the data has not been checked out by another user, in 2425 the system 110 may lock all the records in the org group from editing. In 2430, the system 110 may duplicate all the records in the org group into a temporary sandbox org database. In 2435, the system 110 may look to the user profile table to find connection information to the user's desktop tool. In 2440, the system 110 may open a link between the user's desktop tool and the sandbox. In 2445, the system 110 may receive user login to the desktop tool. In 2450, the system 110 may prompt the user to confirm connection. In 2455, the system 110 may receive user confirmation of the connection and establish a link between the user desktop tool and the sandbox, for example using SQL. FIG. 122 illustrates an example screenshot of an online checkout mode.

FIG. 42D is a desktop online checkout process 4400 according to an embodiment of the invention. In a case wherein an admin user is checking out data, in 4458 the system 110 may receive the user's selection of a group. In 4460, the system 110 may determine whether the user would like to edit in a web tool or desktop tool. In 4444, if the user selects web tool, the system 110 may initiate a web based checkout protocol. An example of such a protocol is described in greater detail above. If the user selects desktop, in 4462 the system 110 may determine whether the user has selected a link to a server or an offline download of the data. If the user prefers an offline download, in 4464 the system 110 may lock all the records in the org group from editing. For example, a Boolean "locked" field for the records may be marked as true. In 4466, the system 110 may set a "checkout owner" field associated with the data to the unique ID associated with the requesting user. In 4468, the system 110 may duplicate all the records in the org group into a temporary sandbox org database. In 4470, the system 110 may create a data set containing the sandbox data and/or database settings, for example a binary data file, which may be made available for the user to download. The package available for download may include user ID data which may prevent users other than the requesting user from downloading, opening, and/or editing the package. See for example FIG. 32. If the user prefers a server link, in 4472 the system 110 may lock all the records in the org group from editing. For example, a Boolean "locked" field for the records may be marked as true. In 4474, the system 110 may set a "checkout owner" field associated with the data to the unique ID associated with the requesting user. In 4476, the system 110 may wait for an SQL link or other link to be established by the user. When the link is established, in 4480 the system 110 may then initiate a "connect to sandboxed database" wizard.

Desktop Offline Checkout

FIG. 24 is a checkout process 2500 according to an embodiment of the invention. For example, this process 2500 may be used for desktop offline checkout compatible with server model 1910 illustrated in FIG. 11 above. In 2510, the system 110 may receive the user selection of an org group accessible to the user generated in a logon process 2100/2200. In 2520, the system 110 may check whether the org group data is in use by another user. If so, in 2530 the system 110 may ask the user whether they would like to request control of the org group data. If not, the system 110 may receive another user selection in 2510. If so, in 2540 the system 110 may notify the other user who has checked out the data of the request a change in control, for example by displaying a message on the other user's screen and/or emailing them. If the other user agrees to allow the change in control, the system 110 may initiate a change in control protocol such as the process 2600 described in FIG. 25 below. If the data has not been checked out by another user, in 2550 the system 110 may lock all the records in the org group from editing. In 2560, the system 110 may duplicate all the records in the org group into a temporary sandbox org database. In 2570, the system 110 may create a data set containing the sandbox data and/or database settings, for example a binary data file. In 2580, the system 110 may send the data set to the user.

FIGS. 27A-27C show another checkout process 2900 according to an embodiment of the invention. In 2902, the system 110 may receive the user selection of an org group accessible to the user generated in a logon process 2100/2200. In 2904, the system 110 may check whether the org group data is in use by another user. If so, in 2906 the system 110 may ask the user whether they would like to request control of the org group data. If not, the system 110 may receive another user selection in 2902. If so, in 2908 the system 110 may determine whether the user who has checked out the data is currently online. If so, in 2910 the system 110 may notify the other user who has checked out the data of the request of a change in control by displaying a message on the other user's screen. If the user who has checked out the data is not online, in 2912 the system 110 may notify the other user who has checked out the data of the request a change in control by sending an email to this user. The email may include a link that, when clicked, may initiate a change of control process. If the other user agrees to allow the change in control, in 2914 they may indicate this to the system 110, for example by clicking a link in the email or onscreen message. In 2916, the system 110 may initiate a change in control protocol such as the process 2600 described in FIG. 25. If the data has not been checked out by another user, in 2918 the system 110 may determine what type of user is requesting the data. If it is a client user, in 2920 the system 110 may initiate a web based checkout protocol. If it is an admin user, in 2922 the system 110 may present the user with a set of optional checkout protocols from which to choose, examples of which are described in greater detail below.

In a case wherein an admin user is checking out data, in 2924 the system 110 may receive the user's selection of a group. In 2926, the system 110 may determine whether the user would like to edit in a web tool or desktop tool. In 2928, if the user selects web tool, the system 110 may initiate a web based checkout protocol. An example of such a protocol is described in greater detail below. If the user selects desktop, in 2930 the system 110 may determine whether the user has selected a link to a server or an offline download of the data. If the user prefers an offline download, in 2932 the system 110 may lock all the records in the org group from editing. For example, a Boolean "locked" field for the records may be marked as true. In 2934, the system 110 may set a "checkout owner" field associated with the data to the unique ID associated with the requesting user. In 2936, the system 110 may duplicate all the records in the org group into a temporary sandbox org database. In 2938, the system 110 may create a data set containing the sandbox data and/or database settings, for example a binary data file, which may be made available for the user to download. The package available for download may include user ID data which may prevent users other than the requesting user from downloading, opening, and/or editing the package. If the user prefers a server link, in 2940 the system 110 may lock all the records in the org group from editing. For example, a Boolean "locked" field for the records may be marked as true. In 2942, the system 110 may set a "checkout owner" field associated with the data to the unique ID associated with the requesting user. In 2944, the system 110 may duplicate all the records in the org group into a temporary sandbox org database. In 2946, the system 110 may look to the user profile table to find connection information to the user's desktop tool. In 2948, the system 110 may open a link between the user's desktop tool and the sandbox. In 2950, the system 110 may receive user login to the desktop tool. In 2952, the system 110 may prompt the user to confirm connection. In 2954, the system 110 may receive user confirmation of the connection and establish a link between the user desktop tool and the sandbox, for example using SQL. In some embodiments, in 2946 the system 110 may instead wait for an SQL link or other link to be established by the user. In this case, the system 110 may then initiate a "connect to sandboxed database" wizard. See FIG. 32.

In a case wherein a client user is checking out the data, or wherein an admin user has requested a web based checkout, in 2956 the system 110 may receive the user's selection of a group. In 2958 the system 110 may lock all the records in the org group from editing. In 2960, the system 110 may set a "checkout owner" field associated with the data to the unique ID associated with the requesting user. In 2962, the system 110 may duplicate all the records in the org group into a temporary sandbox org database. In 2964, the system 110 may display a welcome screen to the user, which may include instructional text. In 2966, the system 110 may receive an indication from the user that the user is ready to proceed with viewing and/or editing the data. In 2968, the system 110 may load a primary org design UI for the user.

Connect to Sandboxed Data Functionality

Figure 69:
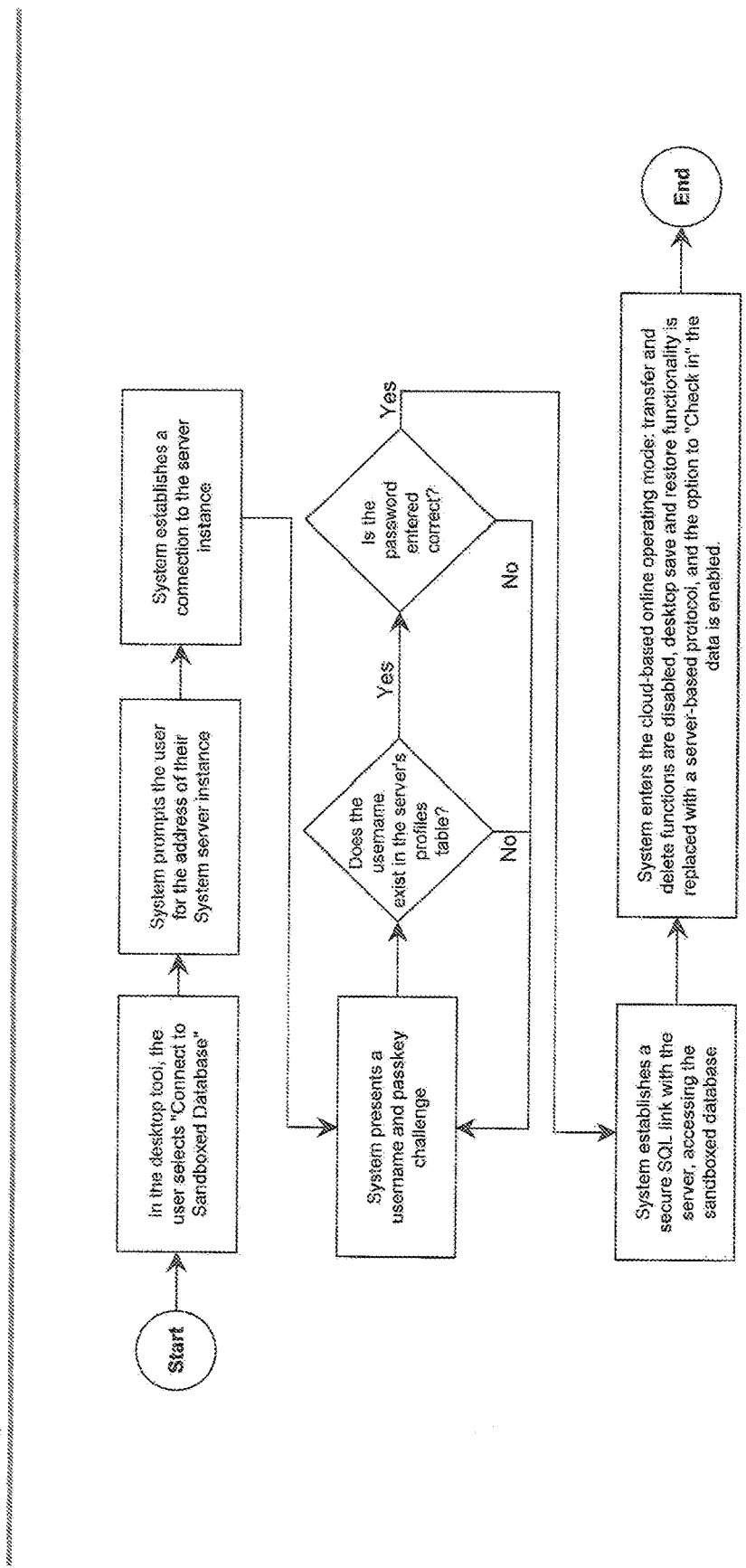
FIG. 69 is a connection process according to an embodiment of the invention.

FIG. 69 provides an alternate embodiment of steps 2946-2954 in FIG. 27B. In the desktop application, the user may select the "Connect to Sandboxed Database" function. The application may then prompt the user for the address of the server instance and/or other information relevant to establishing a connection. Upon receipt of that information, the system may attempt to establish a connection to the remote database. Once the connection has been successfully established, the application may present the user with a name and passkey challenge. Once the identity of the user is confirmed, the application may establish a secure database link to the organization that the user may have already checked out through the web tool. Once the connection to the remote database has been successfully established, the application may enter the "Online Editing" operating mode described in further detail below.

Checking in Data and Resolving Errors

Once data is in the system 110, under the third server model as described above, it may be "checked-out" by a user who has been granted editing privileges by the project management office. In checking-out their data, the application may copy the data to a "sandbox" (see FIG. 1D). Once in the sandbox, the user may edit the data and, in some embodiments, create multiple versions of the same data set. For example, they might investigate the cost savings offered by maintaining a geographic orientation or moving to a centralized organizational model. Once the user creates a version of the data in the sandbox that meets their approval, they may indicate that they wish to overwrite the corresponding data in the "single source of truth" organization database by "checking-in" their data. The check in process may involve a "quarantine" process, which may isolate and test data before it overwrites its corresponding parts in the main database. The process may also include an "error resolution" component, in which users may be tasked with resolving errors that could corrupt the main database, for example, circular references. The quarantine may also ensure that users check in their data with their pools in compliance with a preset standard (see FIG. 53). Once the data has passed completed the error resolution process, records that exist in the both the sandbox and main database may be supplanted by the sandbox version, while new records (for example, added positions) may be appended to the main database.

Quarantine Protocol

Figure 26C:
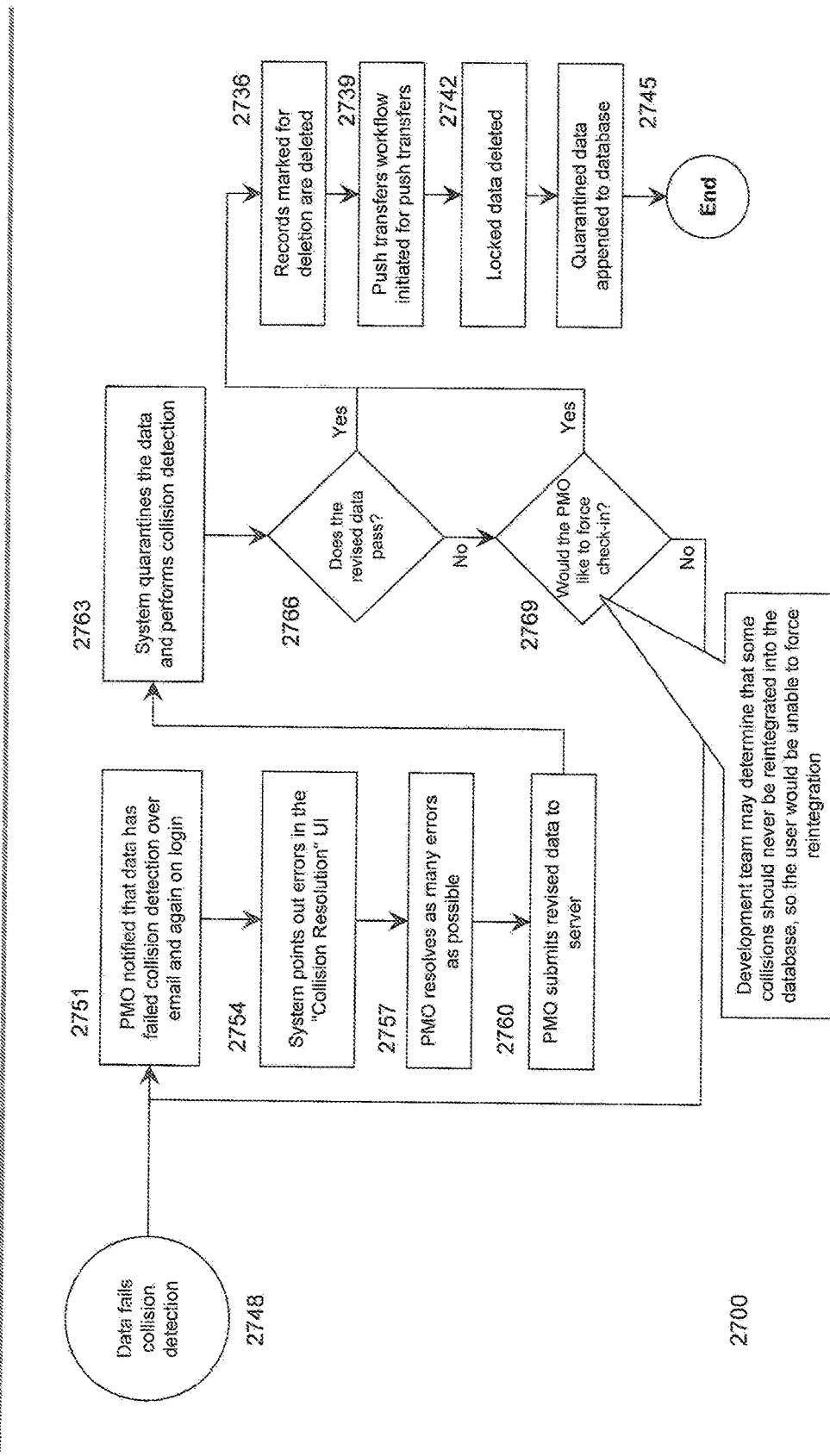
FIG. 26C is a check in process according to an embodiment of the invention.

FIGS. 26A-26C show a check in process 2700 according to an embodiment of the invention. In 2703, the system 110 may receive user changes to the organization data. In 2706, the changes may be submitted to the server, and in 2709, the system 110 may keep the data in quarantine. The system 110 may perform a collision detection analysis. Specifically, in 2712 the system 110 may determine whether all the records originally checked out are present in the quarantined file. In 2715, the system 110 may determine whether a "marked for deletion" pool contains only records created by the user during a current design session. In 2718, the system 110 may determine whether all new records have properly formatted user IDs. In 2721, the system 110 may determine whether there are any records marked as transfers that are part of the original baseline data. In 2723, the system 110 may determine whether integrating the data may create any circular reporting relationships. In 2727, the system 110 may determine whether integrating the data may introduce a non-unique position ID. In 2730, the system 110 may determine whether any parts of the data structure are corrupted or mismatched. If any of 2712-2721 are false, or if any of 2724-2730 are true, in 2748 the system 110 may detect a collision in the data.

If no collisions are detected, in 2733 the system 110 may determine that the data has passed the collision detection test. In 2736, the system 110 may delete any records that are marked for deletion. In 2739, the system 110 may push transfer any workflows initiated for push transfer. In 2742, the system 110 may delete any locked data. In 2745, the system 110 may append any quarantined data to the database.

If a collision is detected in 2748, in 2751 the system 110 may notify the user that data has failed collision detection, for example via email and/or in a notification on login. In 2754, the system 110 may display the collision issues in a collision resolution UI. In 2757, the system 110 may provide tools for the user in the UI to allow resolution of errors, and in 2760 the system 110 may receive user generated data revisions. In 2763, the system 110 may quarantine the revised data and perform a collision detection on the revised data, for example as described above. If the revised data passes collision detection in 2766, in 2736 the system 110 may delete any records that are marked for deletion. In 2739, the system 110 may push transfer any workflows initiated for push transfer. In 2742, the system 110 may delete any locked data. In 2745, the system 110 may append any quarantined data to the database. If the system 110 determines that the revised data does not pass collision detection in 2766, in 2769 the system 110 may give the user the option of forcing check in. In some cases the system 110 may allow forced check-in of data. However, an admin or other high level user may determine that some collisions should never be reintegrated into the database, so the user may be unable to force reintegration in such a case. If forcing is not allowed, or if the user indicates that check in should not be forced, the system 110 may provide a new notification that the data has failed collision detection in 2751. If the check in is to be forced in 2769, in 2736 the system 110 may delete any records that are marked for deletion. In 2739, the system 110 may push transfer any workflows initiated for push transfer. In 2742, the system 110 may delete any locked data. In 2745, the system 110 may append any quarantined data to the database.

Figure 29:
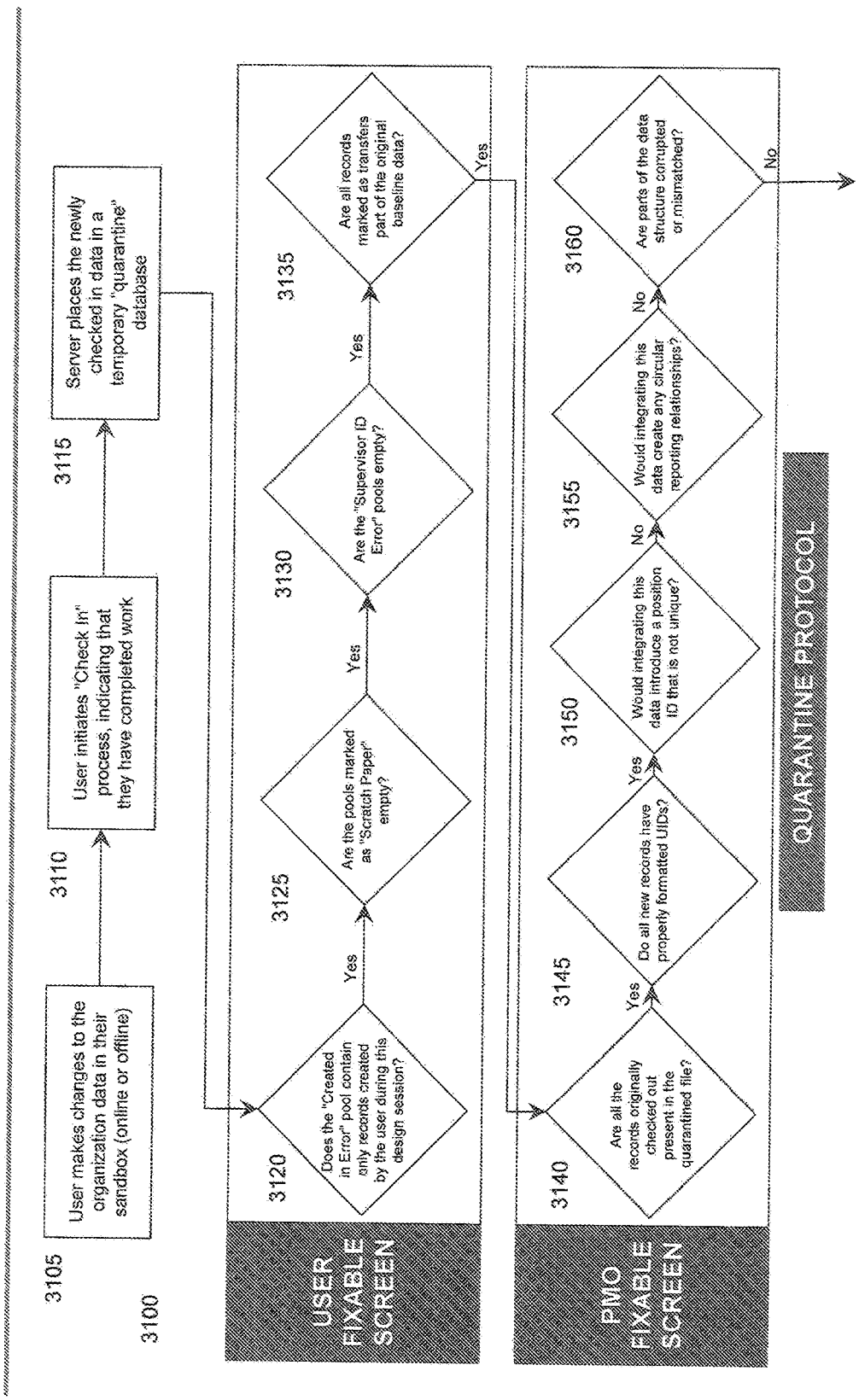
FIG. 29 is a quarantine process according to an embodiment of the invention.

FIG. 29 is a quarantine process 3100 according to an embodiment of the invention. This process 3100 may be performed if requested during a change of control process 3000 or when a user is finished editing a data set, for example. In 3105, the system 110 may receive user changes to a data set. In 3110, the system 110 may initiate the check in process. In 3115, the system 110 may place the checked in data in a quarantine database. The system 110 may perform a quarantine analysis. Specifically, in 3120 the system 110 may determine whether a "created in error" pool only contains records created during the checking in user's design session. In 3125, the system 110 may determine whether pools marked as "scratch paper" are empty. In 3130, the system 110 may determine whether "supervisor ID error" pools are empty. In 3135, the system 110 may determine whether there are any records marked as transfers that are part of the original baseline data. In 3140, the system 110 may determine whether originally checked out records are present in the quarantined file. In 3145, the system 110 may determine whether new records have properly formatted user IDs. In 3150, the system 110 may determine whether integrating the data may introduce a non-unique position ID. in 3155, the system 110 may determine whether integrating the new data would create any circular reporting relationships. In 3160, the system 110 may determine whether any parts of the data structure are corrupted or mismatched. If any of 3120-3145 are false, or if any of 3150-3160 are true, in 2748 the system 110 may detect data errors.

Figure 31:
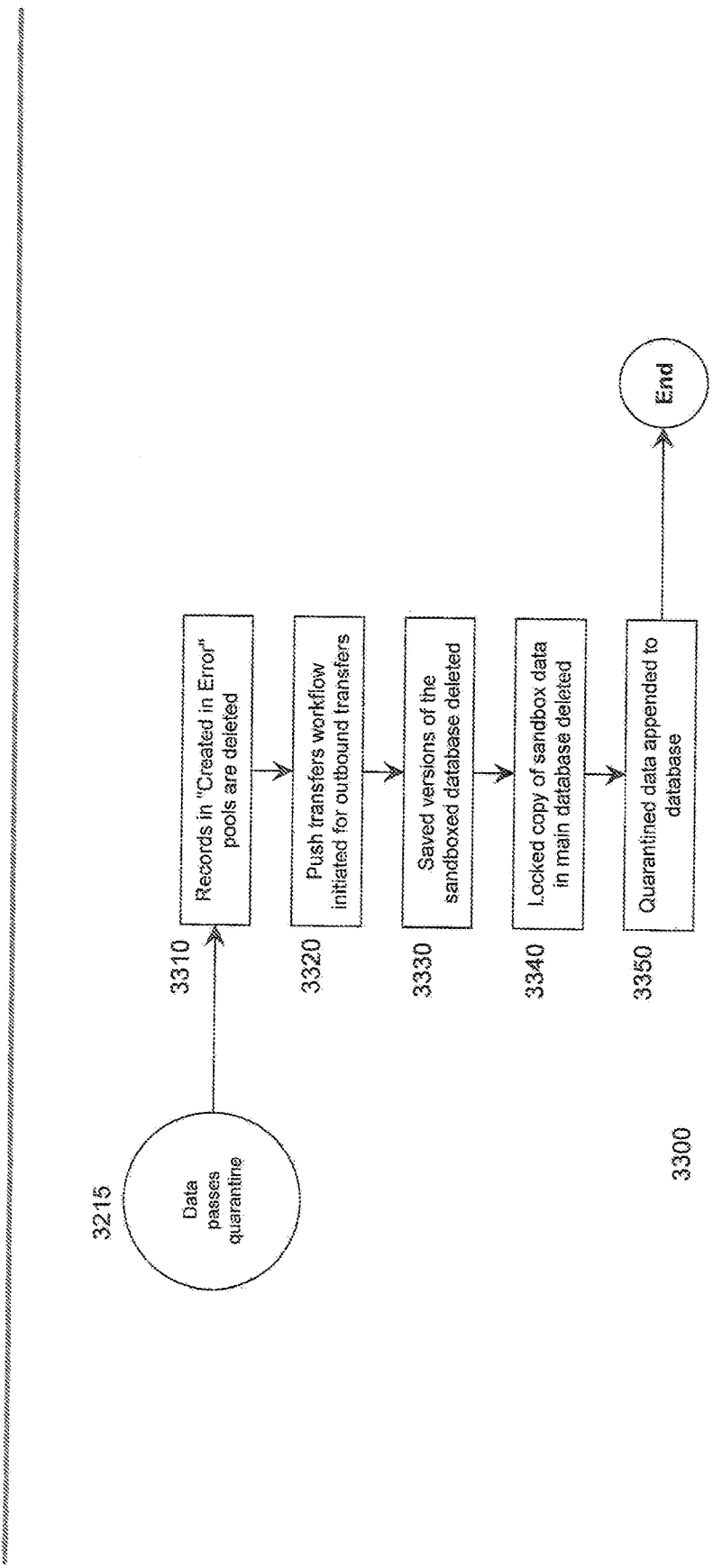
FIG. 31 is a check in process according to an embodiment of the invention.

FIG. 31 is a check in process 3300 according to an embodiment of the invention. This process 330 may be performed after the data has passed quarantine in 3215 of the process 3200 described above, for example. In 3310, the system 110 may delete records that may have been created in error. In 3320, the system 110 may initiate a push transfers workflow for any outbound transfers. In 3330, the system 110 may delete any saved versions of the sandboxed database. In 3340, the system 110 may delete any locked copy of the sandbox data in a system 110 database. In 3350, the system 110 may add the quarantined data to the database by appending and/or merging the data. Note that online mode check in (e.g., server models 1 and/or 2) may include a GUI allowing selection of a data type (e.g., regular data, quarantined data, etc.). Offline check in may omit this, because the binary data itself may include an indication of data type. Thus, the system 110 may know what kind of binary data file has been uploaded and automatically enter the right mode.

FIG. 49 is a set of example pools according to an embodiment of the invention. These and/or other pools may be used in the quarantine processes and elsewhere as described herein.

Error Resolution Protocol

Figure 30:
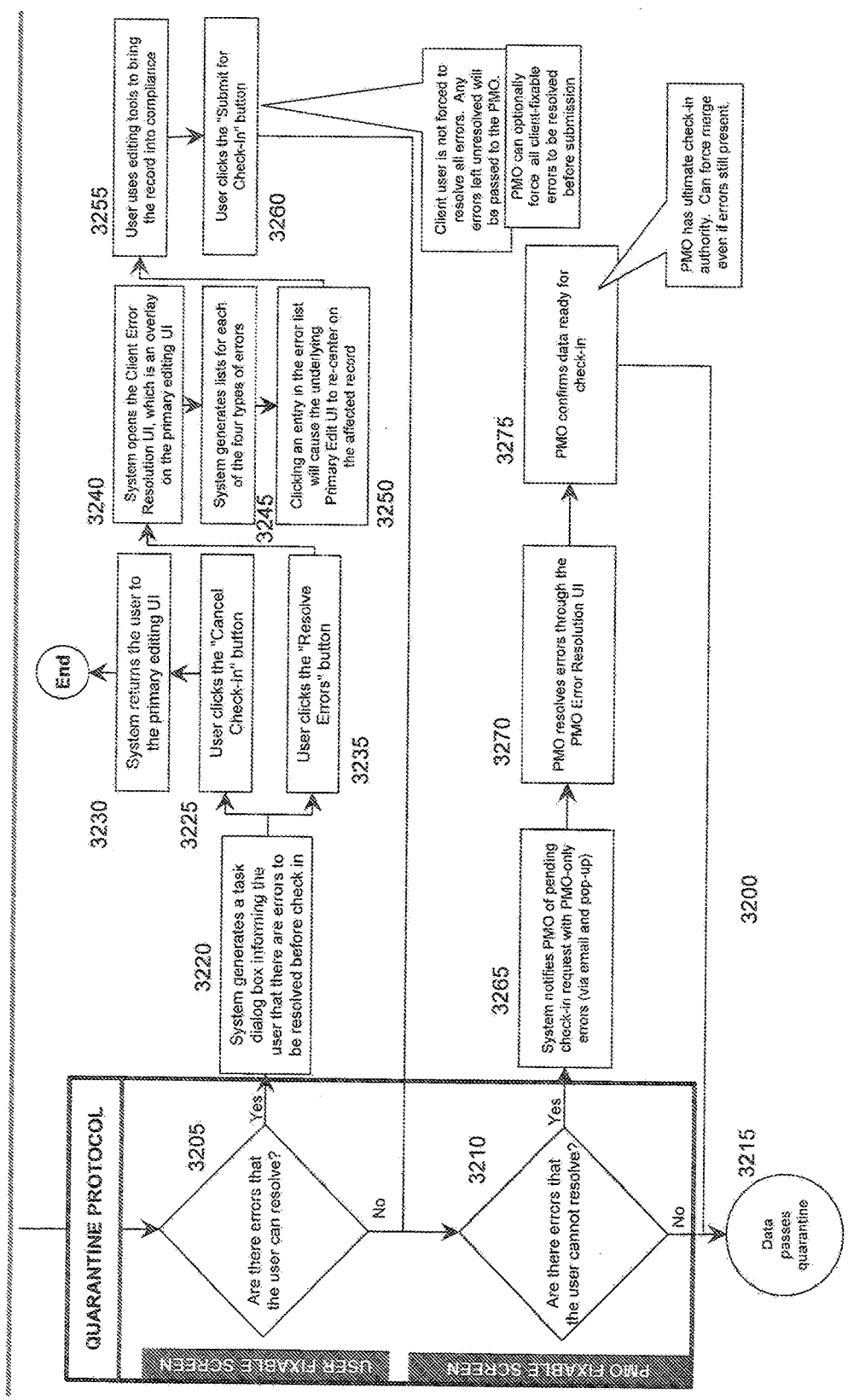
FIG. 30 is an error resolution process according to an embodiment of the invention.

FIG. 30 is an error resolution process 3200 according to an embodiment of the invention. This process 3200 may be performed following a quarantine process 3100, for example. In 3205, the system 110 may determine whether any errors were detected that a user can resolve. If there were no such errors, or if they have been resolved as described in greater detail below, in 3210 the system 110 may determine whether any errors were detected that a user cannot resolve. If there were no such errors, or if they have been resolved as described in greater detail below, in 3215 the system 110 may determine that the data has passed quarantine.

Figure 64:
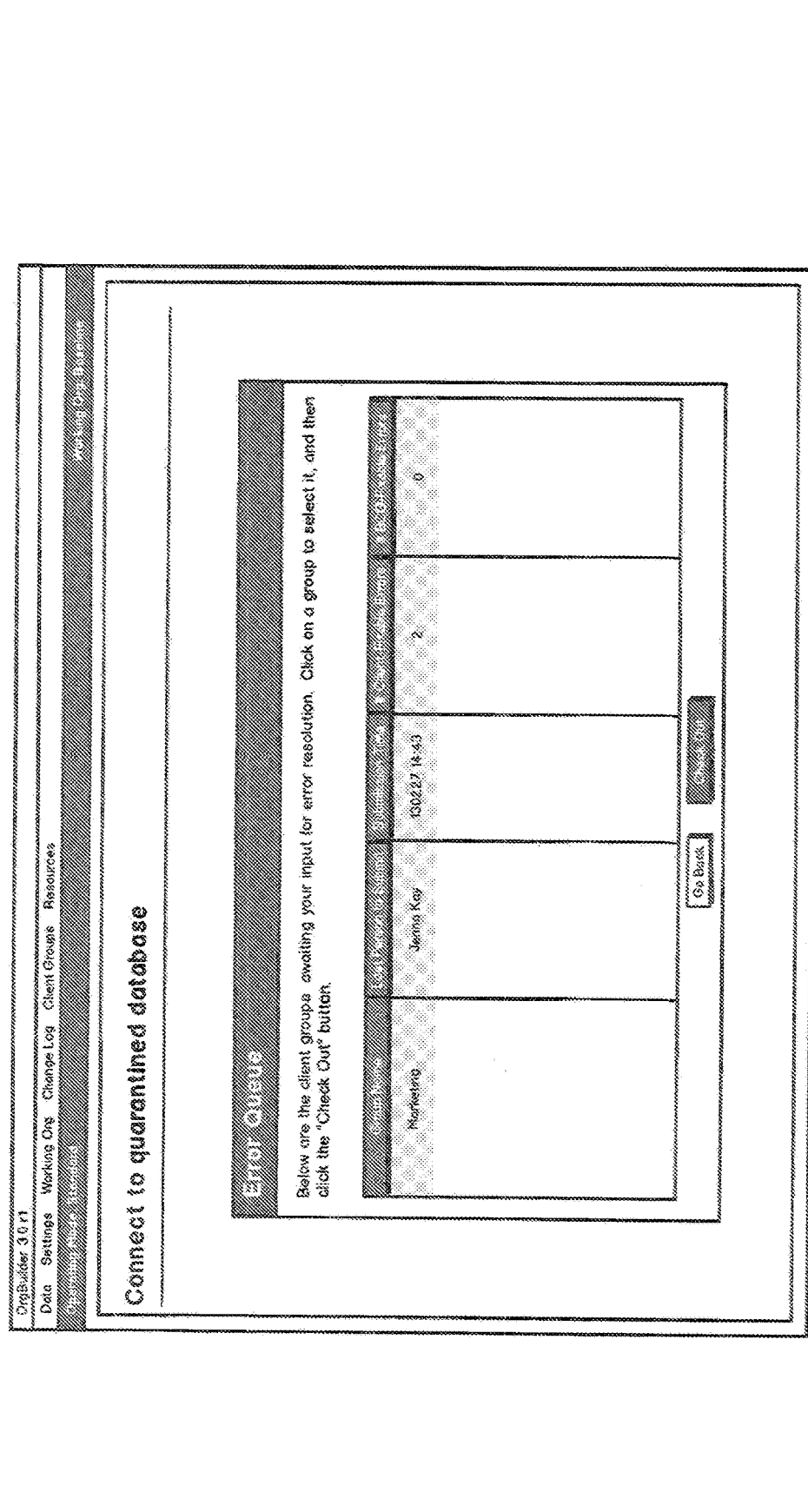

If errors exist that may be resolvable by the user, in 3220 the system 110 may generate a task dialog box informing the user that there are errors to be resolved before check in. See for example FIG. 64. In 3225 the system 110 may receive a user request to cancel check in, and in 3230 the system 110 may return the user to the primary editing UI. Alternatively, in 3235 the system 110 may receive a user request to resolve errors. In 3240, the system 110 may present a client error resolution UI to the user. In 3245, the system may generate a list of errors. In 3250, the system 110 may receive a user selection of an error to correct. In 3255, the system 110 may provide editing tools to enable the user to correct the selected error. After the user has corrected errors and wishes to proceed, in 3260 the system 110 may receive a user command to submit the data for check in. At this time, in 3210 the system 110 may determine whether any errors were detected that a user cannot resolve. If there were no such errors, or if they have been resolved as described in greater detail below, in 3215 the system 110 may determine that the data has passed quarantine.

If errors exist that may not be resolvable by the user, in 3265 the system 110 may notify an admin of pending check in request with admin only errors (e.g., via email and/or pop-up notification). In 3270, the system 110 may receive admin resolution of errors via a UI. In 3275, the system 110 may receive admin confirmation that the data is ready for check in. In 3215 the system 110 may determine that the data has passed quarantine. FIG. 123 illustrates an example screenshot of an online error resolution interface. FIG. 124 illustrates an example screenshot of an offline error resolution interface.

FIGS. 43A-43B show another quarantine and error resolution process 4500 according to an embodiment of the invention. This process 4500 may be performed if requested during a change of control process 3000 or when a user is finished editing a data set, for example. In 4502, the system 110 may receive user changes to a data set. In 4504, the system 110 may initiate the check in process. In 4506, for binary data files being uploaded from a desktop instance in offline mode, the system 110 may check the status of the binary data file's unique identifier. In 4508, if the unique ID is marked as completely checked-in already, the system 110 may cancel the upload process and may display an error message. In 4510, the system 110 may place the checked in data in a quarantine database. The system 110 may perform a quarantine analysis. Specifically, in 4512 the system 110 may determine whether a "created in error" pool only contains records created during the checked in user's design session. In 4514, the system 110 may determine whether pools marked as "scratch paper" are empty. In 4516, the system 110 may determine whether "errors to clear" pools are empty. In 4518, the system 110 may determine whether there are comments in records marked for deletion. In 4520, the system 110 may determine whether there are any records marked as transfers that are part of the original baseline data. In 4522, the system 110 may determine whether originally checked out records are present in the quarantined file. In 4524, the system 110 may determine whether new records have properly formatted unique IDs. In 4526, the system 110 may determine whether integrating the data may introduce a non-unique position ID. in 4528, the system 110 may determine whether integrating the new data would create any circular reporting relationships. In 4530, the system 110 may determine whether any parts of the data structure are corrupted and/or whether any field types are mismatched. If any of 4512-4524 are false, or if any of 4526-4530 are true, the system 110 may begin the error resolution process.

In 4532, the system 110 may determine whether any errors were detected that a user can resolve. If there were no such errors, or if they have been resolved as described in greater detail below, in 4534 the system 110 may determine whether any errors were detected that a user cannot resolved. If there were no such errors, or if they have been resolved as described in greater detail below, in 4580 the system 110 may determine that the data has passed quarantine.

If errors exist that may be resolvable by the user, in 4536 the system 110 may generate a task dialog box informing the user that there are errors to be resolved before check in. In 4538 the system 110 may receive a user request to cancel check in, and in 4540 the system 110 may return the user to the primary editing UI. Alternatively, in 4542 the system 110 may receive a user request to resolve errors. In 4544, the system 110 may present a client error resolution UI to the user. In 4546, the system may generate a list of errors for each error type For example, each error check 4512-4530 may represent one error type. In 4548, the system 110 may receive a user selection of an error to correct. In 4550, the system 110 may provide editing tools to enable the user to correct the selected error. In 4552, the system 110 may display the errors to the user. In 4554, the system 110 may run the data through a quarantine protocol such as those described above. In 4556, the system 110 may display any remaining errors, and then in 4548 the system 110 may receive a user selection of an error to correct again. After the user has corrected errors and wishes to proceed, in 4558 the system 110 may receive a user command to submit the data for check in. At this time, in 4534 the system 110 may determine whether any errors were detected that a user cannot resolved. If there were no such errors, or if they have been resolved as described in greater detail below, in 4580 the system 110 may determine that the data has passed quarantine.

If errors exist that may not be resolvable by the user, in 4560 the system 110 may notify an admin of pending check in request with admin only errors (e.g., via email and/or pop-up notification). In 4562, the system 110 may check the data out to the admin. In 4564, the system 110 may receive admin resolution of errors via a UI. In 4566, the system 110 may determine whether any errors remain. If not, in 4580 the system 110 may determine that the data has passed quarantine. If so, in 4568 the system 110 may notify the PMO that errors remain. In 4570, the system 110 may receive error resolutions from the PMO. In 4572, the system may determine whether any errors remain. If not, in 4574 the system 110 may check in the data as described below, and in 4580 the system 110 may determine that the data has passed quarantine. If errors still remain, in 4576 the PMO may request a forced check in, and in 4580 the system 110 may determine that the data has passed quarantine.

Notification (e.g., of Non-PMO Admin or Consultants) Upon Check-in with Errors

FIG. 44 is an admin notification process 4600 according to an embodiment of the invention. This process 4600 may be performed when errors are detected that a client user cannot resolve as described above, for example. In 4650, the system 110 may receive the client user's submission of data for check in as described above. In 4610, the system 110 may place the data in a quarantined sandbox. In 4615, the system 110 may perform a quarantine protocol such as those described above. In 4620, the system 110 may determine whether any errors remain. If not, in 4625 the system 110 may determine that the data has passed quarantine and may merge the data with the data in the database. If so, in 4630 the system 110 may search for a non-PMO admin associated with the client group being checked in. in 4635, the system 110 may determine whether a non-PMO admin for the group exists. If so, in 4340, the system 110 may notify the admin of the errors. If not, in 4345 the system 110 may notify a PMO of the errors. In either case, in 4650 the system 110 may place the client group in the admin or PMO's error resolution queue. In 4655, the system 110 may save a backup of any work the admin or PMO was working on and clear their desktop database. In 4660, the system 110 may receive login data from the admin or PMO. In 4665, the system 110 may receive a request from the admin or PMO to view the error queue. In 4670, the system 110 may display the error queue. In 4675, the system 110 may receive admin or PMO selection of a client group for which errors will be resolved. In 4680, the system 110 may ask the admin or PMO how they would like to work with the data. If the admin or PMO requests an offline mode, in 4685 the system 110 may initiate a desktop offline quarantine checkout protocol. If the admin or PMO requests an online mode, in 4690 the system 110 may initiate a desktop online quarantine checkout protocol.

Notification of PMO Upon Check-in with Errors

Figure 45:
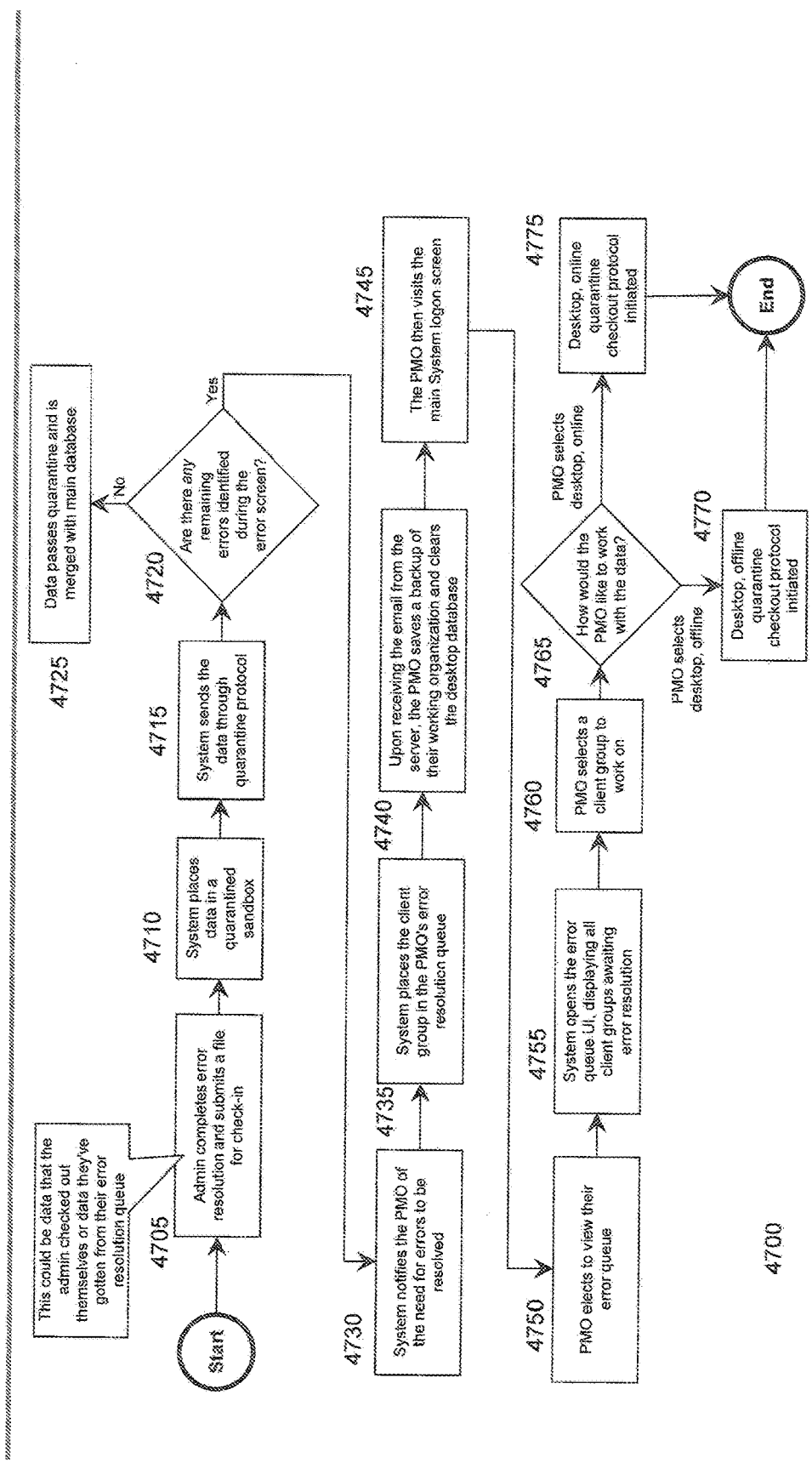
FIG. 45 is a PMO notification process according to an embodiment of the invention.
Figure 52B:
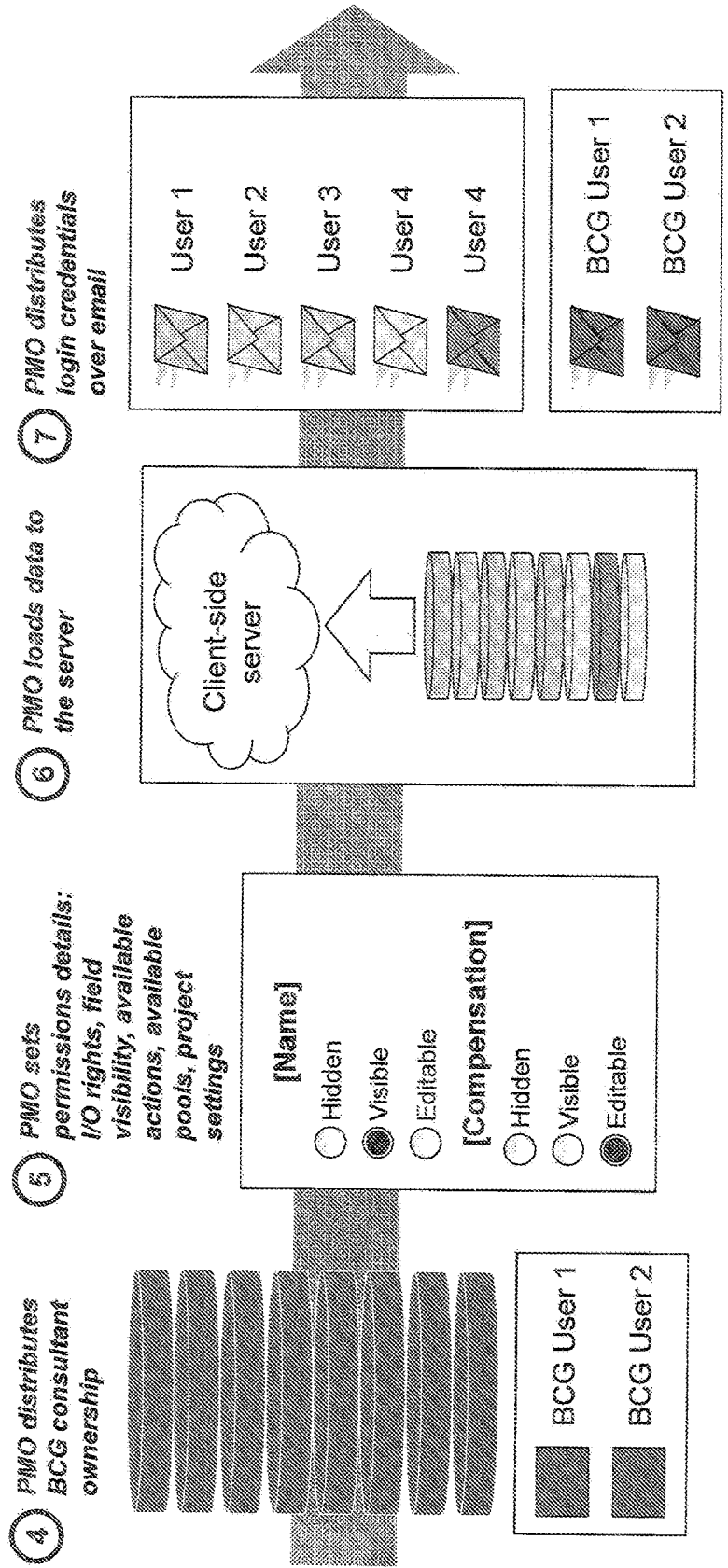
FIG. 52B is a client group management process according to an embodiment of the invention.
Figure 52C:
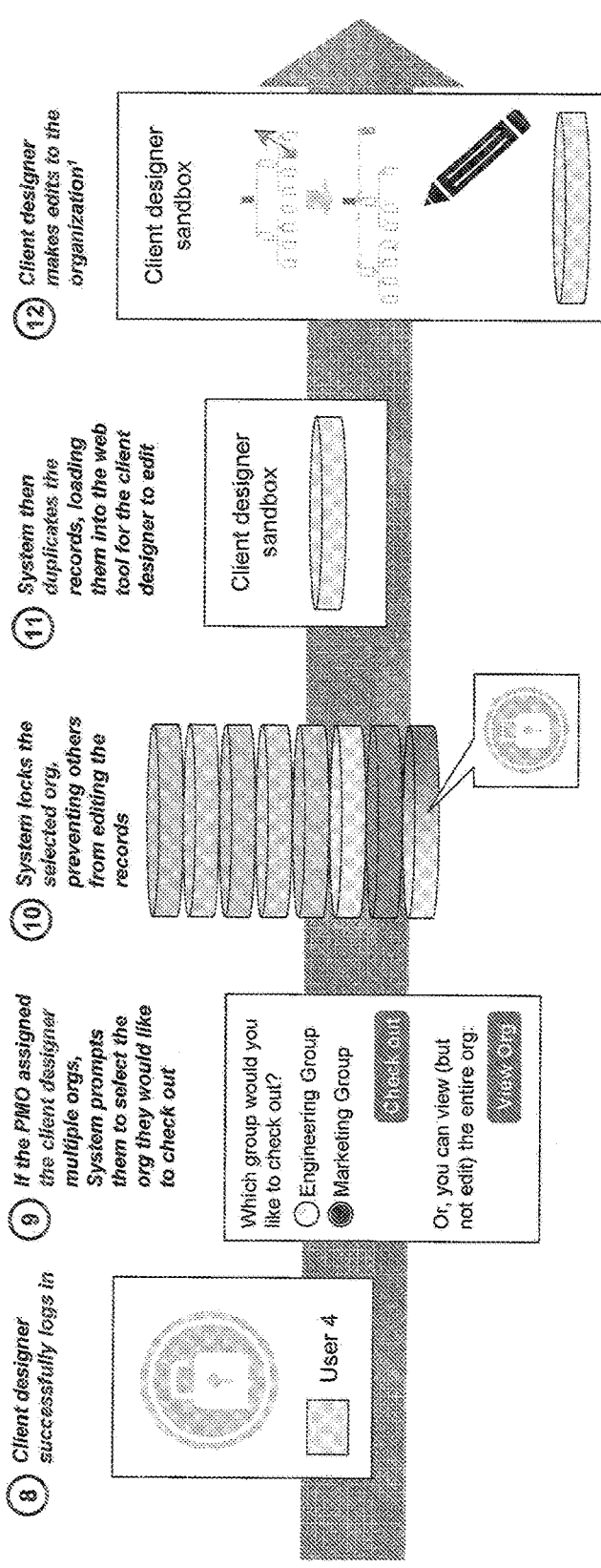
FIG. 52C is a client group management process according to an embodiment of the invention.
Figure 52D:
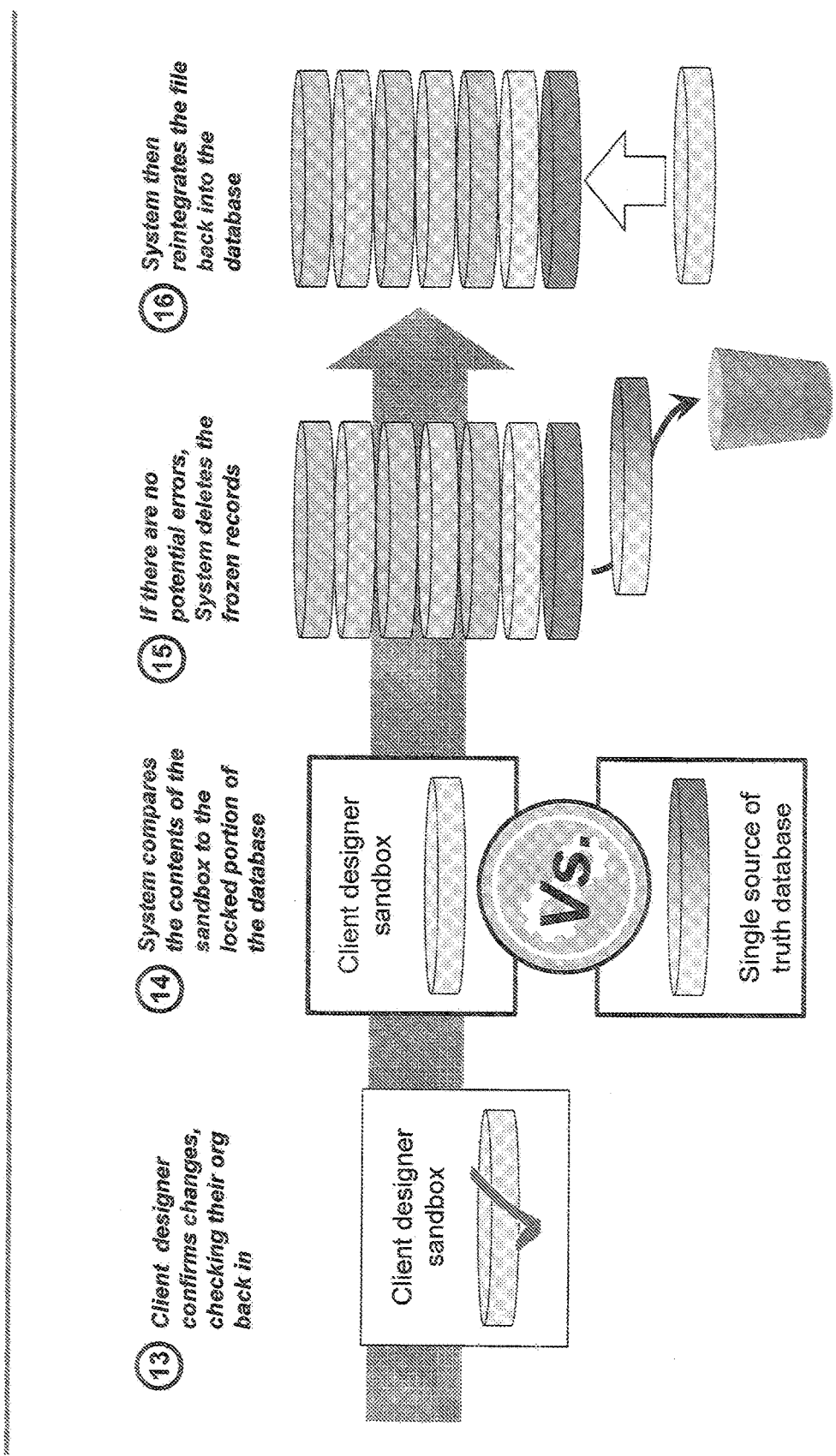
FIG. 52D is a client group management process according to an embodiment of the invention.

FIG. 45 is a PMO notification process 4700 according to an embodiment of the invention. This process 4700 may be performed when errors are detected that an admin user cannot resolve as described above, for example. In 4705, the system 110 may receive the admin user's submission of data for check in as described above. In 4710, the system 110 may place the data in a quarantined sandbox. In 4715, the system 110 may perform a quarantine protocol such as those described above. In 4720, the system 110 may determine whether any errors remain. If not, in 4725 the system 110 may determine that the data has passed quarantine and may merge the data with the data in the database. If so, in 4730 the system 110 may notify a PMO of the errors. In 4735 the system 110 may place the client group in the PMO's error resolution queue. In 4740, the system 110 may save a backup of any work the PMO was working on and clear their desktop database. In 4745, the system 110 may receive login data from the PMO. In 4750, the system 110 may receive a request from the PMO to view the error queue. In 4755, the system 110 may display the error queue. In 4760, the system 110 may receive PMO selection of a client group for which errors will be resolved. In 4765, the system 110 may ask the PMO how they would like to work with the data. If the PMO requests an offline mode, in 4770 the system 110 may initiate a desktop offline quarantine checkout protocol. If the PMO requests an online mode, in 4775 the system 110 may initiate a desktop online quarantine checkout protocol.

Reintegration of the Data

See the discussion of FIGS. 26A-26C above, and specifically FIG. 26B, for an example of data reintegration in the context of a check in process 2700. See also the discussion of FIG. 31 above for another example of data reintegration in the context of a check in process 3300.

Operating Modes for the Desktop Tool

The standard operating mode of the desktop tool may be suitable for workstreams, but may also be too powerful to operate within the client groups paradigm. Thus, additional operating modes, with limited permissions, may be provided for users wishing to utilize the desktop tool. Users may wish to employ the desktop tool, even with limited permissions or functionality, because they may prefer the style of its graphical user interface, for example. Each operating mode may be tailored to a combination of an activity and a connection mode. There may be at least two activities: editing and error resolution. There may be at least two connection modes: offline and online. In this instance, operating "offline" may mean that the desktop application connects to a local database. Whereas "online" may indicate that the desktop application connects to a remote database.

Figure 67:
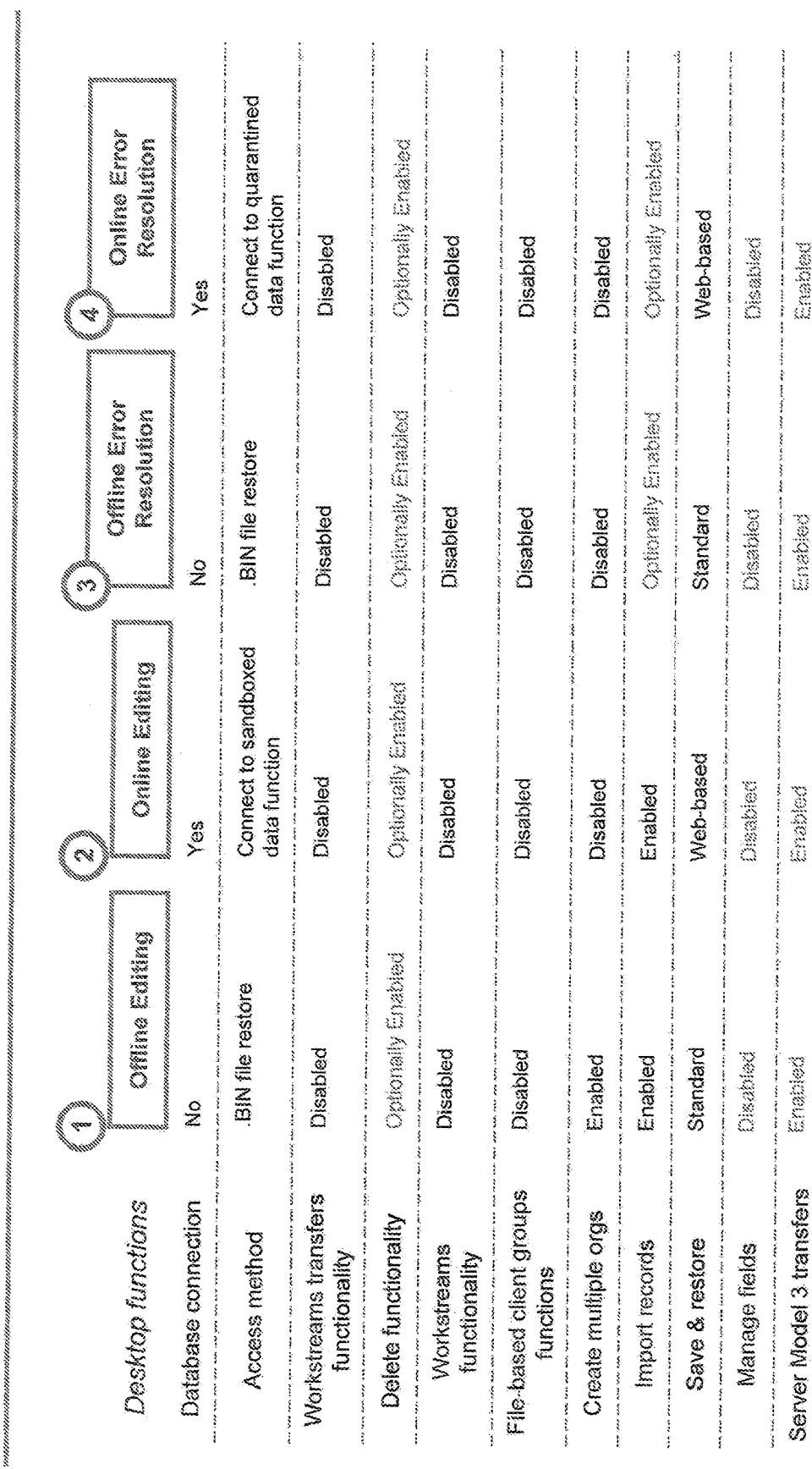
FIG. 67 is a plurality of modes and functions according to an embodiment of the invention.
Figure 68:
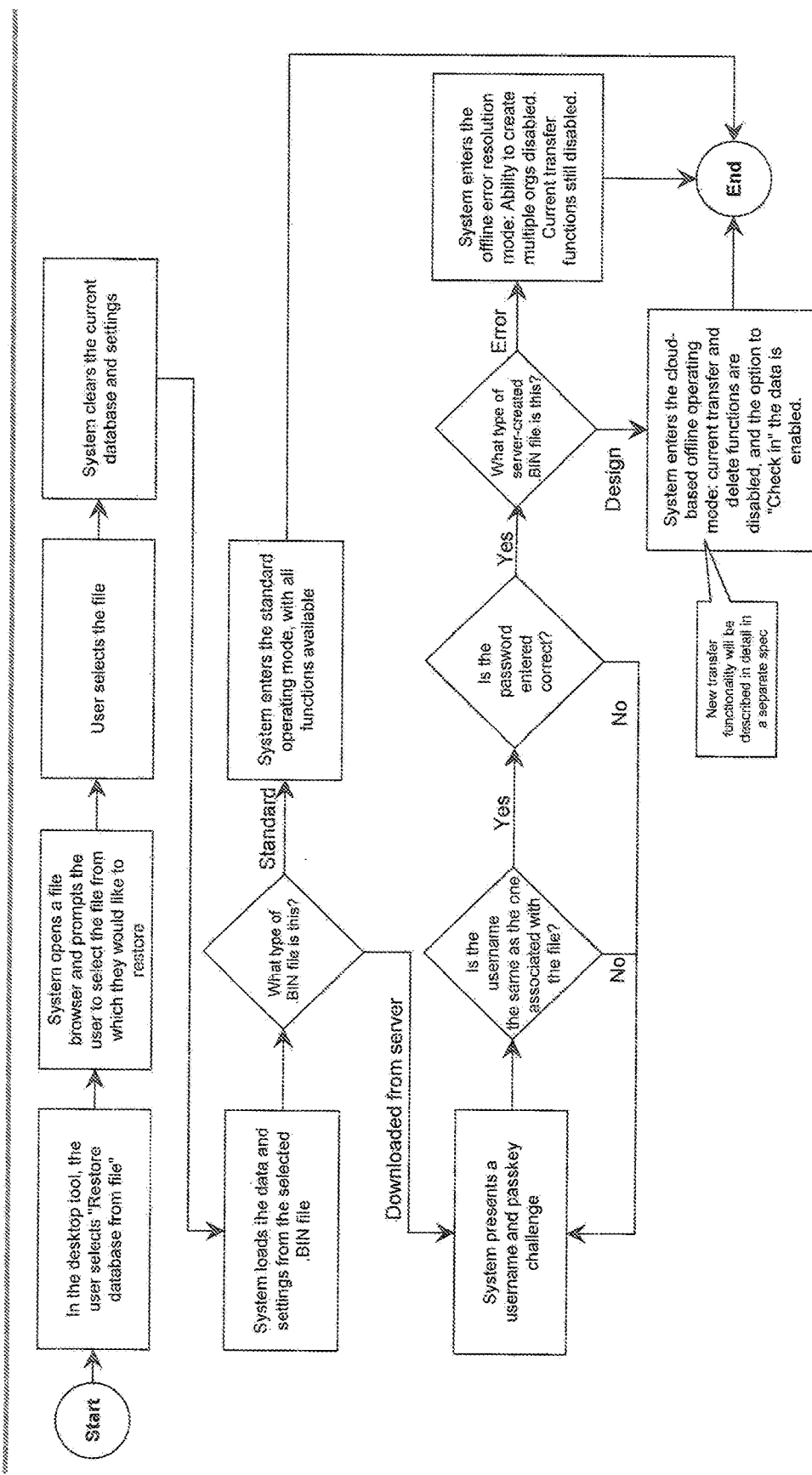
FIG. 68 is a restore process according to an embodiment of the invention.

In FIG. 67, "Editing" operating modes (numbered 1 & 2) may be employed by users wishing to edit a data set in their "sandbox." Compared to the standard desktop application, these operating modes have may limited functionality. For example, they may not provide the ability to delete/destroy records, to employ user-defined unique identifiers, to utilize the workstreams-specific transfers functionality (which includes the ability to delete/destroy records), or to define custom pools, calculations and/or fields. But, unlike the standard desktop application, the editing operating modes may allow Server Model 3—specific transfers functionality.

In FIG. 67, "Error Resolution" operating modes (numbered 3 & 4) may be similar to the "Editing" operating modes. In this mode, the user may also not be able to create multiple versions of an organization. (For example, only one version of any organization/client group may be submitted for check-in. So, only one version may need to be checked for errors.) Additionally, the PMO may enable import and delete functionality to enable users to deal with errors that may be considered more complex—like circular references or non-unique identifiers.

FIG. 46 is a quarantine checkout process 4800 according to an embodiment of the invention. This process 4800 may be used when quarantined files are to be checked out for error correction as described above, for example. In 4805, the system 110 may determine whether the user would like to edit in an offline mode or server linked mode. If the user prefers an offline download, in 4810 the system 110 may change an edit type variable associated with the data set to "error" from "design", and the data may remain locked. In 4815, the system 110 may set a "checkout owner" field associated with the data to the unique ID associated with the admin or PMO user. In 4820, the system 110 may load the quarantined data into a quarantined sandbox. In 4825, the system 110 may create a data set containing the sandbox data and/or database settings, for example a binary data, which may be made available for the user to download. The package available for download may include user ID data which may prevent users other than the requesting user from downloading, opening, and/or editing the package. See FIG. 34. If the user prefers a server link, in 4830 the system 110 may change an edit type variable associated with the data set to "error" from "design", and the data may remain locked. In 4835, the system 110 may set a "checkout owner" field associated with the data to the unique ID associated with the requesting user. In 4840, the system 110 may load the quarantined data into a quarantined sandbox. In 4845, the system 110 may wait for an SQL link or other link to be established by the user. When the link is established, in 4850 the system 110 may then initiate a "connect to quarantined data" wizard.

Connect to Quarantined Data Functionality

Figure 70:
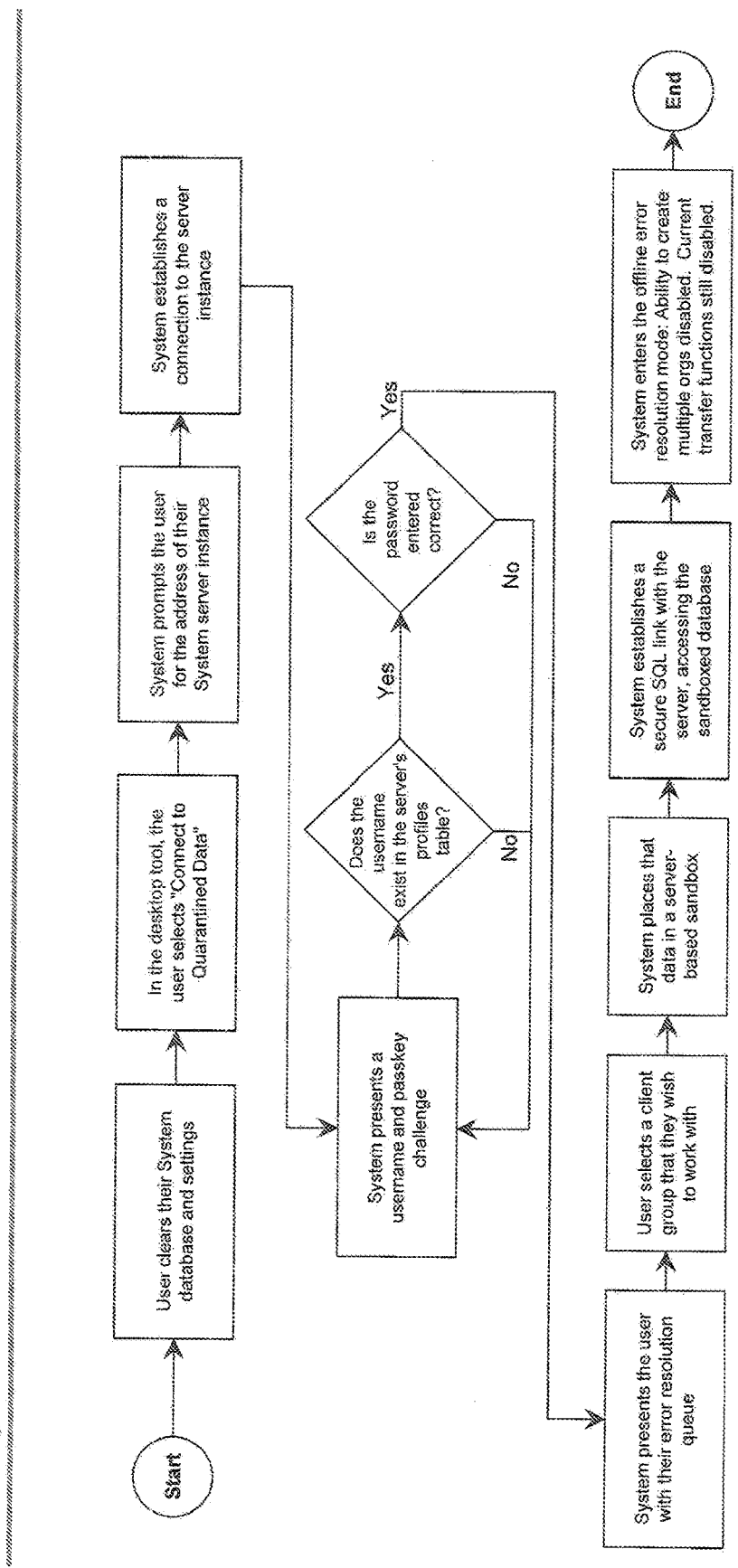
FIG. 70 is a connection process according to an embodiment of the invention.

FIG. 70 gives further detail on 4850, the connect to quarantined data wizard. The user may first clear their database and settings, which may allow the system 110 to redirect its database link to the quarantined data. The application may prompt the user for the address of their server instance. Once a connection has been established, the application may present the user with a username and passkey challenge. Once the system has successfully identified the user, it may present the user with an "error resolution queue," which may contain all the data sets that have been submitted, either by the user or by others over which the user has some responsibility. The user may then select a data set for checkout. The system may then establish a secure connection to the data and enter the "error resolution" mode described above.

Automatic Backups

Figure 32:
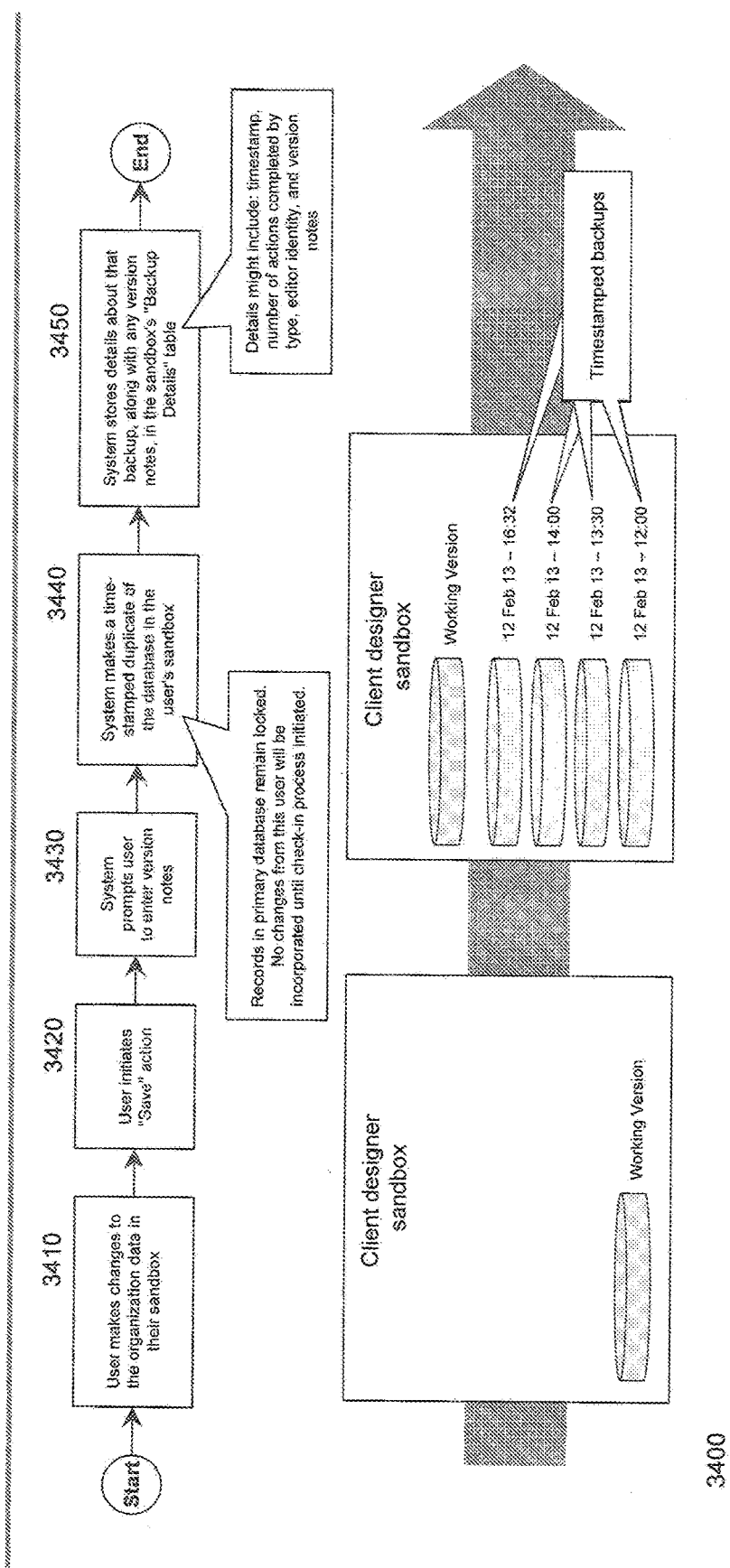
FIG. 32 is a save process according to an embodiment of the invention.

FIG. 32 is a save process 3400 according to an embodiment of the invention. This process 3400 may be used to allow users of an online tool described above to save data without checking in data. Note that users of an offline program who may have downloaded data may be able to save in other ways, as they may not need to check in data that is local to their own computer. In 3410, the system 110 may receive user changes in the sandbox data. In 3420, the system 110 may receive a save request. In 3430, the system 110 may prompt the user to enter notes about the save and may receive the user's entry. In 3440, the system 110 may create a duplicate of the sandbox data which may be time-stamped. In 3450, the system 110 may store details about the backup and/or the time stamp in a backup details table. Details may include: timestamp, number of actions completed by type, editor identity, and version notes, for example. Saved data may be purged as part of a check in process, as described above.

Figure 33:
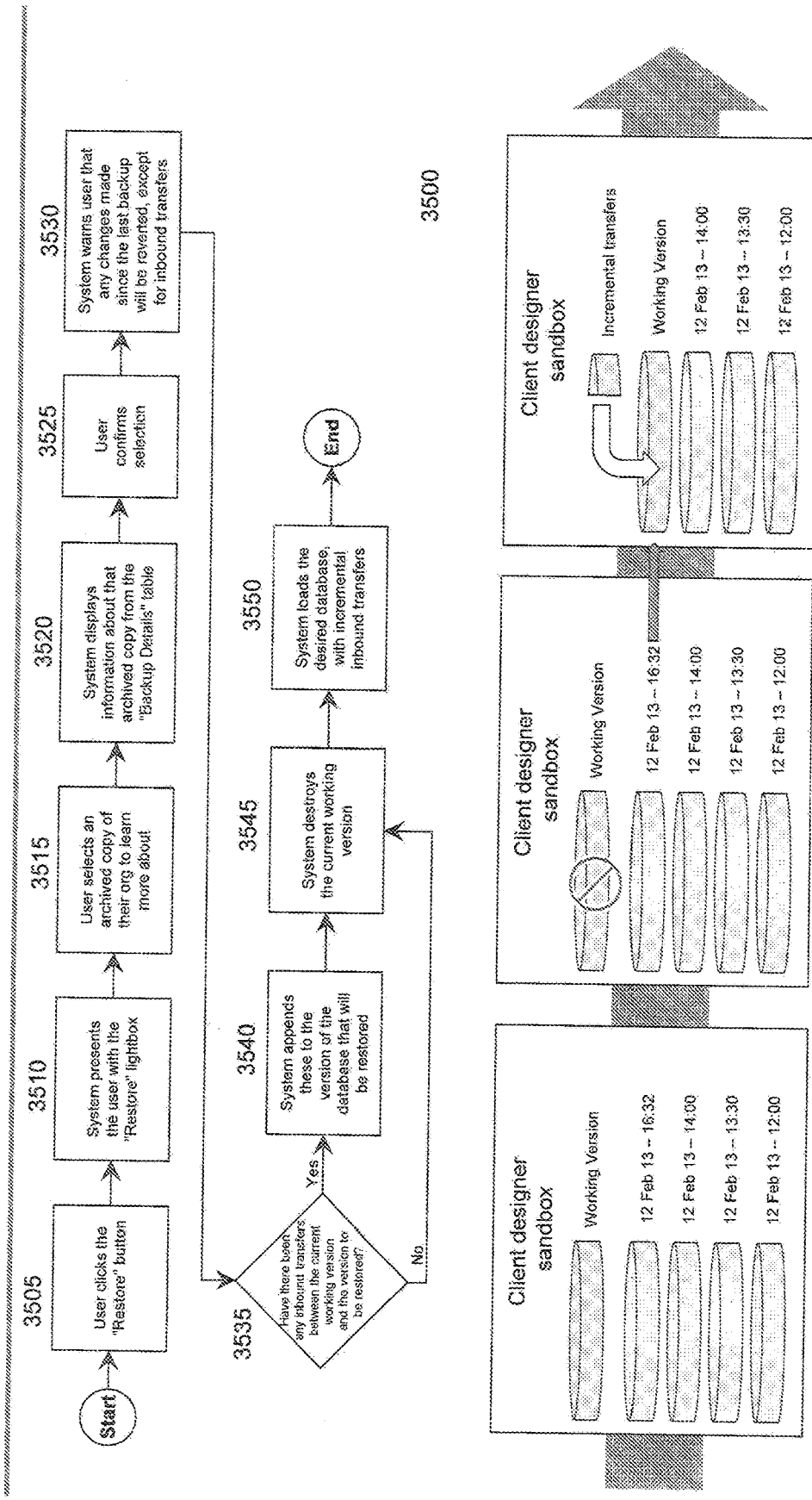
FIG. 33 is a load process according to an embodiment of the invention.

FIG. 33 is a load process 3500 according to an embodiment of the invention. This process 3500 may be used to retrieve backups stored via the save process 3400, for example. In 3505, the system 110 may receive a user request to restore saved data. In 3510, the system 110 may present data about stored backups to the user. In 3515, the system 110 may receive a user selection of an archived copy. In 3520, the system 110 may display additional details about the archived copy, for example the details saved in 3450 above. In 3525, the system 110 may receive user confirmation of the selection. In 3530, the system 110 may present a warning indicating that unsaved changes may be lost. In 3535, the system 110 may determine whether there have been any inbound transfers between the current working version and the version to be restored. If so, in 3540 the system 110 may append those to the data to be restored. After appending the changes, or if there were no inbound transfers, in 3545 the system 110 may destroy the current working version. In 3550 the system may load the requested data.

Figure 34:
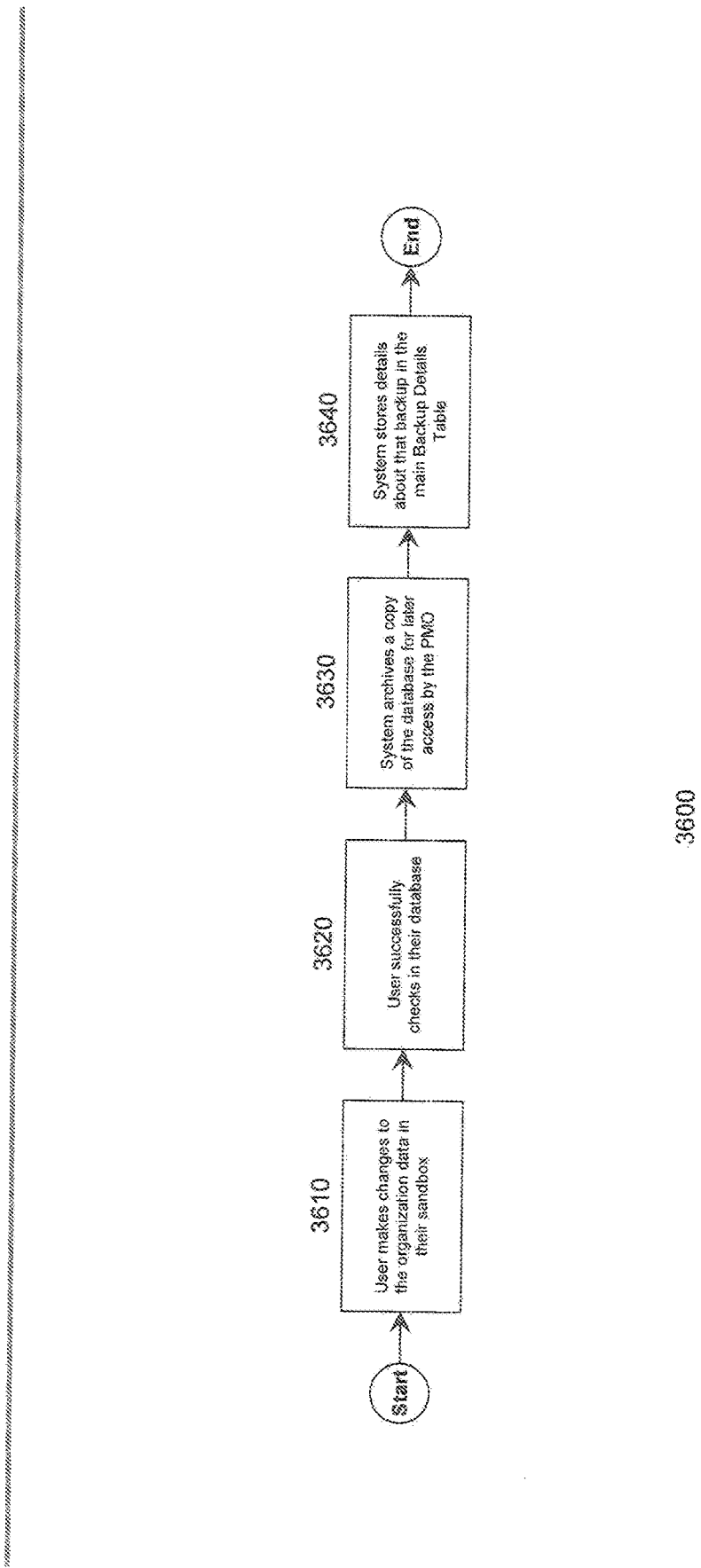
FIG. 34 is an automatic backup process according to an embodiment of the invention.

FIG. 34 is an automatic backup process 3600 according to an embodiment of the invention. This process 3600 may automatically back up data after each check in. In 3610, the system 110 may receive user changes in the sandbox data. In 3620, the system 110 may determine that the user has successfully checked in the data. In 3630, the system 110 may archive a copy of the database. In 3640, the system 110 may store details about the archived backup. Details may include: timestamp, number of actions completed by type, editor identity, and version notes, for example.

Figure 35:
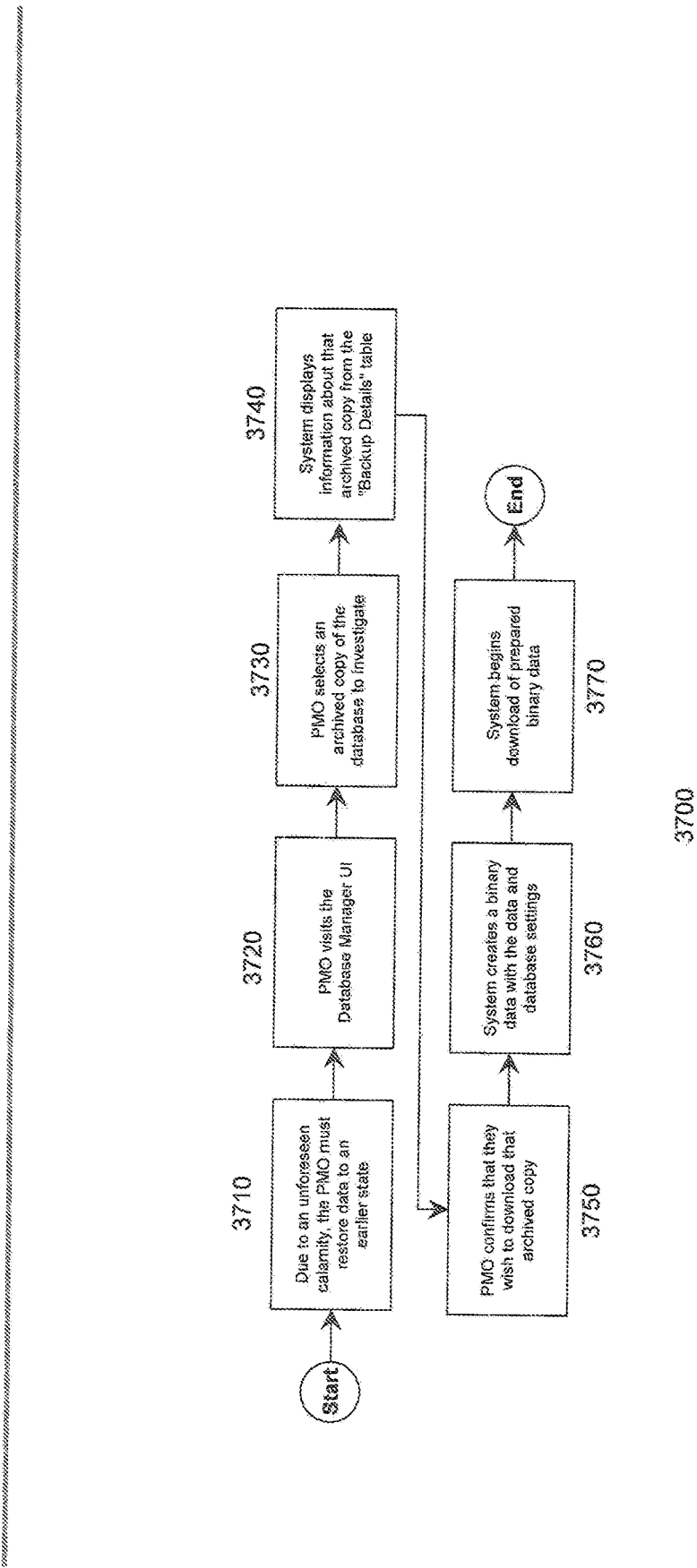
FIG. 35 is a backup download process according to an embodiment of the invention.

FIG. 35 is a backup download process 3700 according to an embodiment of the invention. This process 3700 may be used to retrieve a backup generated by the process 3600 described above, for example. In 3710, an admin may wish to restore data to an earlier state, and the system 110 may receive a request to display a database manager UI. In 3720, the system 110 may display the database manager UI. In 3730, the system 110 may receive a user selection of archived data to restore. In 3740, the system 110 may display data about the selected archive. In 3750, the system 110 may receive user confirmation that the archived data is to be restored. In 3760, the system 110 may create a file which may include the data and/or database settings. For example, this file may be a binary data file. In 3770, the system 110 may send the prepared file to the user.

FIG. 48 is a save process 5000 according to an embodiment of the invention. This process 5000 may be used when automatic backup (e.g., process 3600 described above) is enabled. This process 5000 may allow users of an online tool described above to save data without checking in data. Note that users of an offline program who may have downloaded data may be able to save in other ways, as they may not need to check in data that is local to their own computer. In 5010, the system 110 may receive user changes in the sandbox data. In 5020, the system 110 may receive a save request. In 5030, the system 110 may prompt the user to enter notes about the save and may receive the user's entry. In 5060 the system 110 may create a duplicate of the sandbox data which may be time-stamped. In 5070, the system 110 may store details about the backup and/or the time stamp in a backup details table. Details may include: timestamp, number of actions completed by type, editor identity, and version notes, for example. Saved data may be purged as part of a check in process, as described above Also, regardless of whether a user initiates a save backup request in 5030, in 5040 the system 110 may determine if automatic backups are to be created (e.g., due to a setting by a PMO), and in 5050, the system 110 may determine whether a time interval between saves (e.g., defined by a PMO) has elapsed. This may be done after every user change in 5010 and/or periodically. If both are true, in 5060 the system 110 may create a duplicate of the sandbox data which may be time-stamped. In 5070, the system 110 may store details about the backup and/or the time stamp in a backup details table. Details may include: timestamp, number of actions completed by type, editor identity, and version notes, for example. Saved data may be purged as part of a check in process, as described above.

Transferring Records in the Third Server Operating Model

Under the workstreams paradigm, as well as in server models 1 and 2 described above, the type of transfer employed is called "push." Push transfers may be transfers in which the initiating user owns the transferring record. Pull transfers may be transfers in which the requesting user initiates the transfer. The third server model may employ push transfers, as well as pull transfers. In some embodiments, these transfers may occur in real time, meaning that as soon as the initiating party completes their part of the transfer process, the receiving party may be notified that they have been transferred a record. In other embodiments, the system may employ a delay tactic, which may allow users additional certainty about their transfers. Specifically, the system may prevent records from being completely transferred until the initiator's data has been checked back in to the main database.

Push Transfer Initiation Through the Web Tool

FIG. 38 is a notification process 4000 according to an embodiment of the invention. This process 4000 may be performed after a transfer has been initiated to inform a recipient of an incoming transfer. For example, a user may be working on a checked-out client group while connected to a server of the system 110. In 4010, a client group to be transferred to this user's client group may be checked in. In 4020, the system 110 may change the client group identifiers for the transferring records, for example by examining the "to" field which may have been filled in as described above. In 4030, the system 110 may change the status of all transferring records from "outbound transfers" to "pending transfers". In 4040, the system 110 may copy the transferred record(s) to the user's sandbox. In 4050, the system may notify the user that a record has been added to their "pending transfers" pool.

FIGS. 36A-36B show a transfer process 3800 according to an embodiment of the invention. This process 3800 may be used for push transfer through a web tool embodiment, for example. In 3802, the system 110 may receive a user selection of a record to be transferred to another client group. In 3804, the system 110 may receive a command to transfer the record. In 3806, the system 110 may determine whether the selected record is a manager record, for example by checking a field containing such data. If the record is a manager record, in 3808 the system may search hierarchy data for the organization for positions that sit under the manager, and in 3810 the system 110 may store identifiers for positions under the manager in a temporary storage. In 3812, the system 110 may prompt the user to determine an outcome for the manager's reporting organization. The user may be able to select a variety of options. For example, in 3814 the system 110 may receive a user command to move positions under the manager into a pool. If so, in 3816 the system 110 may change fields in the returned records under the manager to indicate the pool for each record, and in 3818 the system 110 may delete supervisor IDs for any records that are directly under the manager. In another example, in 3820 the system 110 may receive a user command to roll records under the manager to the manager's supervisor. In response, in 3822 the system 110 may change the supervisor IDs for any records directly under the manager to the ID of the manager's supervisor. In another example, in 3824 the system 110 may receive a user command to move subordinate records with the selected manager record.

After the subordinate records have been handled, or if the record is not a manager, in 3826 the system 110 may display a company directory and may prompt the user to search for and/or select the target manager. In 3828, the system 110 may determine whether the user selected a target manager. If so, in 3830 the system 110 may change the supervisor ID of the selected record to the target manager. If not, or after changing the supervisor ID, in 3832 the system 110 may create "to" and "from" flags that may indicate the starting and ending client groups for the selected record (and records that sit under it, if they are also moving). In 3834, the system 110 may change the pool of records to an "outbound transfers" setting. In 3836, the system 110 may receive the user's final changes to the data, and in 3838, the system 110 may check in the user's work as described in greater detail below. In 3840, the system 110 may perform a quarantine protocol such as those described in greater detail below. If errors are present, in 3842 the system 110 may receive user error corrections, and in 3844 the system 110 may receive admin error corrections. In 3846, the system 110 may merge the checked out data in with the other org data. In 3848, the system 110 may change client group identifiers for the transferring records, for example by utilizing the "to" field filled in as described above. In 3850, the system 110 may change the status of transferring records from "outbound transfers" to "pending transfers".

Figure 58C:
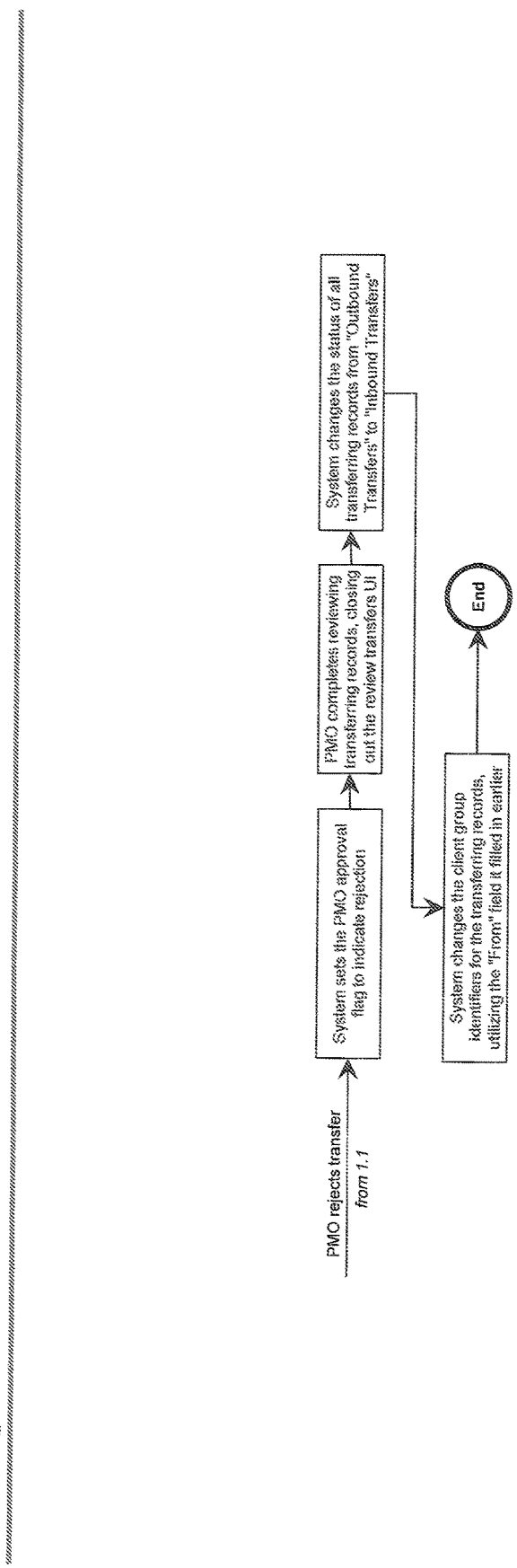

FIGS. 58A-58C illustrate an alternate transfer process, including PMO rejection options.

Placing, Rejecting, and Cancelling Transfers

FIG. 37 is a transfer process 3900 according to an embodiment of the invention. This process 3900 may be used to handle inbound transfers after a login event. In 3905, the system 110 may log in a user after the user passes a login challenge. In 3910, the system 110 may receive a user selection of a group to be checked out. In 3915, the system 110 may check out the selected group and place the group data in a user sandbox. At this point, all of the records that have been transferred to this client group but not yet placed may be in its "pending transfers" pool. In 3920, the system 110 may receive a user request to view transfers for the group. In 3925, the system 110 may display the contents of the "pending transfers", "returning rejected transfers", "outbound rejected transfers", and/or "outbound transfers" pools. In 3930, the system 110 may receive a user selection of a record in the pending transfers pool. In 3935, the system 110 may receive a user command to place the selected transfer. The system 110 may display top level managers and, in some cases, a representation of their teams. Teams may be kept together when displayed by the system 110 in this part of the process 3900.

In 3940, the system 110 may present a transfer placement UI to the user and receive user rejection or acceptance of the transfer. If the user rejects the transfer, in 3945 the system 110 may place the rejected record(s) in the "outbound rejected transfers" pool. In 3950, the system 110 may then reverse the "to" and "from" flags in each record. If the user accepts the transfer, in 3955 the system 110 may determine whether a target manager has been suggested. If no target manager has been suggested, in 3960 the system 110 may prompt the user to select a manager, and in 3965 the system 110 may receive the user selection. If a target manager has been suggested, in 3970 the system 110 may ask the user whether they would like to keep the suggested manager. In 3975, the system 110 may receive a user choice to select a new target manager. In this case, in 3960 the system 110 may prompt the user to select a manager, and in 3965 the system 110 may receive the user selection. In 3980, the system 110 may receive user confirmation of the target manager. Once a target manager has been either confirmed or selected, in 3985 the system 110 may change a supervisor ID of the selected record to correspond to the target manager. In 3990, the system 110 may display a summary of the transfer.

Figure 59:
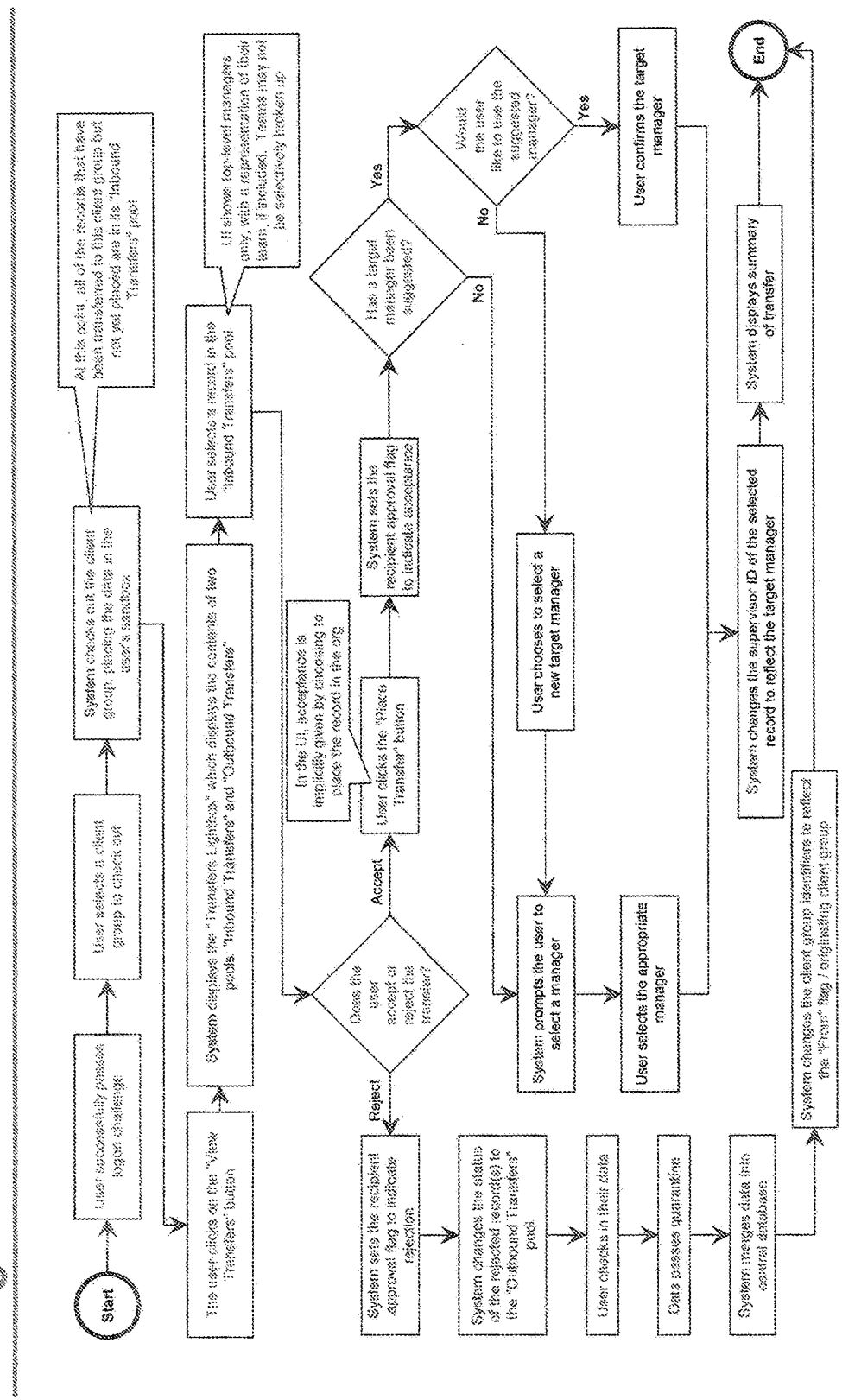
FIG. 59 is a transfer process according to an embodiment of the invention.

FIG. 59 shows another example of a transfer process, including rejection of transfers.

Figure 40:
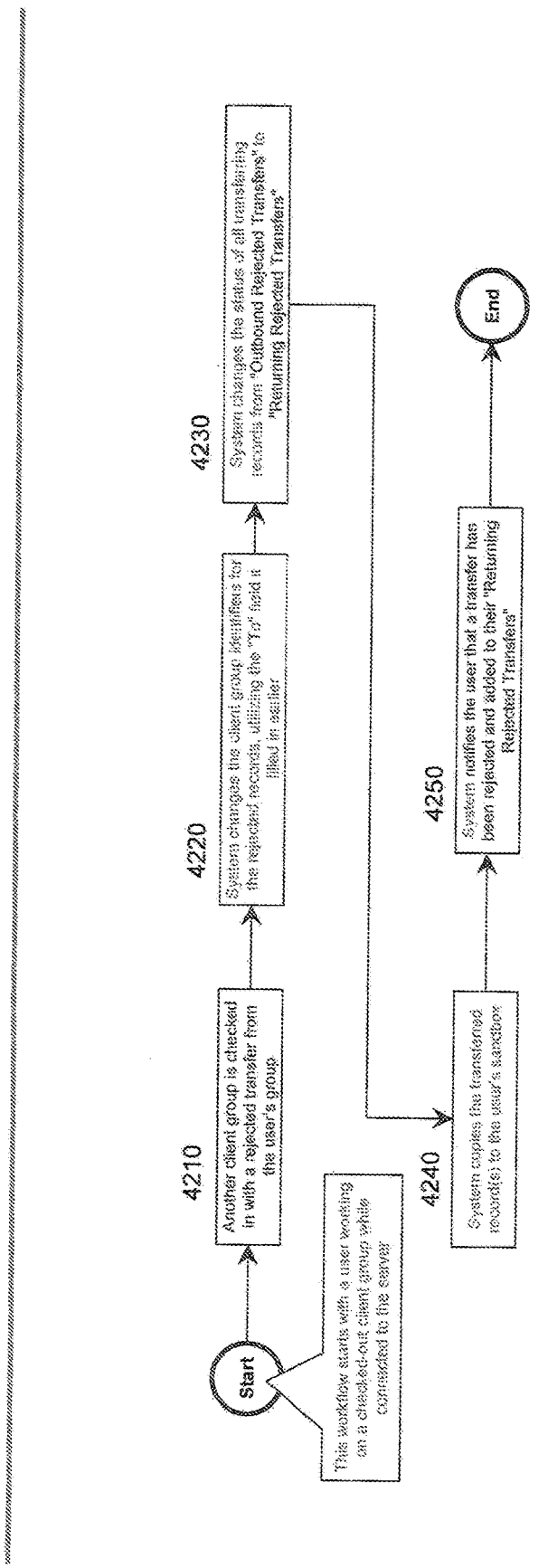
FIG. 40 is a transfer return process according to an embodiment of the invention.
Figure 60:
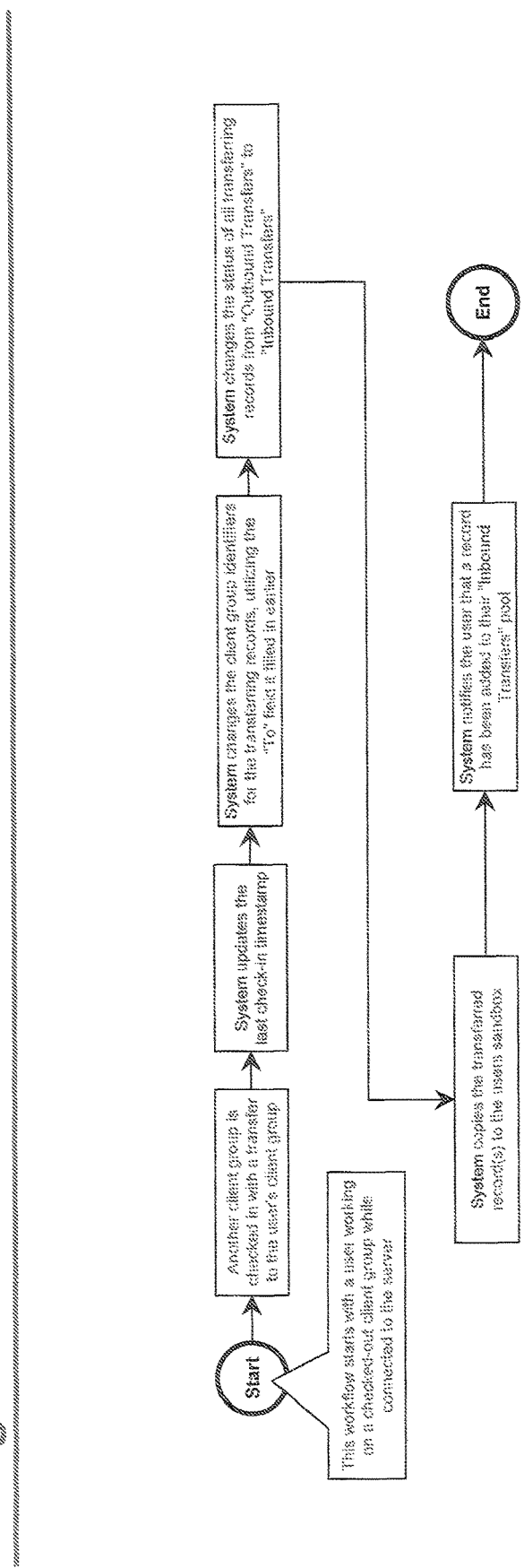
FIGS. 60-61 are transfer return and/or notification processes according to an embodiment of the invention s.
Figure 61:
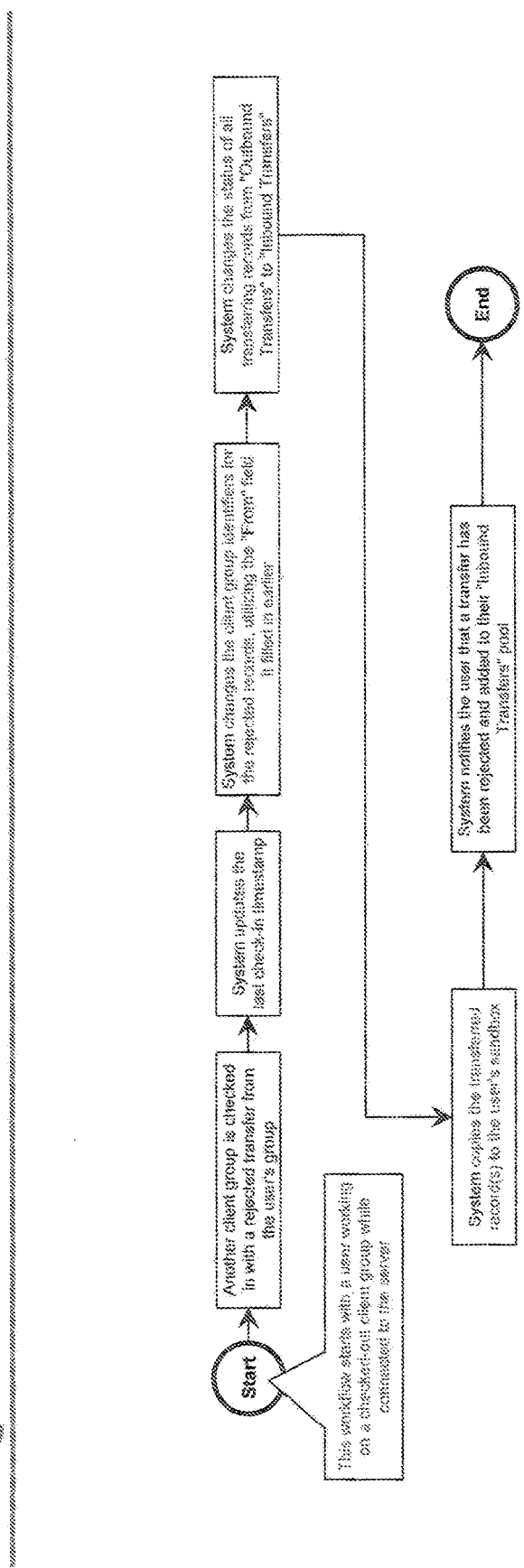

FIG. 40 is a transfer return process 4200 according to an embodiment of the invention. This process 4200 may be performed after a transfer has been rejected. For example, a user may be working on a checked-out client group while connected to a server of the system 110. In 4210, another client group may be checked in with a rejected transfer from the user's group. In 4220, the system 110 may change the client group identifiers for the rejected records, for example by utilizing the "to" field filled in as described above. In 4230, the system 110 may change the status of transferring records from "outbound rejected transfers" to "returning rejected transfers". In 4240, the system 110 may copy the transferred record(s) to the user's sandbox in 4250, the system 110 may notify the user that a transfer has been rejected and added to their "returning rejected transfers." FIGS. 60-61 illustrate other examples of transfer return and/or notification processes.

Requesting a Pull Transfer

Figure 39:
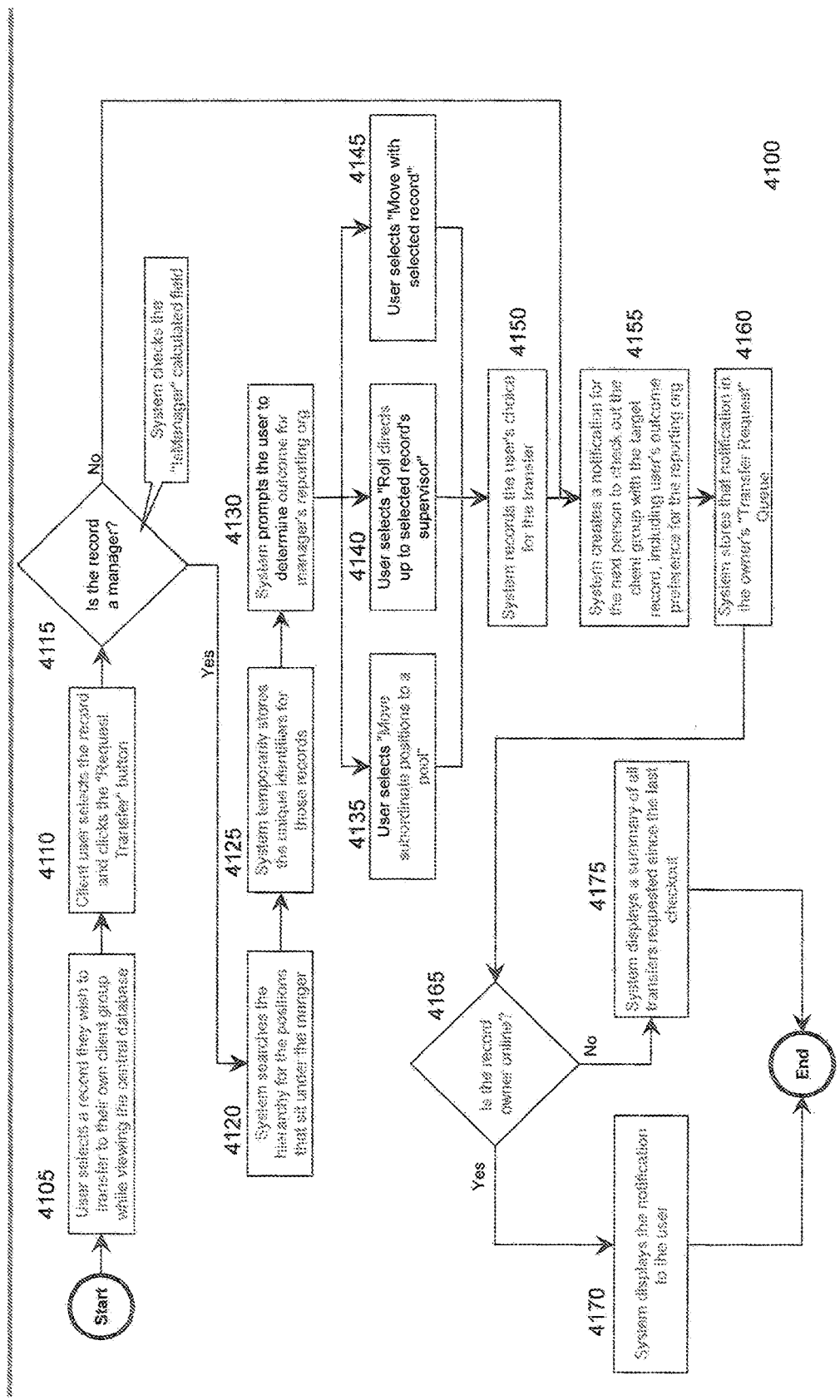
FIG. 39 is a transfer request process according to an embodiment of the invention.

FIG. 39 is a transfer request process 4100 according to an embodiment of the invention. This process 4100 may enable the system 110 to accept and process user requests to transfer records to their own groups. In 4105, the system 110 may receive a user selection of a record they wish to transfer to their own client group. In 4110, the system 110 may receive a user request to transfer the selected record. In 4115, the system 110 may determine whether the selected record is a manager record. If so, in 4120 the system 110 may identify positions beneath the manager, and in 4125 the system 110 may temporarily store unique identifiers for identified positions beneath the manager. In 4130, the system 110 may prompt the user to determine an outcome for the manager's reporting org. In 4135, the system 110 may receive a user selection that subordinate positions may be moved to a pool. In 4140, the system 110 may receive a user selection to roll records under the manager to the manager's supervisor In 4145, the system 110 may receive a user selection to move the subordinate positions with the selected record. In 4150, the system 110 may record the user's choice for the transfer. After recording this choice, or if the record is not a manager record, in 4155 the system 110 may create a notification for the next person to check out the client group with the target record, which may include the user's outcome preference for the reporting org. In 4160, the system 110 may store the created notification in the record owner's transfer request queue. In 4165, the system 110 may determine whether the record owner is online. If so, in 4170 the system 110 may display the notification to the record owner. If not, in 4175 the system 110 may display a summary of all transfers requested since the last checkout.

Figure 62:
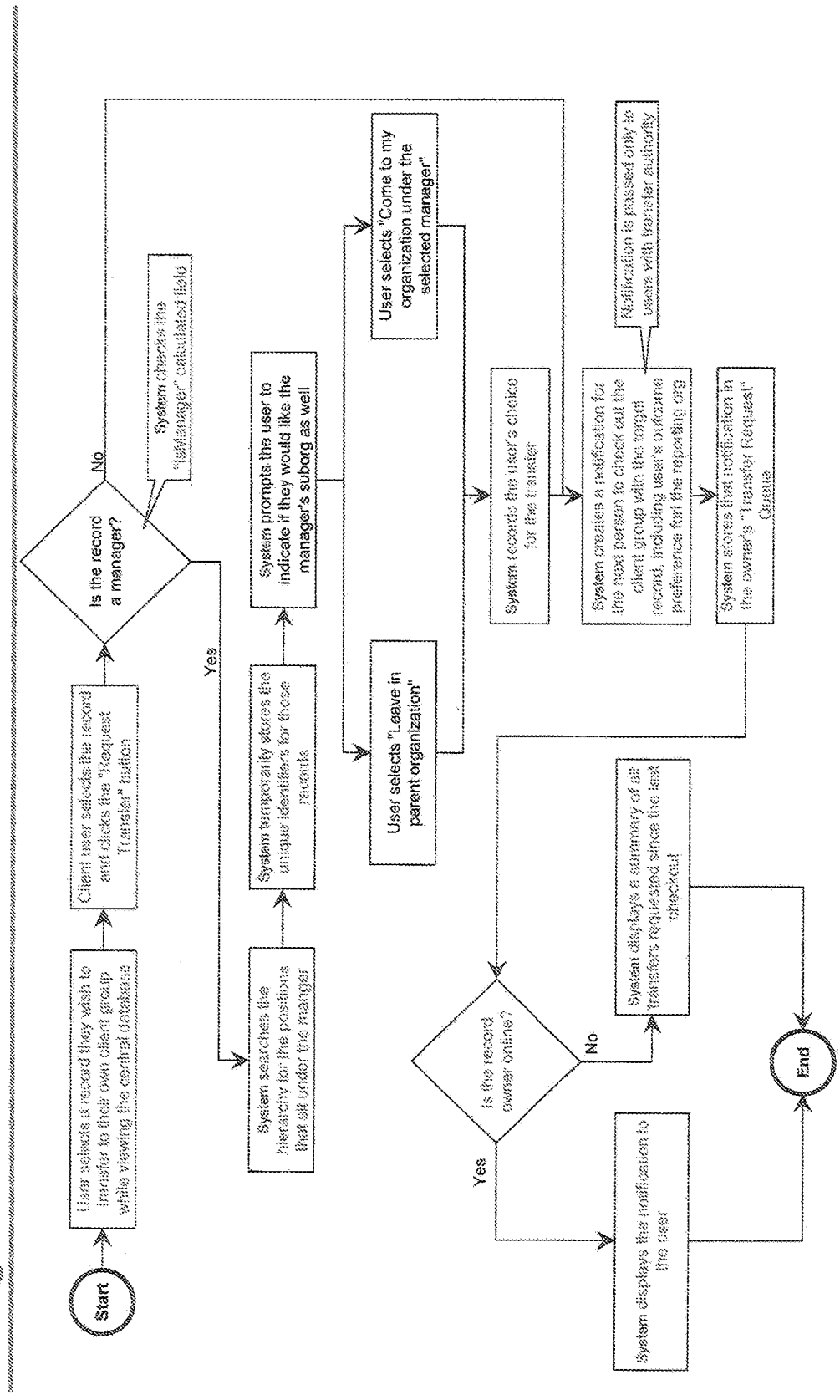
FIG. 62 is a request for transfer process according to an embodiment of the invention.

FIG. 62 illustrates another request for transfer example process.

FIG. 25 is a change of control process 2600 according to an embodiment of the invention. As discussed above, this process 2600 may be performed in response to a checkout process 2300/2400/2500. If the user who has currently checked out the data agrees to relinquish control, in 2610 the system 110 may receive notification from that user that they have checked in their data. The system 110 may run a check in protocol, such as the process 2700 described in FIG. 26 below. In 2620, the system 110 may keep all the records locked. Then, the system 110 may run the desired checkout process 2300/2400/2500 as discussed above. After this change of control process 2600 has taken place, the checkout process 2300/2400/2500 may enable user checkout of the data as described above.

Figure 28:
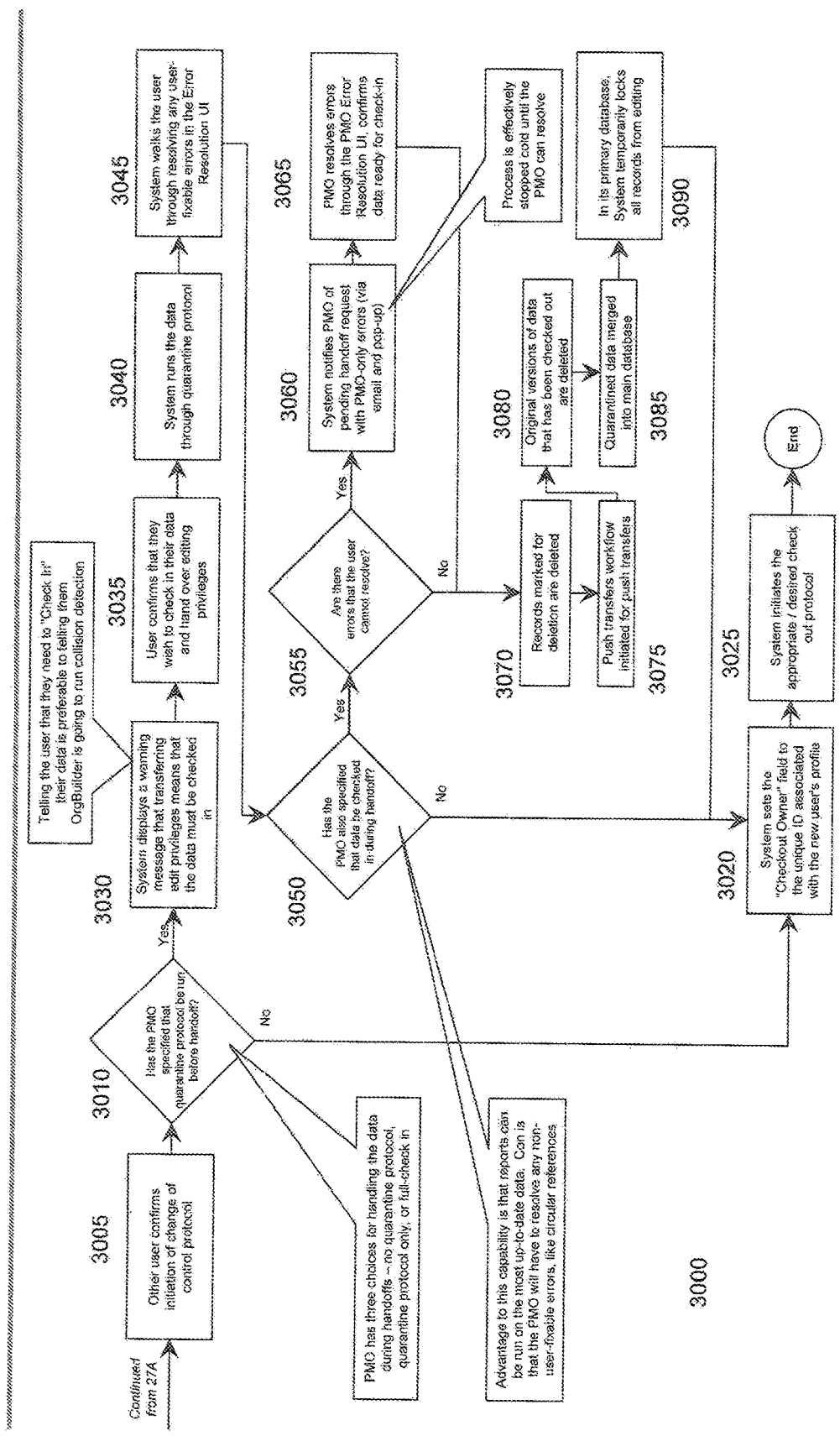
FIG. 28 is a change of control process according to an embodiment of the invention.

FIG. 28 is another change of control process 3000 according to an embodiment of the invention. As discussed above, this process 3000 may be performed in response to a checkout process 2900. If the user who has currently checked out the data agrees to relinquish control, in 3005 the system 110 may receive notification from that user that they have confirmed initiation of change of control protocol. In 3010, the system 110 may determine whether a quarantine protocol should be run before handoff. If no quarantine protocol should be run, in 3020 the system may set the "checkout owner" field to the unique ID associated with the new user's profile, and in 3025 the system may initiate a check out protocol. If a quarantine protocol should be run, in 3030 the system 110 may display a warning message that transferring edit privileges means that the data must be checked in. In 3035, the system 110 may receive user confirmation that the data may be checked in and editing privileges may be transferred. In 3040, the system may run a quarantine protocol, examples of which are described in greater detail below. In 3045, the system 110 may assist a user in correcting any errors found through the quarantine process. In 3050, the system 110 may determine whether the data must also be checked in. If the data need not be checked in, in 3020 the system may set the "checkout owner" field to the unique ID associated with the new user's profile, and in 3025 the system may initiate a check out protocol. If the data should be checked in, in 3055 the system 110 may determine whether there are errors present which a user may be unable to resolve. If such errors are present, in 3060 the system 110 may notify an admin of the errors, and in 3065 the system 110 may receive admin correction of the errors and confirmation that the data is ready for check in. After such confirmation and correction are received, or if no errors were present, in 3070 the system 110 may delete any records marked for deletion. In 3075, the system 110 may push transfer any workflows initiated for push transfer. In 3080, the system 110 may delete any original versions of data that have been checked out. In 3085, the system 110 may merge any quarantined data to the database. In 3090, the system 110 may temporarily lock records in the primary database. Then, in 3020 the system may set the "checkout owner" field to the unique ID associated with the new user's profile, and in 3025 the system may initiate a check out protocol.

FIG. 47 is a control change process 4900 according to an embodiment of the invention. This process 4900 may be performed in response to a control change request from a first user when another user has data checked out as described above, for example. In 4905, the system 110 may receive confirmation from the other user who has data checked out that the change may take place. In 4910, the system 110 may warn the current user that the data must be checked in. In 4915, the system 110 may receive user confirmation that the data may be checked in and editing privileges may be transferred. In 4920, the system 110 may perform a quarantine protocol such as those described above. In 4925, the system 110 may perform a user error resolution process such as those described above. In 4930, the system 110 may determine whether a PMO has specified that data must be checked in during handoff. Checking in during handoff may allow reports to be run on the most up to date data, for example. If there is no such specification, in 4935 the system 110 may set a "checkout owner" field to the unique ID associated with the first user. In 4940, the system 110 may initiate a checkout protocol such as those described above.

If a PMO has specified that data must be checked in during handoff, in 4945 the system 110 may determine whether there are outstanding errors. If so, in 4950 the system 110 may notify an admin of the errors, and in 4955 the system 110 may receive corrections of the errors, for example as described above. After error correction, or if there were no errors, in 4960 the system 110 may delete records marked for deletion. In 4965, the system 110 may initiate a push transfer workflow for outstanding push transfers. In 4970, the system 110 may delete original versions of data that has been checked out. In 4975, the system 110 may merge quarantined data into the database. In 4980, the system 110 may lock records in the database from editing. In 4935 the system 110 may set a "checkout owner" field to the unique ID associated with the first user. In 4940, the system 110 may initiate a checkout protocol such as those described above. Note that in some embodiments, there may be no option to handoff without quarantine.

Transfer Flags

FIG. 54 is a table of example fields which may indicate, among other things, how data may be flagged for transfer, according to an embodiment of the invention. By "flagging," we mean appending, editing, and managing fields in the person and position tables of the relational database that may be employed to accomplish an objective—in this case, providing critical information to the system during the above outlined transfers workflows (e.g. providing text for task dialog boxes) and providing a trail of data that may allow the project management office to audit transfers. Alternate embodiments of the invention may store the fields relating to transfers in their own dedicated table, etc. The fields employed by this embodiment and detail in FIG. 54 break down into a few major groups:

- "Pathing" fields may be used to store the originating client group and destination client group.
- "Reporting Line" fields may be used to capture information about the record's immediate supervisor. When a reporting org or team of records is transferred, these fields may be most relevant to the team leader, as the team members may all maintain the team leader as their supervisor.
- The "Recipient Approval" field indicates the status of the transfer in regard to the recipient. Similarly, the "PMO Approval" indicates the status of the transfer in regard to the PMO. When a rejected transfer is returned to a user, the PMO and Recipient approval values indicate may by whom the record was rejected.
- "Pool" fields are utilized, as elsewhere in the application, to indicate the records' pool. Most relevant to transfers in this embodiment are the following pools: "Organization Tree," "Inbound Transfers," and "Outbound Transfers." In alternate embodiments, more organizational containers may be employed.
- "Audit" fields may facilitate transferring the transfer overall, as well as when specific actions occurred (e.g. PMO approval).
- "I/O Privileges" fields are used to indicate to which client group the records belong. A user with read/write access to that client group may be able to edit the record.
- The "Communication" field is used to indicate the last person to "touch" the record. Specifically, in the embodiment in which the execution of transfers is delayed until data check-in, the field contains the full name of the user profile that last checked in the data. The field may be used to populate task dialog boxes describing the transfers process, for example "John Smith rejected your transfer of 13 May 2012."

As records pass through the transfer process, the system 110 may change specific values of the above-described flags. Four example workflows are provided. In the following four workflows, changes may be observed in the fields displayed for each step. These field changes may represent the system 110 changing values of the above-described flags.

Figure 71A:
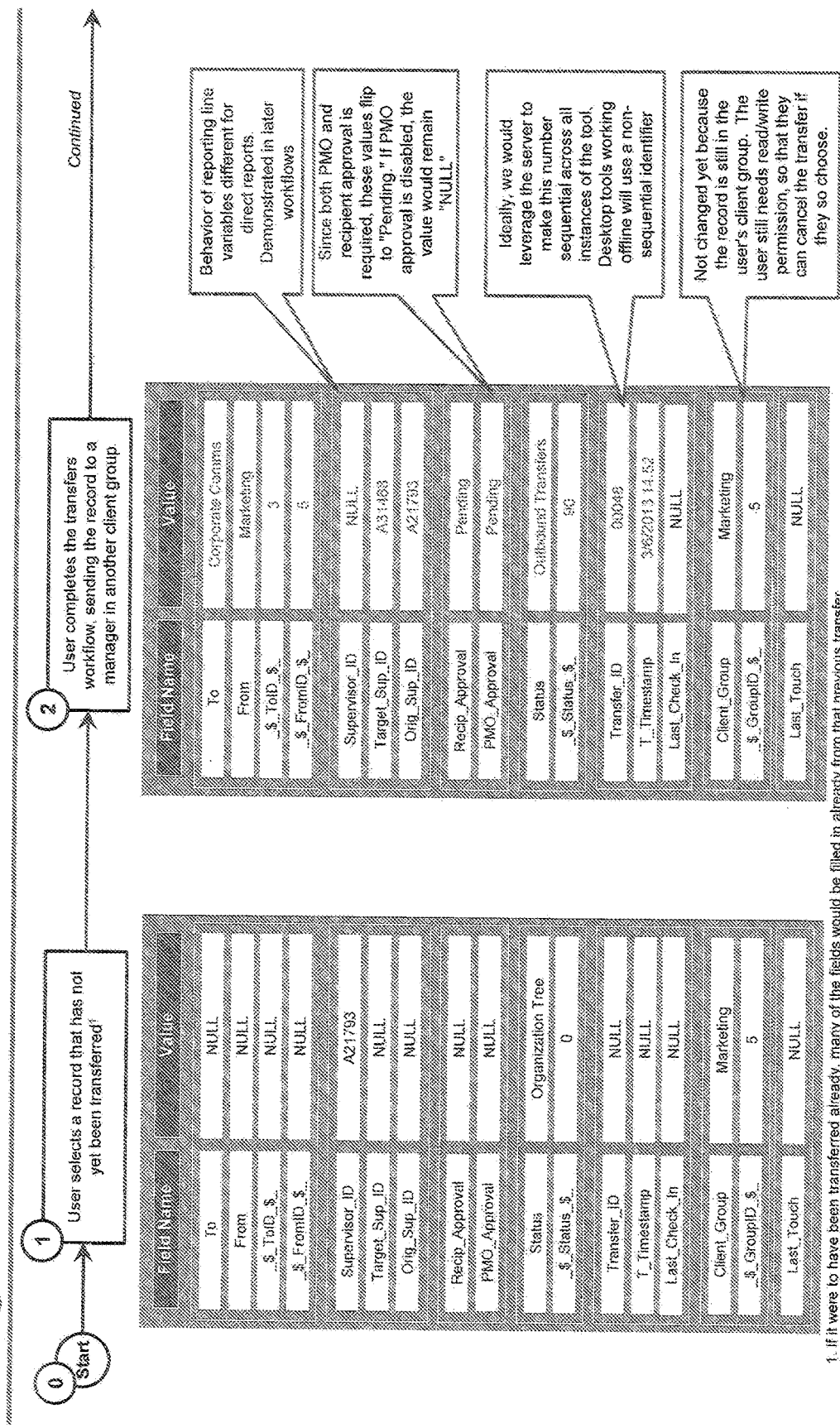
FIGS. 71A-71C show a transfer process according to an embodiment of the invention.
Figure 71B:
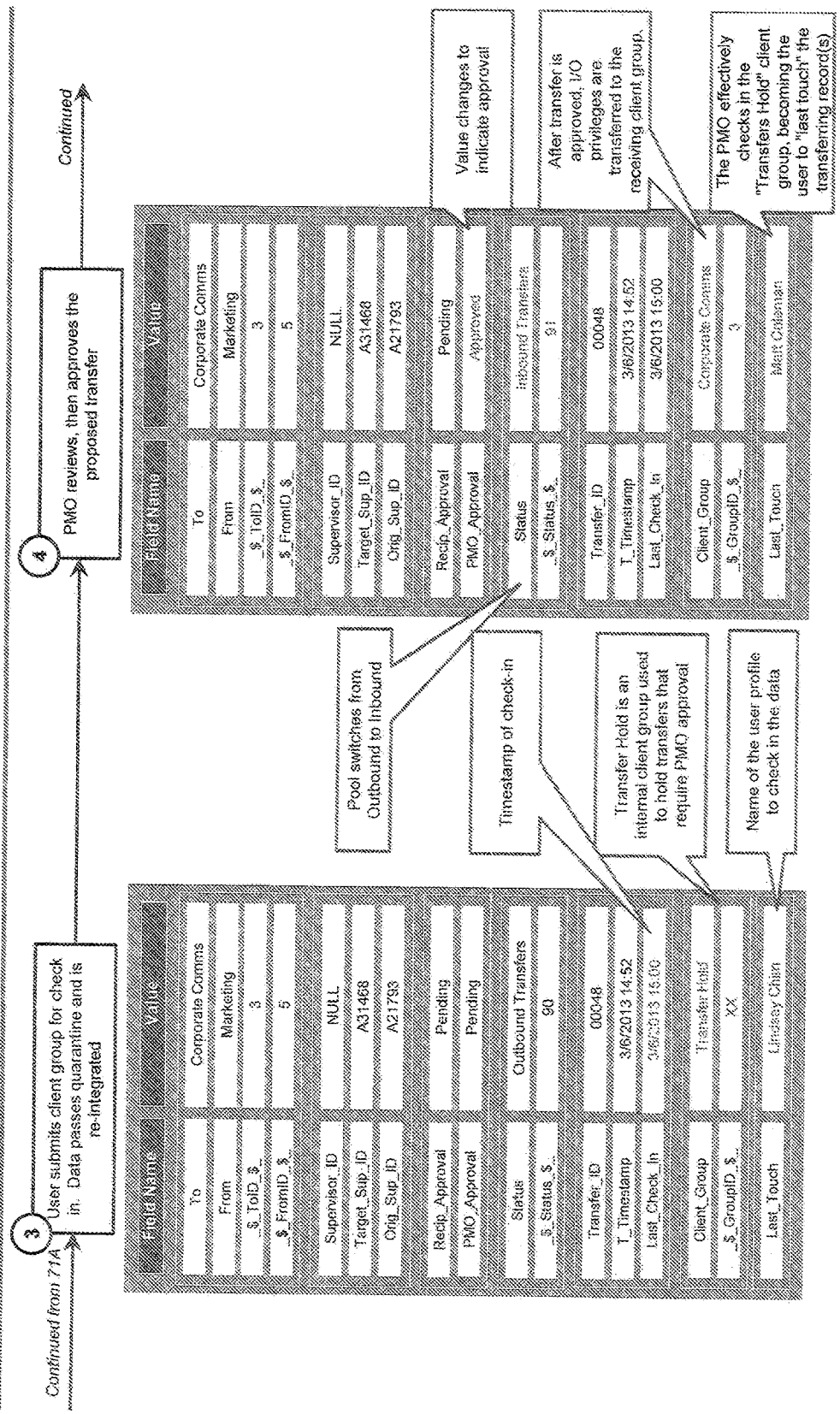
Figure 71C:
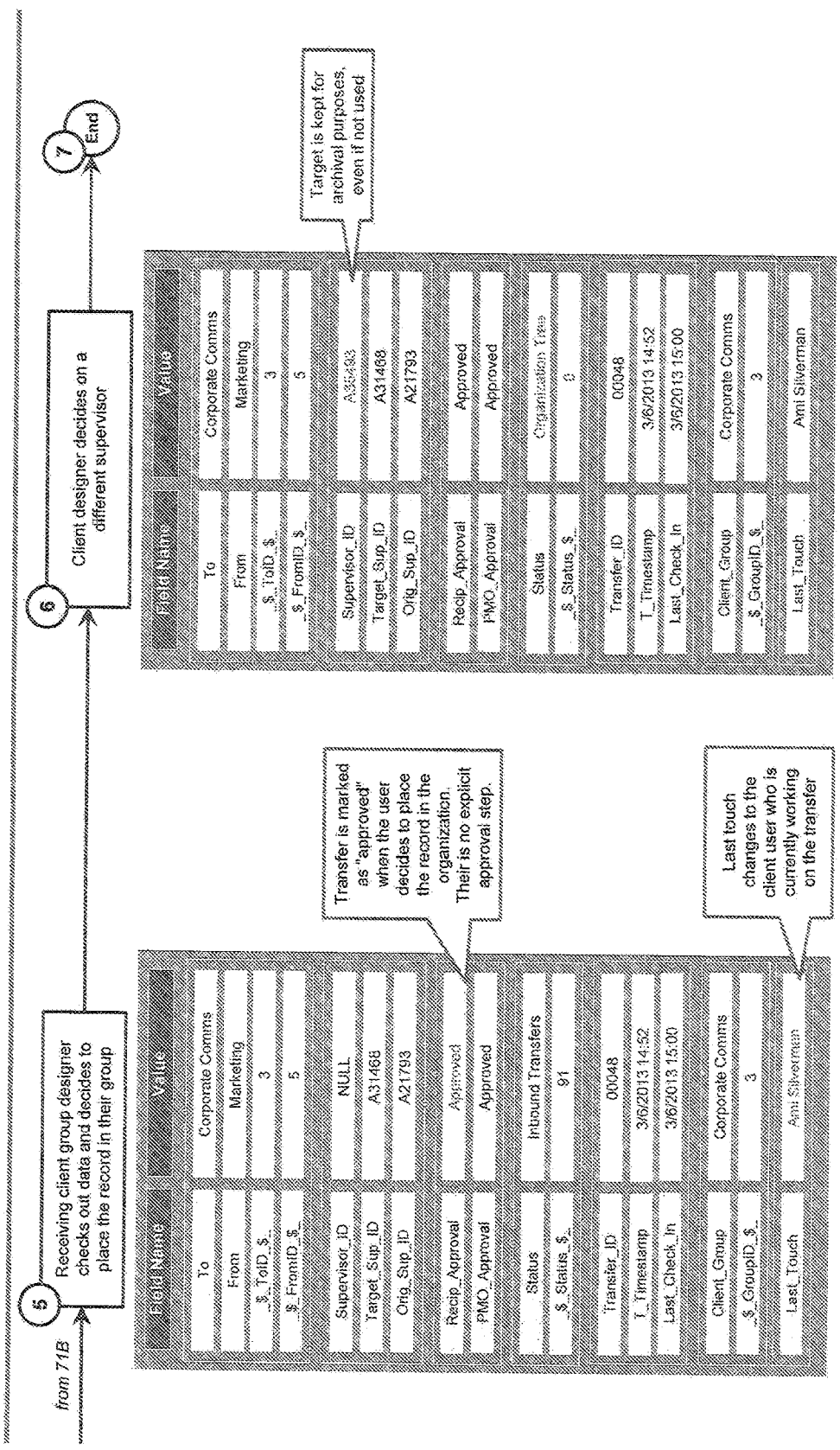

FIGS. 71A-C—Approved transfer workflow for top-level/node record

Figure 72A:
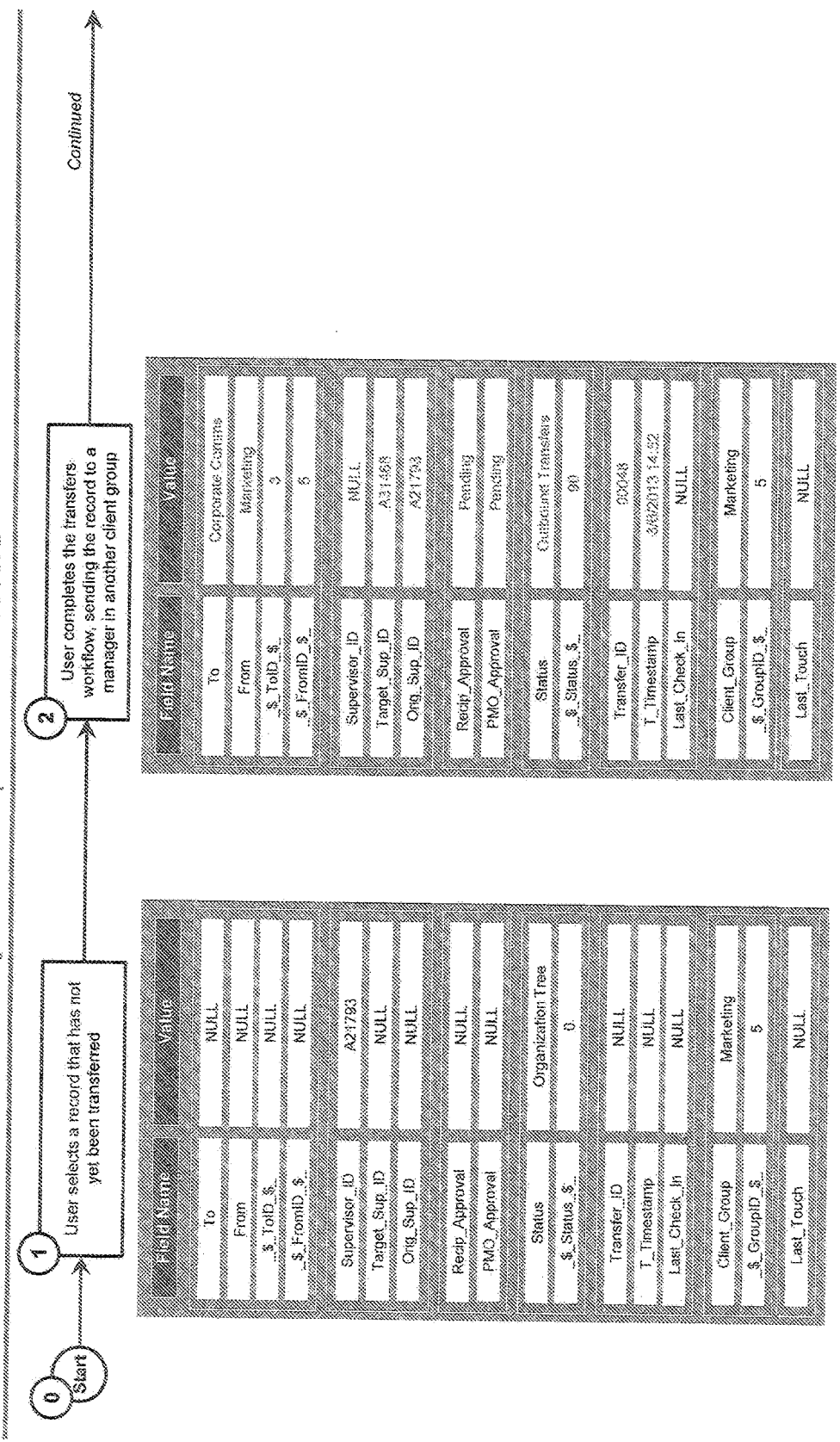
FIGS. 72A-72B show a transfer process according to an embodiment of the invention.
Figure 72B:
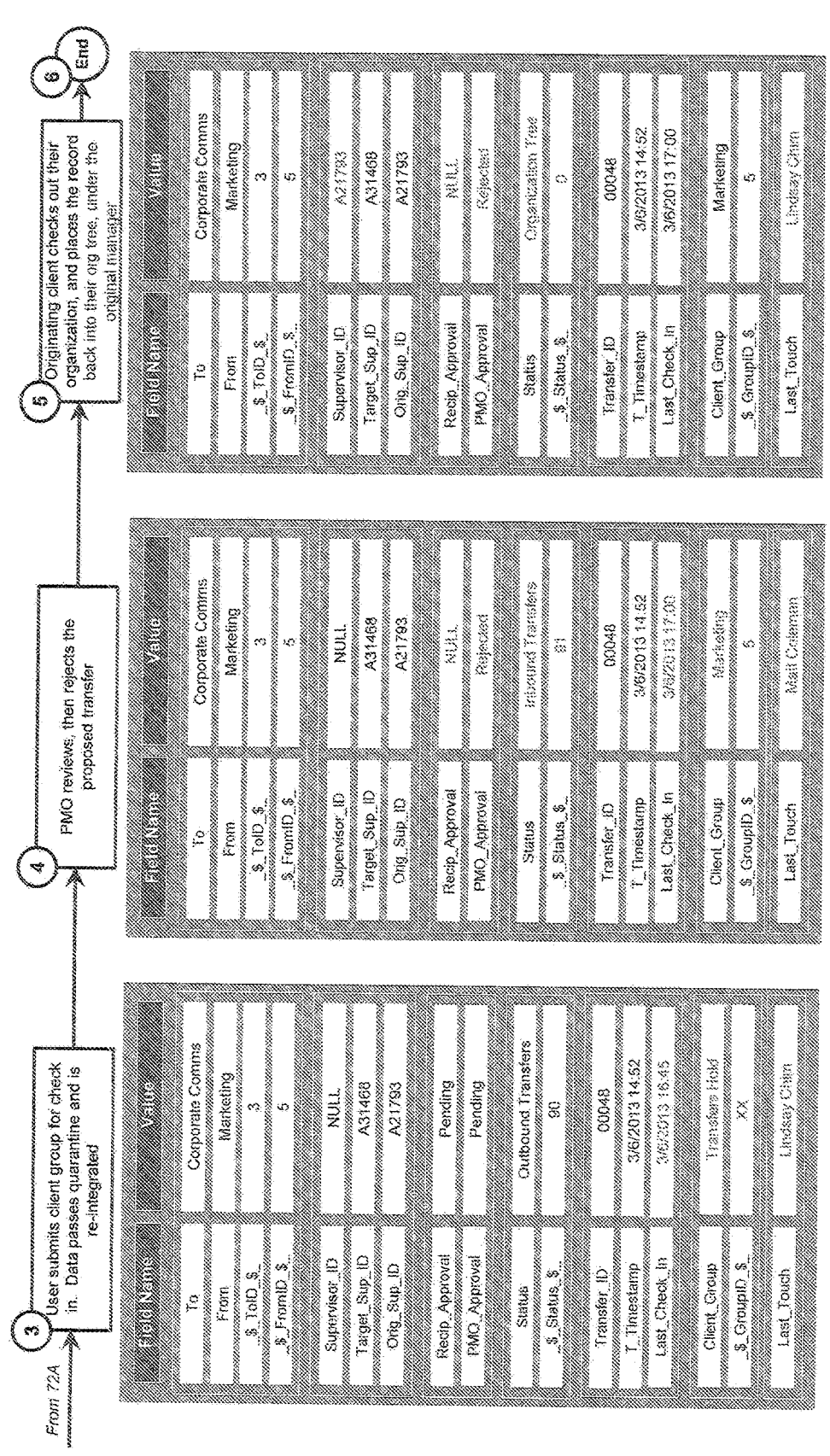

FIGS. 72A-B—PMO rejection of transfer for top-level/node record

Figure 73A:
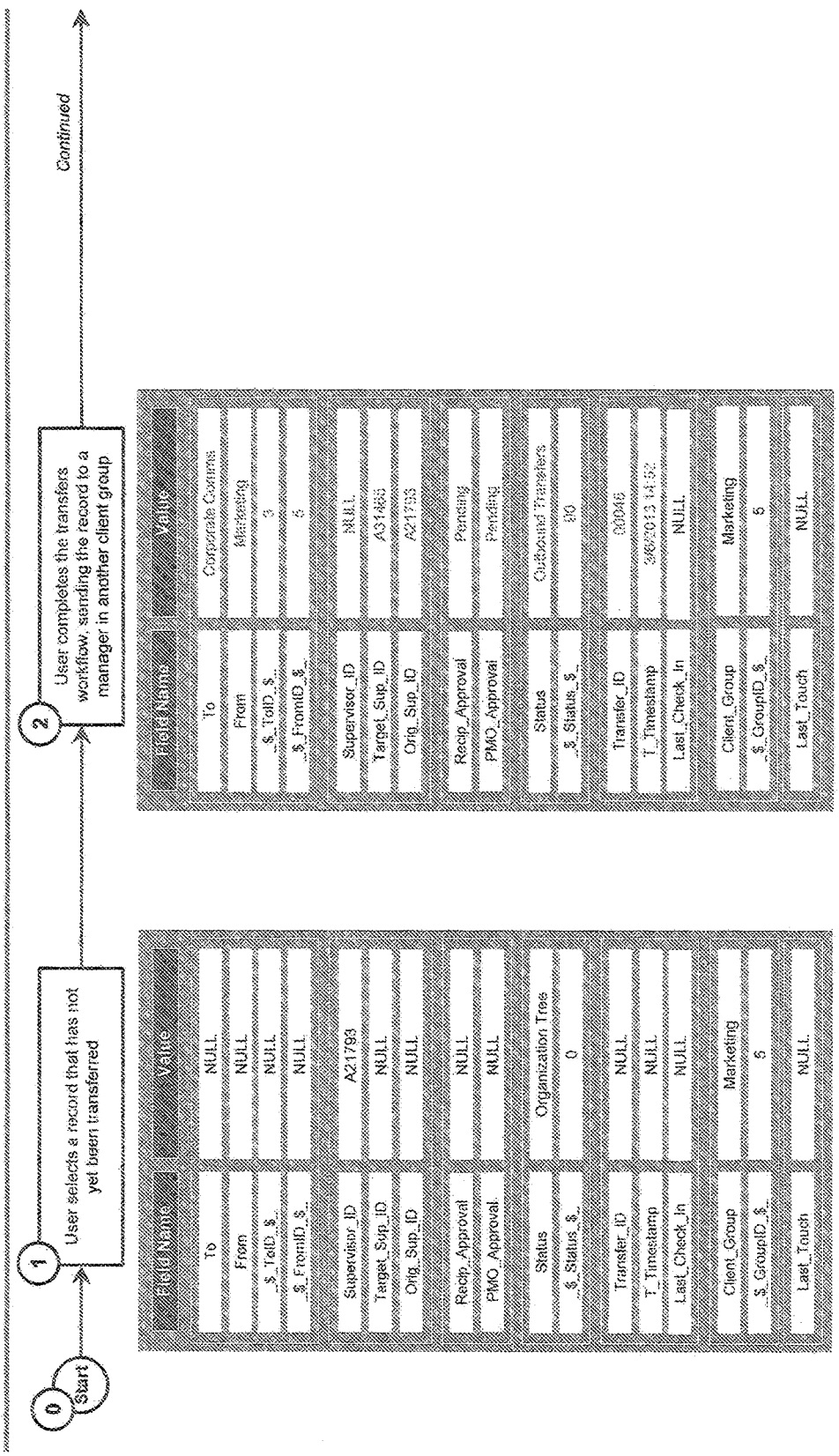
FIGS. 73A-73C show a transfer process according to an embodiment of the invention.
Figure 73B:
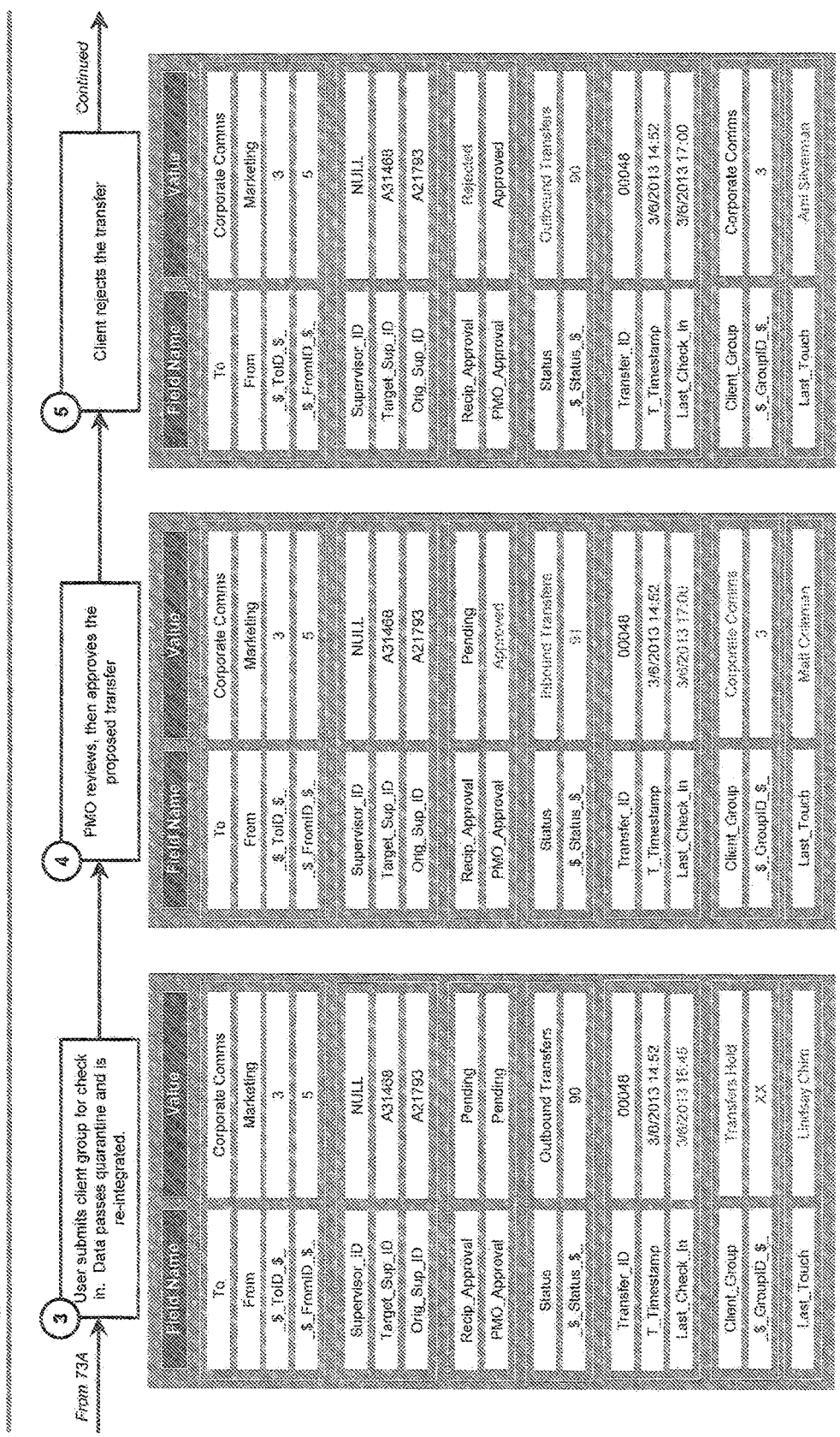
Figure 73C:
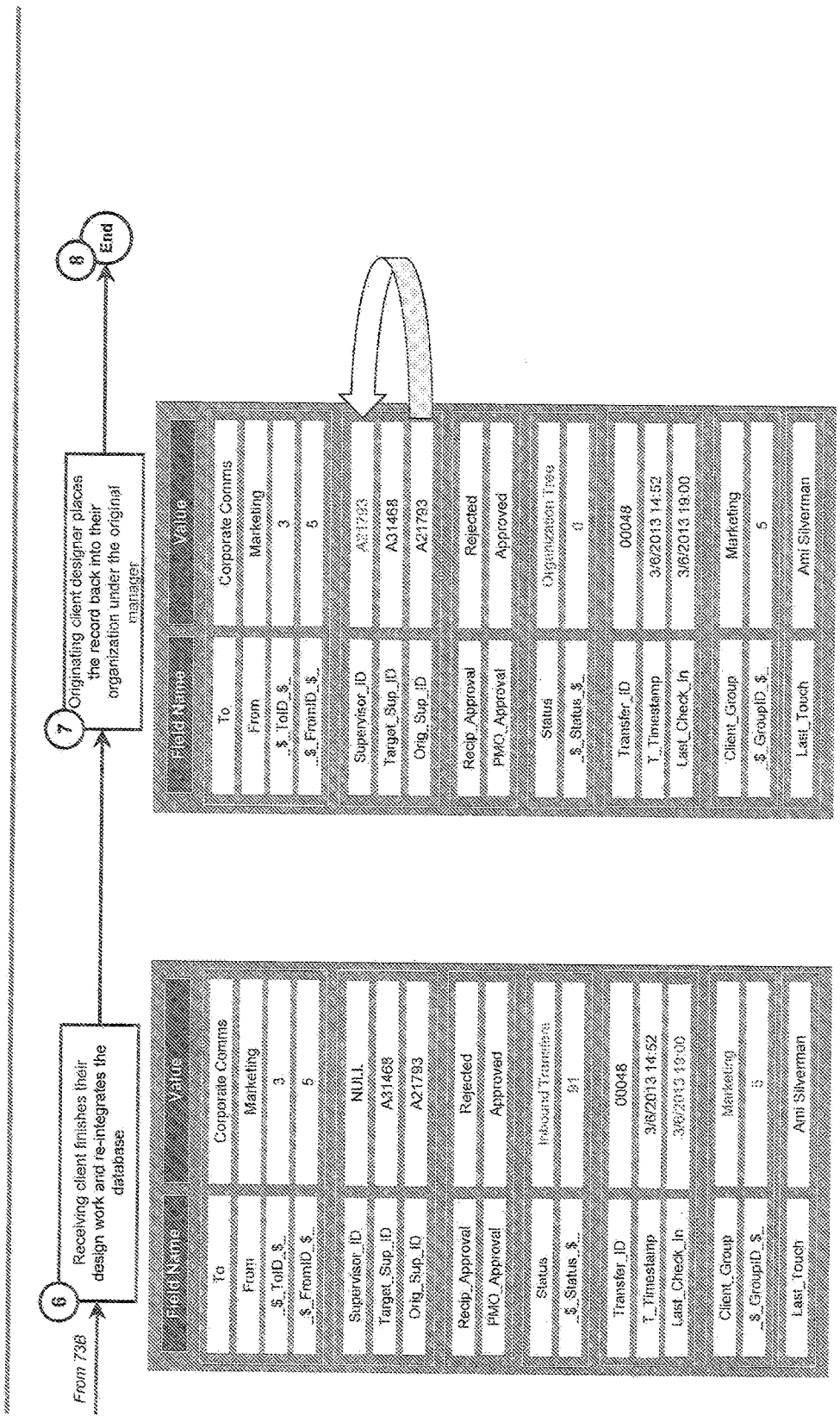

FIGS. 73A-C—Colleague rejection of transfer for top-level/node record

Figure 74A:
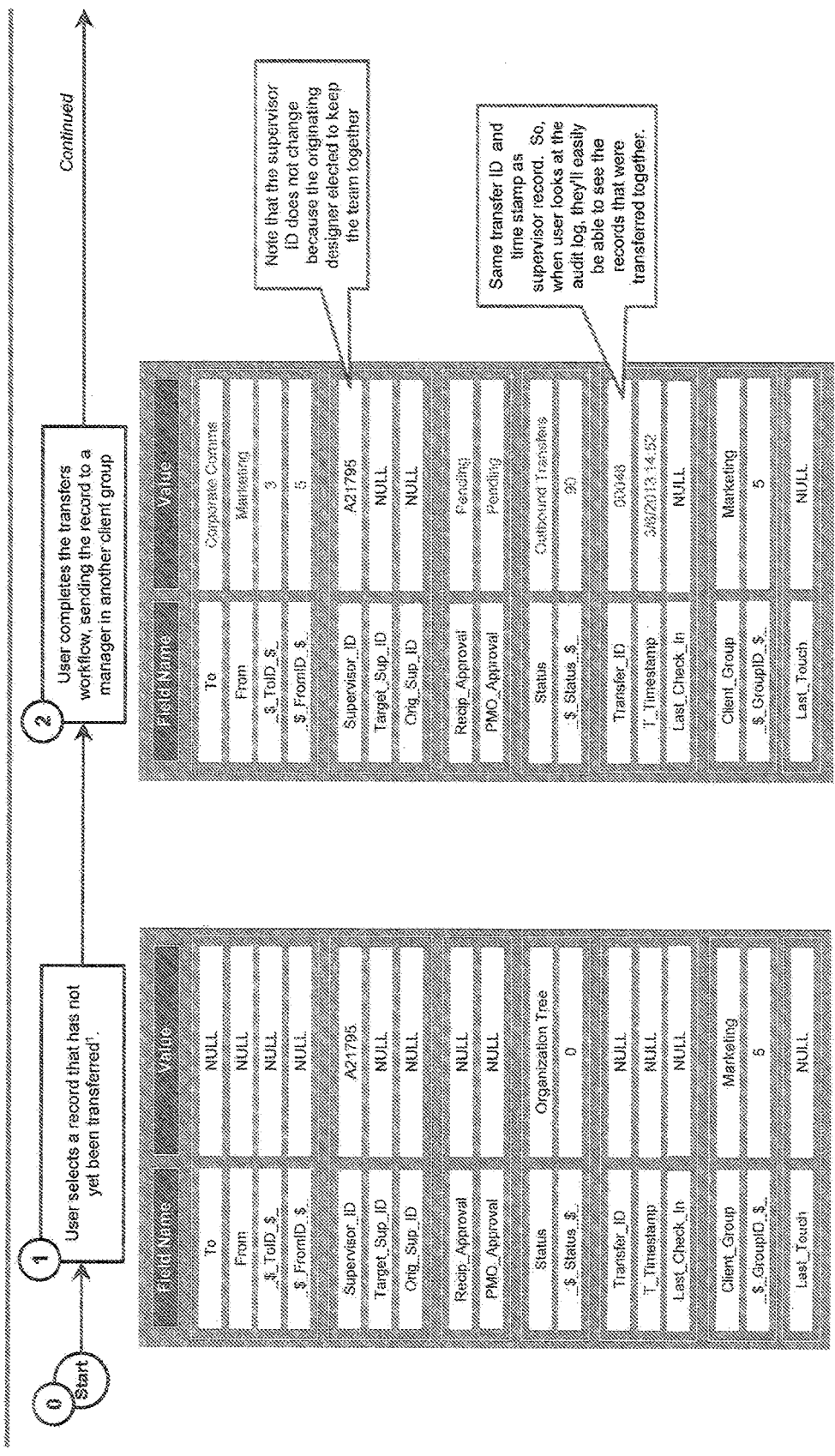
FIGS. 74A-74B show a transfer process according to an embodiment of the invention.
Figure 74B:
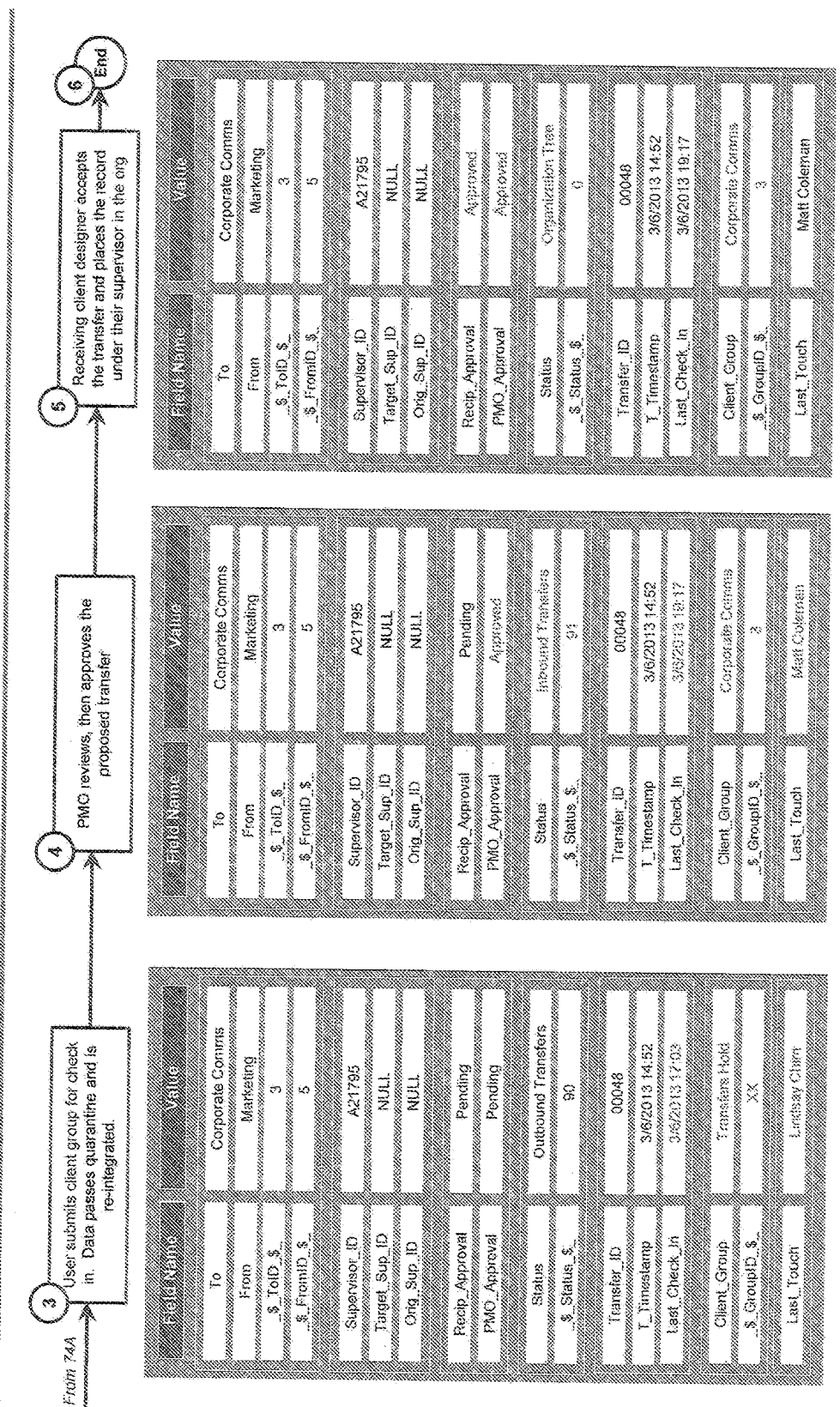

FIGS. 74A-B—Approved transfer of direct report following a top-level/node record All transfer functionality may apply to staffed positions, unstaffed positions, and/or unstaffed people. People requests can be made in staffing mode with flags or tags when people have been flagged for placement in a new position.

Example: Collaboration Modes in the Cascading Organization Design Process

Note that the following examples are intended to illustrate a possible user interaction with the system 110. In various embodiments and examples, some or all of the steps performed in these examples may not necessarily be performed in the order described, may not be performed at all, and other additional steps may be performed.

Figure 66:
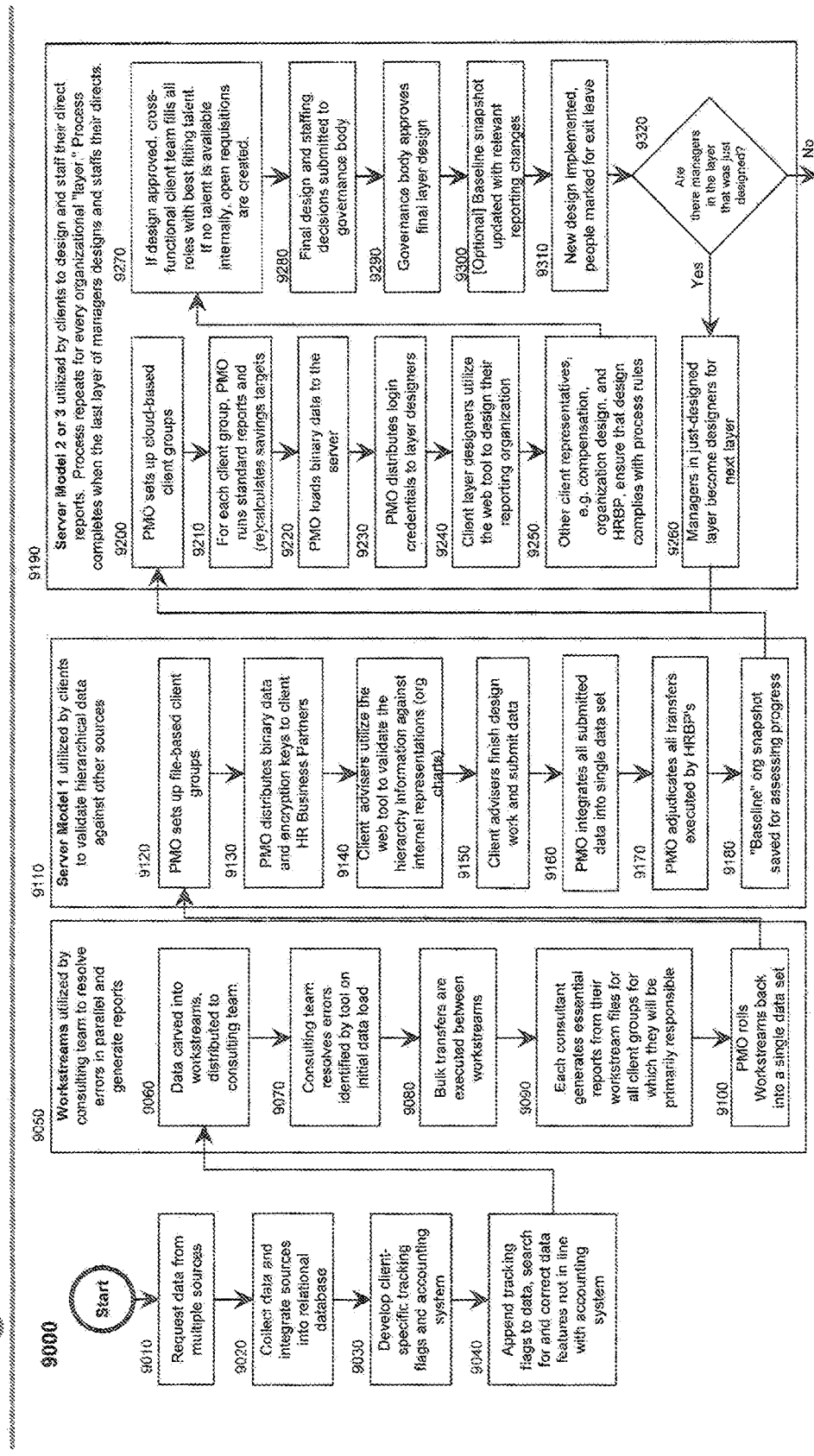
FIG. 66 is a collaboration process according to an embodiment of the invention.

FIG. 66 demonstrates that the methods of collaboration described in this patent application may not be mutually exclusive. FIG. 66 details a cascading organization design process in which, after a "clean baseline" has been developed 9010-9180, each organizational layer designs the layer below it 9190. For example, once the design of layer 3 has been finalized, the people marked for exiting the organization are transitioned out and the remaining layer 3 managers design their own set of layer 4 direct reports. Once the layer 4 design is finalized, the people marked for exit leave, and the remaining managers design their direct reports, etc.

Design of the organization can be with people and positions combined or as distinct steps. When steps are separated, candidate slates may be created to identify specific people for designated roles. The user may create a "slate" or ranked list of candidates either by using the full organization or filtering a pool. The user may select individuals, but the action is not finalized until the person has been moved into that position (e.g. unstaffed from baseline role, transferred to new group accepted by new group, and placed in position). Historical slate information may be retained for tracking purposes.

In the cascading design process described here, any collaboration method described in this application could be substituted for any other at any time. No particular piece of work is dependent only upon a single mode of operation. Instead, the project management office can tailor the application to the needs of the engagement.

FIG. 66 illustrates one embodiment of the process that employs three of the four collaboration models: In steps 9010-9040, the project management office requests and receives data, typically from multiple sources (e.g. HRIS systems, financial reporting systems, etc.). The project management office may then, for example, develop a system for accounting specific to the needs of the engagement/client; then, append fields to the data set to facilitate that accounting system.

After preparing the data, the PMO may employ the workstreams function 9050 to distribute non-overlapping subsets of the data to a distributed team for editing in parallel. The team may then resolve errors initially identified during the data load process, but not resolved by the PMO (as seen in FIG. 9, 860-870). The team may be tasked with error resolution because they are in close contact with the owners of the effected organizations and/or the quantity of identified errors is quite high. After each individual completes resolving errors, they may utilize the workstreams-specific transfer functionality to transfer large sets of records from one workstream to another, 9080. The need for those transfers may be especially acute during a change in target operating model. After executing those transfers, each consultant may utilize the report generator to create a standard set of reports that may describe critical features of the organizations of their client counterparts. Once that reporting is complete, the PMO may collect the data for each workstream from each consulting team member 9100, and re-integrate the workstreams as described in FIG. 9.

After the PMO has successfully integrated the data, they may choose to employ the file-based client groups, a.k.a. server model 1, to validate the data that has been loaded and cleaned. This model may be available before models 2 or 3 because, for example, the security audit performed by the client on those two models may take longer than the one for the first. In this instance, "validate" may mean checking the data against other sources, for example org charts or budgets. In this embodiment of the process, the PMO may choose to engage the client human resource business partner for this validation task, 9140. There may be alternate embodiments that involve different clients, users, and/or stakeholders. Once the client HRBP's submit their data to the PMO (for example, by transferring a file over email) 9160, the PMO may then adjudicate all transfers that have occurred while server model 1 was employed. In other words, in this embodiment, the PMO must review each transfer and approve its destination. If the transfer were to be provided without critical information, like the Supervisor ID, the PMO may choose to reach out to the recipient for guidance in completing the transfer.

Once the transfers are complete, the PMO may use the "Save Backup" functionality in the desktop tool to create a snapshot of the organizational data to which they can compare other organizational snapshots to assess progress, 9180. This first snapshot is typically called the "baseline snapshot." The baseline, however, may not be static. The PMO may choose to apply some changes suggested during the design phase to the baseline, as the broad team may not catch all discrepancies between reality and the data during the validation stage.

After the data has been validated 9110, the "cascade" portion of the design and staffing process begins. Any of the collaboration mechanisms described herein could facilitate this process. However, this specific embodiment employs server model 3. In step 9200, the PMO sets up cloud-based client groups, using the workflows described in FIGS. 41A-41E. The PMO may then assigns a savings target to each user that will be designing their direct reports 9210. The savings targets may take many forms, for example a decrease in operating expenses or a reduction in headcount. In fact, the targets may not be limited to savings alone. For example, increasing span of control reduction in overall layers, or higher talent base may increase organizational efficiency. When distributing login credentials 9220 before uploading the data 9230, the PMO may choose to include the savings targets calculated in 9210.

Once users receive their credentials, they may log into the web application to check out a client group over which they may establish ownership. The user then checks out that client group and performs some design work, e.g. consolidating teams or moving to a shared services model 9240. Once the principal designer, i.e. the manager designing their direct reports, a cross-functional team of clients may need to validate the principal designer's work or append additional information 9250, e.g. pay grade and estimated salary for new positions.

Once the cross-functional team has approved the design, a staffing phase may begin, in which the cross-functional team works to fill the positions created in the design phase with available people 9270 using a slating, posting or other process. During slating, the designer may filter available people into specific staffing pools, then rank order preferred candidates. Either a PMO facilitated, offline, and/or flag based facilitation may ensue. Each person from the baseline may be either placed in a designed role or exited. During posting, an open role may be created for candidates to view. Candidates can apply for specific positions either based on existing HR systems and/or databases or directly via a proprietary database. Regardless of the approach, custom fields may be designated to track progress at the individual level. Once a person is placed, in some embodiments, no further changes can be made. In other embodiment, changes may be made. Once the final design and staffing choices have been made, the design may be submitted to a governing body for further review 9280. In alternate embodiments, the governance body may be involved earlier, more frequently, or not at all. Similarly, a cross-functional team is common but not required.

Once the governance body has approved the final design and staffing, the PMO may choose to incorporate certain aspects of the new design into the baseline 9300. For example, if it has been agreed that transfers between client groups are to be cost neutral, then transferred records should be in their new home in the baseline. In 9310, the new design of the direct reports' may be implemented and people marked for exiting the organization may leave. The process repeats until there are no managers in the designed layer, 9320, 9260.

Figure 75:
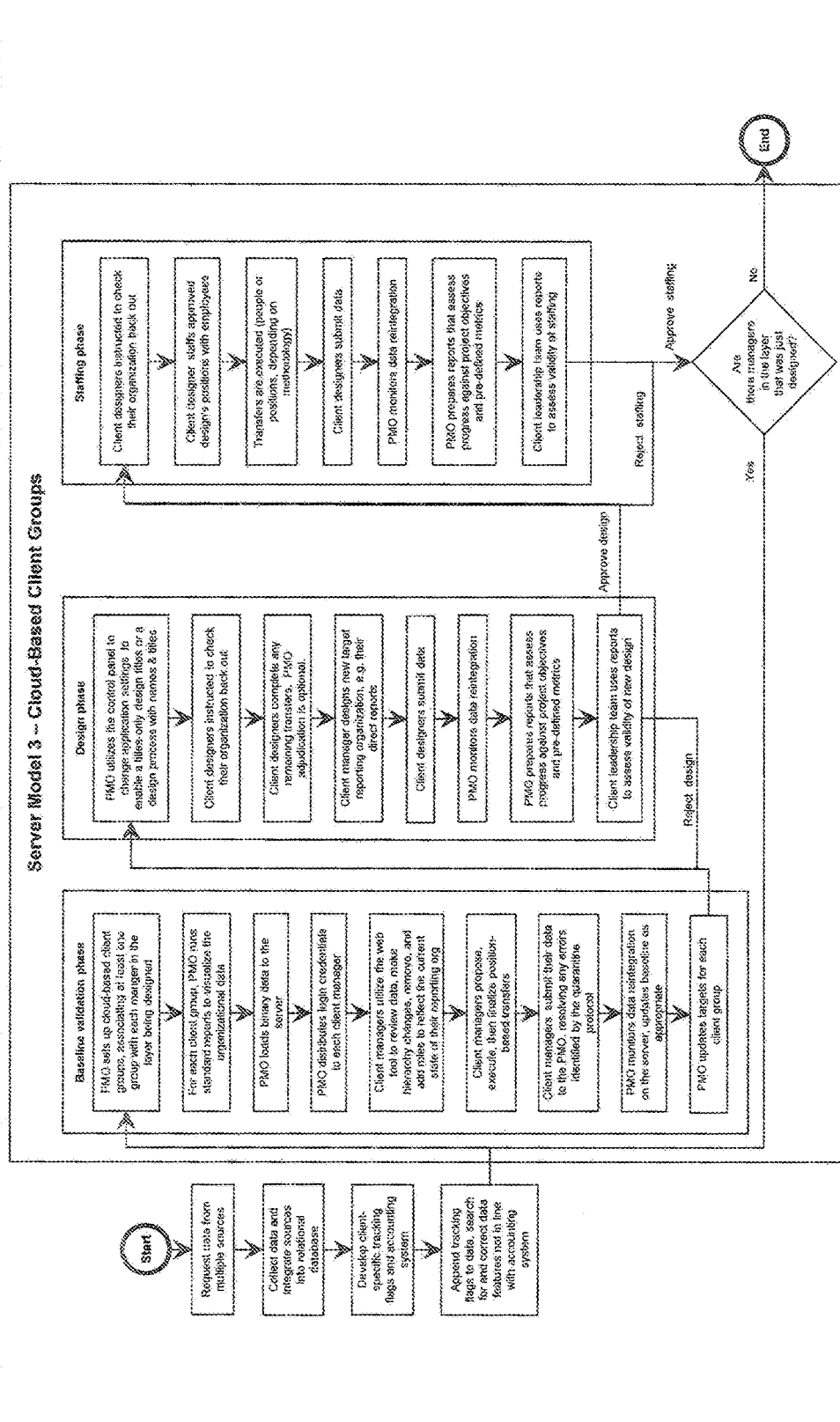
FIG. 75 is a collaboration process according to an embodiment of the invention.

The sub-process 9190 illustrates a possible iterative process for designing and/or staffing multiple layers of an organization. An alternative example of such a process may proceed as follows and may be illustrated in FIG. 75:

A. Identify and carve out client group
B. Baseline validation
   distribute to client manager to review baseline, make hierarchy changes, remove, add roles to reflect current operations propose/finalize position based transfers (refer to transfer processes discussed above)
reintegrate data and checks
update targets C. Design distribute to client manager to design org in boxes only or people in boxes
complete additional transfers
reintegrate data and checks
PMO develops reports that compare against project objectives and pre-defined metrics
client leadership team approves/rejects changes
client group iterates and resubmits for roll up D. Staffing based on designs from step C, purpose individuals in boxes
slate: user selected rank order either from viewing full or partial organization, or from staffing pool, or from another method
post: candidate applies for role
transfers (people only or people with positions depending on methodology)
PMO develops reports that compare against project objectives and pre-defined metrics—e.g. compare people with position for fit
client leadership team approves/rejects changes
client group iterates and resubmits for roll up
once person confirmed, may be locked for future staffing
if there are individuals that were not included in this or prior cycle, then repeat until every record is addressed . . . this may be done one layer at a time.

FIGS. 76-77 illustrate example models for hierarchical data management, according to embodiments of the invention. Model #1 illustrates a clear, single owner and/or editor. In this model, mutually exclusive allocation is possible. A clear, single owner per carve out may be enabled. For example, one user can own L4, L5 and the levels highlighted beneath L5. Push transfer capability is possible. For example, a user can indicate certain persons and/or positions to push to another group. In this model, there may be limited organization visibility outside of a group.

Model #2 in FIG. 76 illustrates multiple owners and/or editors and full organization visibility. In this model, mutually exclusive allocation is also possible. Multiple owners per carve out is possible, and multiple people may edit simultaneously. This model may provide the ability to partition the organization for one or many users to edit, with the requisite data controls and the ability to lock fields to prevent data errors. For example, a user could have their name or other information tied to Record A that user is editing, and Record A may be locked while being edited by that user. In this way, other users can see that Record A is being edited. In some embodiments, a timer (illustrated in FIG. 76) may indicate how much time a user has remaining to edit records. In some embodiments, some users (e.g., CEO, PMO, managers) may have more edit rights (e.g., full edit rights, partial edit rights) than other users (e.g., lower level employees). Full visibility outside the group is possible, such that users may see the different parts of the organization, as well as certain information about the persons and/or positions in those parts. In some embodiments, some users (e.g., CEO, PMO, managers) may be able to view more information than other users (e.g., lower level employees). For example, a PMO could view one complete partition representing the entire organization. In this model, push transfer capability is possible. In addition, pull transfer capability is also possible. For example, a user can indicate certain persons and/or positions to pull to his group.

Model #2 in FIG. 77 illustrates a special case where a full organizational group is illustrated. In this example, all records may be allocated to one group, and multiple users can access the group. In this example, no transfers are necessary and all users may be able to view the entire organization.

Model #3 in FIG. 77 illustrates an example of non-hierarchical carve outs. In this model, for example, user A could have access to the dark green areas, user B could have access to the grey areas, and user C could have access to the blue areas. In this example, flexible allocation is possible and cross ownership of fields and records is also possible. Push and/or pull transfer capability is also possible in this embodiment. In addition, full visibility outside of a group is also possible.

Figure 78:
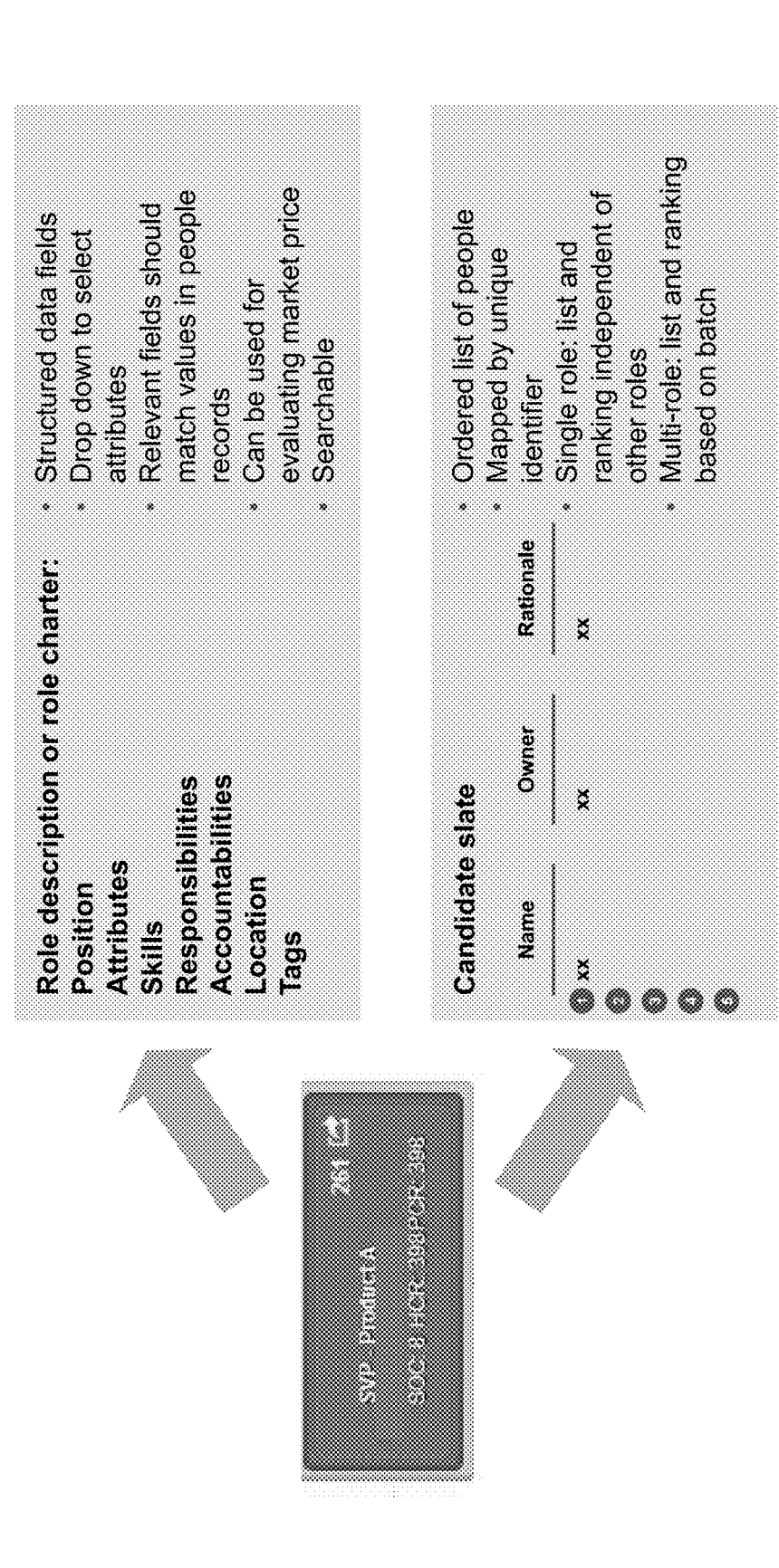
FIG. 78 illustrates a role design view, according to an embodiment of the invention.

FIG. 78 illustrates role information, according to an embodiment of the invention. Role description and/or role charter record information may be illustrated in the role design view. This record information may comprise field information related to: position information, attributes, skills, responsibilities, accountabilities, location information, or tag information, or any combination thereof. A role description or role charter record may comprise structured data fields. A drop down menu may be used to, for example, select attributes. Relevant fields should match values in people records. The information may be used to evaluate a market price for a position. A user may create, edit, search and/or view role descriptions and/or role charters within a hierarchical data tool. A user may also create staffing slates related to one or more roles in a hierarchical data tool.

FIG. 78 also illustrates a candidate slate, which may be an ordered list of people for a certain role or position. The candidate slate may comprise name, owner, rationale, and/or number of request information. The candidate slate information may be mapped by unique identifiers. For a single role candidate slate, a list may be made and ranked independent of other roles. For a multi-role candidate slate, a list may be made and ranked based on batch information.

Figure 79:
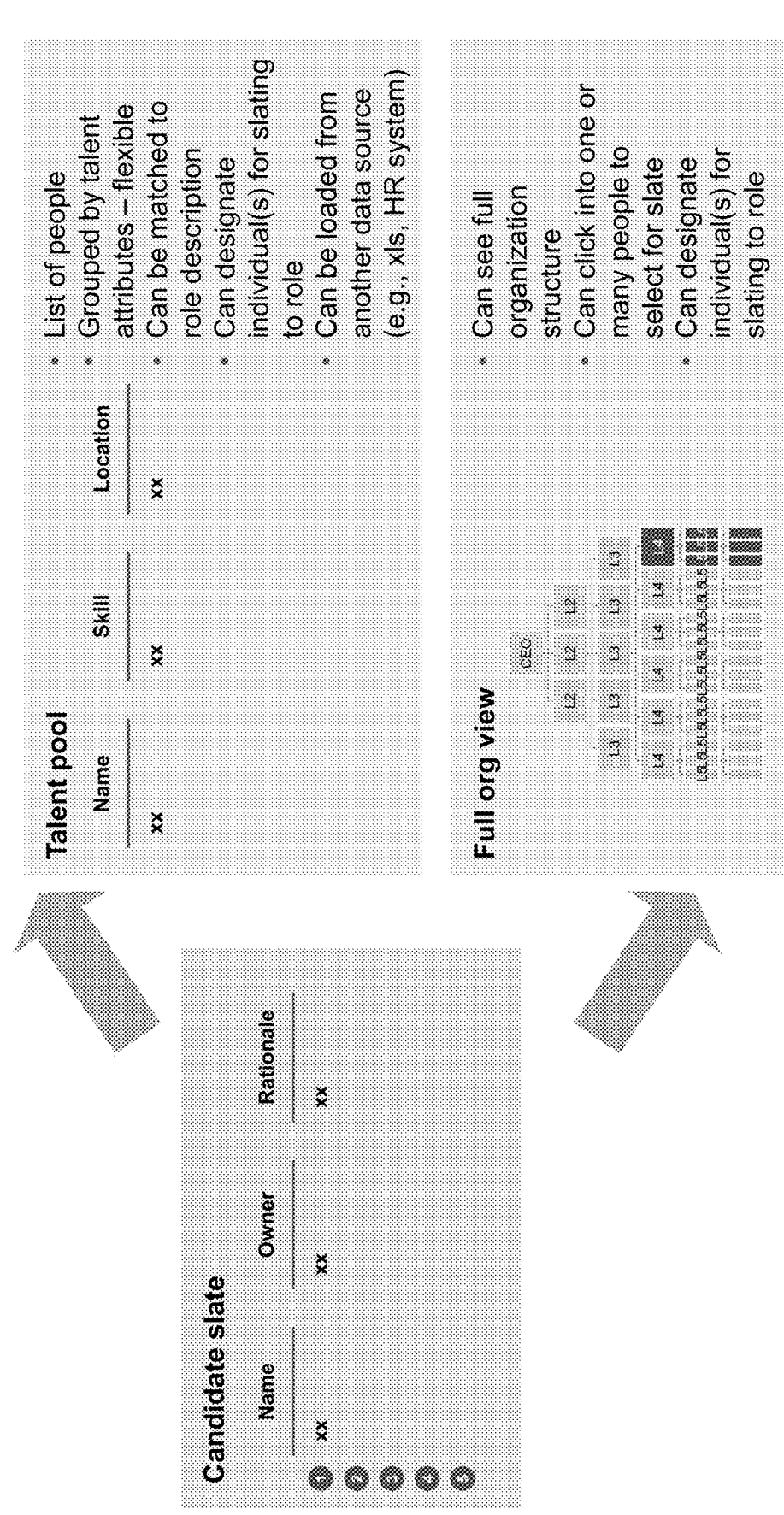
FIG. 79 illustrates example role and candidate slate information, according to an embodiment of the invention.

FIG. 79 illustrates additional candidate slate information, according to an embodiment of the invention. Talent pool information may be included, which may comprise a list of people. The people may be grouped by talent attributes (which can be flexible). The people can be matched to a role description. Individuals can be designated for slating to a role. In some embodiments, the talent pool information may be loaded from another data source (e.g., xls, HR system). The talent pool information may provide the ability to match talent to roles using unique identifiers: from filtered pools, pulled from an organization view and/or list; or taken from an xls upload, or any combination thereof.

A full organization view may also be shown. In this way, the full organization structure may be viewed. One or more people can be selected (e.g., by clicking on their positions/roles) for a slate. Individuals can be designated for slating to one or more roles.

FIG. 80 illustrates a request count in slate and person views, according to embodiments of the invention. In the position view, information about the position may be included. In the person view, the name of the person may be included. The number of requests per person may be tied between people and positions.

FIG. 81 illustrates a conflict resolution process, according to an embodiment of the invention. In 8105, it may be determined whether a person has at least one request to be placed. If no, in 8110, it may be determined whether the person has high potential. If no, the person does not have high potential, in 8115 no action is taken. If it is determined that yes, the person does have high potential, in 8120 HR may be notified for offline resolution.

If the answer to 8105 is yes, in 8125 it is determined whether the person has at least one request for placement. If there is one request and it is a top candidate, in 8130 the role may be confirmed. If there is one request it is not a top candidate, in 8135 the requestor may be notified. If there are more than one request, in 8140 all requestors may be notified.

Using the conflict resolution process, a consolidated list may be made for offline resolution. Alerts within the tool may notify users when there are conflicts and/or recommendations. Final placement of a person can lock availability for other roles for that person. In addition, final placement can change the status and/or adjust the order of requested slates.

Using the conflict resolution process, the ability to compare candidate slate and/or nominated individuals to show or adjudicate conflicts can be applied to staffed positions and unstaffed people. Using the conflict resolution process, the ability to automatically shift pools and slates once a role has been confirmed as staffed may be enabled.

Conclusion

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown. In particular, the elements of any flowchart or process figures may be performed in any order and any element of any figures may be optional.

Although the term "at least one" may often be used in the specification, claims and drawings, the terms "a", "an", "the", "said", etc. also signify "at least one" or "the at least one" in the specification, claims and drawings. The terms "including" and "comprising" and any similar terms should be interpreted as "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for editing hierarchical data comprising: performing processing associated with copying, with a data management module in communication with a processor, data subsets of hierarchical data, the data subsets comprising person and position data from a general database, the hierarchical data comprising a plurality of layers comprising at least three layers, wherein each of the plurality of layers is linked to at least one other of the plurality of layers in a hierarchical fashion, and wherein a first layer comprises at least two second layer data subsets, and each second layer data subset comprises at least two third layer data subsets, each second layer data subset and each third layer data subset each stored in a separate table within the general database with established boundaries between different data subsets and clear ownership over the different data subsets;

performing processing associated with generating, with the data management module, at least two workstreams, wherein each workstream comprises a non-overlapping data subset that has clear ownership and is separately editable in accordance with the established boundaries;

performing processing associated with sending, with the data management module, the at least two workstreams to at least two users;

performing processing associated with receiving, with the data management module, an edit to a first workstream from a first user and an edit to a second workstream from a second user;

after receiving edits, performing processing associated with editing, with the data management module, the hierarchical data in the general database according to the edits made by the first user and the second user;

performing processing associated with displaying a full organization view of persons and positions in the organization that includes the edits made by the first user and the second user; and performing processing associated with displaying tag information in the full organization view, the tag information comprising requests for transfers and/or a number of requests.

2. The method of claim 1, further comprising performing processing associated with enabling the at least two users to simultaneously edit group data and/or subset data, the group data and/or subset data comprising: one or more records, one or more hierarchies, or one or more fields, or any combination thereof.

3. The method of claim 2, wherein a user can lock out other users from editing a piece of data for a pre-determined amount of time.

4. The method of claim 3, wherein a timer is used.

5. The method of claim 1, further comprising performing processing associated with assigning different rights to different users, the rights comprising: edit rights, read rights, transfer rights, or search rights, or any combination thereof.

6. The method of claim 5, wherein the rights can be assigned at a record and/or a field level.

7. The method of claim 1, further comprising:
performing processing associated with requesting the persons and/or the positions to be moved to another part of the organization; and/or
performing processing associated with displaying requests in the full organization view.

8. The method of claim 7, further comprising:
performing processing associated with displaying tag information in the full organization view.

9. The method of claim 8, further comprising:
performing processing associated with displaying process tags to show progress against project milestones, the process tags comprising: custom tags, time-based tags, Boolean-based tags, or value-based tags, or any combination thereof.

10. The method of claim 1, further comprising:
performing processing associated with creating slates for open positions to identify rank ordered candidates.

11. The method of claim 10, the slates enabling requests made to a current manager of a candidate and/or the slates enabling confirmation of placement of a candidate.

12. The method of claim 1, further comprising:
performing processing associated with displaying performance metrics for: savings to a target; implementation progress; efficiency metrics; talent metrics; or accountability information;
or any combination thereof.

13. The method of claim 1, wherein multiple organizations and/or groups are supported such that people may be shifted across organizations and/or groups.

14. The method of claim 1, wherein changes made to a manager user's fields are applied to records of all personnel managed by the manager.

15. The method of claim 1, wherein a manager has permission to edit any records of all personnel managed by the manager.

* * * * *